US012077241B2

(12) United States Patent
Zawistowski

(10) Patent No.: US 12,077,241 B2
(45) Date of Patent: Sep. 3, 2024

(54) MULTI-BODY VEHICLE SUSPENSION LINKAGE

(71) Applicant: YETI CYCLING, LLC, Golden, CO (US)

(72) Inventor: Peter Zawistowski, Lakewood, CO (US)

(73) Assignee: YETI CYCLING, LLC, Golden, CO (US)

( * ) Notice: Subject to any disclaimer, the term of this patent is extended or adjusted under 35 U.S.C. 154(b) by 456 days.

(21) Appl. No.: 16/779,406

(22) Filed: Jan. 31, 2020

(65) Prior Publication Data

US 2020/0247500 A1 Aug. 6, 2020

Related U.S. Application Data

(60) Provisional application No. 62/894,469, filed on Aug. 30, 2019, provisional application No. 62/867,169, filed on Jun. 26, 2019, provisional application No. 62/833,496, filed on Apr. 12, 2019, provisional application No. 62/815,675, filed on Mar. 8, 2019, provisional application No. 62/800,181, filed on Feb. 1, 2019.

(51) Int. Cl.
*B62K 25/04* (2006.01)

(52) U.S. Cl.
CPC ........ *B62K 25/04* (2013.01); *B62K 2025/044* (2013.01)

(58) Field of Classification Search
CPC . B62K 2025/044; B62K 25/04; B62K 25/286
USPC .......................................................... 280/284
See application file for complete search history.

(56) References Cited

U.S. PATENT DOCUMENTS

| | | | | |
|---|---|---|---|---|
| 421,748 A * | 2/1890 | McErlain | B62K 25/08 | 280/276 |
| 519,855 A * | 5/1894 | Whitaker | B62K 25/04 | 280/283 |
| 591,306 A * | 10/1897 | Tolson | B62K 25/04 | 280/283 |

(Continued)

FOREIGN PATENT DOCUMENTS

| | | |
|---|---|---|
| CA | 2293366 A1 | 12/1998 |
| CA | 2980086 A1 | 6/2005 |

(Continued)

OTHER PUBLICATIONS

U.S. Patent and Trademark Office, "Final Office Action," mailed Jul. 22, 2021, for U.S. Appl. No. 15/925,165, 15 pages.

(Continued)

*Primary Examiner* — Tony H Winner
*Assistant Examiner* — Hosam Shabara
(74) *Attorney, Agent, or Firm* — Dorsey & Whitney LLP

(57) ABSTRACT

Disclosed herein is a two-wheel vehicle suspension linkage. The suspension linkage includes a suspended body-1, a swingarm body-2, a link body-3, a link body-4, a link body-5, and a link body-6 operatively coupled with one another. Link body 3 is operatively coupled to suspended body 1 and link body 5. Link body 4 is operatively coupled to suspended body 1 and link body 5. Link body 6 is operatively coupled to suspended body 1 and swingarm body 2. Swingarm body 2 is operatively coupled to link body 5.

49 Claims, 130 Drawing Sheets

(56) References Cited

U.S. PATENT DOCUMENTS 630,232 A * 8/1899 Hughes et al. ...... B62K 25/286 280/284
712,784 A * 11/1902 Ellis .................... B62K 25/286 280/284
724,871 A * 4/1903 Hunter .................. B62K 25/04 280/283
944,795 A * 12/1909 Leet et al. ........... B62K 25/286 280/284
1,043,269 A * 11/1912 Stephenson .......... B62K 25/286 280/284
1,068,583 A * 7/1913 Harley ................. B62K 25/286 280/284
1,168,702 A * 1/1916 Babis, Jr. ............. B62K 25/286 280/284
1,220,606 A * 3/1917 Chelstrom ........... B62K 25/286 280/284
1,261,440 A * 4/1918 Rigby .................. B62K 25/286 280/276
1,283,030 A * 10/1918 Ashton ................ B62K 25/286 D12/110
1,369,356 A * 2/1921 Rigby .................. B62K 25/283 280/284
2,173,520 A * 9/1939 Klatt ...................... B62M 1/14 280/262
3,803,933 A * 4/1974 Huret .................. B62M 9/1242 474/82
3,813,955 A * 6/1974 Huret .................. B62M 9/1348 474/82
3,847,028 A * 11/1974 Bergles ............... B62M 9/1248 474/80
3,917,313 A * 11/1975 Smith .................. B62K 25/26 180/227
3,977,697 A * 8/1976 MacPike ............. B62K 25/286 384/908
4,058,181 A * 11/1977 Buell .................... B62K 25/26 180/227
4,076,271 A * 2/1978 Doncque ............. B62K 25/283 180/227
4,114,918 A * 9/1978 Lutz ...................... B62K 25/26 267/260
4,241,617 A * 12/1980 Nagano ................. B62M 25/02 474/82
4,265,329 A * 5/1981 de Cortanze ........ B62K 21/005 180/219
4,279,172 A * 7/1981 Nagano ................ B62M 9/1344 474/82
4,322,088 A * 3/1982 Miyakoshi ........... B62K 25/286 180/227
4,360,214 A * 11/1982 Isono .................. B62K 25/286 280/284
4,408,674 A * 10/1983 Boyesen ............... B62K 25/26 267/222
4,410,196 A * 10/1983 Ribi ...................... B62K 25/24 280/283
4,415,057 A * 11/1983 Yamaguchi .......... B62K 25/286 180/227
4,429,760 A * 2/1984 Koizumi ............... B62K 5/027 280/282
4,433,747 A * 2/1984 Offenstadt ............ B62K 25/26 180/231
4,463,824 A * 8/1984 Boyesen ............... B62K 25/26 180/231
4,463,964 A * 8/1984 Takayanagi ........... B62K 5/027 180/215
4,485,885 A 12/1984 Fukuchi
4,500,302 A 2/1985 Crepin
4,506,755 A 3/1985 Tsuchida et al.
4,540,193 A 9/1985 Noda et al.
4,544,044 A 10/1985 Boyesen
RE32,059 E * 12/1985 Nagano ................. B62M 9/127 474/82
4,558,761 A 12/1985 Boyesen
4,561,519 A 12/1985 Omori
4,574,909 A 3/1986 Ribi
4,582,343 A 4/1986 Waugh
4,586,913 A 5/1986 Nagano
4,596,302 A 6/1986 Suzuki et al.
4,619,633 A 10/1986 Nagano
4,621,706 A 11/1986 Boyesen
4,671,525 A * 6/1987 Ribi ........................ B62M 9/00 180/227
4,673,053 A 6/1987 Tanaka et al.
4,679,811 A 7/1987 Shuler
4,702,338 A 10/1987 Trema
4,735,277 A 4/1988 Prince
4,744,434 A 5/1988 Miyakoshi et al.
4,789,042 A 12/1988 Pitts
4,789,174 A 12/1988 Lawwill
RE32,924 E * 5/1989 Nagano ................. B62M 9/125 474/82
4,830,391 A 5/1989 Silk
4,878,884 A 11/1989 Romano
4,951,791 A 8/1990 Belil Creixell
5,011,459 A 4/1991 Van De Vel
5,121,937 A 6/1992 Lawwill
5,205,572 A 4/1993 Buell et al.
5,226,674 A 7/1993 Buell et al.
5,244,224 A 9/1993 Busby
5,259,637 A 11/1993 Busby
5,282,517 A 2/1994 Prince
5,295,702 A 3/1994 Buell
5,299,820 A 4/1994 Lawwill
5,306,036 A 4/1994 Busby
5,332,246 A 7/1994 Buell
5,335,929 A 8/1994 Takagaki et al.
5,354,085 A 10/1994 Gally
5,356,165 A 10/1994 Kulhawik et al.
5,360,078 A 11/1994 Rifenburg et al.
5,370,411 A 12/1994 Takamiya et al.
5,409,248 A 4/1995 Williams
5,409,249 A 4/1995 Busby
5,417,445 A 5/1995 Smart
5,429,380 A 7/1995 Lawwill
5,435,584 A 7/1995 Buell
5,441,292 A 8/1995 Busby
5,452,910 A * 9/1995 Harris ................... B62K 25/26 280/283
5,474,318 A 12/1995 Castellano
5,498,013 A 3/1996 Hwang
5,509,679 A 4/1996 Leitner
5,553,881 A 9/1996 Klassen et al.
5,570,896 A 11/1996 Collins
5,597,366 A 1/1997 Ozaki
5,607,367 A 3/1997 Patterson
5,611,557 A 3/1997 Farris et al.
5,628,524 A 5/1997 Klassen et al.
5,658,001 A 8/1997 Blanchard
5,678,837 A 10/1997 Leitner
5,688,200 A 11/1997 White
5,772,228 A 6/1998 Owyang
5,791,674 A 8/1998 D'Aluisio et al.
5,816,966 A 10/1998 Yang et al.
5,826,899 A 10/1998 Klein et al.
5,899,480 A 5/1999 Leitner
5,957,473 A 9/1999 Lawwill
6,012,999 A 1/2000 Patterson
6,076,845 A 6/2000 Lawwill et al.
6,086,080 A 7/2000 Scheffer
6,102,421 A 8/2000 Lawwill et al.
6,131,934 A 10/2000 Sinclair
6,203,042 B1 * 3/2001 Wilcox ............... B62K 25/286 280/283
6,206,397 B1 3/2001 Klassen et al.
6,244,610 B1 6/2001 Kramer-Massow
6,406,048 B1 6/2002 Castellano
6,439,593 B1 8/2002 Tseng
6,450,520 B1 9/2002 Girard
6,488,301 B2 12/2002 Klassen et al.
6,543,799 B2 4/2003 Miyoshi
6,629,903 B1 10/2003 Kondo
6,712,374 B2 3/2004 Assier

(56) References Cited

U.S. PATENT DOCUMENTS 6,793,230 B1 9/2004 Cheng
6,843,494 B2 1/2005 Lam
6,845,998 B2 1/2005 Probst
6,871,867 B2 3/2005 Parigian
6,877,591 B1 4/2005 Hso
6,886,846 B2 5/2005 Carroll
6,902,504 B2 6/2005 Fukuda
6,926,298 B2 8/2005 Ellsworth et al.
6,955,373 B2 10/2005 Chang
6,969,081 B2 11/2005 Whyte
7,025,698 B2 4/2006 Wickliffe
7,048,292 B2 5/2006 Weagle
7,066,481 B1 6/2006 Soucek
RE39,159 E * 7/2006 Klassen ............... B62K 25/286 280/283
7,097,190 B2 * 8/2006 Matsumoto ............. B62M 9/04 280/281.1
7,100,930 B2 9/2006 Saiki
7,104,908 B2 9/2006 Nagano
7,128,329 B2 10/2006 Weagle
7,131,511 B2 11/2006 Arnold
7,210,695 B2 5/2007 Griffiths
7,216,883 B2 5/2007 Oconnor
7,296,815 B2 * 11/2007 Ellsworth ............. B62K 25/26 280/284
7,350,797 B2 * 4/2008 Carroll .................. B62K 25/28 280/283
7,377,535 B2 5/2008 Chamberlain
7,392,999 B2 7/2008 Oconnor
7,395,892 B2 * 7/2008 Alonzo ................ B62K 25/286 180/227
7,413,208 B2 8/2008 Weng
7,427,077 B2 9/2008 Lesage et al.
7,467,803 B2 12/2008 Buckley
7,494,146 B2 2/2009 Tseng
7,556,276 B1 7/2009 Dunlap
7,581,743 B2 9/2009 Graney
7,635,141 B2 12/2009 Oconnor
7,658,394 B1 2/2010 Huang
7,677,347 B2 3/2010 Brawn
7,703,785 B2 4/2010 Colegrove et al.
7,703,788 B2 4/2010 Tanouye et al.
7,712,757 B2 5/2010 Berthold
7,717,212 B2 5/2010 Weagle
7,722,072 B2 5/2010 Hoogendoorn
7,722,488 B2 5/2010 Kunisawa et al.
7,766,135 B2 8/2010 Fox
7,784,810 B2 8/2010 Graney
7,806,422 B2 10/2010 I
7,815,207 B2 10/2010 Currie
7,828,314 B2 11/2010 Weagle
7,837,213 B2 11/2010 Colegrove et al.
7,837,214 B2 11/2010 Tribotte
7,891,688 B2 2/2011 Chamberlain
7,909,347 B2 * 3/2011 Earle ..................... B62K 25/26 280/283
7,914,407 B2 3/2011 Fukushima et al.
7,934,739 B2 5/2011 Domahidy
7,938,424 B2 5/2011 Arraiz
7,938,425 B2 5/2011 Chamberlain
7,954,837 B2 6/2011 Talavasek
7,963,541 B2 6/2011 Chamberlain
7,971,892 B2 7/2011 Sasnowski et al.
7,980,579 B2 7/2011 Buckley
8,002,301 B2 8/2011 Weagle
8,006,993 B1 8/2011 Chamberlain
8,007,383 B2 8/2011 Watarai et al.
8,012,052 B2 9/2011 Shahana
8,033,558 B2 10/2011 Earle
8,066,297 B2 11/2011 Beale et al.
8,075,009 B2 * 12/2011 Cocalis ................. B62K 25/28 280/284
8,136,829 B1 3/2012 Kang et al.
8,152,191 B2 4/2012 Huang et al.
8,201,841 B2 6/2012 Beale et al.
8,272,657 B2 9/2012 Graney et al.
8,272,658 B2 9/2012 Hoogendoorn
8,286,982 B2 10/2012 Plantet et al.
8,303,443 B2 11/2012 Wickliffe et al.
8,348,295 B2 1/2013 Beaulieu et al.
8,376,382 B2 2/2013 Twers
8,382,136 B2 2/2013 Beale et al.
8,419,573 B2 4/2013 Yamaguchi
8,430,415 B2 4/2013 Earle et al.
8,434,776 B2 5/2013 Wuthrich
8,439,383 B2 5/2013 Talavasek
8,459,680 B2 6/2013 Chamberlain
8,585,070 B2 11/2013 Beale
8,590,914 B2 11/2013 Domahidy
8,622,411 B1 1/2014 Chamberlain
8,641,072 B2 2/2014 Graney et al.
8,646,797 B2 2/2014 Buckley
8,678,962 B2 3/2014 Jordan
8,696,008 B2 4/2014 Hoogendoorn
8,727,057 B2 5/2014 Park et al.
8,733,774 B2 5/2014 Graney et al.
8,770,360 B2 7/2014 Fox
8,833,785 B2 9/2014 Wagner
8,851,498 B2 10/2014 Alsop
8,882,127 B2 11/2014 Colegrove et al.
8,919,799 B2 12/2014 Wimmer
8,931,793 B2 1/2015 Klieber
8,932,162 B2 1/2015 Emura et al.
8,998,235 B2 4/2015 Beale
9,039,026 B2 5/2015 Hudec
9,056,644 B2 6/2015 Hudák
9,056,647 B2 * 6/2015 Hu ......................... B62K 25/04
9,061,729 B2 6/2015 Canfield et al.
9,102,378 B2 * 8/2015 Zawistowski ............ B62K 3/02
9,102,379 B2 8/2015 Capogna
9,127,766 B2 9/2015 Kuwayama et al.
9,145,185 B1 9/2015 Claro
9,156,521 B2 10/2015 Lumpkin
9,168,977 B2 10/2015 McLeay
9,216,791 B2 * 12/2015 Hudec .................... B62K 25/28
9,221,513 B2 12/2015 Hoogendoorn
9,242,693 B2 * 1/2016 Voss ....................... B62K 25/20
9,302,732 B2 4/2016 Beale
9,327,792 B2 5/2016 Johnson et al.
9,334,011 B2 5/2016 Chamberlain
9,376,156 B2 6/2016 Chamberlain
9,376,162 B2 6/2016 Colegrove et al.
9,457,871 B2 10/2016 Kuwayama et al.
9,469,369 B2 * 10/2016 Thoma ................... B62K 25/12
9,505,462 B2 11/2016 Pasqua et al.
9,561,834 B2 2/2017 Zawistowski
9,598,131 B2 3/2017 Zusy et al.
9,598,140 B2 3/2017 Berthold
9,637,199 B2 5/2017 Pasqua et al.
9,676,446 B2 6/2017 Pasqua et al.
9,758,217 B2 9/2017 Bortoli et al.
9,821,879 B2 11/2017 Hoogendoorn et al.
9,908,583 B2 3/2018 Matheson et al.
9,919,765 B2 3/2018 Wickliffe et al.
9,988,122 B2 6/2018 Pedretti
10,011,318 B2 7/2018 Beale
10,099,739 B2 * 10/2018 Nishikawa ............. B62K 19/34
10,160,512 B2 12/2018 Beale
10,336,398 B2 7/2019 Hudec
10,343,742 B2 7/2019 Zawistowski
10,363,988 B2 7/2019 Buckley
10,640,169 B2 5/2020 Pedretti
10,703,433 B2 * 7/2020 Lauer ....................... B62M 9/02
10,926,830 B2 * 2/2021 Zawistowski .......... B62K 25/30
11,052,964 B2 * 7/2021 Wallace ............... B62K 25/286
2001/0024024 A1 9/2001 Klassen et al.
2003/0038450 A1 2/2003 Lam
2003/0090082 A1 5/2003 Ellsworth et al.
2003/0160421 A1 * 8/2003 Assier .................. B62K 25/286 280/283
2003/0193163 A1 * 10/2003 Chamberlain ........... B62K 3/04 280/284

(56) References Cited

U.S. PATENT DOCUMENTS

| | | | | |
|---|---|---|---|---|
| 2003/0193164 | A1* | 10/2003 | Parigian | B62K 25/283 180/227 |
| 2004/0046355 | A1 | 3/2004 | Carroll | |
| 2004/0061305 | A1 | 4/2004 | Christini | |
| 2004/0239071 | A1 | 12/2004 | Chamberlain et al. | |
| 2005/0057018 | A1 | 3/2005 | Saiki | |
| 2005/0067809 | A2 | 3/2005 | Chamberlain | |
| 2005/0067810 | A1 | 3/2005 | Weagle | |
| 2005/0184483 | A1 | 8/2005 | Buckley | |
| 2005/0253357 | A1 | 11/2005 | Chang et al. | |
| 2005/0285367 | A1 | 12/2005 | Chang et al. | |
| 2006/0022428 | A1 | 2/2006 | Whyte | |
| 2006/0061059 | A1 | 3/2006 | Lesage et al. | |
| 2006/0071442 | A1 | 4/2006 | Hoogendoorn | |
| 2006/0119070 | A1 | 6/2006 | Weagle | |
| 2006/0181053 | A1 | 8/2006 | Huang et al. | |
| 2006/0197306 | A1 | 9/2006 | Oconnor | |
| 2006/0225942 | A1 | 10/2006 | Weagle | |
| 2006/0231360 | A1 | 10/2006 | Chen | |
| 2007/0024022 | A1 | 2/2007 | Weagle | |
| 2007/0108725 | A1 | 5/2007 | Graney | |
| 2007/0194550 | A1 | 8/2007 | Wadelton | |
| 2007/0210555 | A1 | 9/2007 | Oconnor | |
| 2008/0054595 | A1 | 3/2008 | Lu | |
| 2008/0067772 | A1 | 3/2008 | Weagle | |
| 2008/0217882 | A1 | 9/2008 | Beaulieu et al. | |
| 2008/0238030 | A1 | 10/2008 | Tseng | |
| 2008/0238031 | A1 | 10/2008 | Tseng | |
| 2008/0252040 | A1 | 10/2008 | Colegrove et al. | |
| 2008/0258427 | A1 | 10/2008 | Buckley | |
| 2008/0303242 | A1 | 12/2008 | Oconnor | |
| 2009/0001685 | A1 | 1/2009 | Talavasek et al. | |
| 2009/0026728 | A1 | 1/2009 | Domahidy | |
| 2009/0072512 | A1 | 3/2009 | Earle | |
| 2009/0250897 | A1 | 10/2009 | Tanouye et al. | |
| 2009/0261556 | A1 | 10/2009 | Beale et al. | |
| 2009/0261557 | A1* | 10/2009 | Beale | B62K 19/18 280/284 |
| 2009/0278331 | A1 | 11/2009 | Graney | |
| 2009/0283986 | A1 | 11/2009 | Falke | |
| 2009/0322055 | A1* | 12/2009 | Arraiz | B62K 25/286 280/284 |
| 2010/0059965 | A1 | 3/2010 | Earle | |
| 2010/0102531 | A1 | 4/2010 | Graney et al. | |
| 2010/0109282 | A1 | 5/2010 | Weagle | |
| 2010/0127473 | A1 | 5/2010 | Cocalis et al. | |
| 2010/0156066 | A1 | 6/2010 | Oconnor | |
| 2010/0327553 | A1 | 12/2010 | Talavasek | |
| 2010/0327554 | A1 | 12/2010 | Talavasek | |
| 2010/0327556 | A1 | 12/2010 | Chamberlain | |
| 2011/0025015 | A1 | 2/2011 | Colegrove et al. | |
| 2011/0115181 | A1 | 5/2011 | Weagle | |
| 2011/0140387 | A1 | 6/2011 | Andal et al. | |
| 2011/0175310 | A1 | 7/2011 | Lewis | |
| 2011/0187078 | A1 | 8/2011 | Higgon | |
| 2011/0233892 | A1 | 9/2011 | Domahidy | |
| 2011/0233893 | A1 | 9/2011 | Buckley | |
| 2011/0275256 | A1 | 11/2011 | Gibbs et al. | |
| 2011/0285106 | A1 | 11/2011 | Talavasek | |
| 2012/0223504 | A1 | 9/2012 | Antonot | |
| 2012/0228850 | A1 | 9/2012 | Tseng | |
| 2012/0280470 | A1 | 11/2012 | Colegrove et al. | |
| 2012/0299268 | A1 | 11/2012 | Chamberlain et al. | |
| 2013/0001918 | A1 | 1/2013 | Graney et al. | |
| 2013/0001919 | A1 | 1/2013 | Graney et al. | |
| 2013/0093160 | A1 | 4/2013 | Alsop | |
| 2013/0096781 | A1 | 4/2013 | Reichenbach et al. | |
| 2013/0214503 | A1 | 8/2013 | Chiuppani | |
| 2013/0249181 | A1 | 9/2013 | Becker et al. | |
| 2013/0249188 | A1 | 9/2013 | Beale | |
| 2013/0285346 | A1 | 10/2013 | Wimmer | |
| 2014/0001729 | A1 | 1/2014 | Hudec | |
| 2014/0015220 | A1 | 1/2014 | Talavasek | |
| 2014/0042726 | A1* | 2/2014 | Canfield | B62K 25/30 280/284 |
| 2014/0060950 | A1 | 3/2014 | Beutner | |
| 2014/0109728 | A1 | 4/2014 | Mcrorie, III | |
| 2014/0167385 | A1 | 6/2014 | Gogo et al. | |
| 2014/0217697 | A1 | 8/2014 | Buckley | |
| 2014/0318306 | A1 | 10/2014 | Tetsuka | |
| 2015/0001829 | A1 | 1/2015 | Berthold | |
| 2015/0035241 | A1* | 2/2015 | McLeay | B62K 25/28 280/5.513 |
| 2015/0054250 | A1 | 2/2015 | Hu | |
| 2015/0115569 | A1 | 4/2015 | Matheson et al. | |
| 2015/0175238 | A1 | 6/2015 | Lumpkin | |
| 2015/0183487 | A1 | 7/2015 | Tsai | |
| 2015/0191213 | A1 | 7/2015 | Beale | |
| 2015/0251724 | A1 | 9/2015 | Hudec | |
| 2015/0360743 | A1 | 12/2015 | Oconnor | |
| 2016/0083042 | A1 | 3/2016 | Voss | |
| 2016/0257371 | A1 | 9/2016 | Droux | |
| 2016/0272273 | A1 | 9/2016 | Colegrove et al. | |
| 2016/0280317 | A1 | 9/2016 | Hoogendoorn | |
| 2016/0311493 | A1 | 10/2016 | Scheffer | |
| 2016/0375956 | A1* | 12/2016 | Talavasek | B62K 11/04 180/220 |
| 2017/0101152 | A1 | 4/2017 | Pedretti | |
| 2017/0151996 | A1 | 6/2017 | Southall | |
| 2018/0037295 | A1* | 2/2018 | Beale | B62K 25/30 |
| 2018/0072378 | A1* | 3/2018 | Talavasek | B62K 19/34 |
| 2018/0072379 | A1* | 3/2018 | Talavasek | B62J 43/13 |
| 2018/0072380 | A1* | 3/2018 | Talavasek | B62K 25/28 |
| 2018/0140387 | A1 | 5/2018 | Richard | |
| 2018/0148123 | A1* | 5/2018 | Neilson | B62K 25/286 |
| 2018/0229798 | A1 | 8/2018 | Hoogendoorn et al. | |
| 2018/0265165 | A1* | 9/2018 | Zawistowski | B62K 25/286 |
| 2018/0297661 | A1 | 10/2018 | Beale | |
| 2019/0039682 | A1 | 2/2019 | Zawistowski | |
| 2019/0144069 | A1 | 5/2019 | Beale | |
| 2019/0300096 | A1 | 10/2019 | Chamberlain et al. | |
| 2019/0300097 | A1* | 10/2019 | Chamberlain | B62K 25/26 |
| 2020/0070930 | A1 | 3/2020 | Buckley | |
| 2021/0046996 | A1* | 2/2021 | Beale | B62K 25/30 |
| 2021/0269117 | A1* | 9/2021 | Zawistowski | B62K 25/30 |
| 2022/0153381 | A1* | 5/2022 | Zawistowski | B62K 25/30 |
| 2022/0306240 | A1* | 9/2022 | Talavasek | B62J 45/423 |

FOREIGN PATENT DOCUMENTS

| | | | |
|---|---|---|---|
| DE | 692011 | C | 6/1940 |
| DE | 9405076 | U1 | 5/1994 |
| DE | 9416803 | U1 | 12/1994 |
| DE | 4435482 | A1 | 4/1996 |
| DE | 102019002456 | A1 | 10/2019 |
| DE | 102021104753 | A1 | 9/2021 |
| EP | 0422324 | A1 | 4/1991 |
| EP | 0723907 | B1 | 7/1998 |
| EP | 0941917 | A2 | 9/1999 |
| EP | 1026073 | A1 | 8/2000 |
| EP | 1060979 | A2 | 12/2000 |
| EP | 1238900 | A2 | 9/2002 |
| EP | 2540609 | A1 | 1/2013 |
| EP | 2706002 | A1 | 3/2014 |
| EP | 1799534 | B1 | 8/2014 |
| EP | 2812234 | A1 | 12/2014 |
| FR | 541520 | A | 7/1922 |
| FR | 933079 | A | 4/1948 |
| FR | 2774966 | A1 | 8/1999 |
| GB | 17336 | | 10/1913 |
| GB | 2086319 | A | 5/1982 |
| GB | 2338216 | A | 12/1999 |
| GB | 2522461 | A | 7/2015 |
| GB | 2525870 | B | 1/2017 |
| GB | 2590808 | B | 7/2022 |
| GB | 2594780 | B | 7/2022 |
| JP | H0725378 | A | 1/1995 |
| NL | 2027223 | B1 | 2/2022 |
| WO | 9422710 | A1 | 10/1994 |
| WO | 9803390 | A1 | 1/1998 |
| WO | 9818671 | A1 | 5/1998 |
| WO | 9856645 | A1 | 12/1998 |
| WO | 199944880 | | 9/1999 |
| WO | 9965760 | A1 | 12/1999 |

(56) References Cited

FOREIGN PATENT DOCUMENTS

| | | | |
|---|---|---|---|
| WO | 9944880 | A9 | 1/2000 |
| WO | 03010042 | A1 | 2/2003 |
| WO | 03018392 | A1 | 3/2003 |
| WO | 03021129 | A1 | 3/2003 |
| WO | 2004045940 | A2 | 6/2004 |
| WO | 2005030564 | A2 | 4/2005 |
| WO | 2005030565 | A1 | 4/2005 |
| WO | 2005090149 | A1 | 9/2005 |
| WO | 2006005687 | A1 | 1/2006 |
| WO | 2006032052 | A2 | 3/2006 |
| WO | 2006061052 | A1 | 6/2006 |
| WO | 2008025950 | A1 | 3/2008 |
| WO | 2008130336 | A1 | 10/2008 |
| WO | 2009121936 | A1 | 10/2009 |
| WO | 2010033174 | A1 | 3/2010 |
| WO | 2010103057 | A1 | 9/2010 |
| WO | 2010121267 | A1 | 10/2010 |
| WO | 2012024697 | A1 | 2/2012 |
| WO | 2012027900 | A1 | 3/2012 |
| WO | 2012063098 | A1 | 5/2012 |
| WO | 2012122634 | A1 | 9/2012 |
| WO | 2013028138 | A2 | 2/2013 |
| WO | 2013078436 | A1 | 5/2013 |
| WO | 2013119616 | A1 | 8/2013 |
| WO | 2013142855 | A2 | 9/2013 |
| WO | 2013192622 | A1 | 12/2013 |
| WO | 2014009019 | A1 | 1/2014 |
| WO | 2014029759 | A1 | 2/2014 |
| WO | 2014202890 | A1 | 12/2014 |
| WO | 2015004490 | A1 | 1/2015 |
| WO | 2015196242 | A1 | 12/2015 |
| WO | 2016036237 | A1 | 3/2016 |
| WO | 2016097433 | A1 | 6/2016 |
| WO | 2016134471 | A1 | 9/2016 |
| WO | 2018027192 | A1 | 2/2018 |
| WO | 2018170505 | A1 | 9/2018 |
| WO | 2019010394 | A1 | 1/2019 |
| WO | 2021133996 | A1 | 7/2021 |
| WO | 2021174088 | A1 | 9/2021 |

OTHER PUBLICATIONS

Netherlands Intellectual Property Office, "Search Report and Opinion," issued Nov. 15, 2021, for Dutch Application No. 2027668, in Dutch with some English translations, 24 pages.
EPO, "Extended European Search Report for EP 18768549.0", mailed Feb. 8, 2021.
"Combined Search and Examination Report under Sections 17 and 18(3)", mailed by U.K. Intellectual Property Office on Aug. 25, 2021, for U.K. Application No. GB2102854.3, 8 pages.
"International Search Report & Written Opinion", mailed on Jul. 16, 2021, for PCT Application No. PCT/US2021/020034, 16 pages.
"Netherlands Patent Office, Written Opinion and Search Report mailed Sep. 24, 2021", in Dutch and English, for Netherlands Application No. 2027223, 17 pages.
"U.K. Intellectual Property Office, "Combined Search and Examination Report under Sections 17 an 18(3),"", mailed Apr. 21, 2021, for U.K. Application No. GB2020235.4, 6 pages.
Worsey, "Forbidden Druid Review—Are high pivots just for downhill?", Enduro, [online], Mar. 4, 2019 [retrieved on Jun. 16, 2021], From Internet: <url: https://enduro-mtb.com/en/fobidden-druid-review/>; 15 pages.
"International Search Report mailed Jun. 19, 2020, in PCT Application No. PCT/US2020/016265, 18 pages".
Aston, Paul, "Canyon Sender—Review", https://www.pinkbike.com/news/canyon-sender-review-2017.html, Mar. 13, 2017, 33 pages.
Aston, Paul, "Robot Bike Co R160—First Look", https://www.pinkbike.com/news/robot-bike-co-r160-first-look-2016.html (Accessed Jun. 30, 2020), May 27, 2016, 39 pages.
Author Unknown, "Sarrus Linkage", Wikipedia, http://en.wikipedia.org/wiki/Sarrus_linkage, 1 page, at least as early as Aug. 20, 2010.
Chen, "Design of Structural Mechanisms", A dissertation submitted for the degree of Doctor of Philosophy in the Department of Engineering Science at the University of Oxford, St Hugh's College, 2003, 160 Pages.
Cunningham, Richard , "First Look: Felt 2014", https://www.pinkbike.com/news/First-Look-Felt-2014.html (Accessed Jun. 30, 2020), Aug. 7, 2013, 20 pages.
DB Bikes, "Felt Compulsion 50 Mountain Bike 2017", https://downhillbikesforsale.com/products/Felt-Compulsion-50-Mountain-Bike-2017.html, (Accessed Jun. 30, 2020), 9 pages.
EP, "European Extended Search Report", Application No. 12851566.5, May 28, 2015, 7 pages.
EP, "Extended European Search Report", Application No. 11818903.4, Sep. 15, 2015, 8 pages.
EP, "Supplementary Search Report", Application No. 05798319.9, Dec. 11, 2009, 1 page.
Foale, Tony, "Motorcycle Handling and Chassis Design: The Art and Science", https://epdf.pub/motorcycle-handling-and-chassis-design-the-art-and-science.html, Mar. 2002, 498 pages.
Giant Bicycles, "Anthem Advanced Pro 29 1", https://www.giant-bicycles.com/us/anthem-advanced-pro-29-1-2021, (Accessed Sep. 14, 2020), 8 pages.
Kavik Bicycles, "Kavik Regen Suspension", (Accessed Jun. 30, 2020), 2 pages.
Li, "Movable Spatial 6R Linkages", XP055249075, Retrieved from the Internet on Oct. 13, 2016: URL:http://people.ricam.oeaw.ac.at/z.li/pu blications/talks/6.pdf, Oct. 2, 2013, 48 Pages.
Mountain Bike Action, "Bike Test: Felt Compulsion 1 27.5", https://mbaction.com/oct-felt-compulsion-1-27-5/, (Accessed Jun. 30, 2020), 10 pages.
Overholt, Zach, Bikerumor, "IB17: Tantrum Cycles makes it to production, gets noticed by Adventure Capitalists", https://bikerumor.com/2017/09/26/ib17-tantrum-cycles-makes-it-to-production-gets-noticed-by-adventure-capitalists/ (Accessed Jun. 30, 2020), Sep. 26, 2017, 8 pages.
PCT, "International Search Report and Written Opinion", Application No. PCT/US2011/048696, Dec. 14, 2011, 10 pages.
PCT, "International Search Report and Written Opinion", Application No. PCT/US2015/065090, Feb. 12, 2016, 11 pages.
PCT, "International Search Report and Written Opinion", Application No. PCT/US2012/066427, Jan. 18, 2013, 12 pages.
PCT, "International Search Report and Written Opinion", Application No. PCT/US2018/041054, Sep. 28, 2018, 12 pages.
PCT, "International Search Report and Written Opinion", Application No. PCT/US2018/023124, Aug. 2, 2018, 14 pages.
PCT, "International Search Report and Written Opinion", Application No. PCT/US2005/33410, Nov. 29, 2006, 5 pages.
Ridemonkey, "how many links could a dw link if a dw could link links?", https://ridemonkey.bikemag.com/threads/how-many-links-could-a-dw-link-if-a-dw-could-link-links.276645/ (Accessed Jun. 30, 2020), May 27, 2016, 8 pages.
Roberts, Dan, "First Ride: 2021 Canyon Sender CFR", https://www.pinkbike.com/news/first-ride-2021-canyon-sender-cfr.html, Aug. 11, 2020, 23 pages.
Sarrut, "Note Sur La Transformation Des Mouvements Rectilignes Alternatifs", Académie des Sciences, 36, 1036-1038, 1853, 5 Pages.
U.S. Patent and Trademark Office, "U.S. Appl. No. 62/815,675", filed Mar. 8, 2019, Mar. 8, 2019.
U.S. Patent and Trademark Office, "U.S. Appl. No. 62/833,496", filed Apr. 12, 2019, Apr. 12, 2019.
U.S. Patent and Trademark Office, "U.S. Appl. No. 62/867,169", filed Jun. 26, 2019, Jun. 26, 2019.
Zawistowski, Think Turquoise, http://www.yeticycles.com/blog/?p=237 [Retrieved from the Internet on Jul. 27, 2011], Jul. 18, 2010,.
Zawistowski, "Quantifying Wheel Path", Think Turquoise, http://www.yeticycles.com/blog/?p=237 [Retrieved from the Internet on Jul. 27, 2011], Jul. 18, 2010, 4 Pages.
GB IPO, "Combined Search and Exam Report", App. No. 2020235.4, Apr. 21, 2021, 6 pages.
MTBR: Mountain Bike Review Forum, "Jayem Discussion Starter #1—Knolly Suing Intense for Building Bikes with Seat-tubes in

(56) References Cited

OTHER PUBLICATIONS

Front of the BB", https://www.mtbr.com/threads/knolly-suing-intense-for-building-bikes-with-seat-tubes-in-front-of-the-bb.1173867/, Jan. 2021, 16 pages.
European Patent Office, EP Extended Search Report, mailed Sep. 21, 2022, for European Application No. 20747607.8, 2 pages.
Smurthwaite, Pinkbike Outside! publication, "Spotted: A New Commencal Supreme Breaks Cover at the Portugal Cup", Article published on Mar. 7, 2022.
Roberts, Pinkbike Outside! publication, "What's Going on With Commencal's Prototype DH Race Bike?", Article published on Jun. 9, 2021.
European Patent Office, Communication Pursuant to Article 94(3) EPC, mailed Jul. 8, 2022, for European Application No. 18768549.0, 6 pages.
European Patent Office, Extended European Search Report, mailed Oct. 4, 2022, for European Application No. 20747607.8, 6 pages.
German Patent Office, Examination Notice and Search Report, mailed Apr. 13, 2022, for German Application No. 10 2020 134 843.6, 7 pages.
U.K. Intellectual Property Office, Search Report mailed Jul. 7, 2022, for U.K. Application No. GB2208682.1, 3 pages.
U.S. Patent and Trademark Office, Non-Final Office Action mailed Sep. 16, 2022, for U.S. Appl. No. 16/705,049, 10 pages.
Brown, "Preview: Nicolai Bikes Available in the U.S. the belt-drive, big-hit bikes will be distributed by Nicolai USA," BIKE Mag, Jun. 3, 2014, 9 pages.
Overholt, "SOC 14: Effigear Calls in the Cavalerie for new Gear Box Bikes in the US," Bike Rumor, Apr. 23, 2014, 16 pages.
Nicolai Maschinenbau, "History of Nicolai," Gesellschaft für Zweirad und Maschinenbau mbh, at least as early as 1995, 3 pages.
Nicolai, "Nicolai Trombone Frame," at least as early as 1995, 6 pages.
Netherlands Patent Office, "Written Opinion and Search Report," mailed Feb. 22, 2023, for Dutch Application No. 2029897, Dutch with partial English translation, 12 pages.
Aston, "Robot Bike Co R160 Custom—Review," Outside Magazine, Oct. 17, 2016, 46 pages.

* cited by examiner

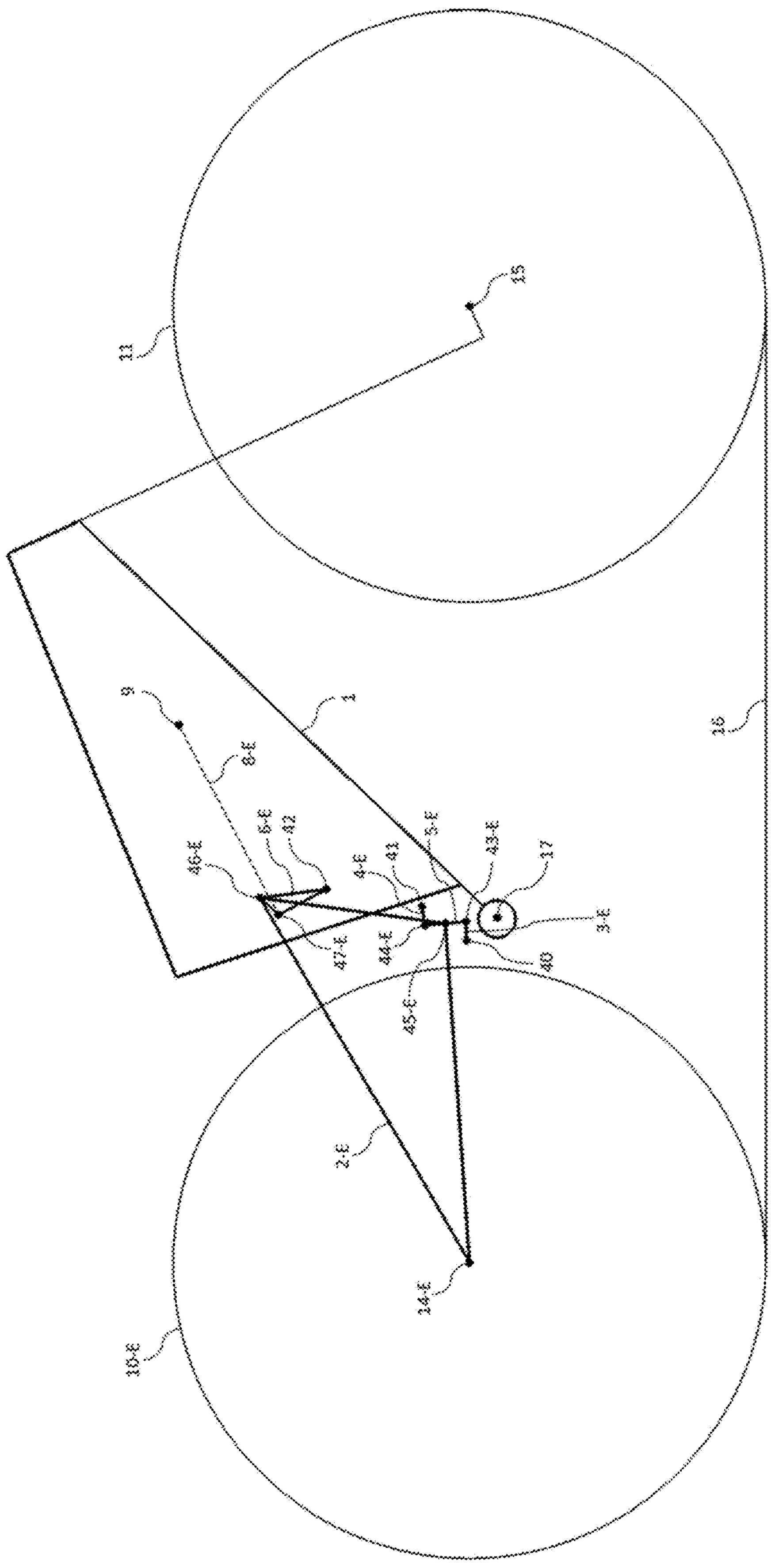
FIG. 1.1

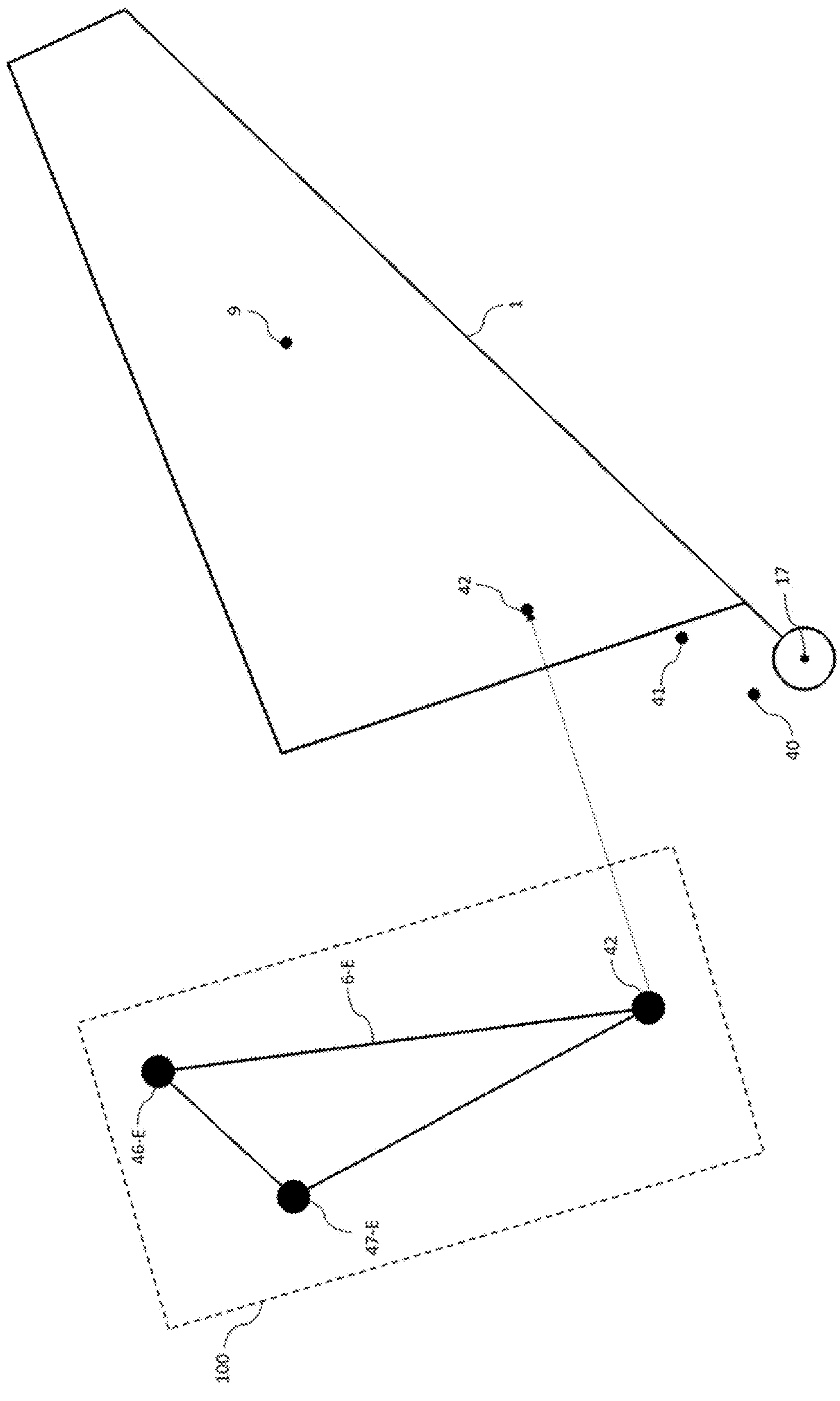
FIG. 1.2

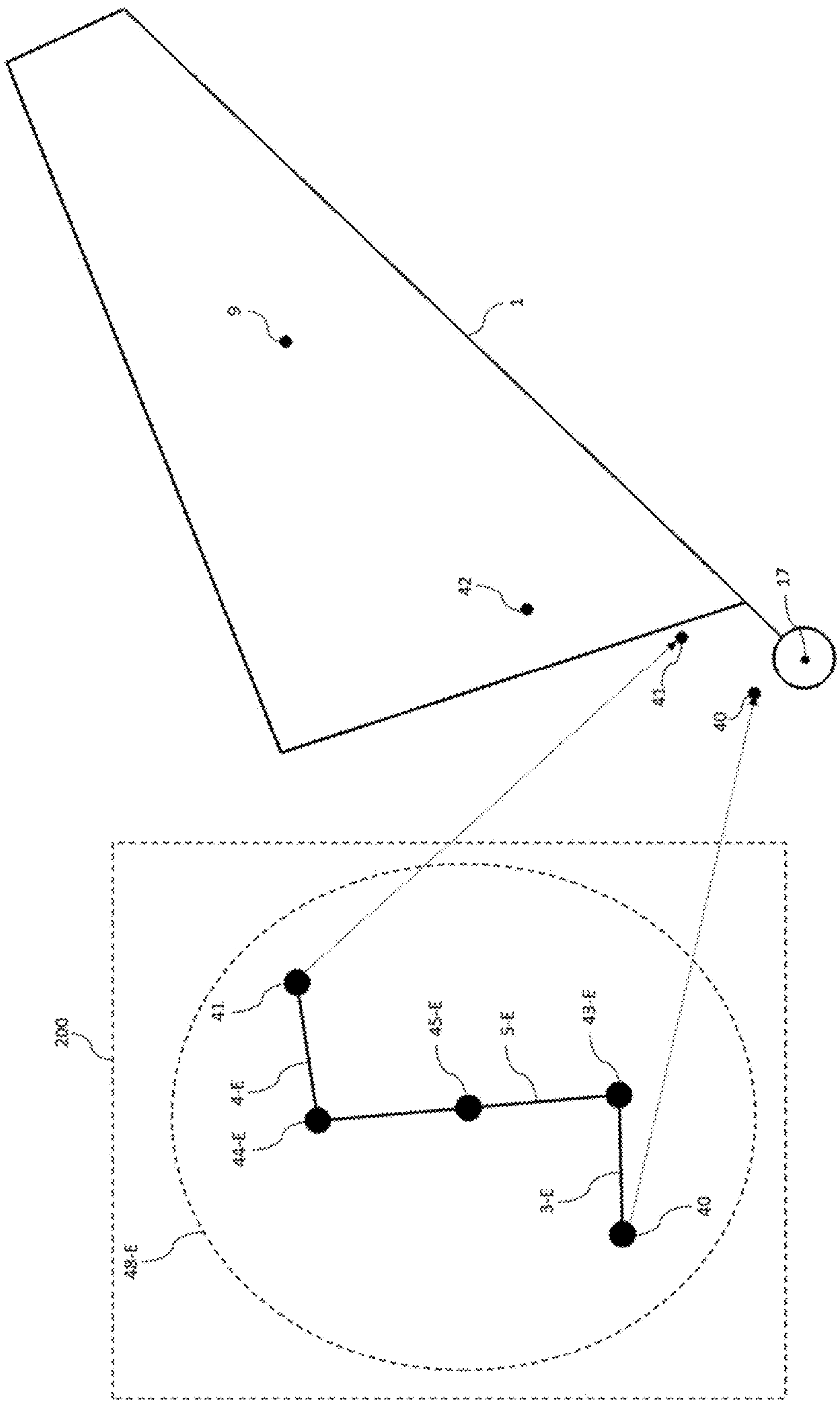
FIG. 1.3A

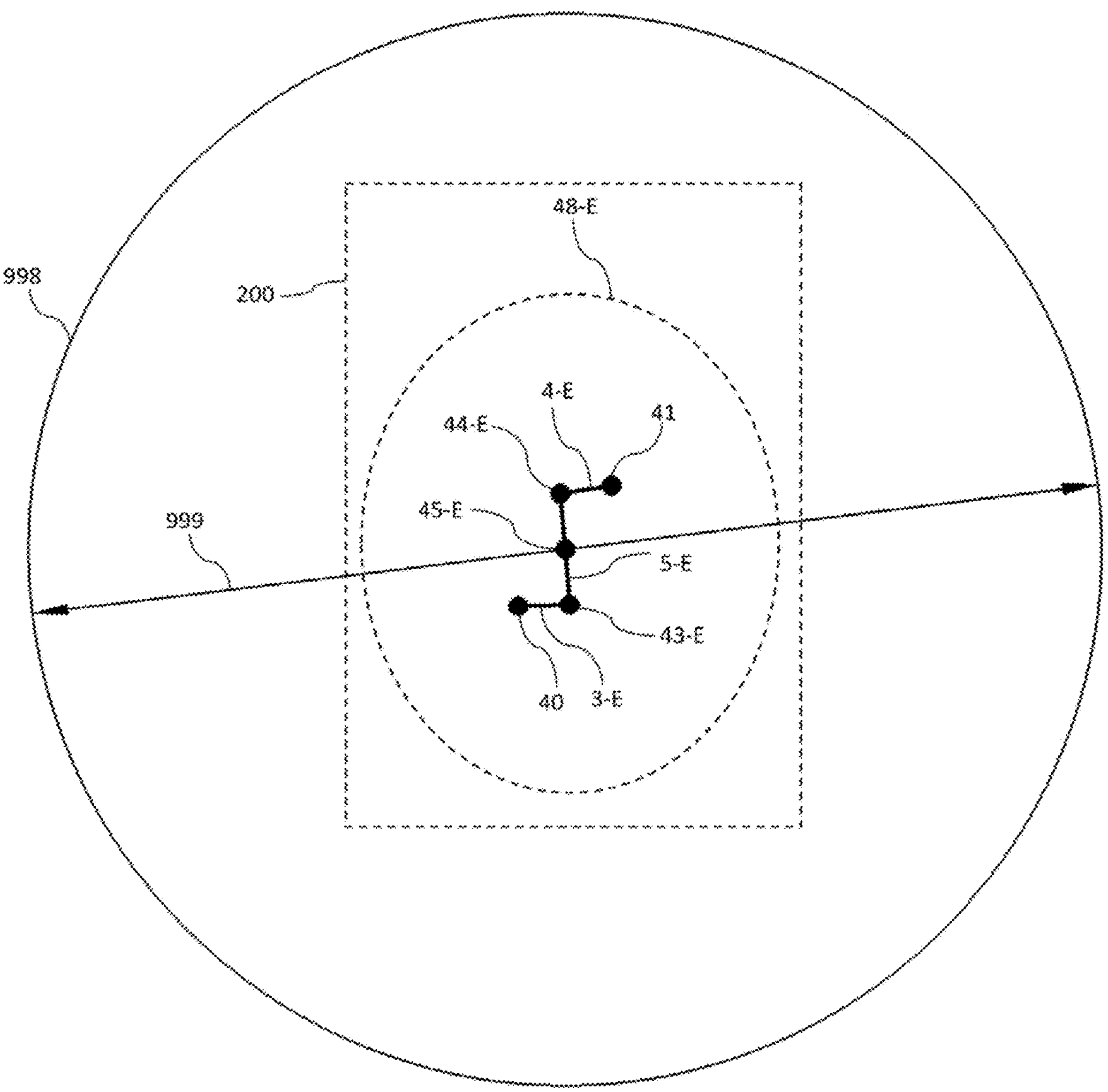
FIG. 1.3B

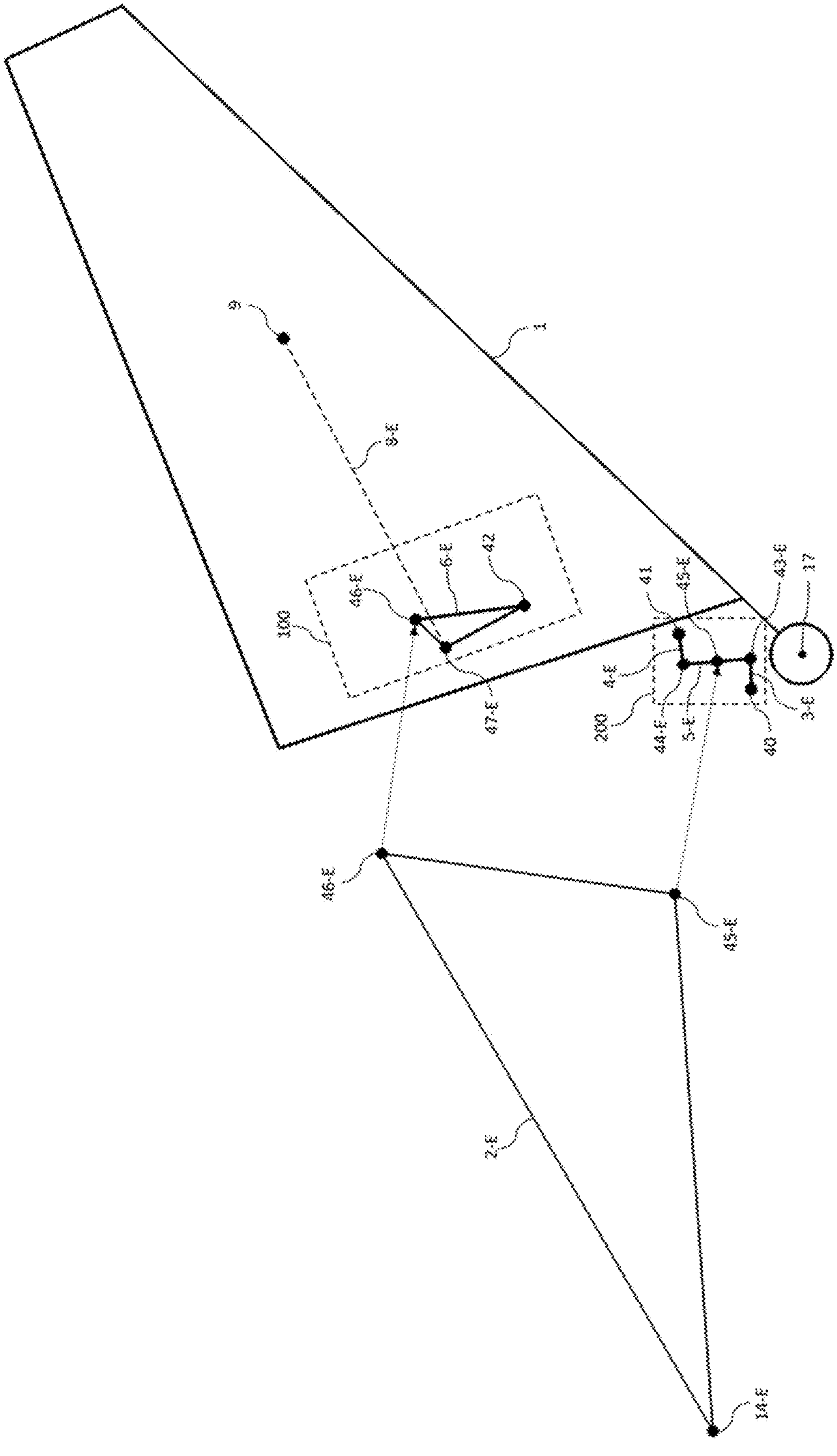
FIG. 1.4

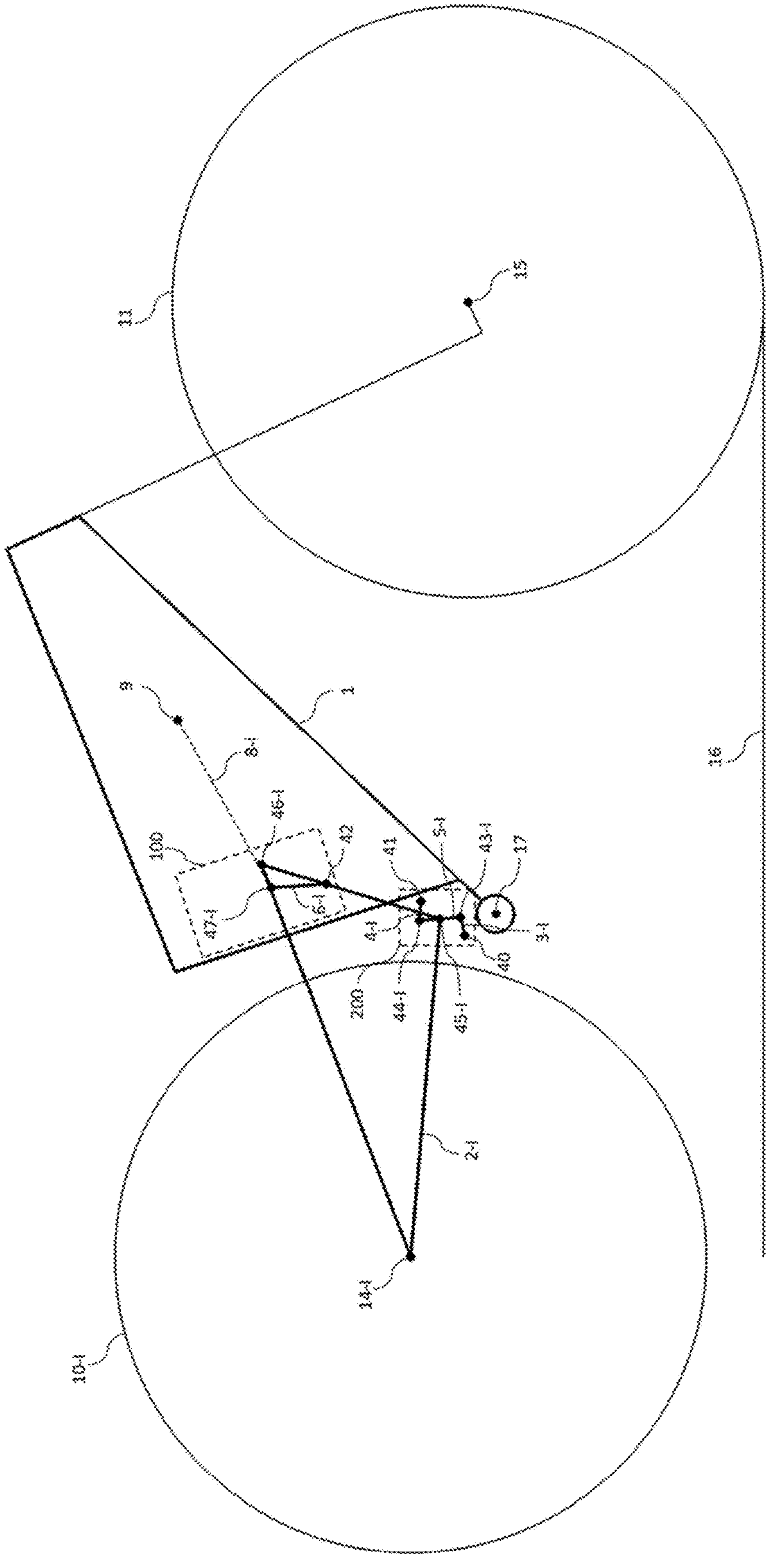
FIG. 1.5

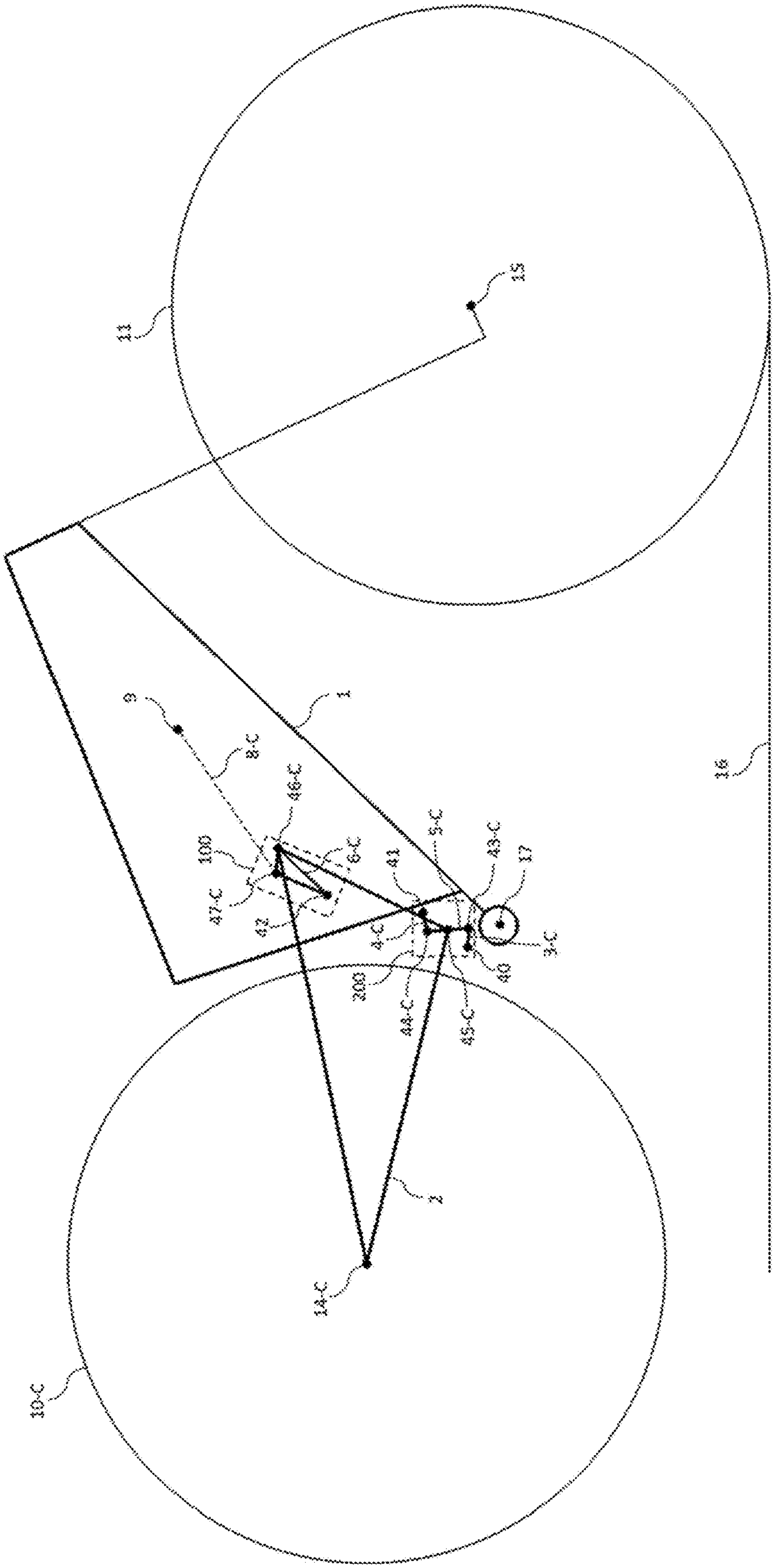
FIG. 1.6

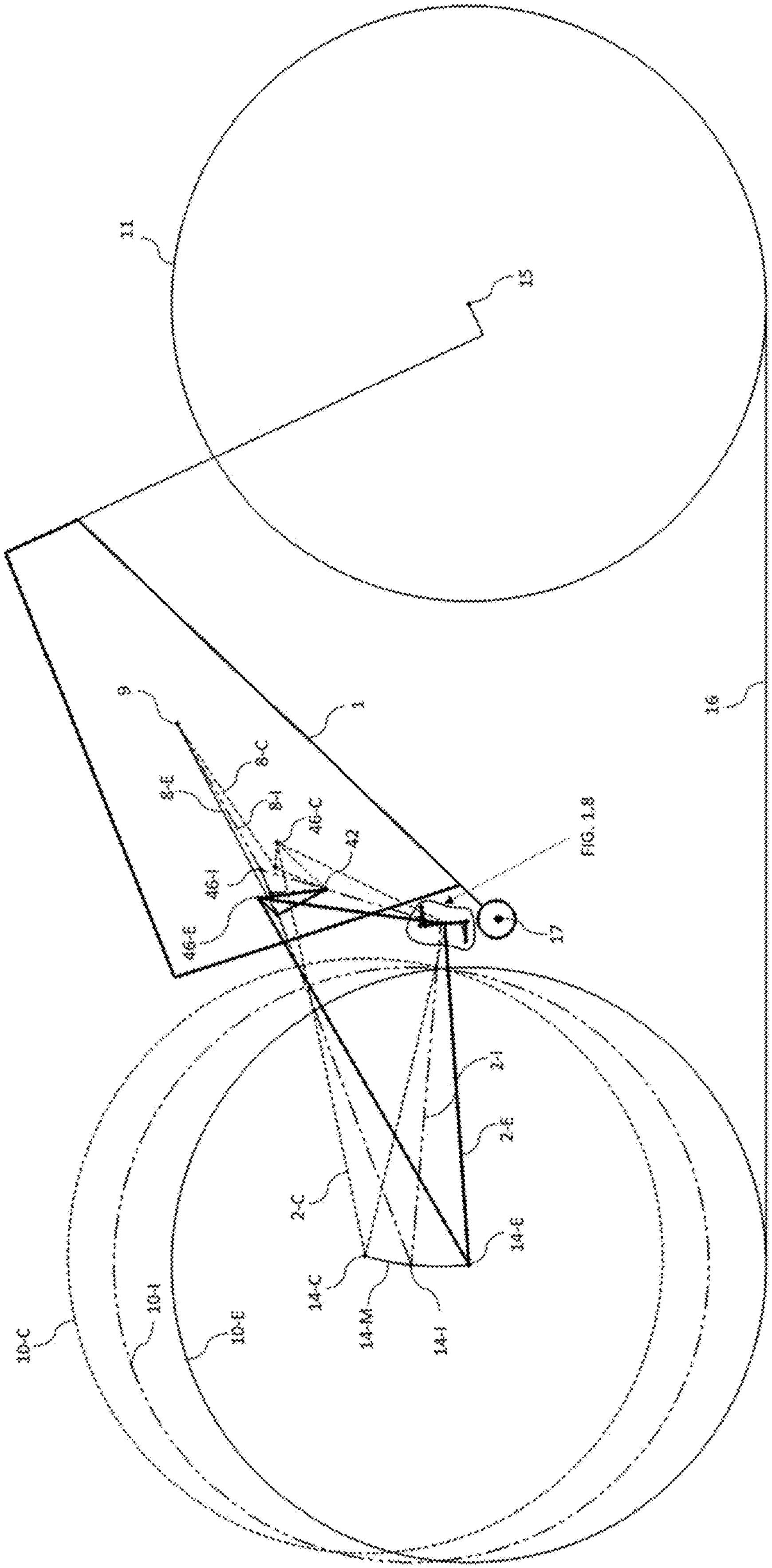
FIG. 1.7

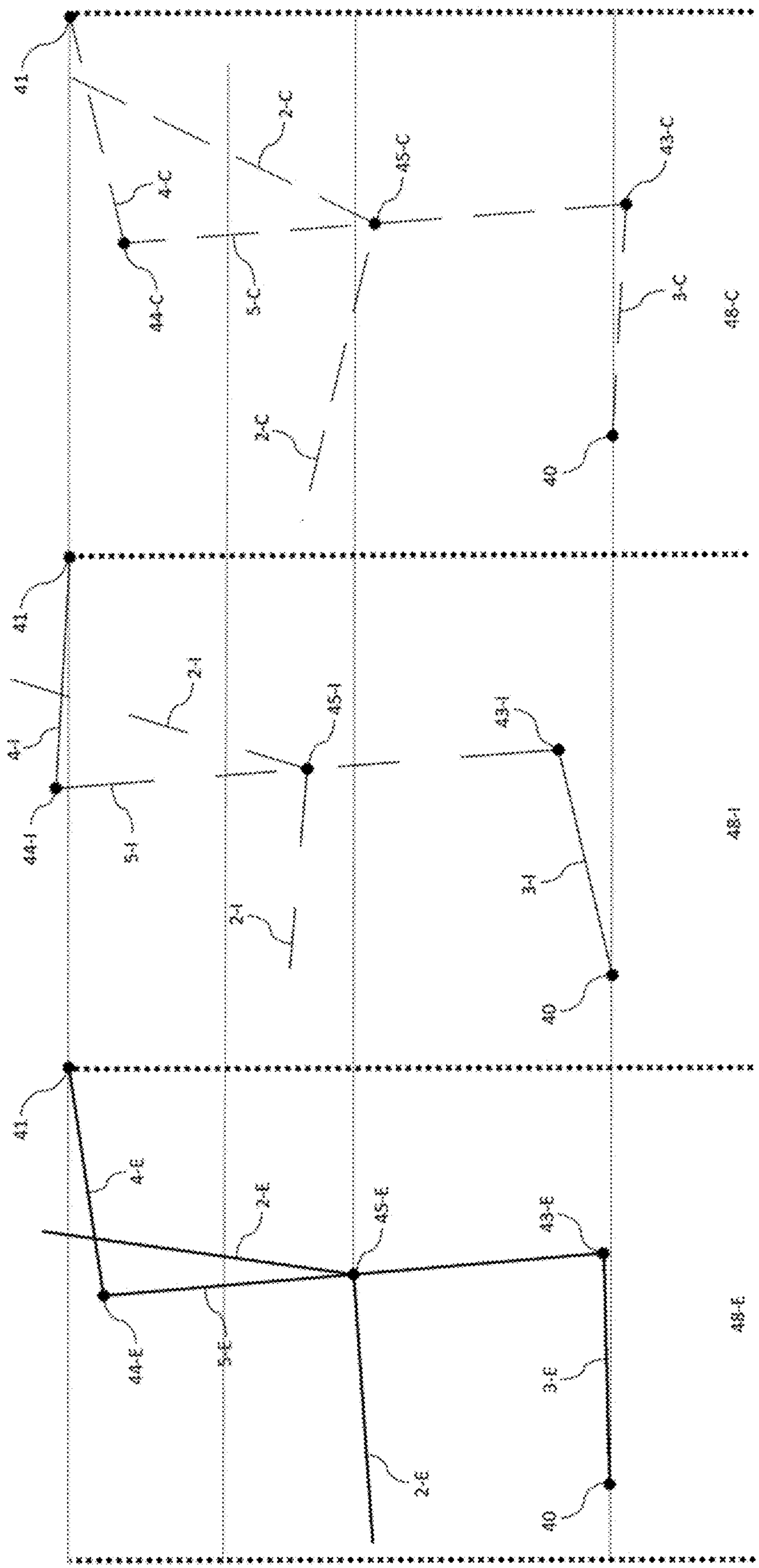
FIG. 1.8

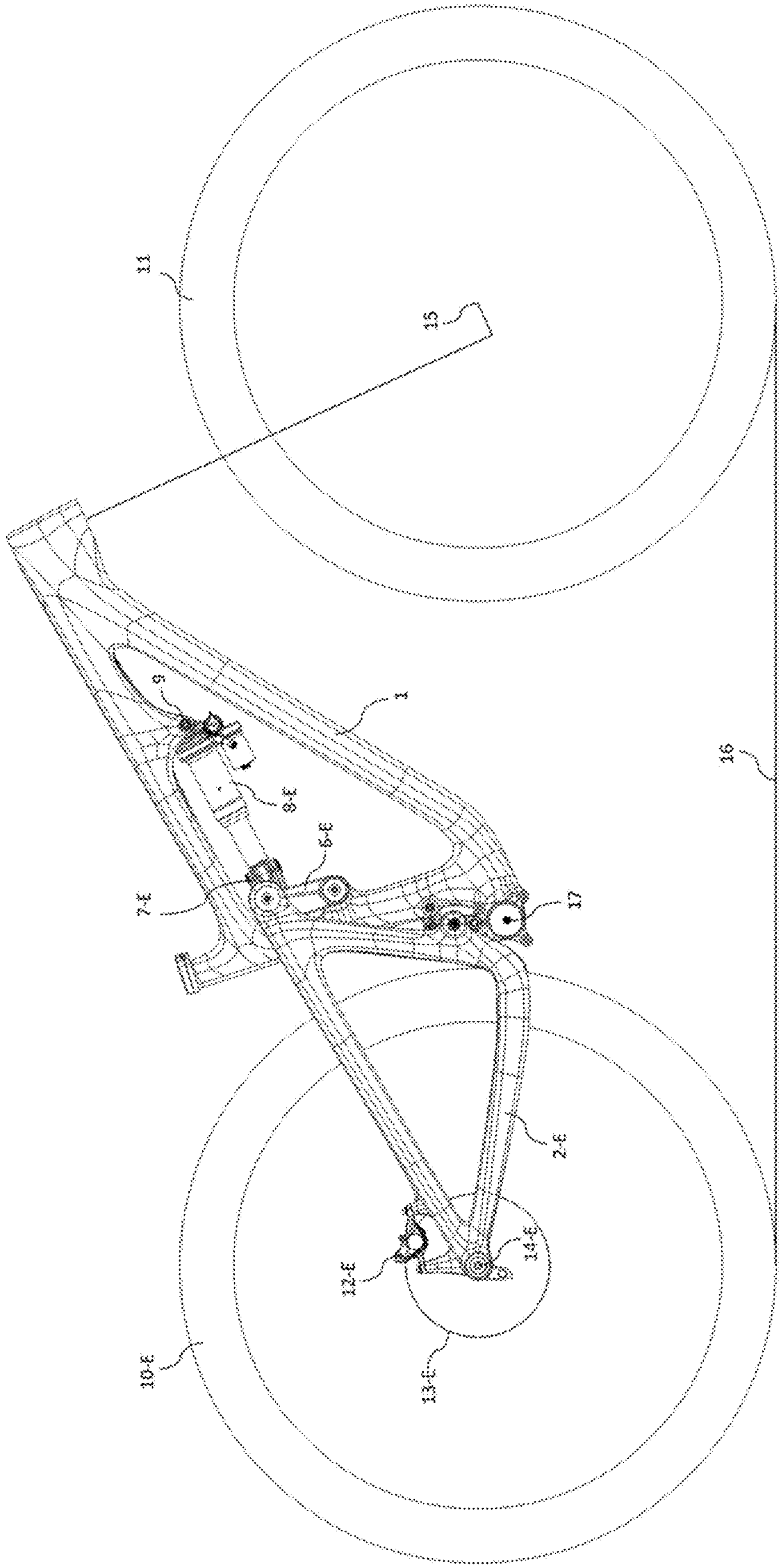
FIG. 1.9

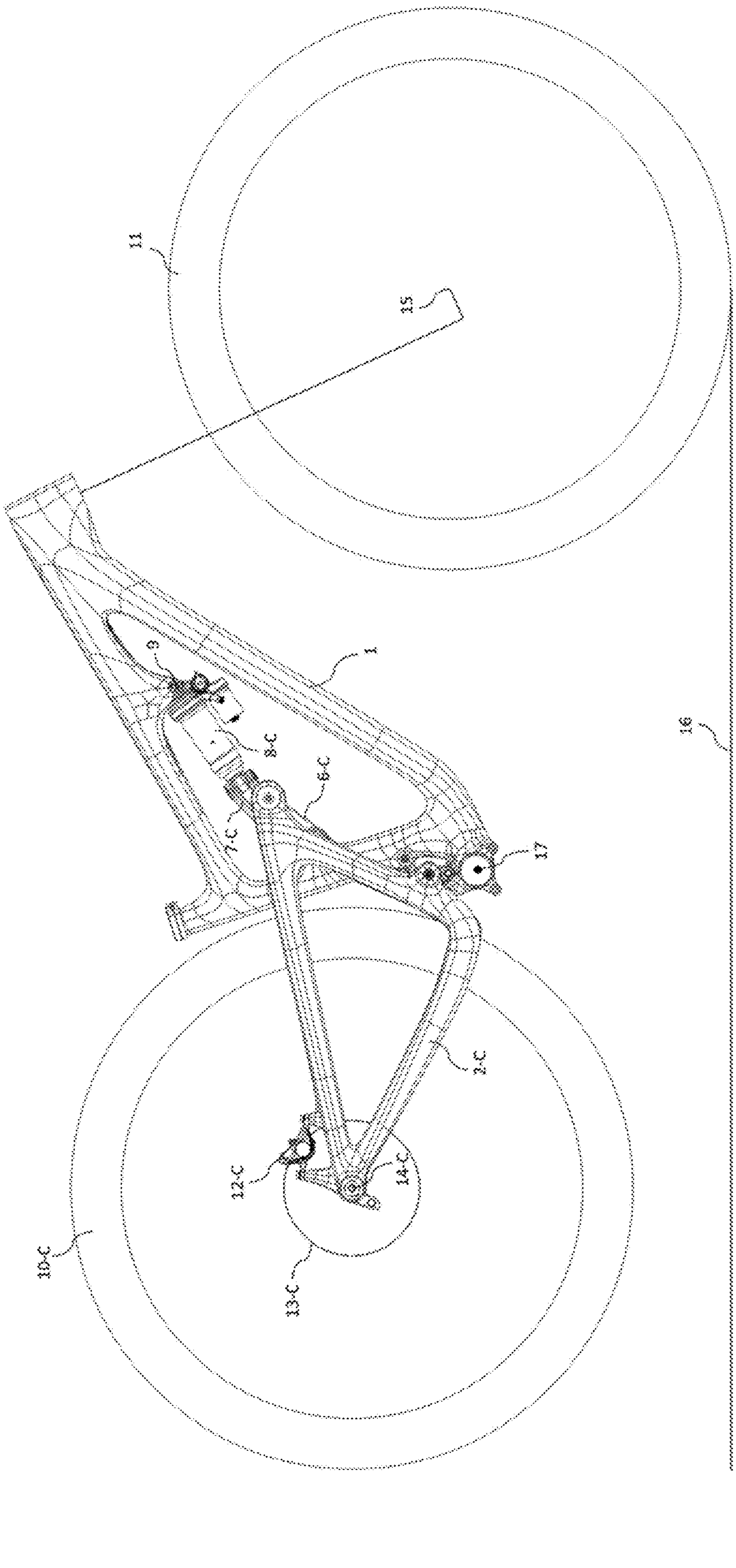
FIG. 1.10

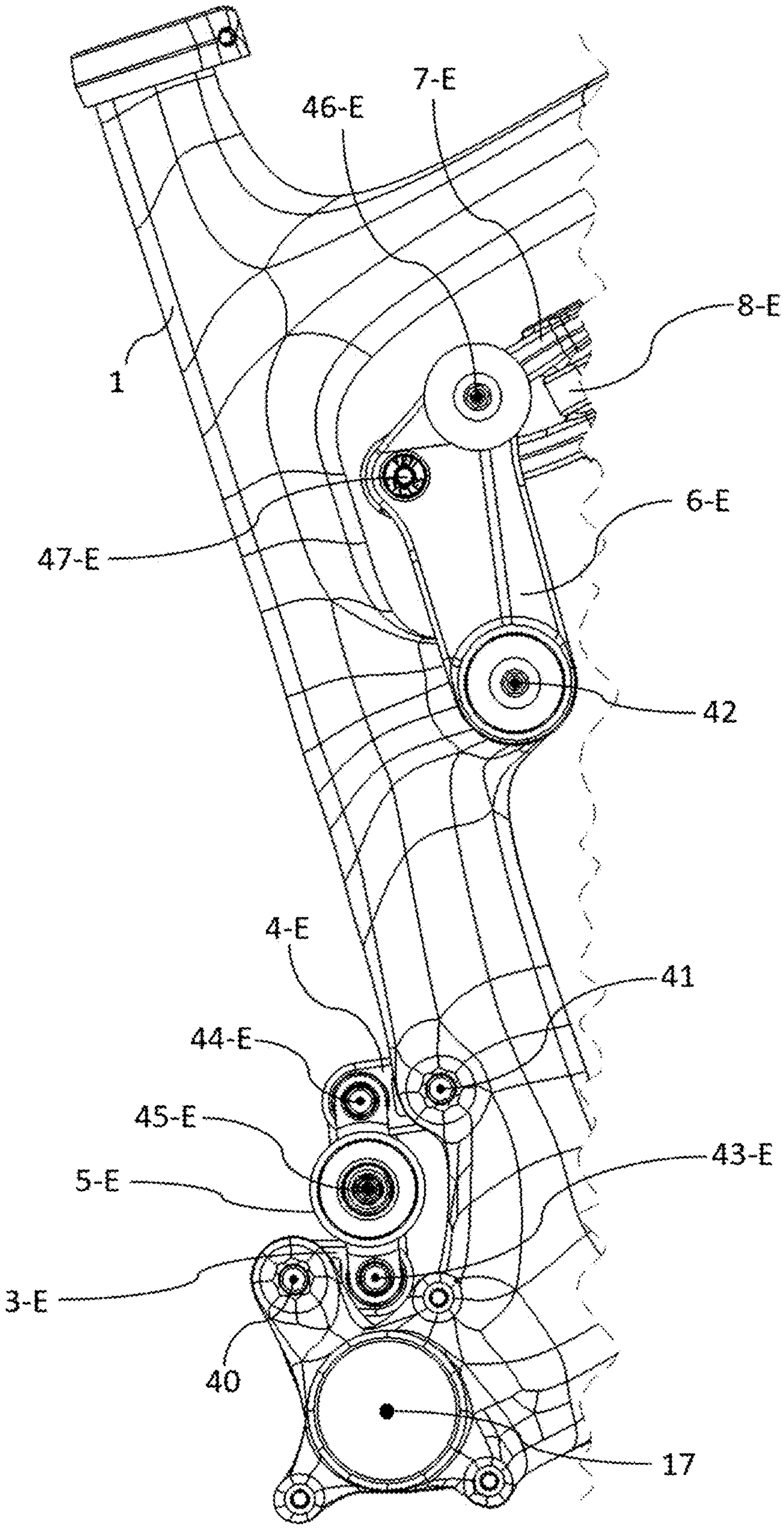
FIG. 1.11A

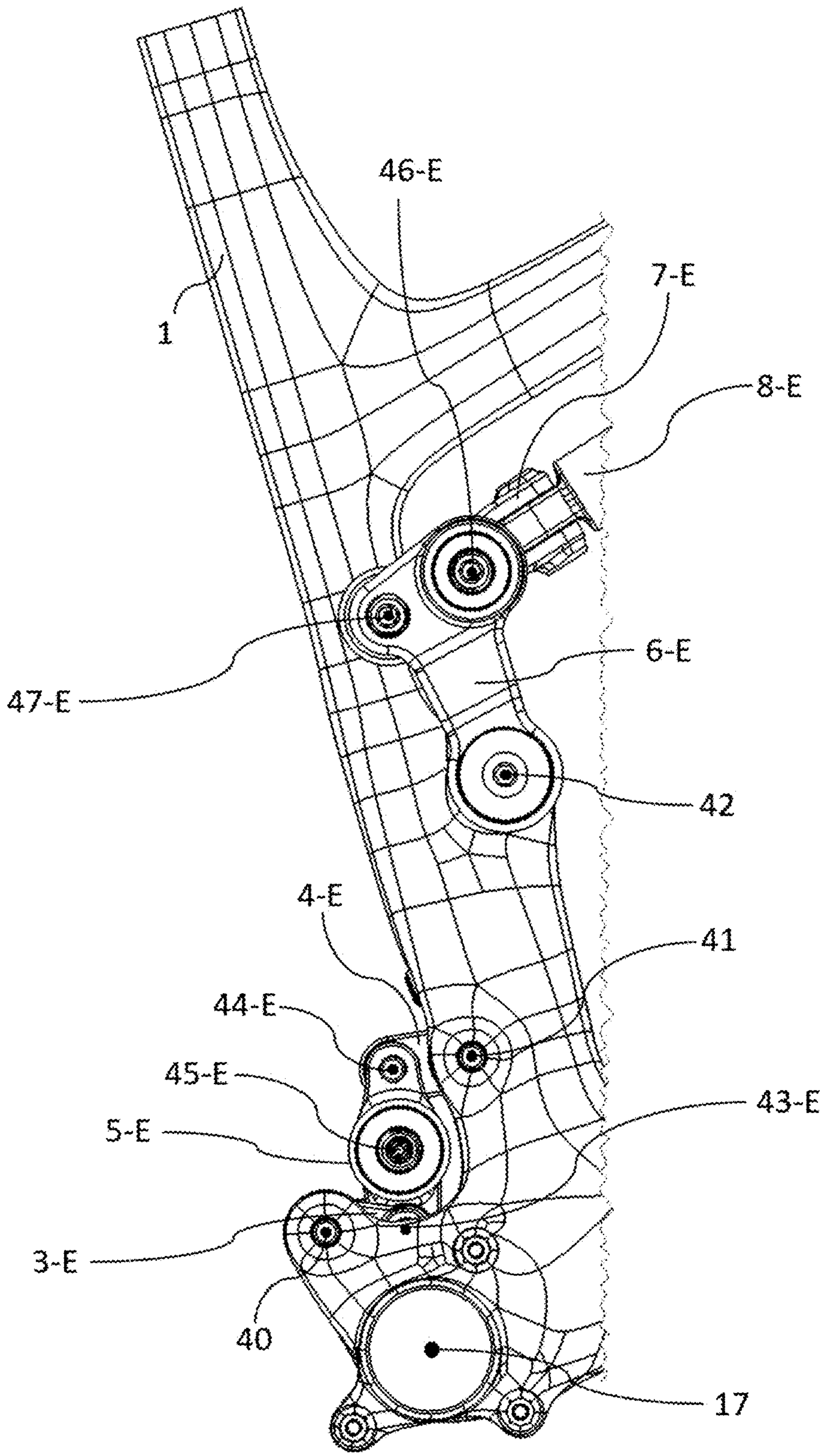
FIG. 1.11B

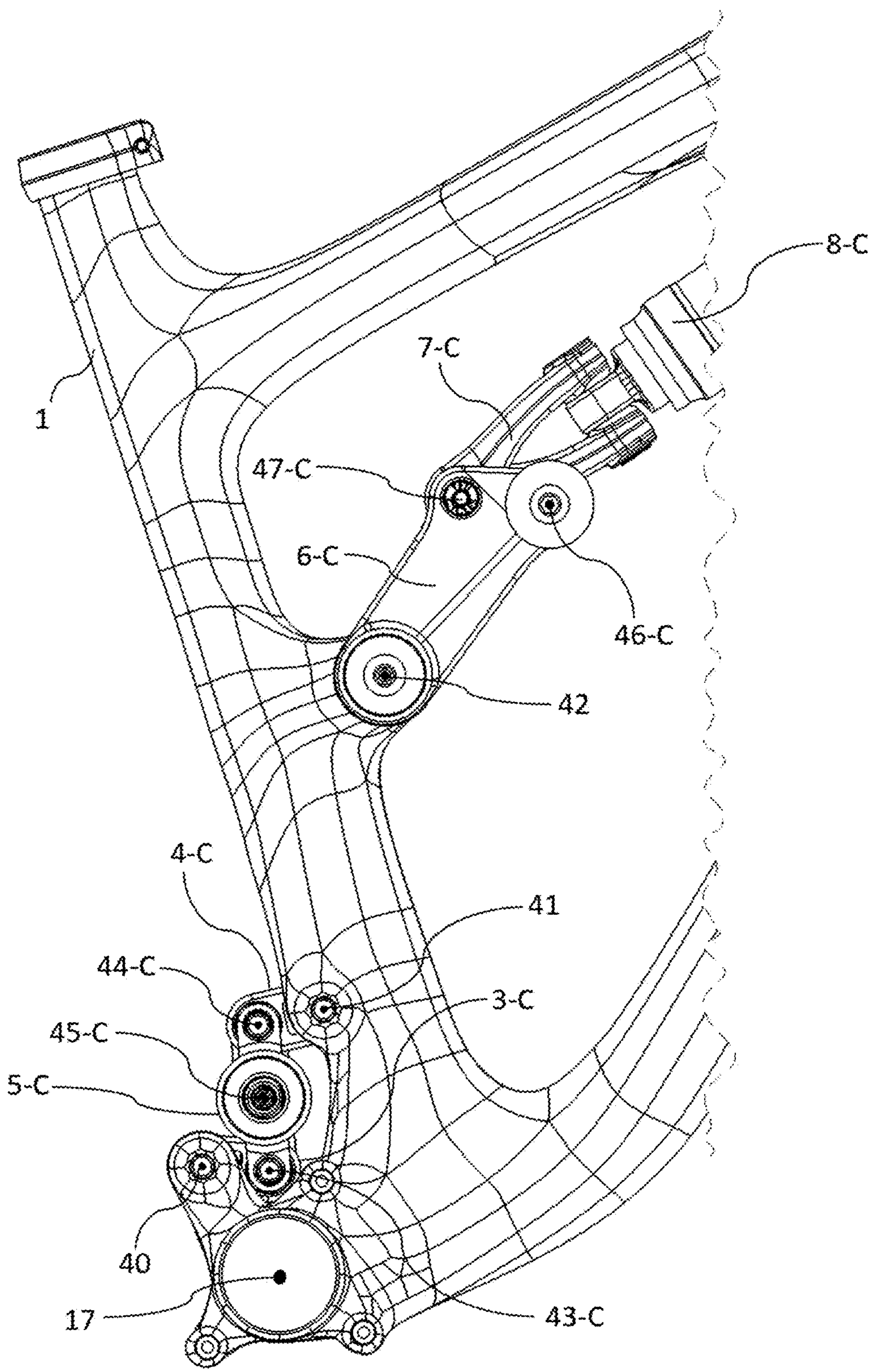
FIG. 1.12

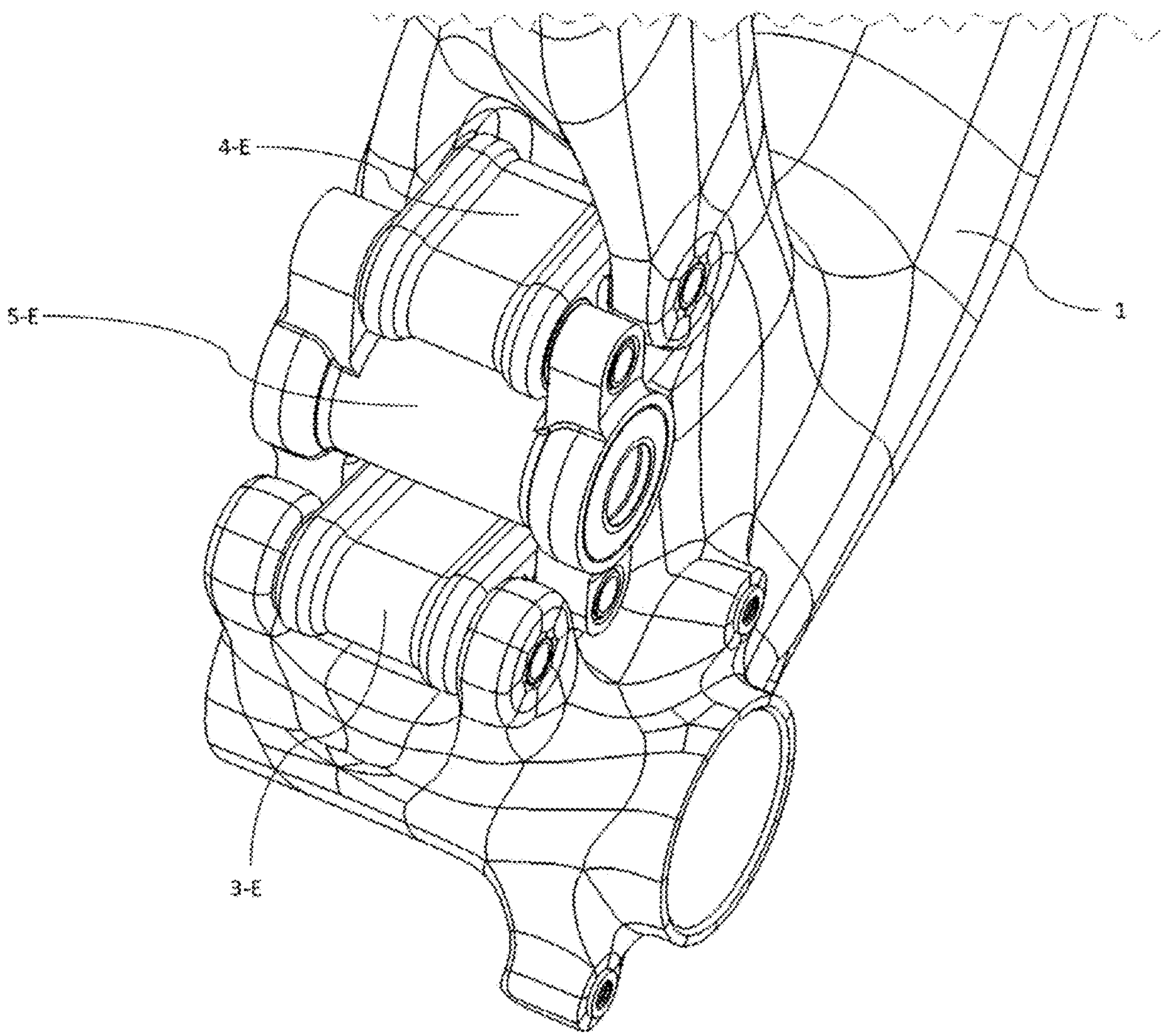
FIG. 1.13

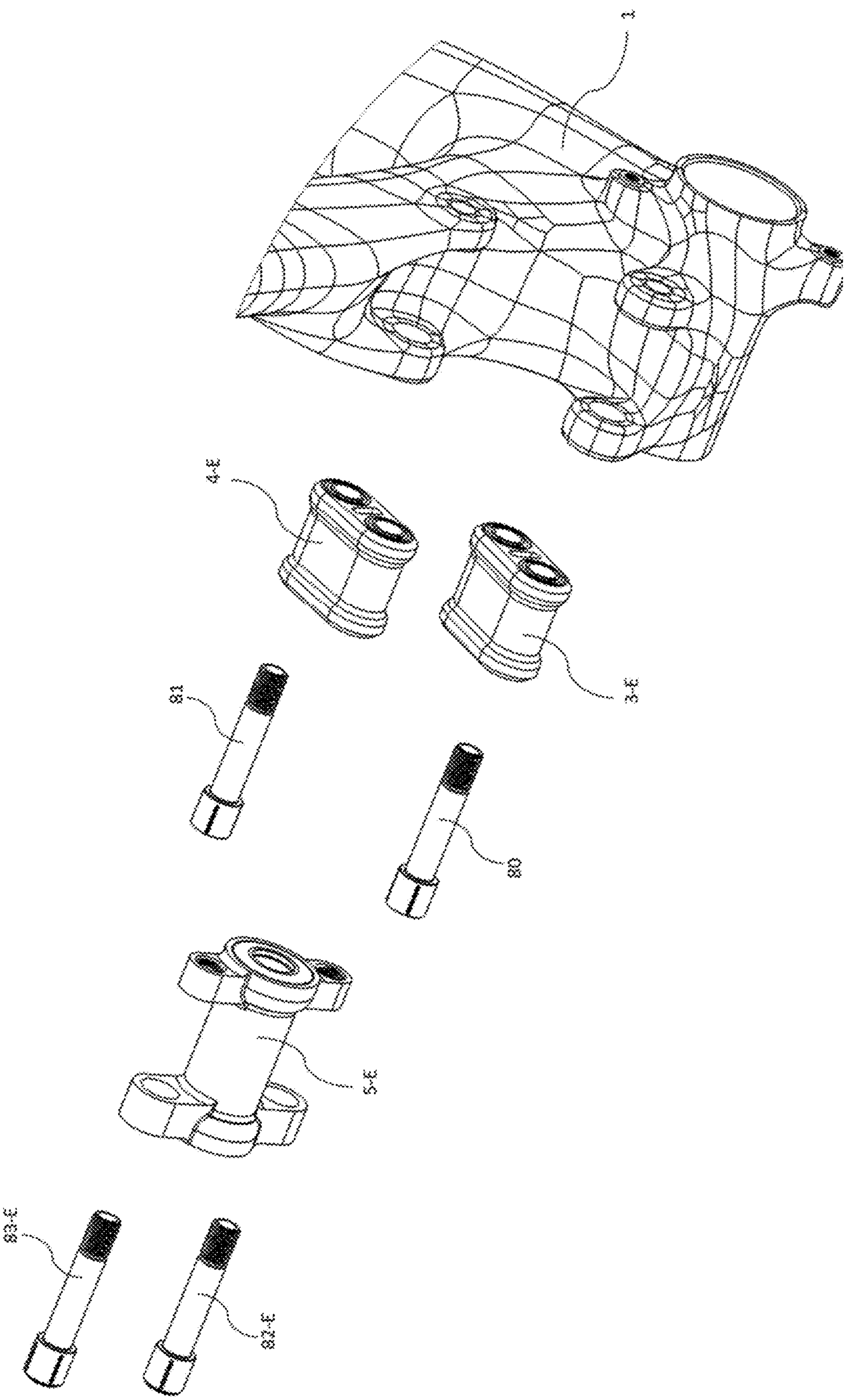
FIG. 1.14A

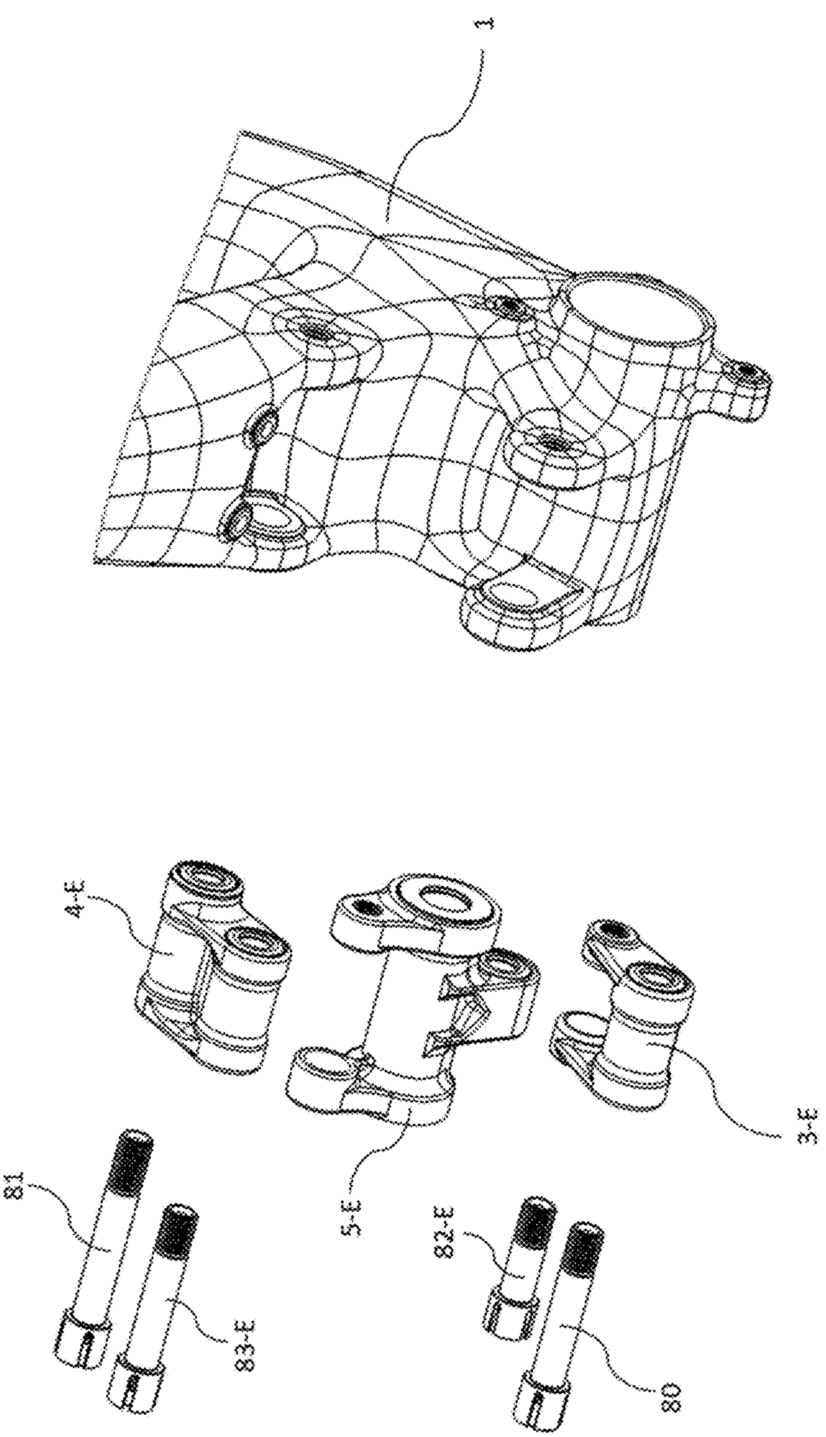
FIG. 1.14B

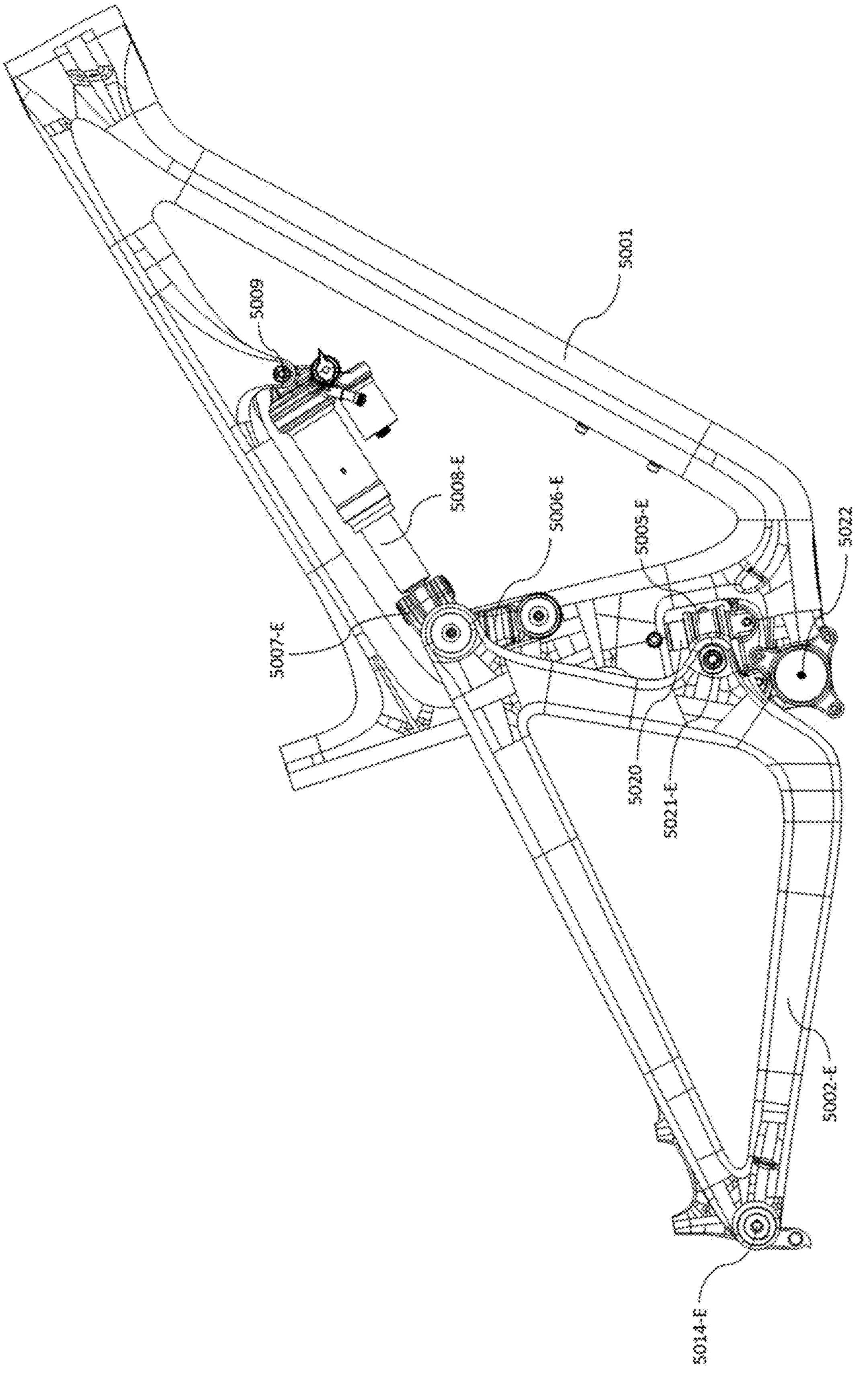
FIG. 1.15

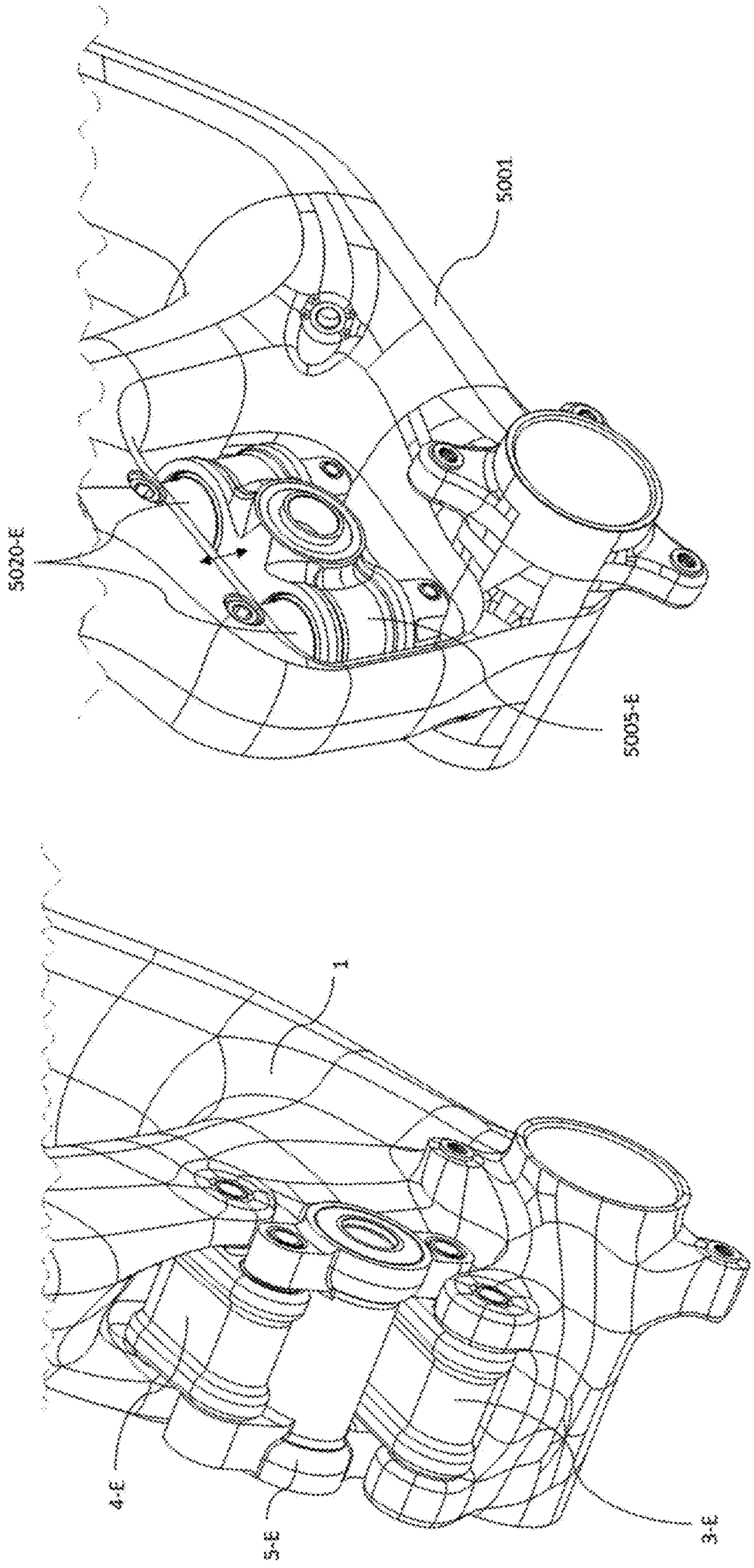
FIG. 1.16

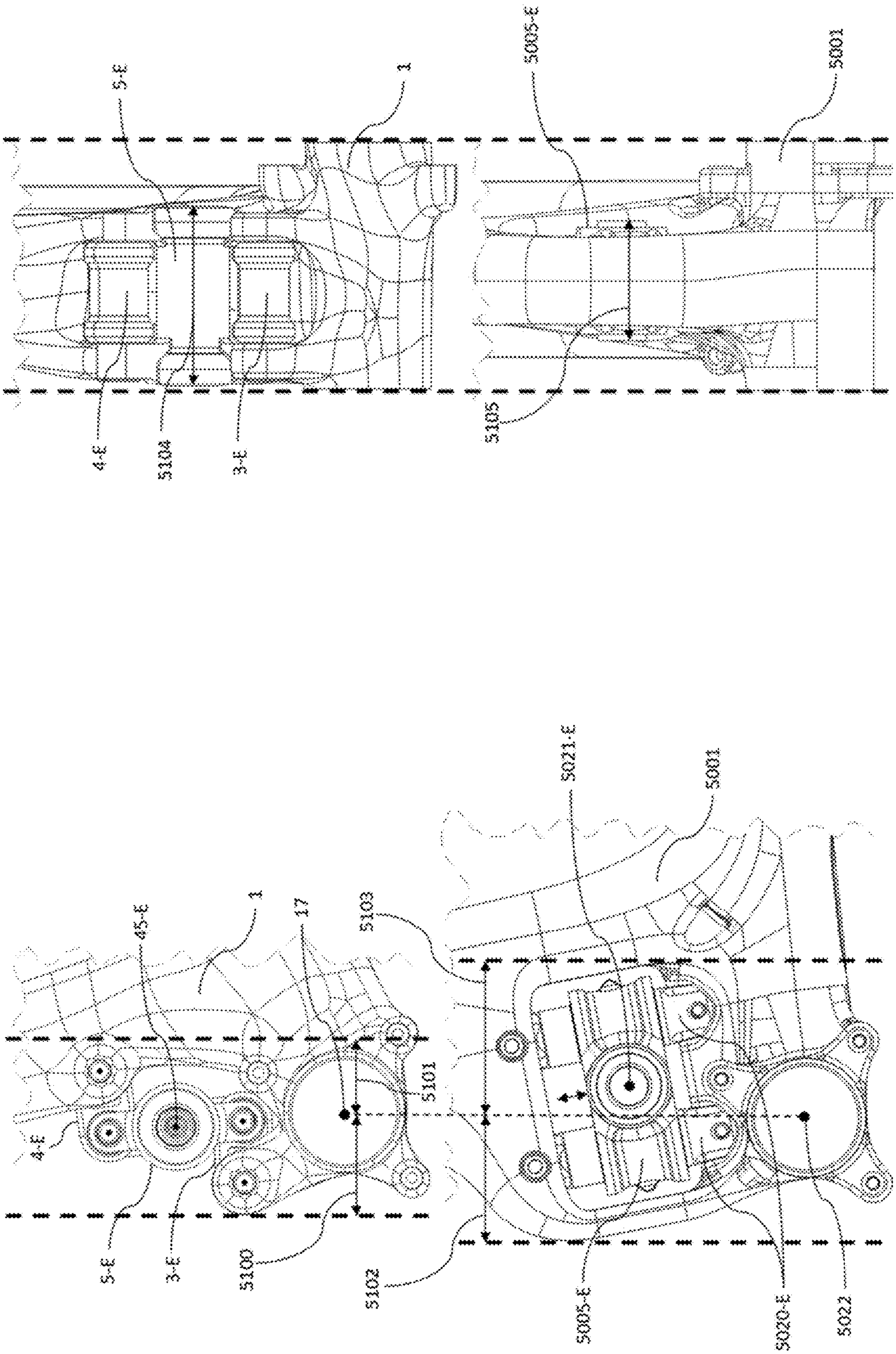
FIG. 1.17

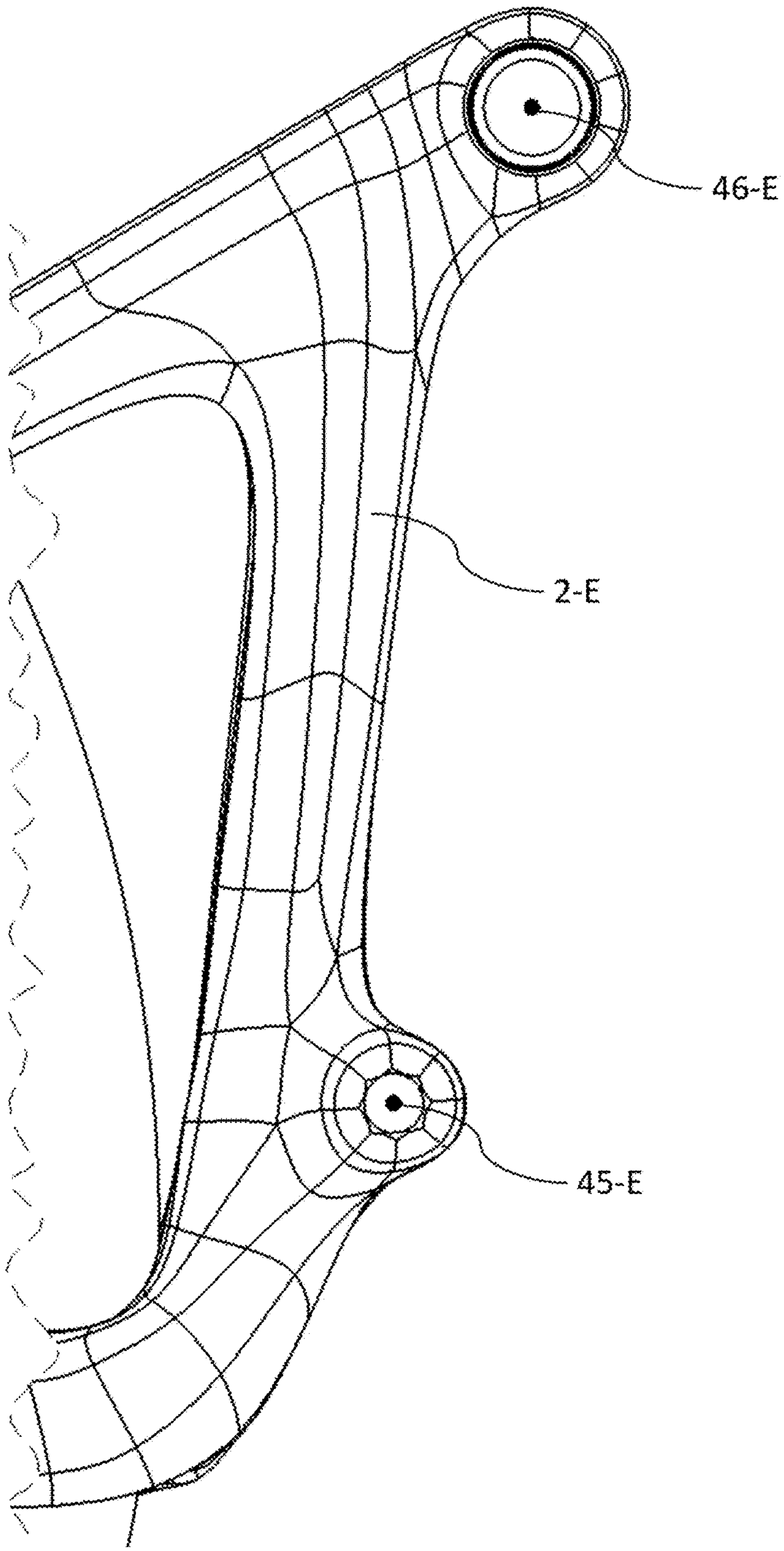
FIG. 1.18

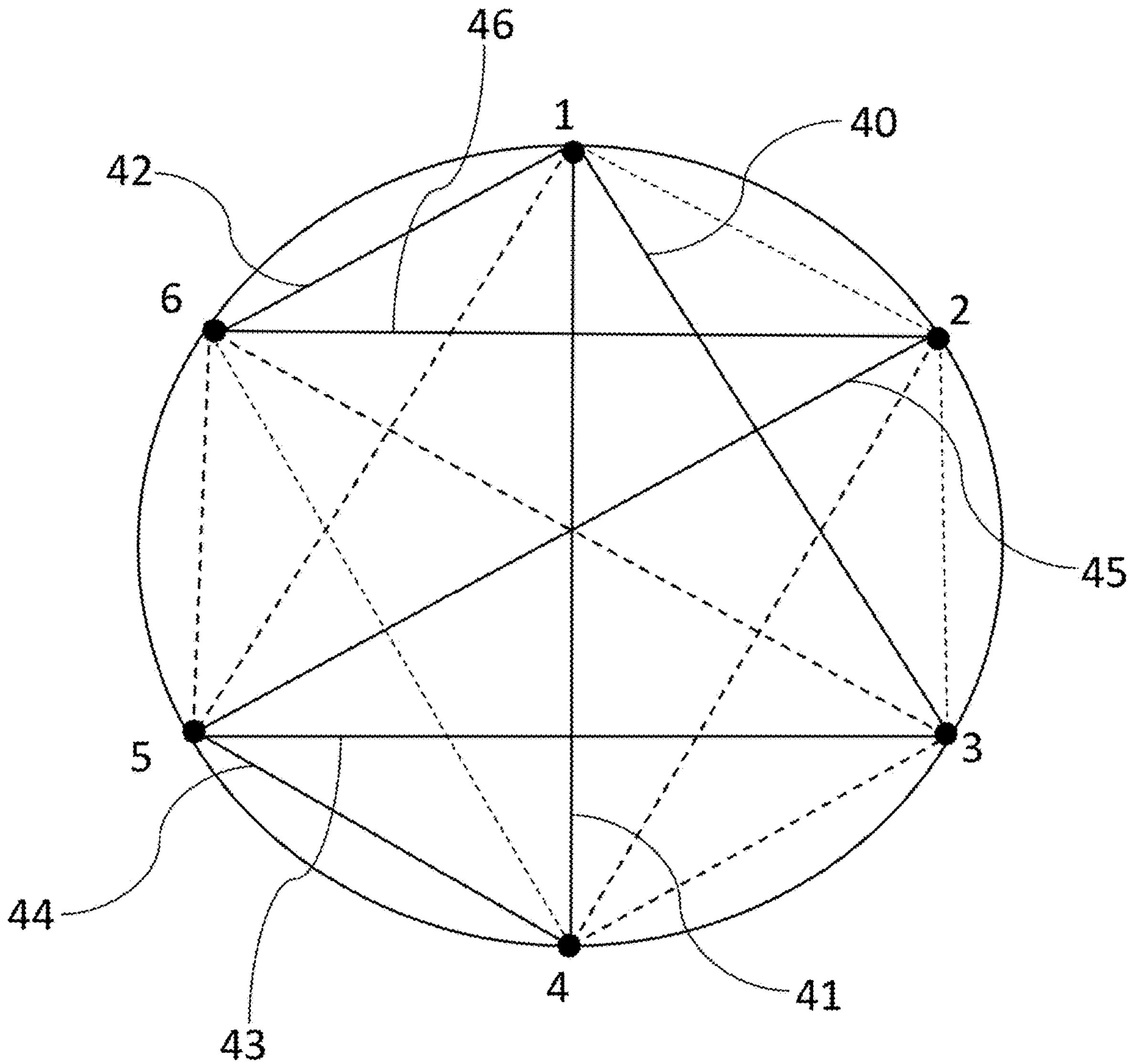
FIG. 1.19

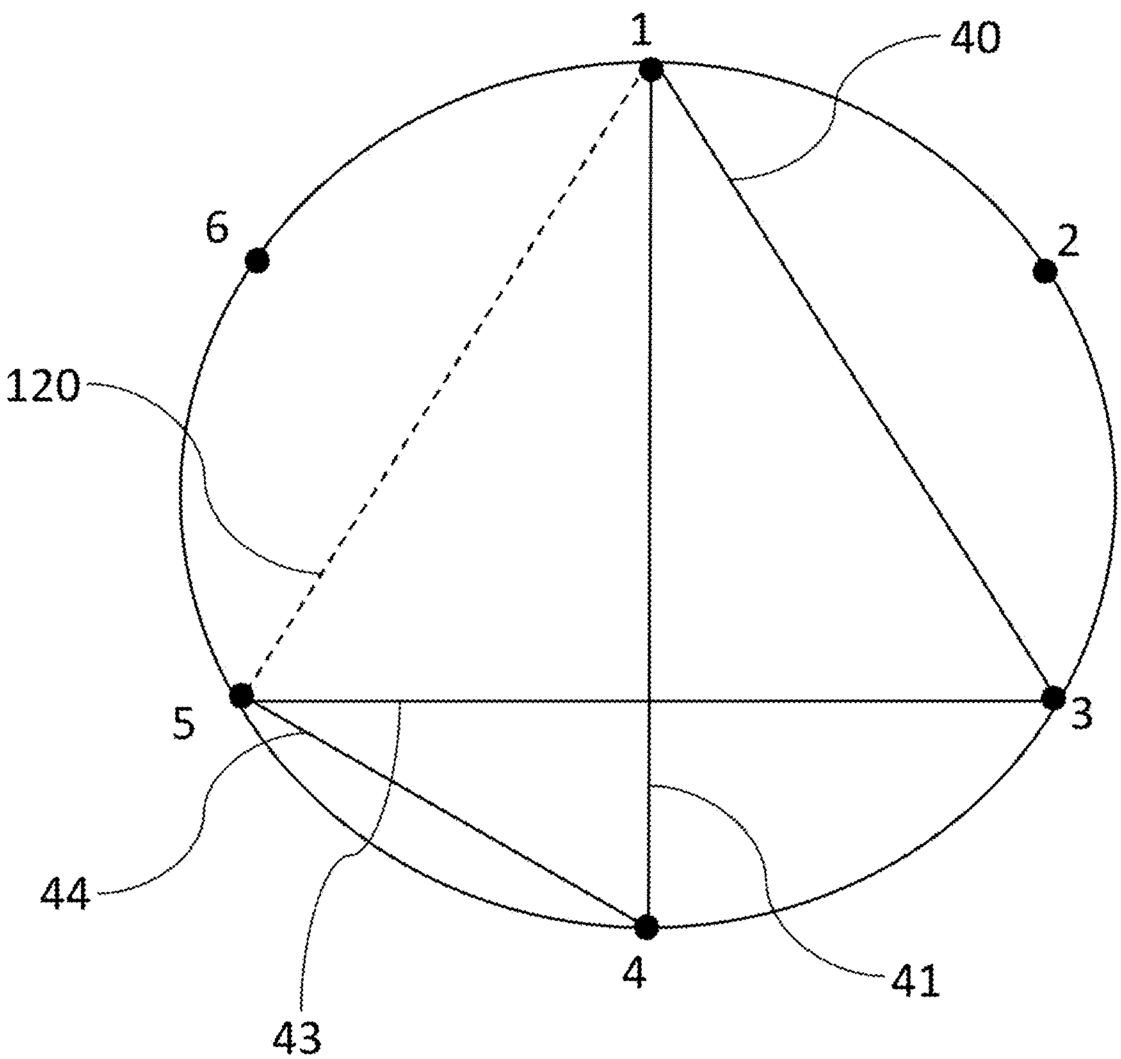
FIG. 1.20

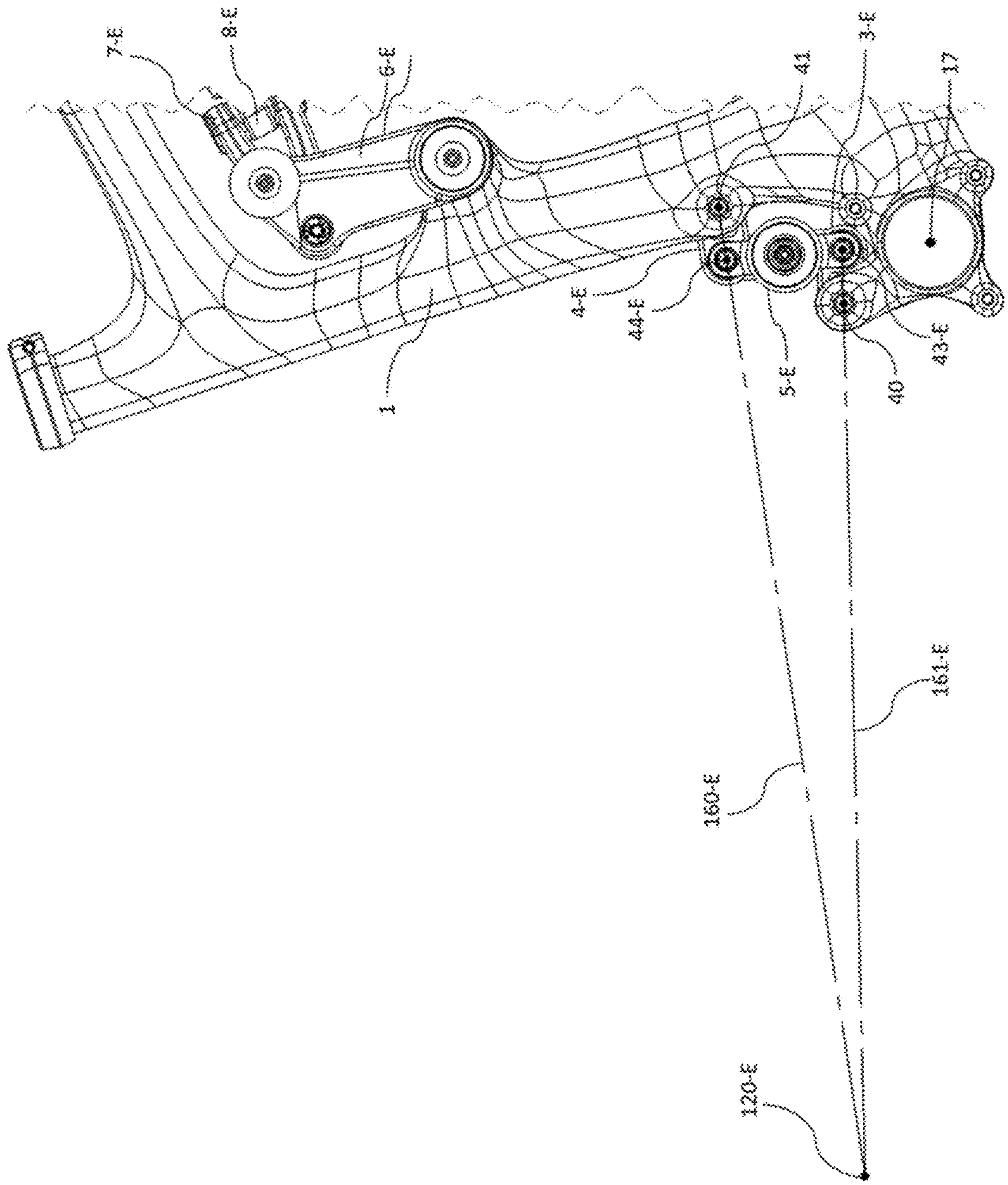
FIG. 1.21

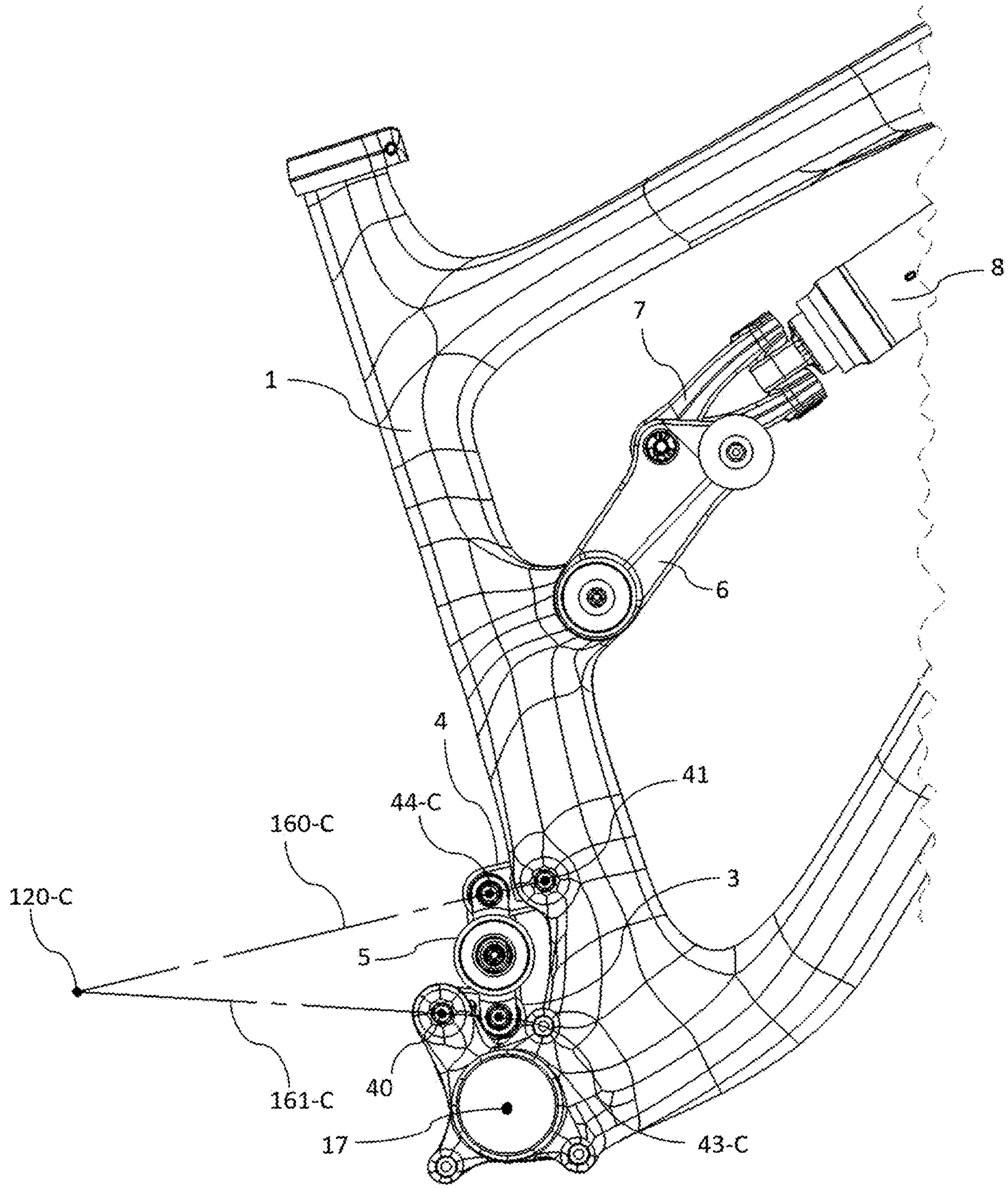
FIG. 1.22

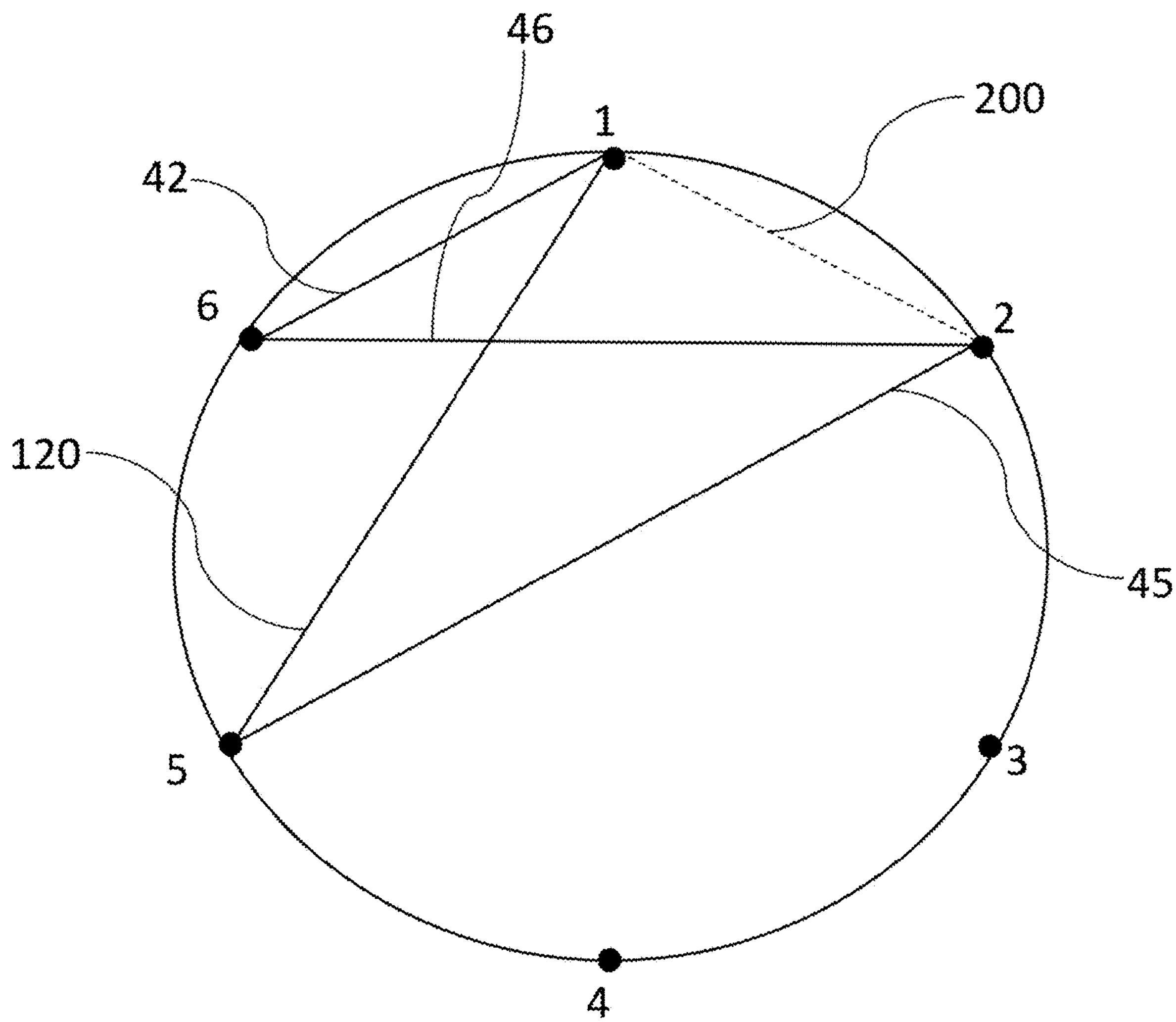
FIG. 1.23

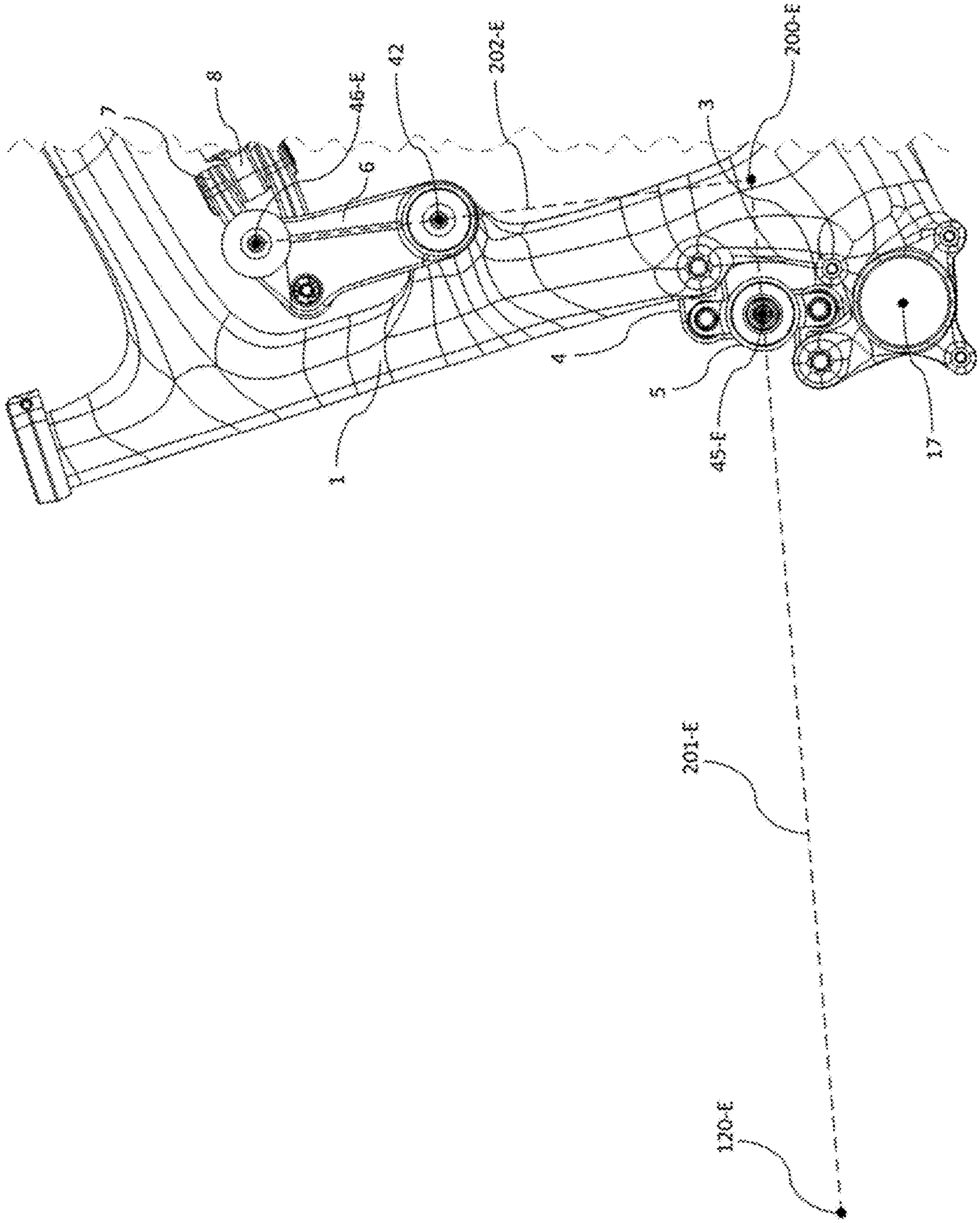
FIG. 1.24

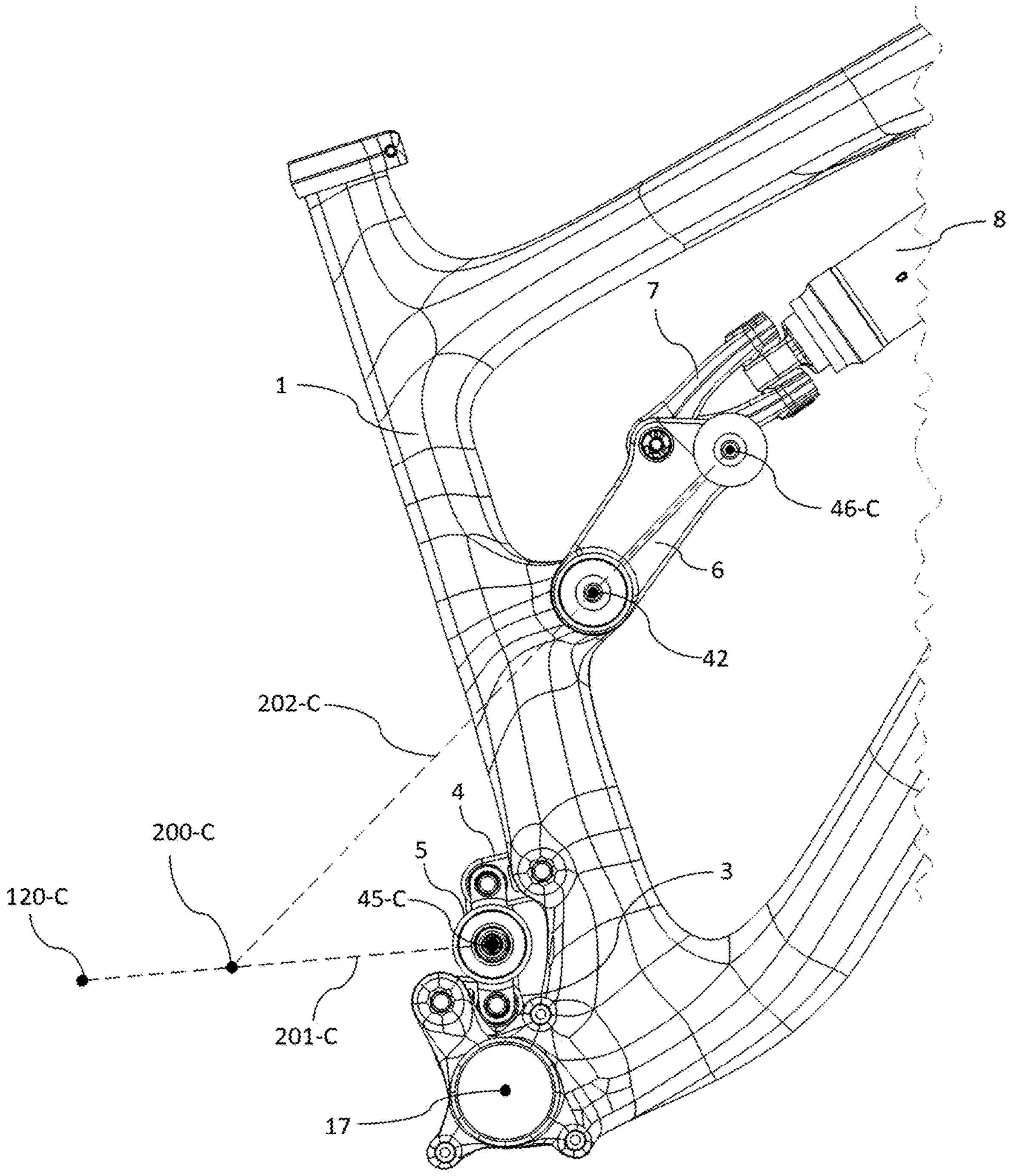
FIG. 1.25

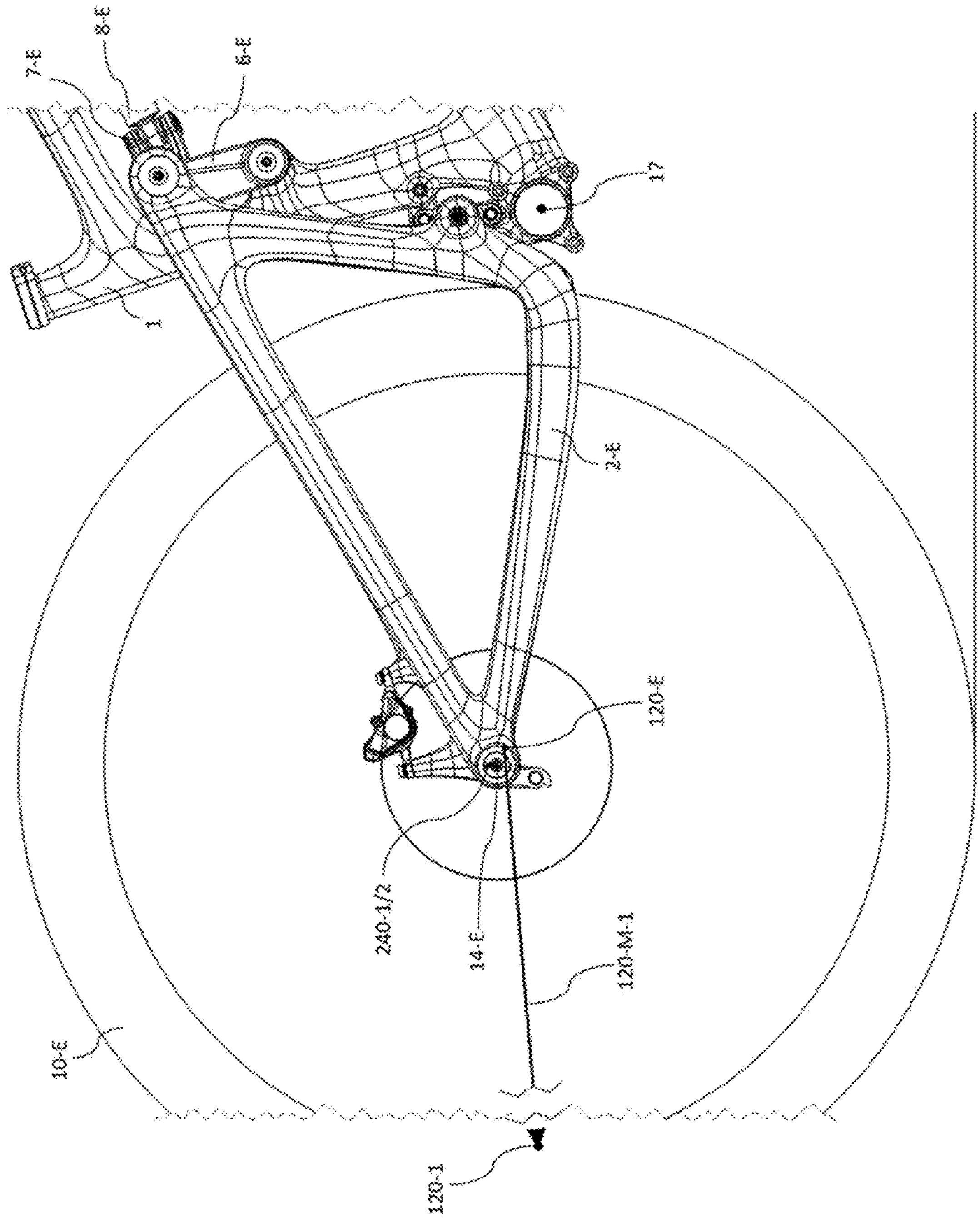
FIG. 1.26

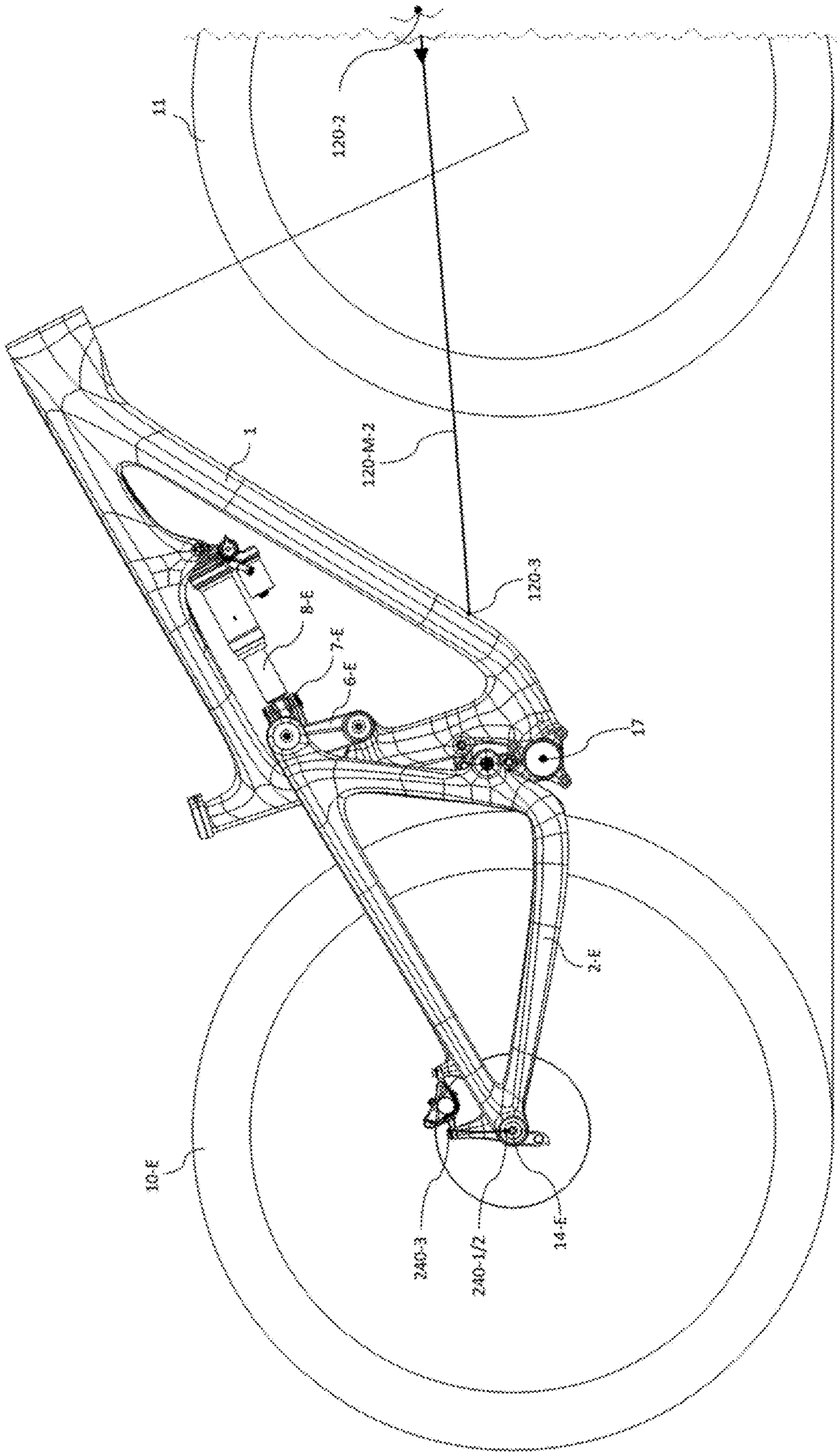
FIG. 1.27

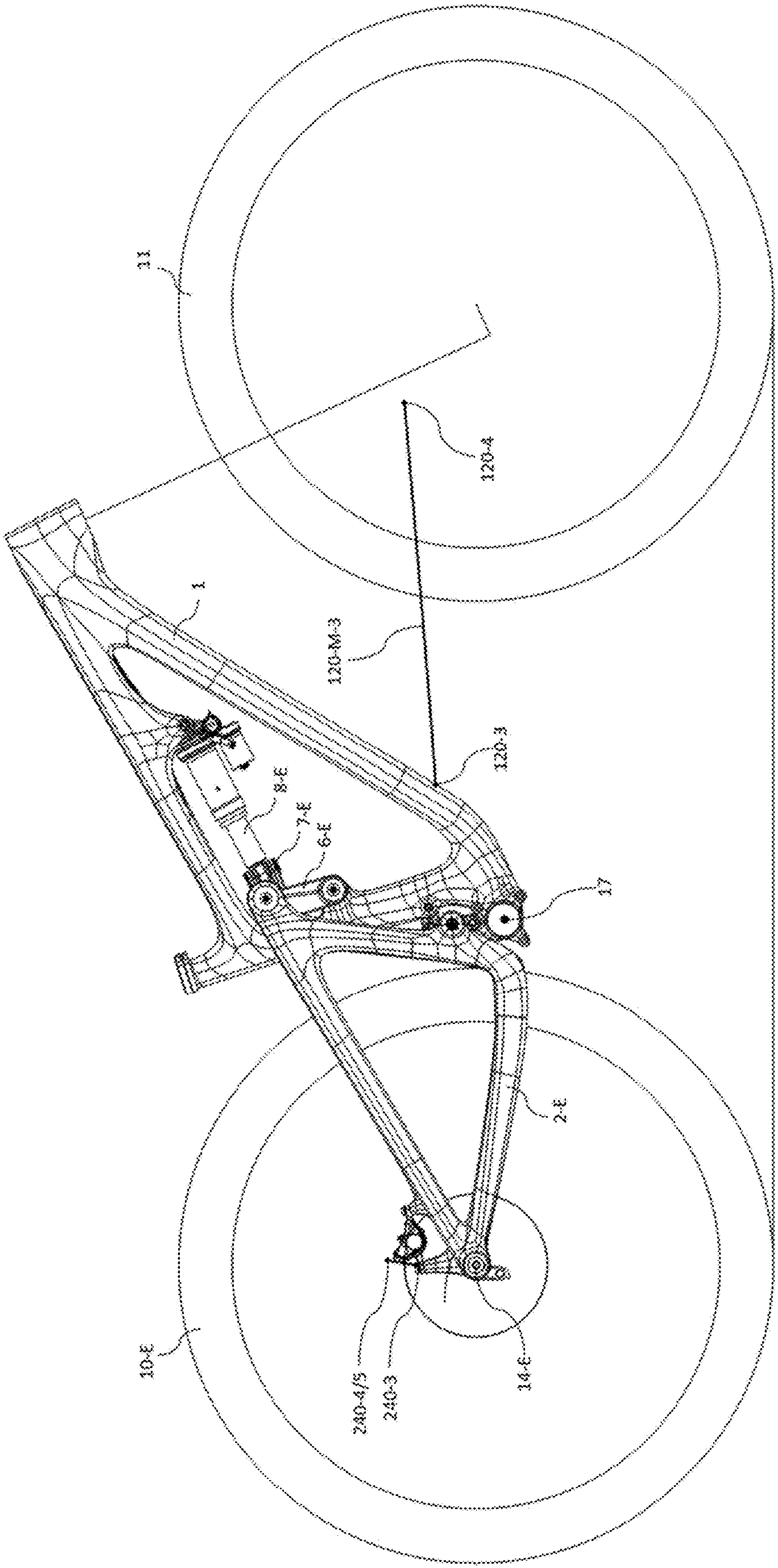
FIG. 1.28

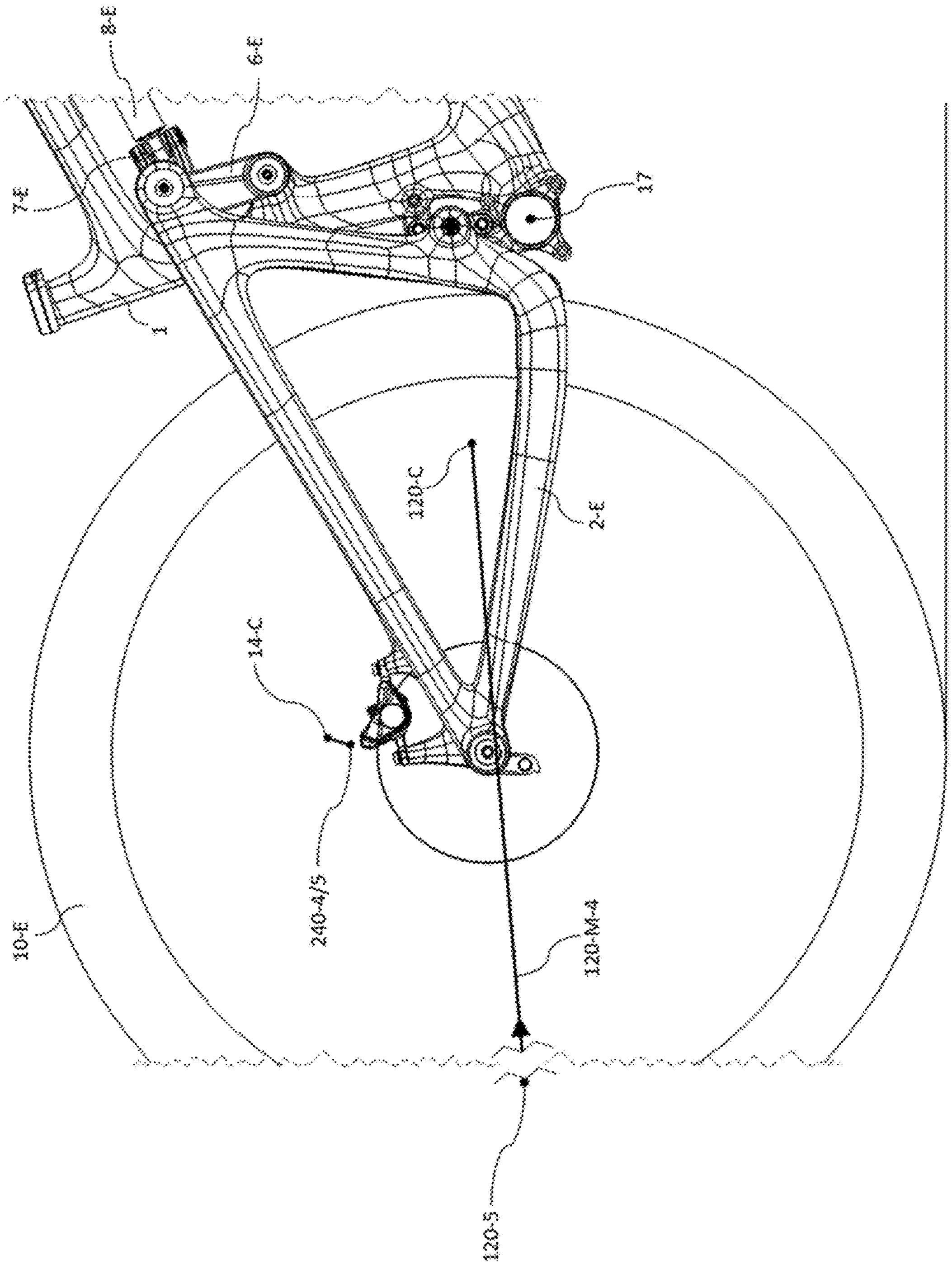
FIG. 1.29

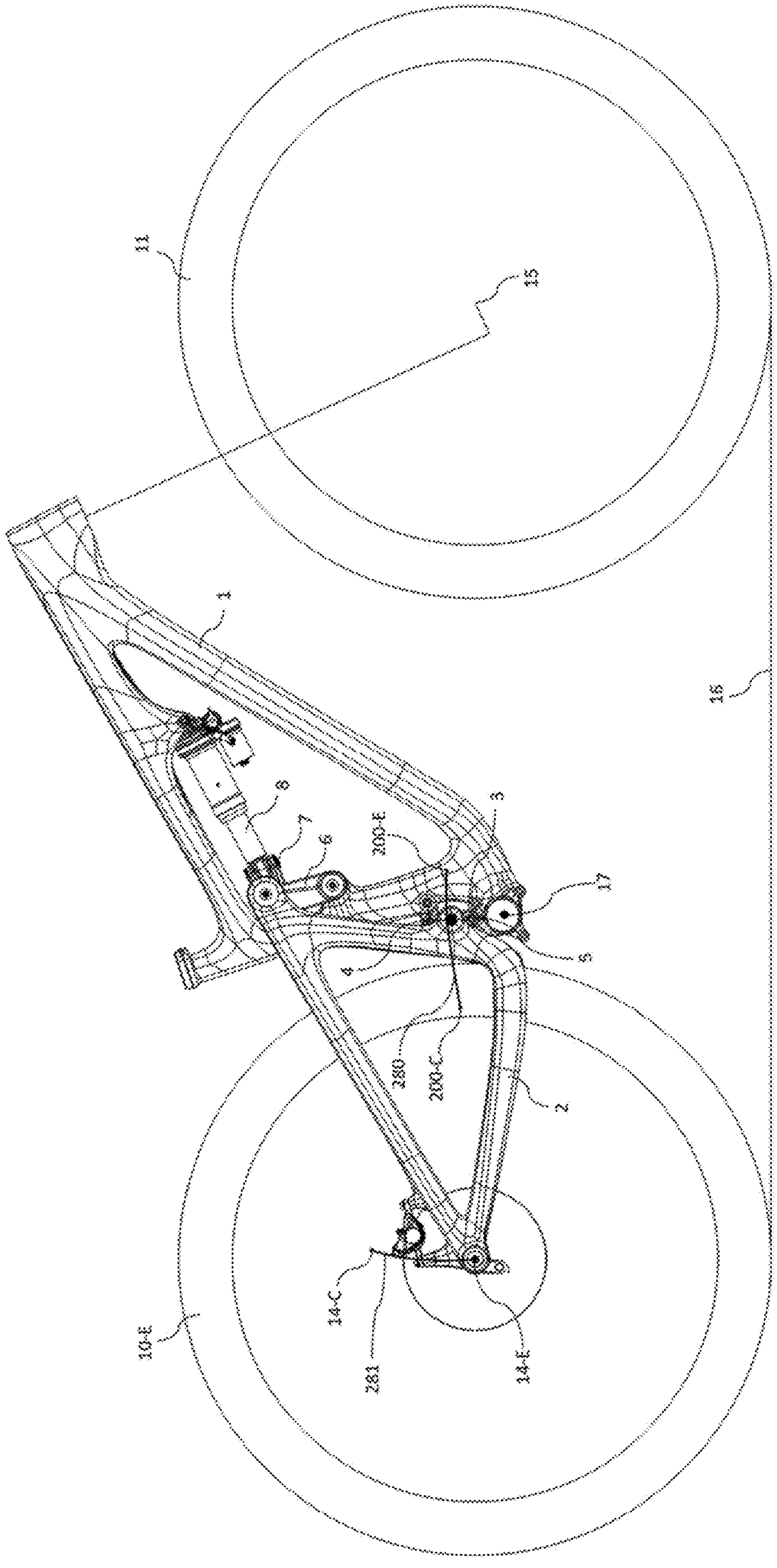
FIG. 1.30

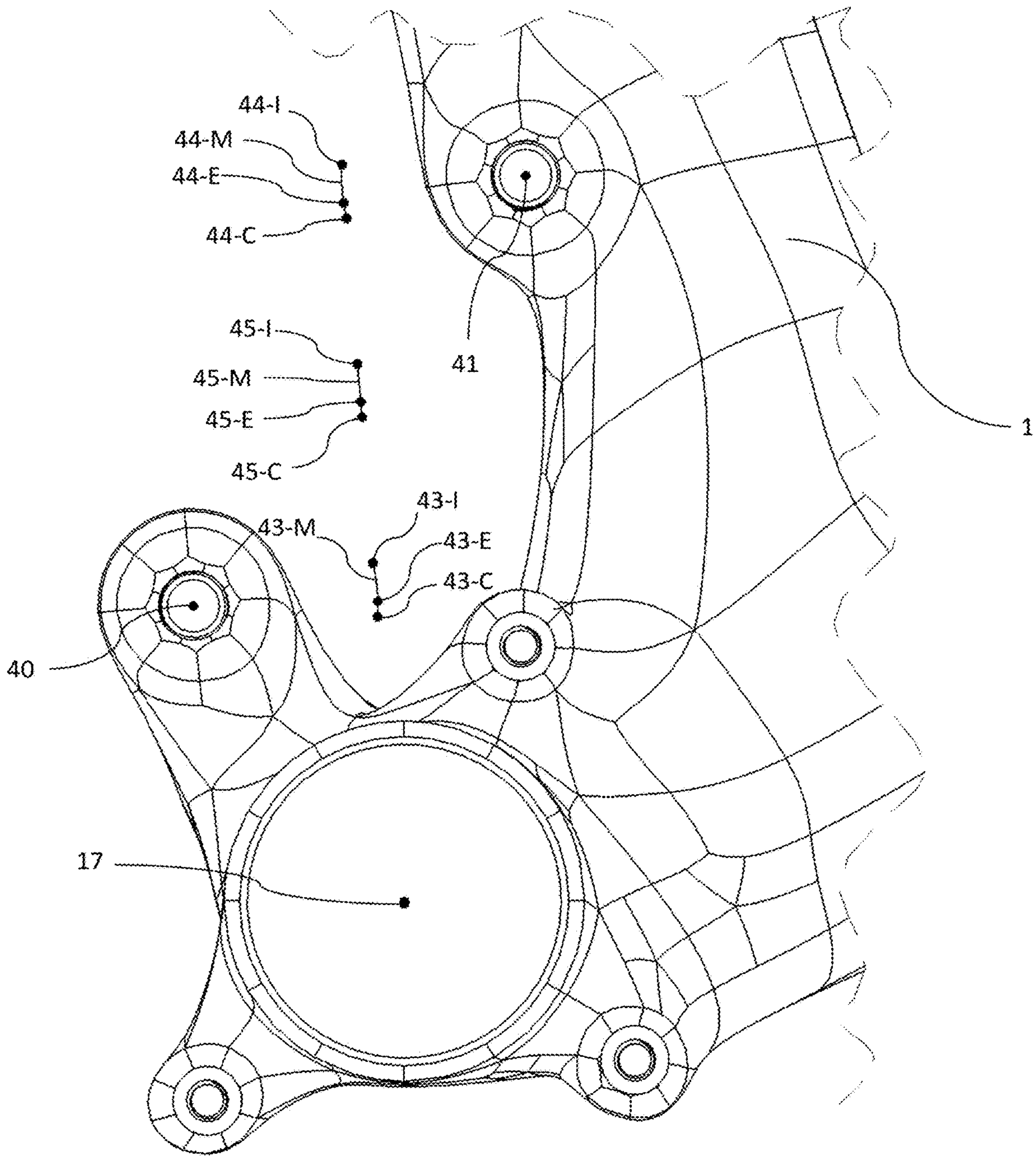
FIG. 1.31

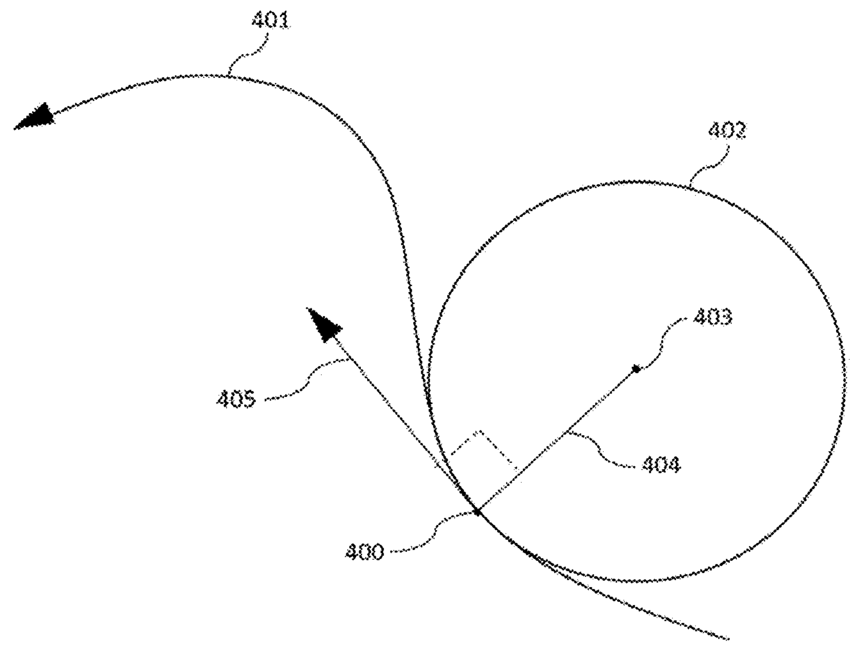
FIG. 1.32
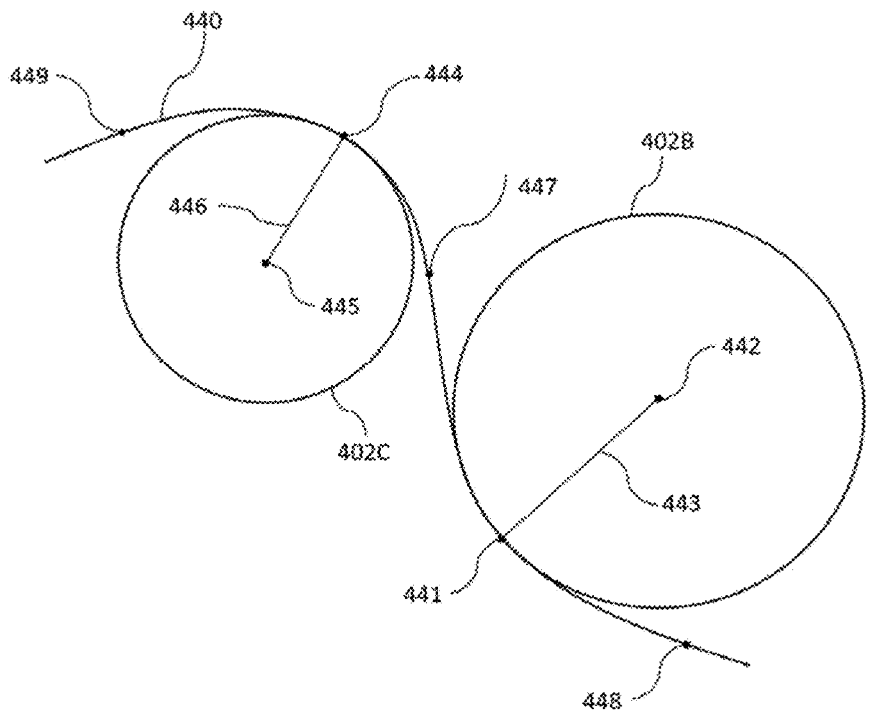
FIG. 1.33

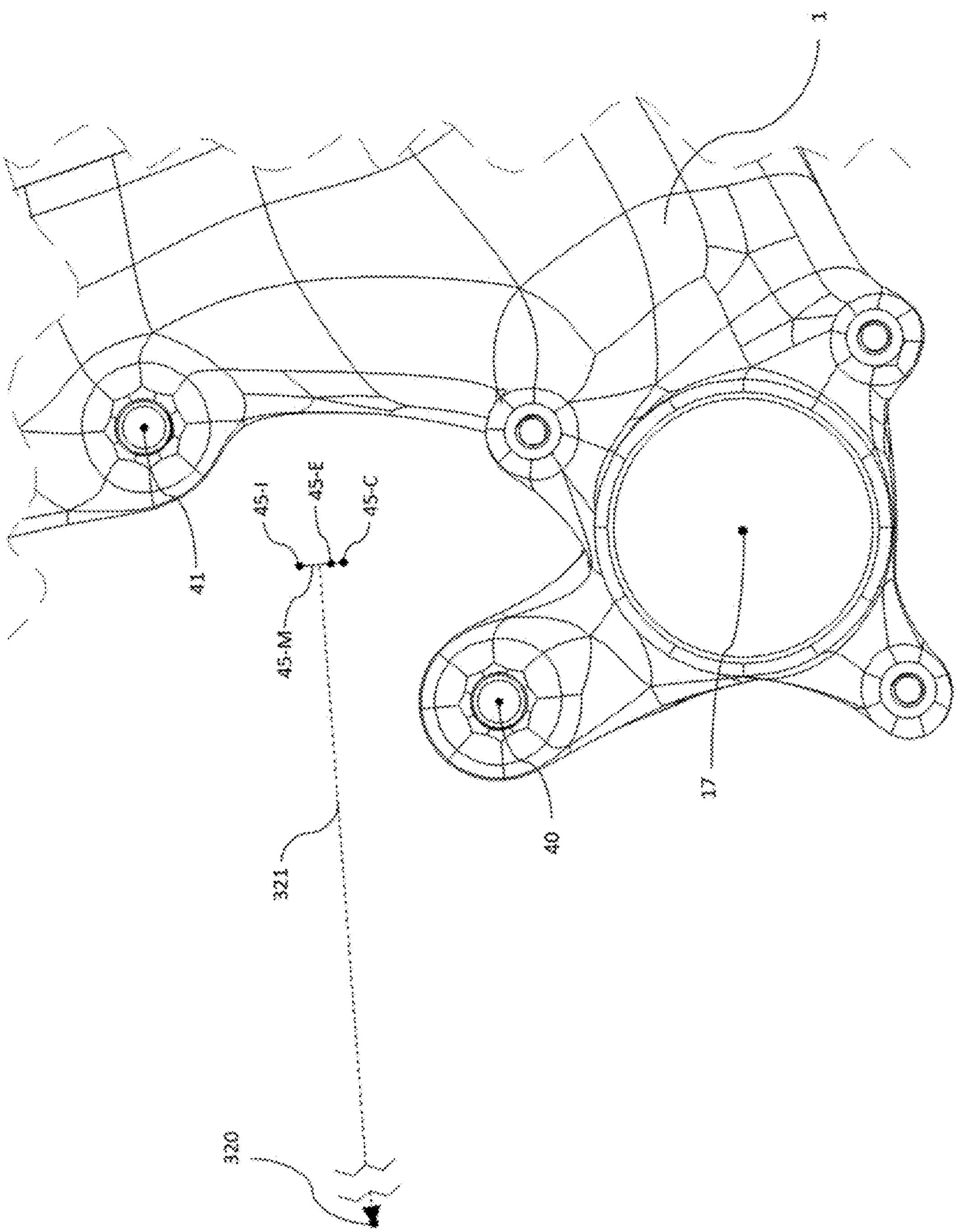
FIG. 1.34

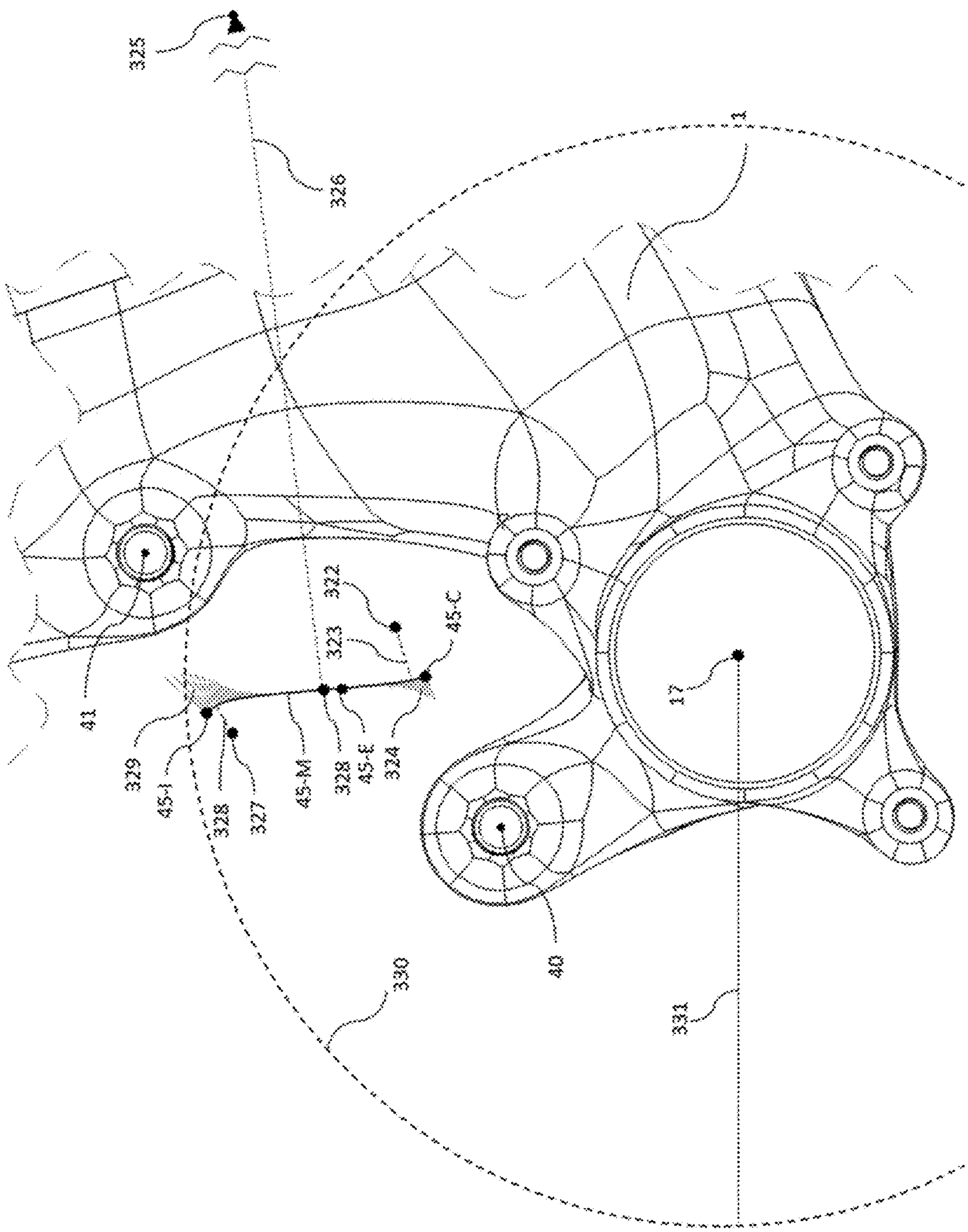
FIG. 1.35

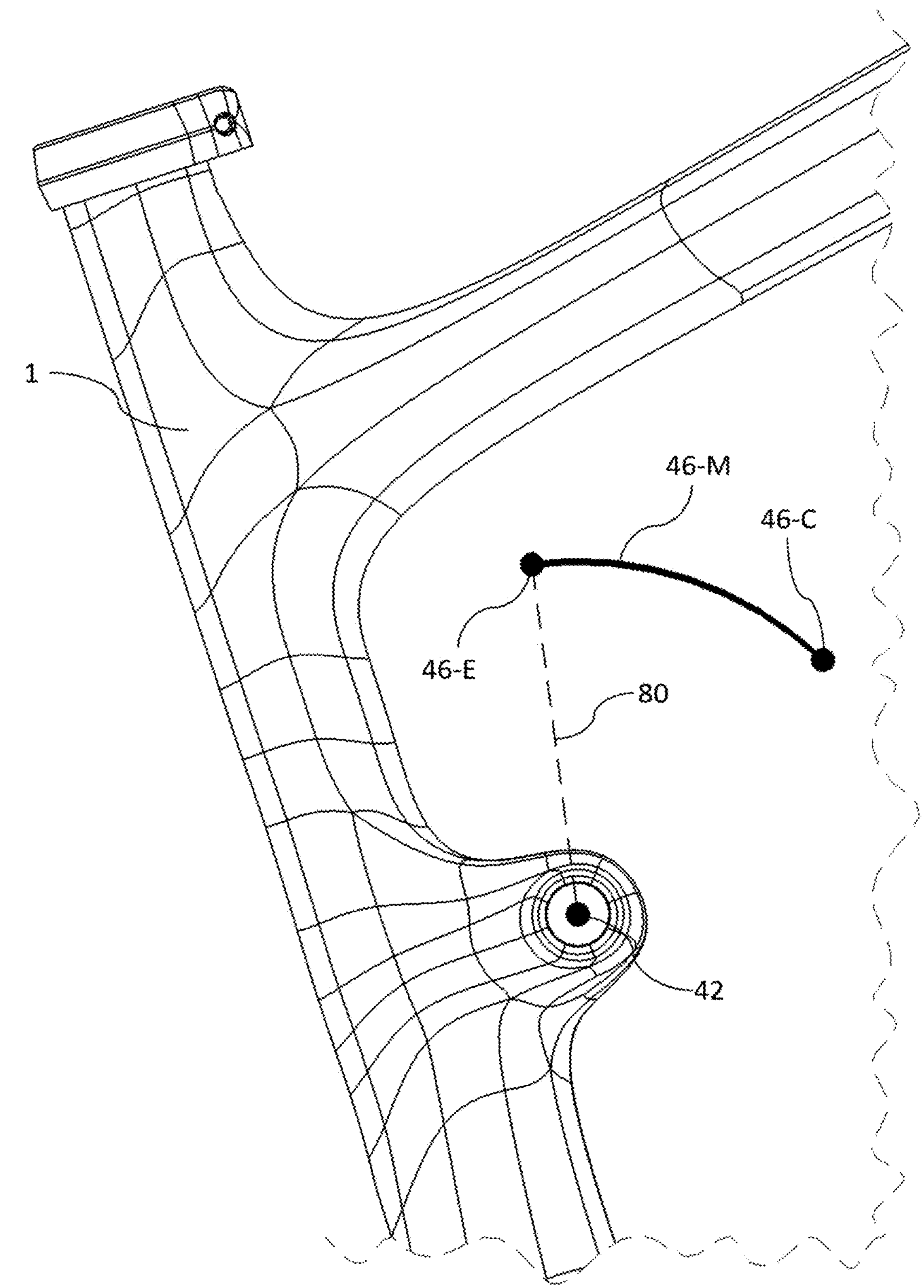
FIG. 1.35B

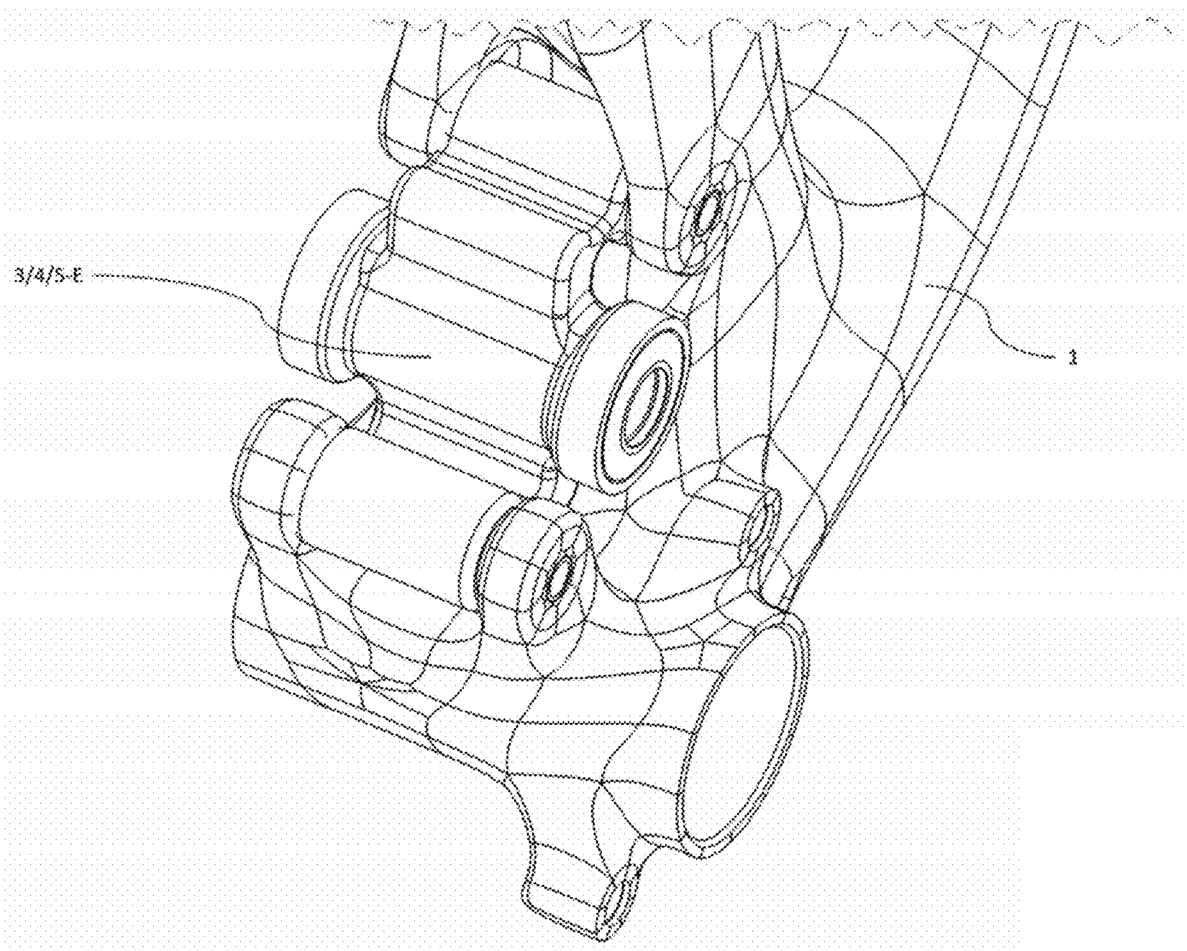
FIG. 1.36

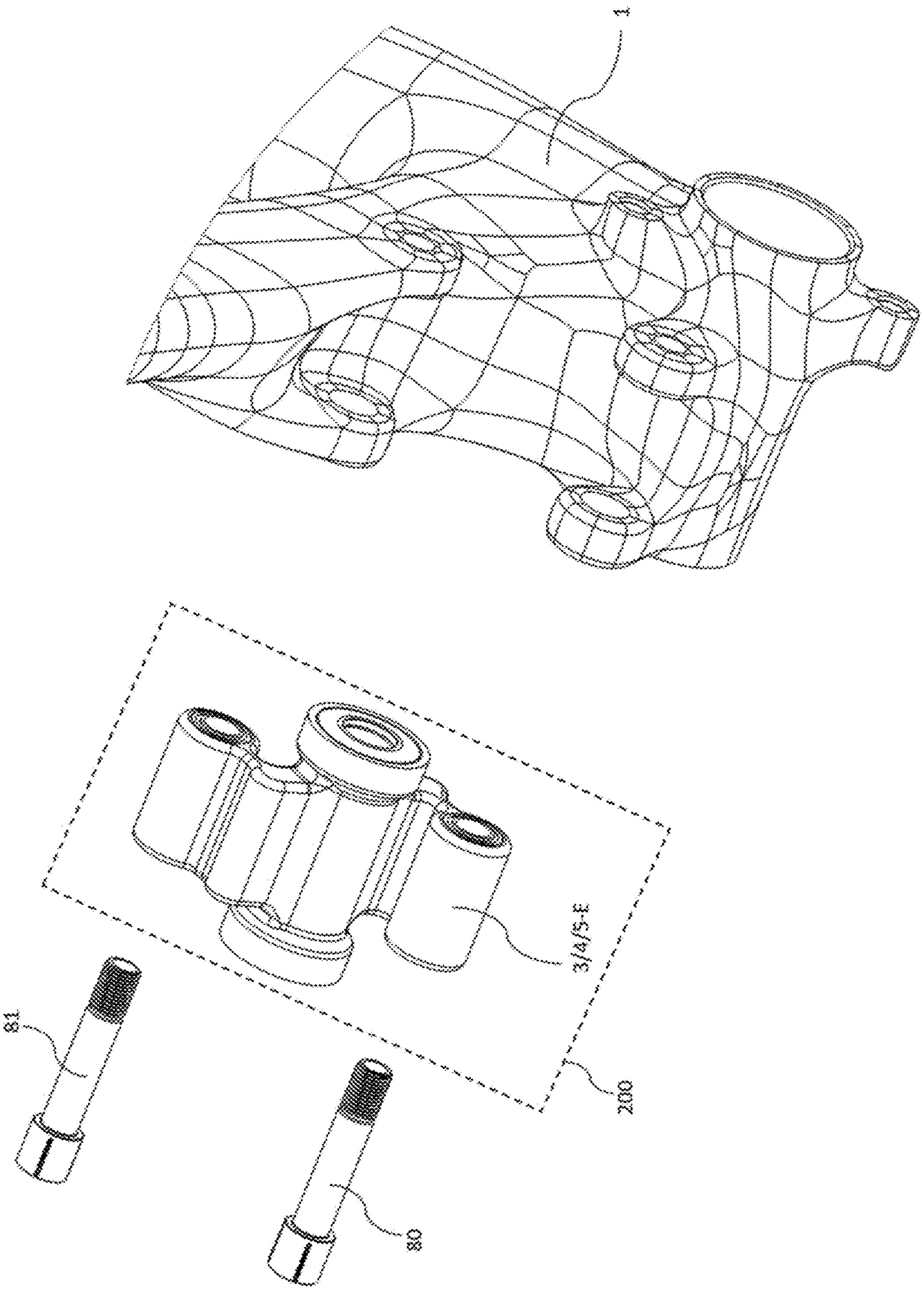
FIG. 1.37

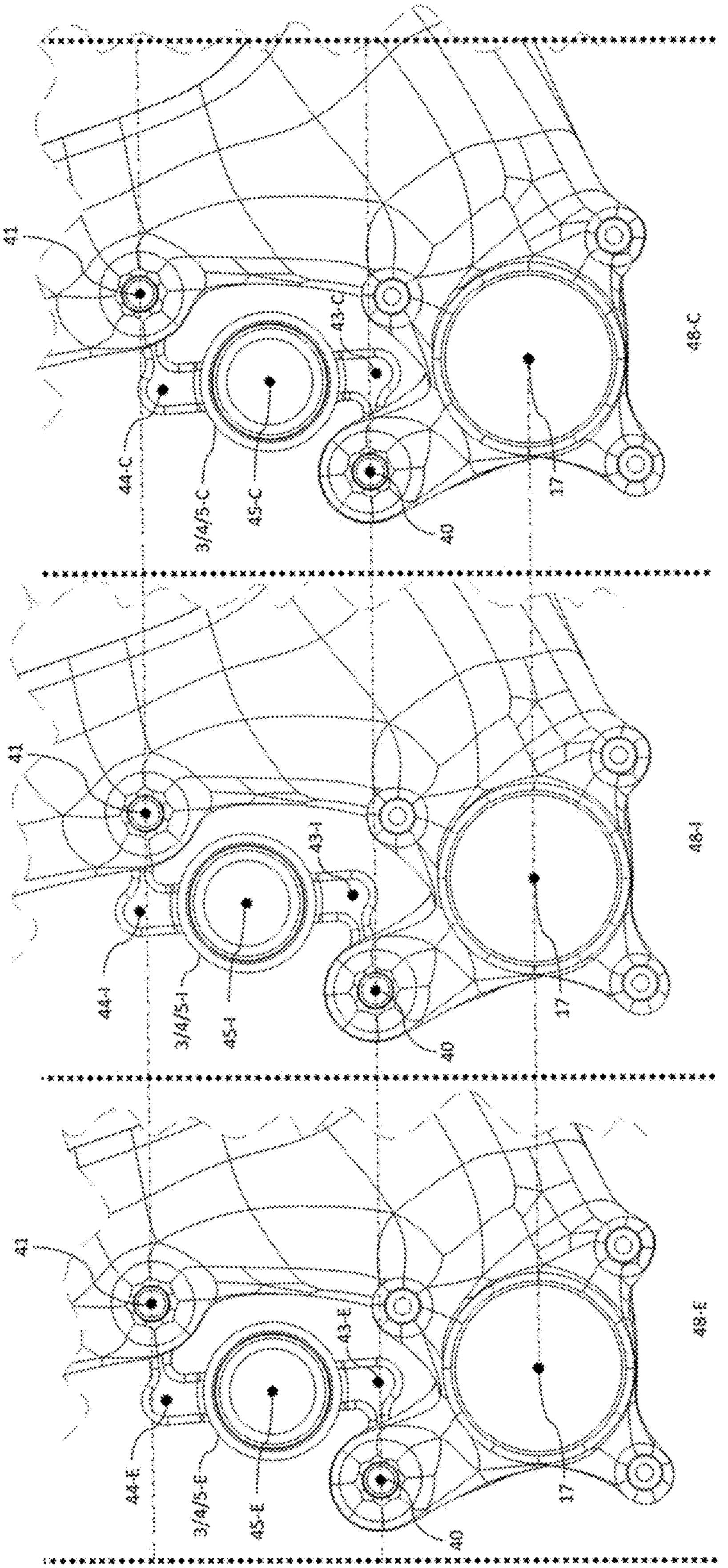
FIG. 1.38

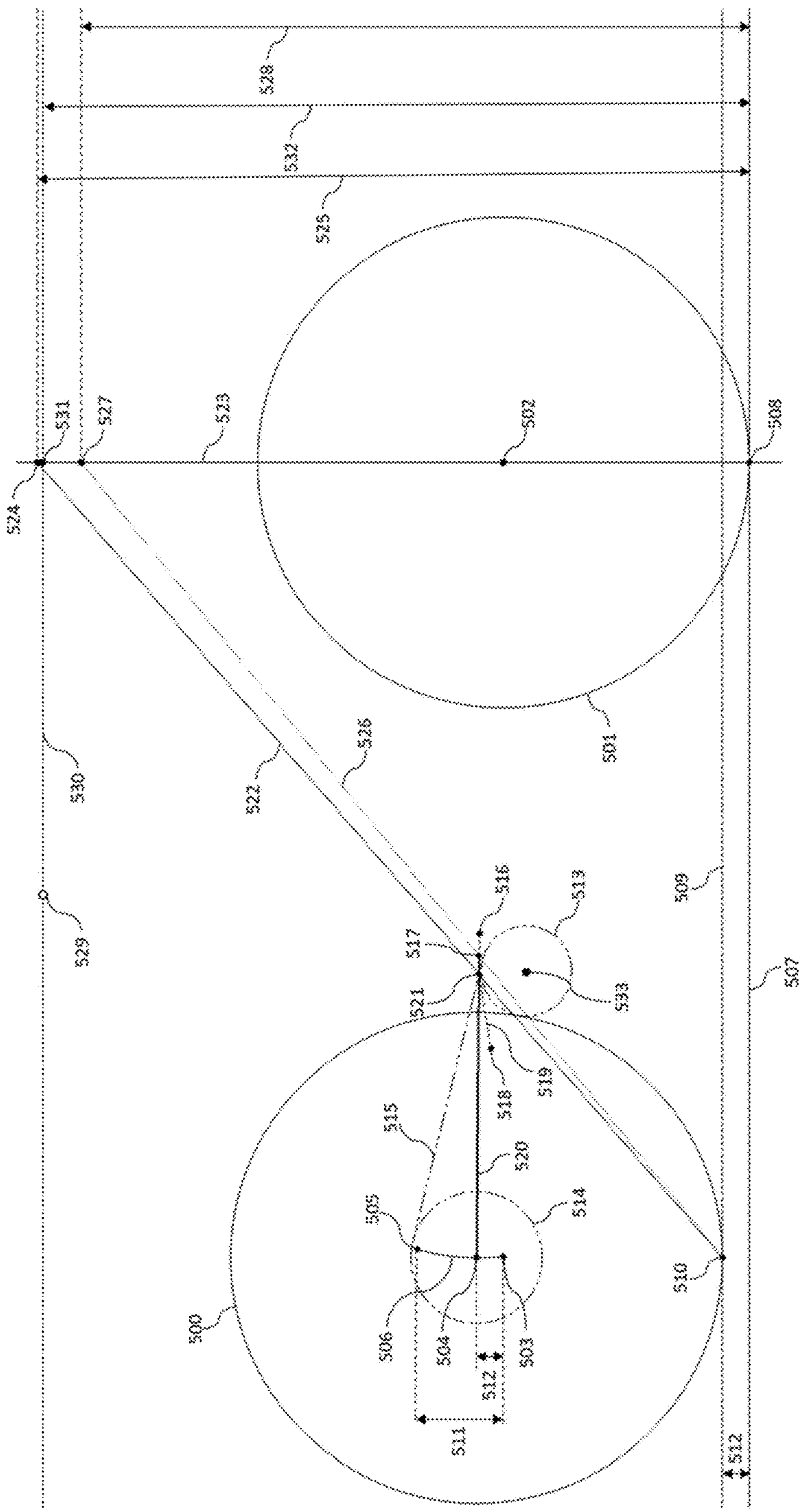
FIG. 1.39

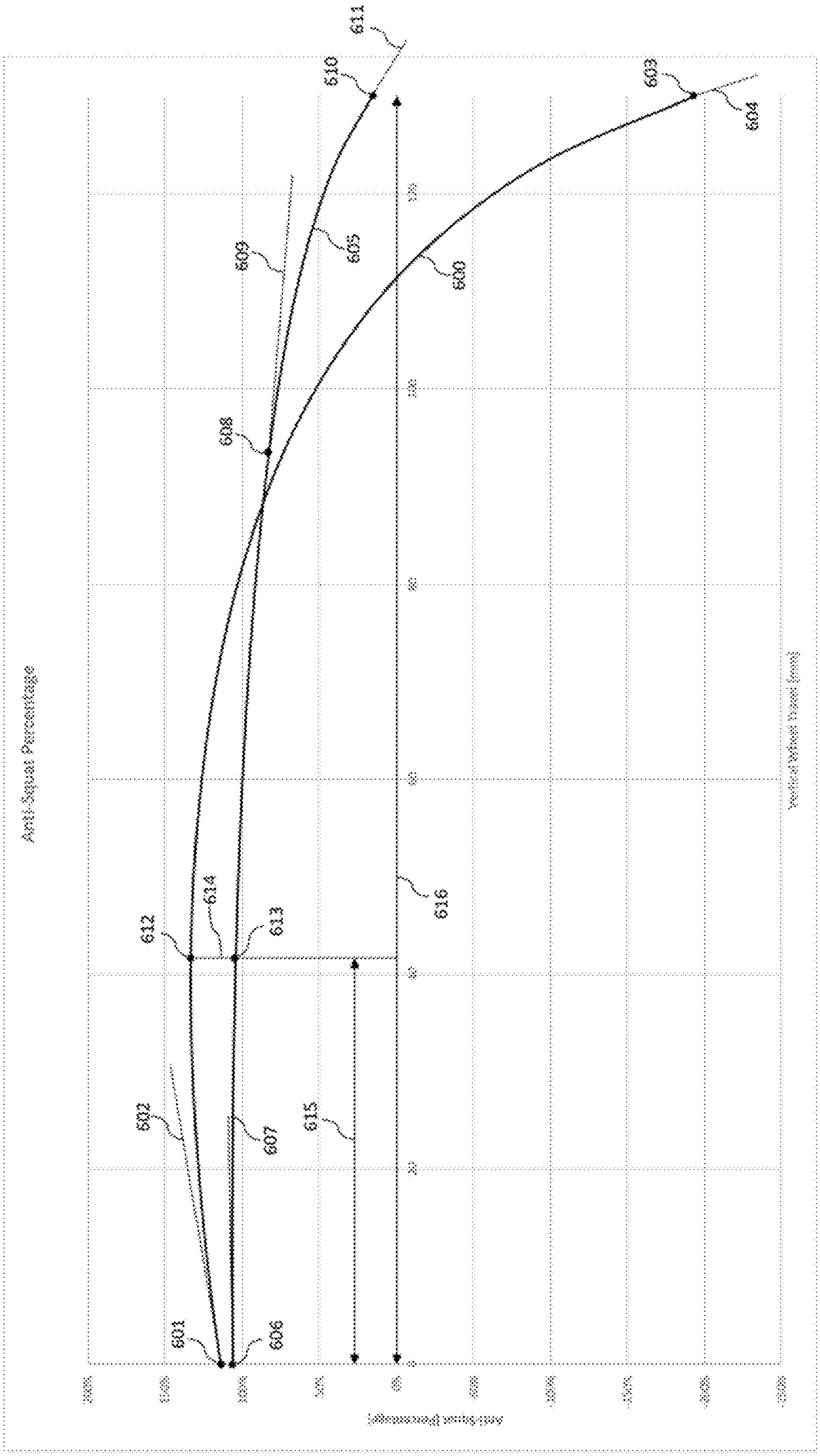
FIG. 1.40

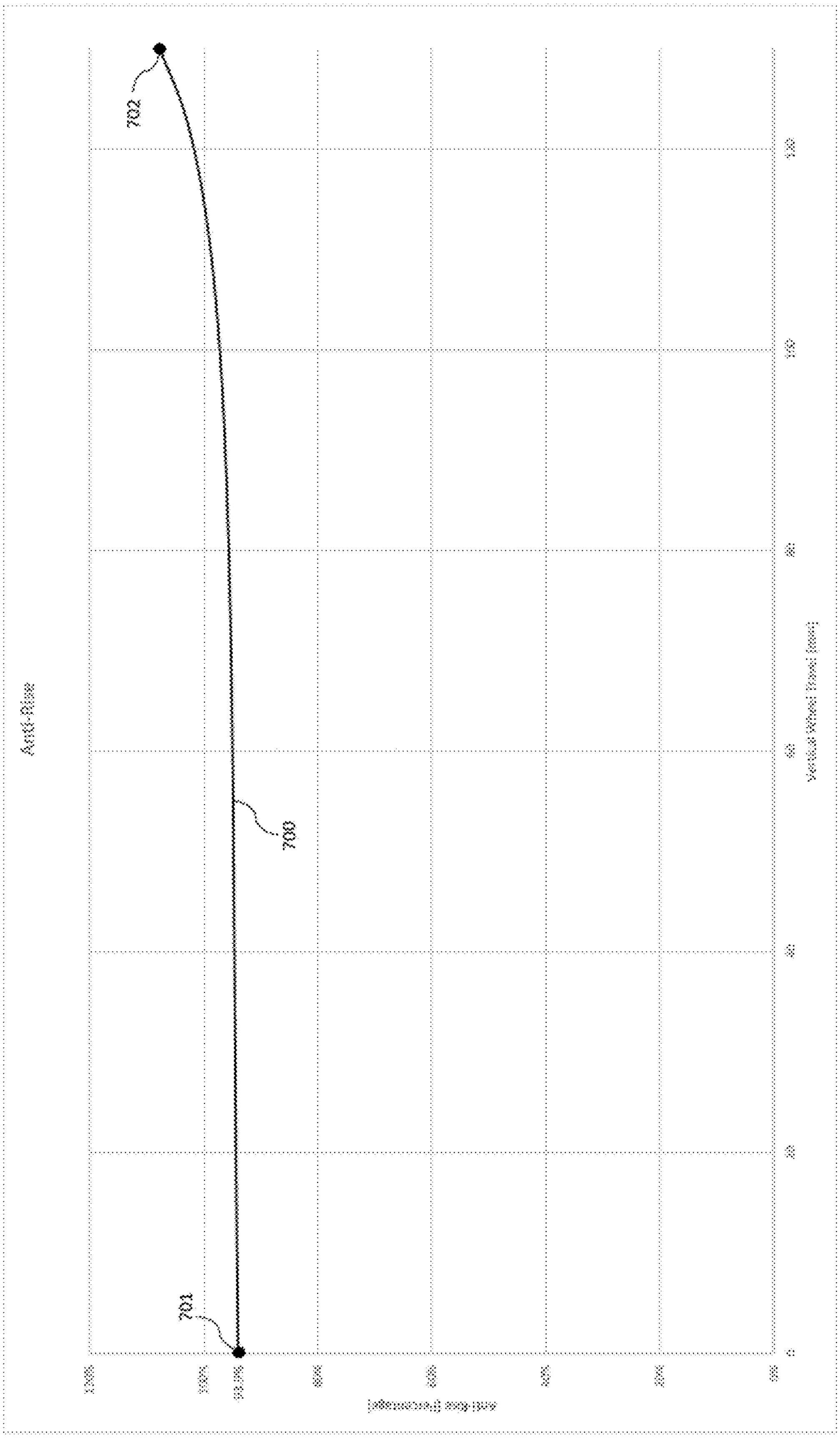
FIG. 1.41

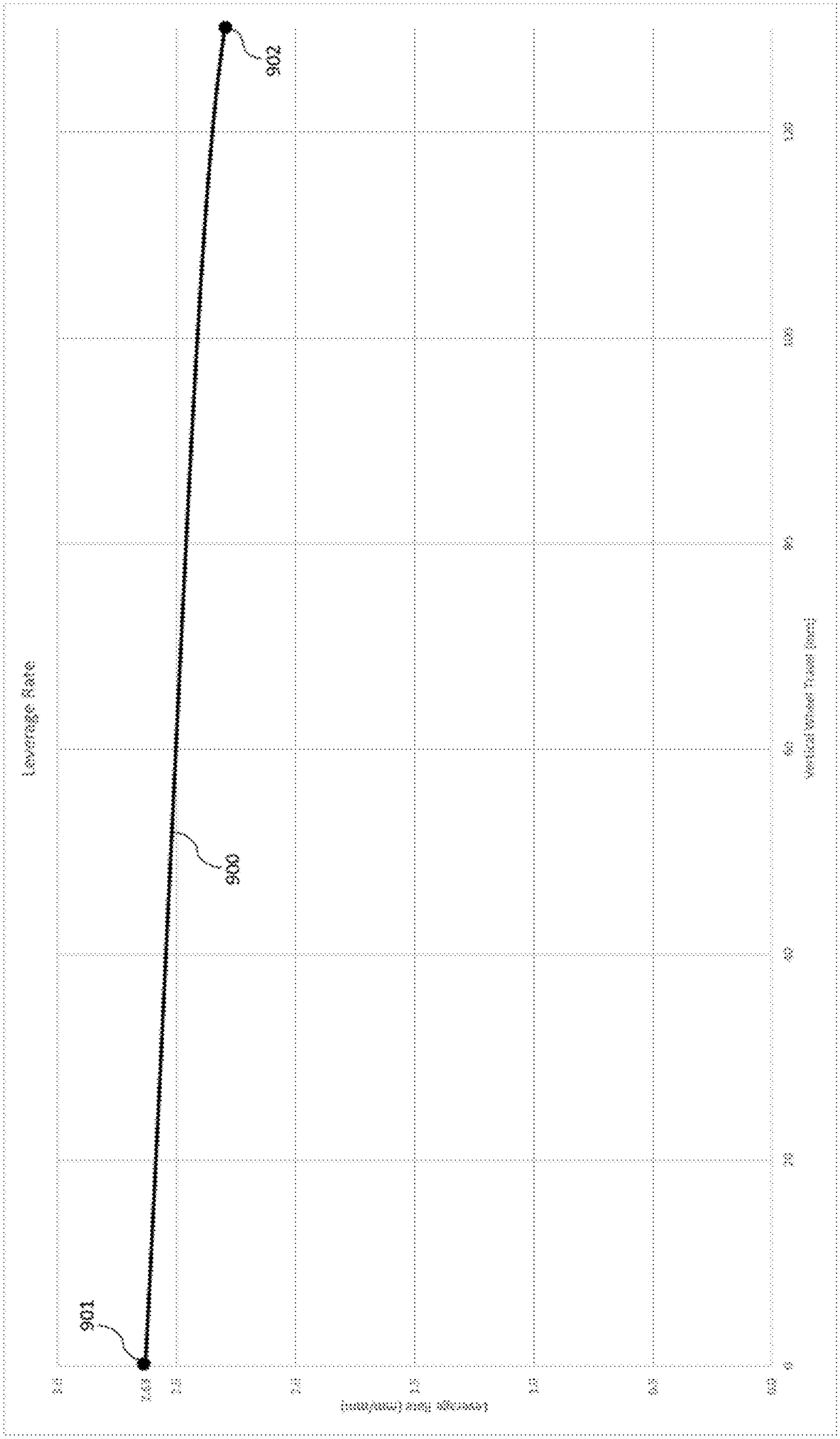
FIG. 1.42

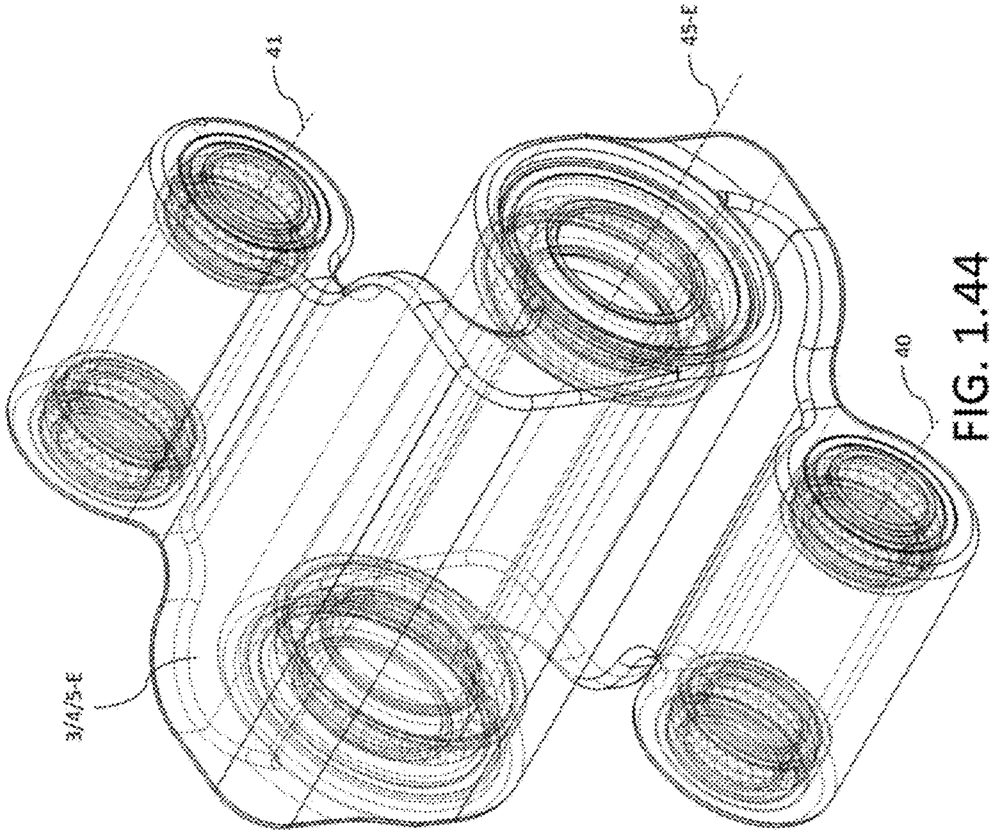
FIG. 1.44
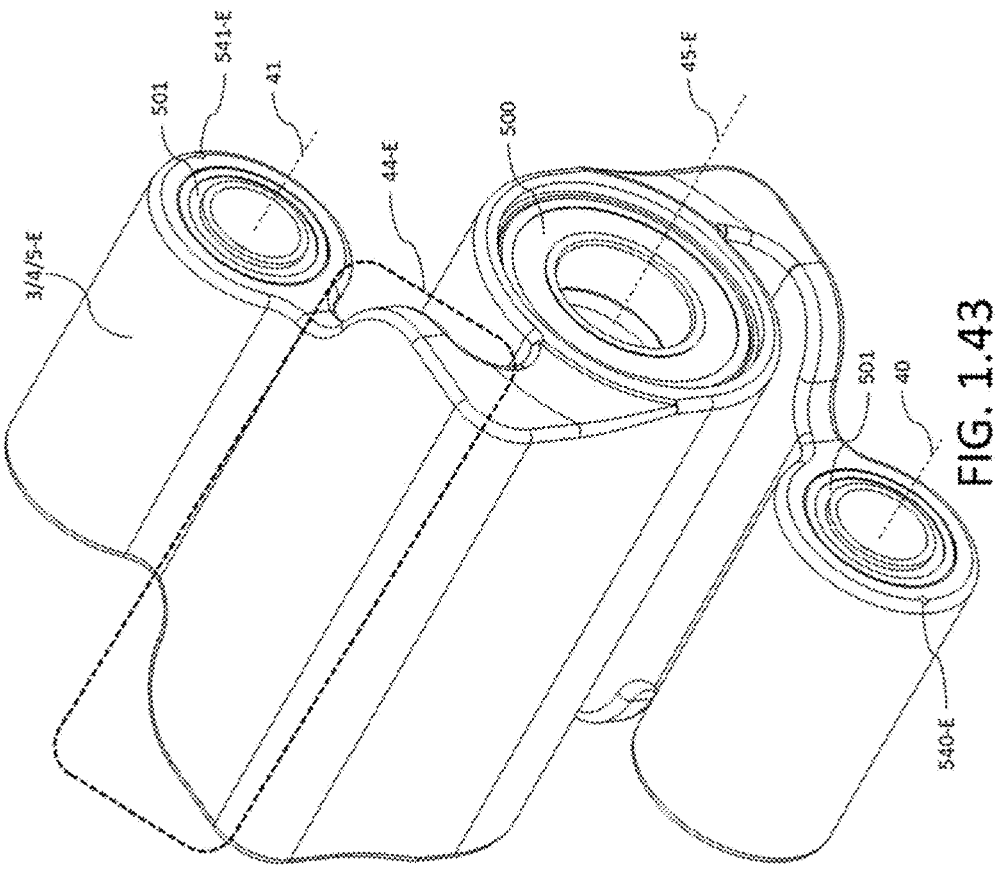
FIG. 1.43

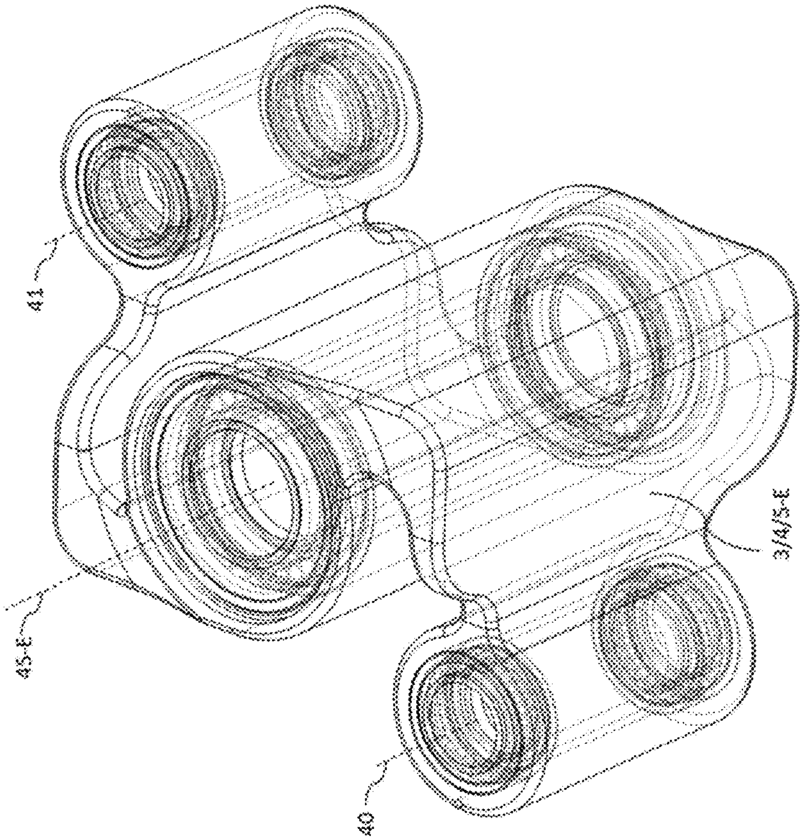
FIG. 1.46
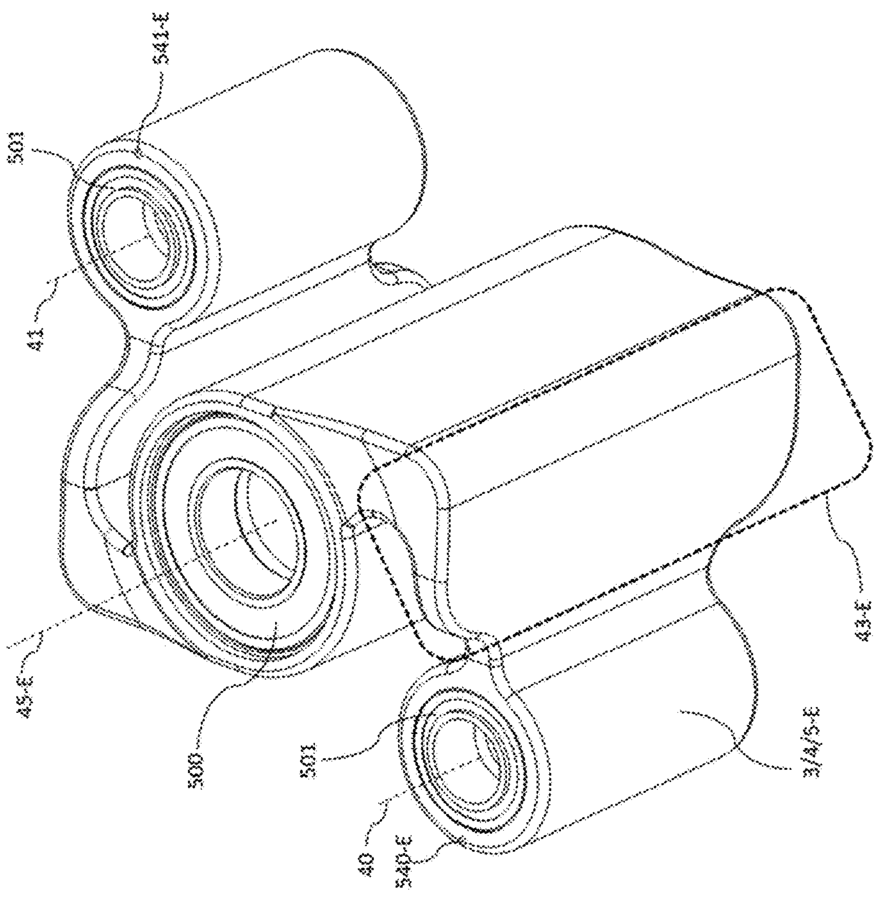
FIG. 1.45

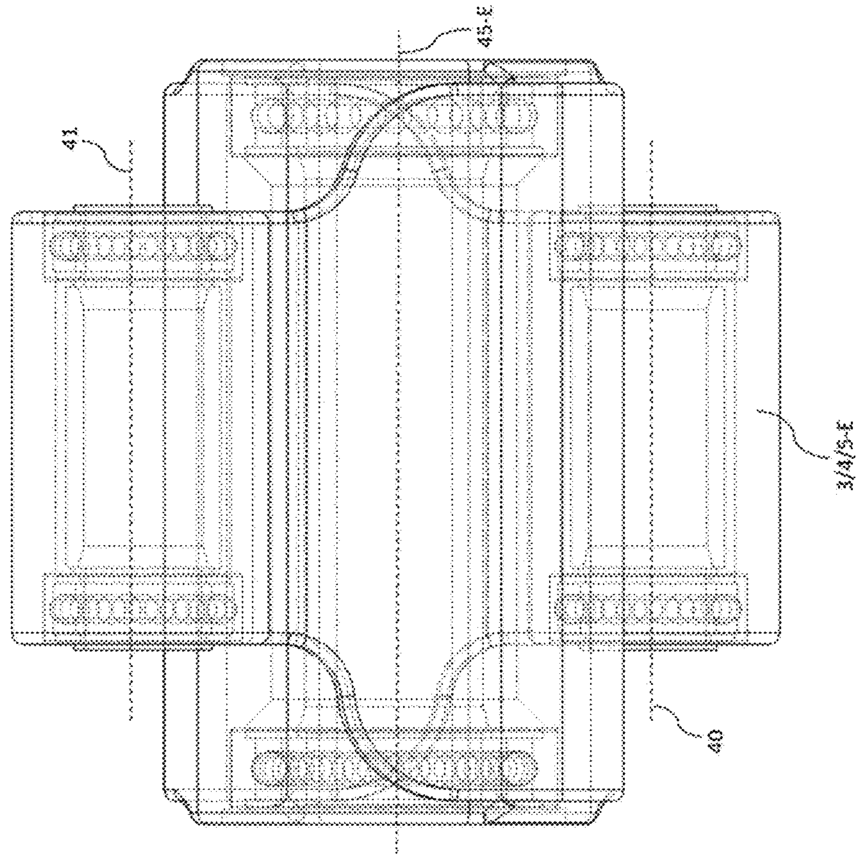
FIG. 1.48
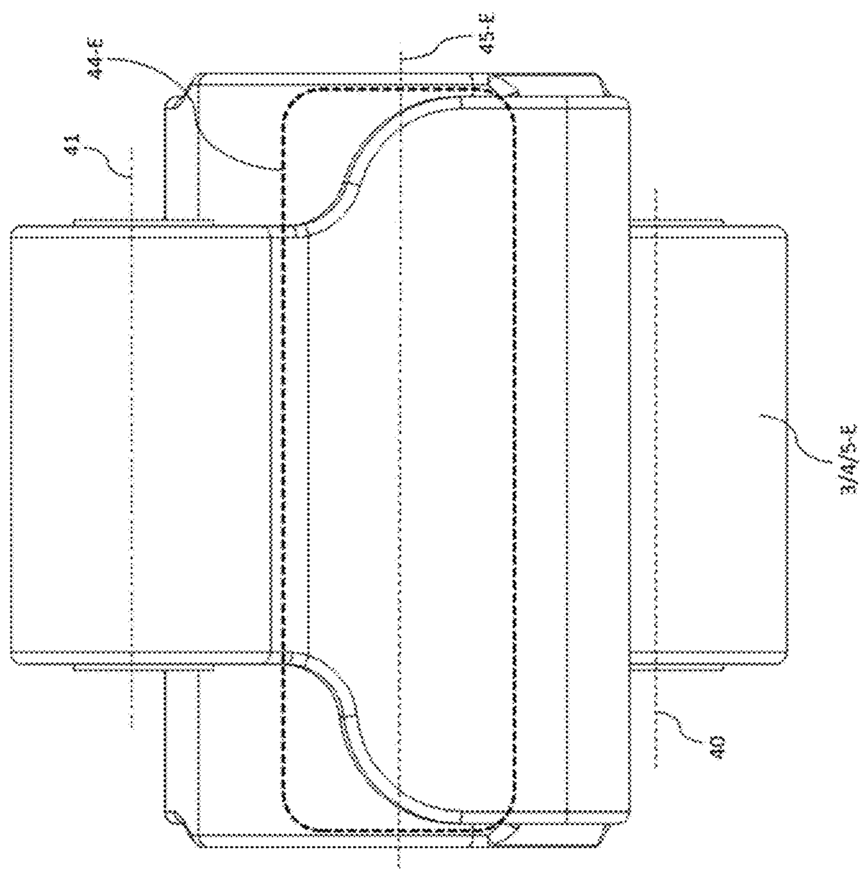
FIG. 1.47

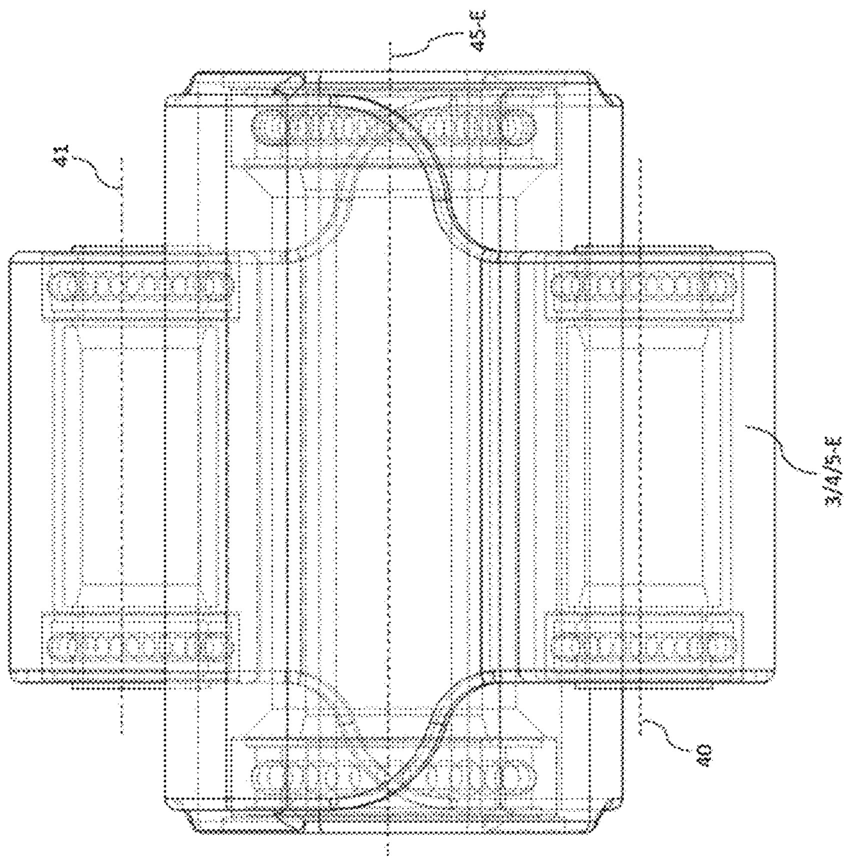
FIG. 1.50
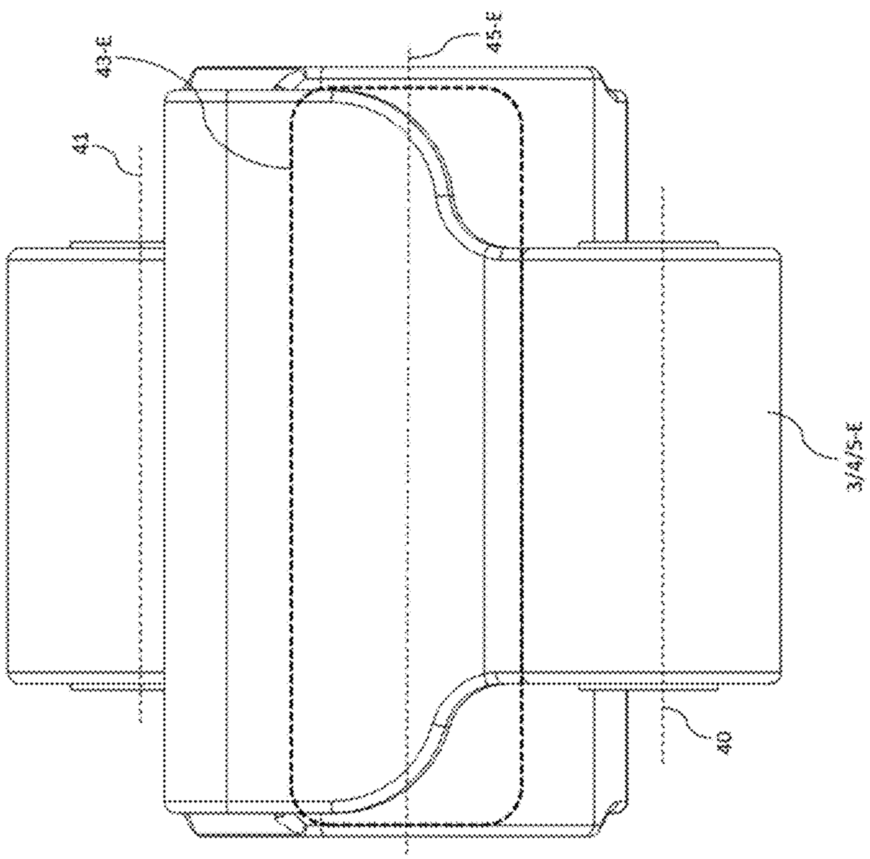
FIG. 1.49

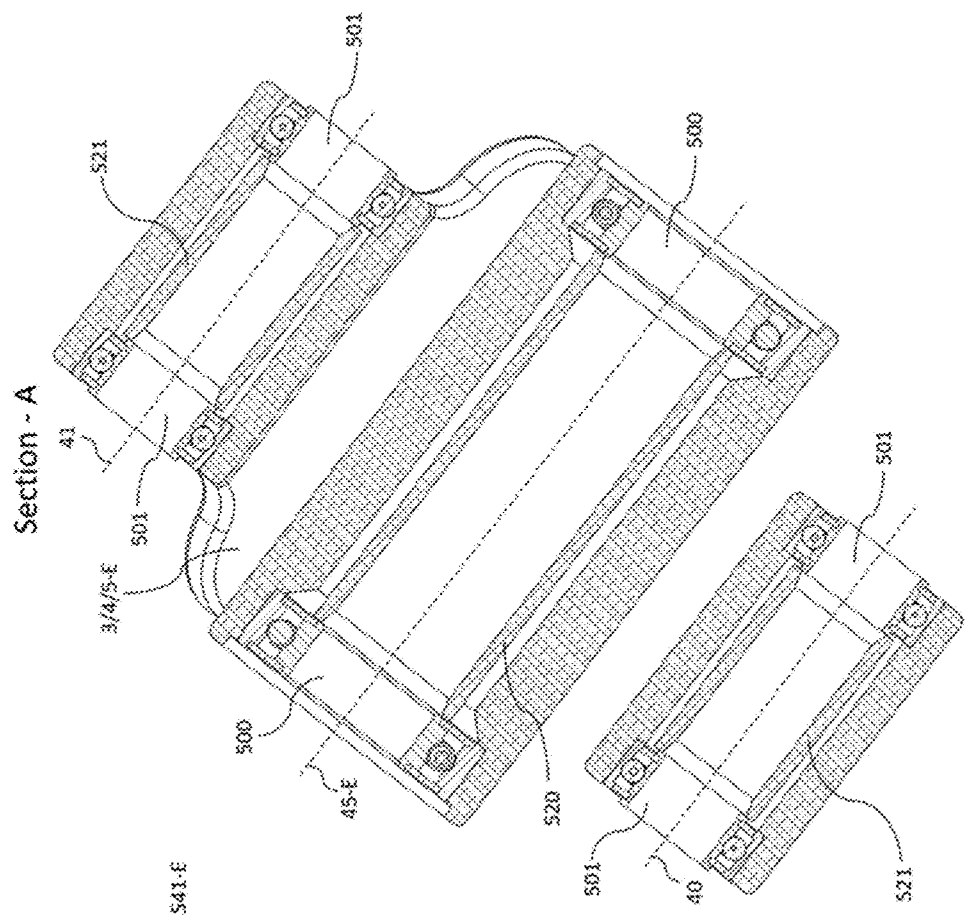
FIG. 1.52
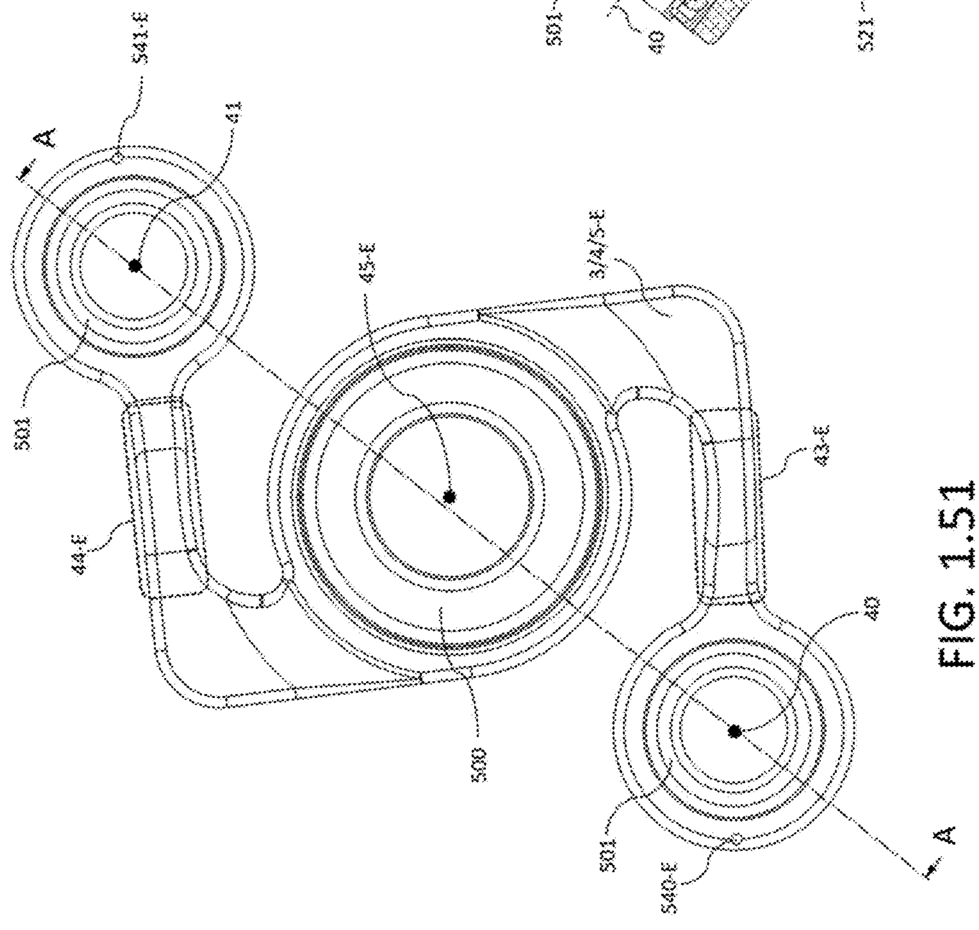
FIG. 1.51

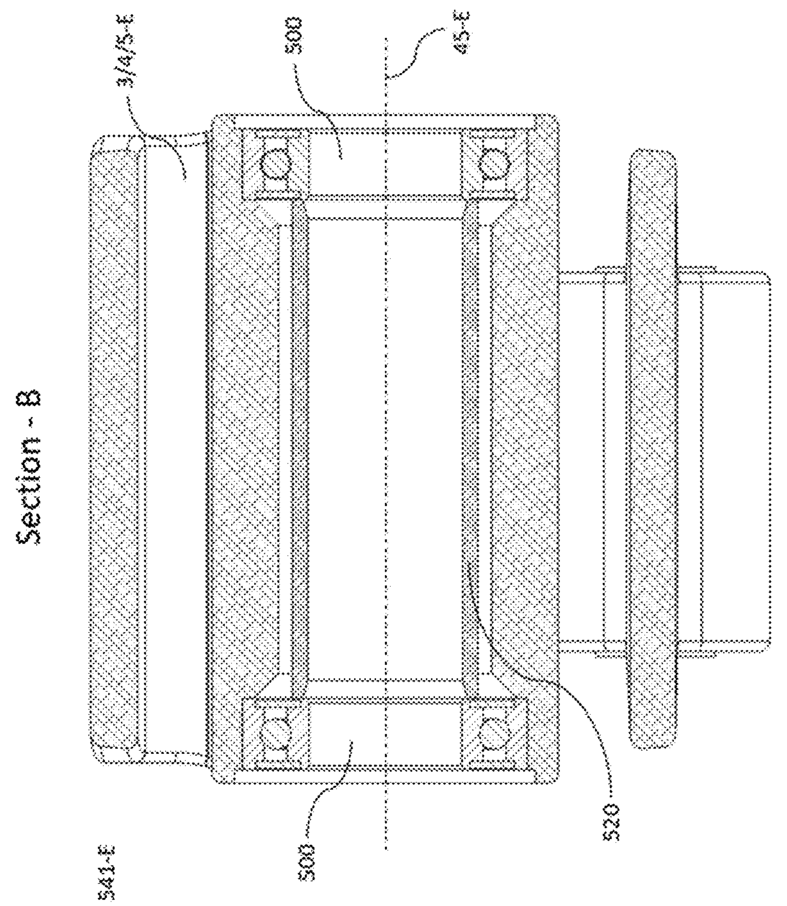
FIG. 1.54
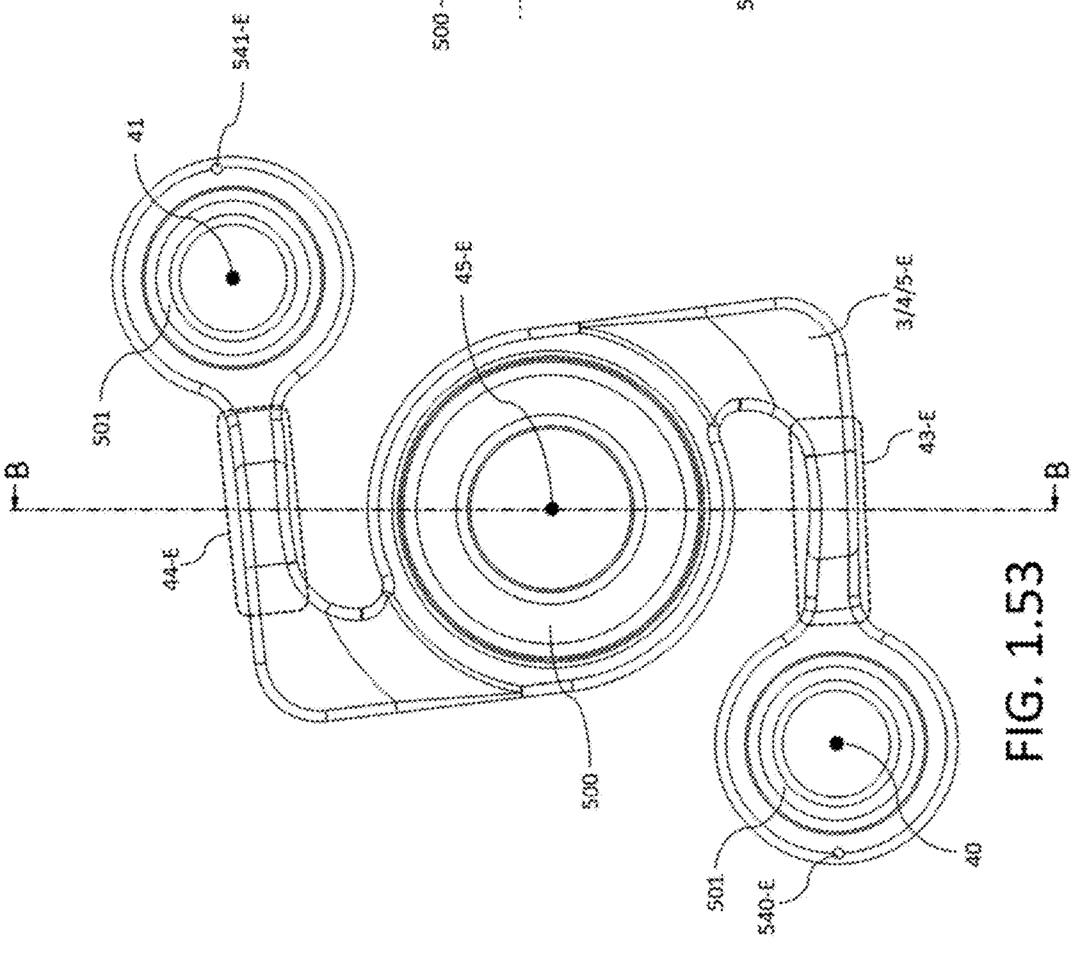
FIG. 1.53

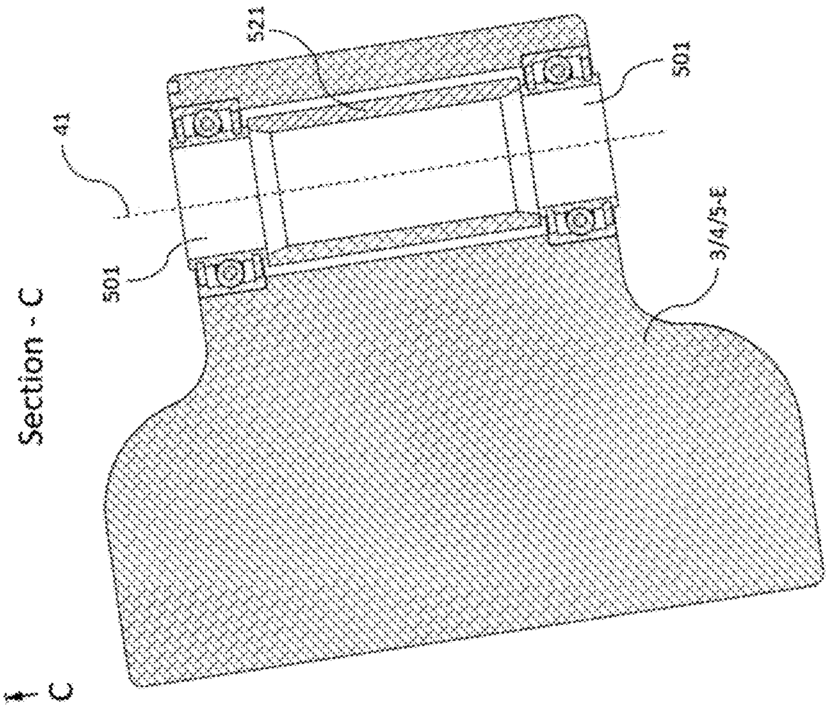
FIG. 1.56
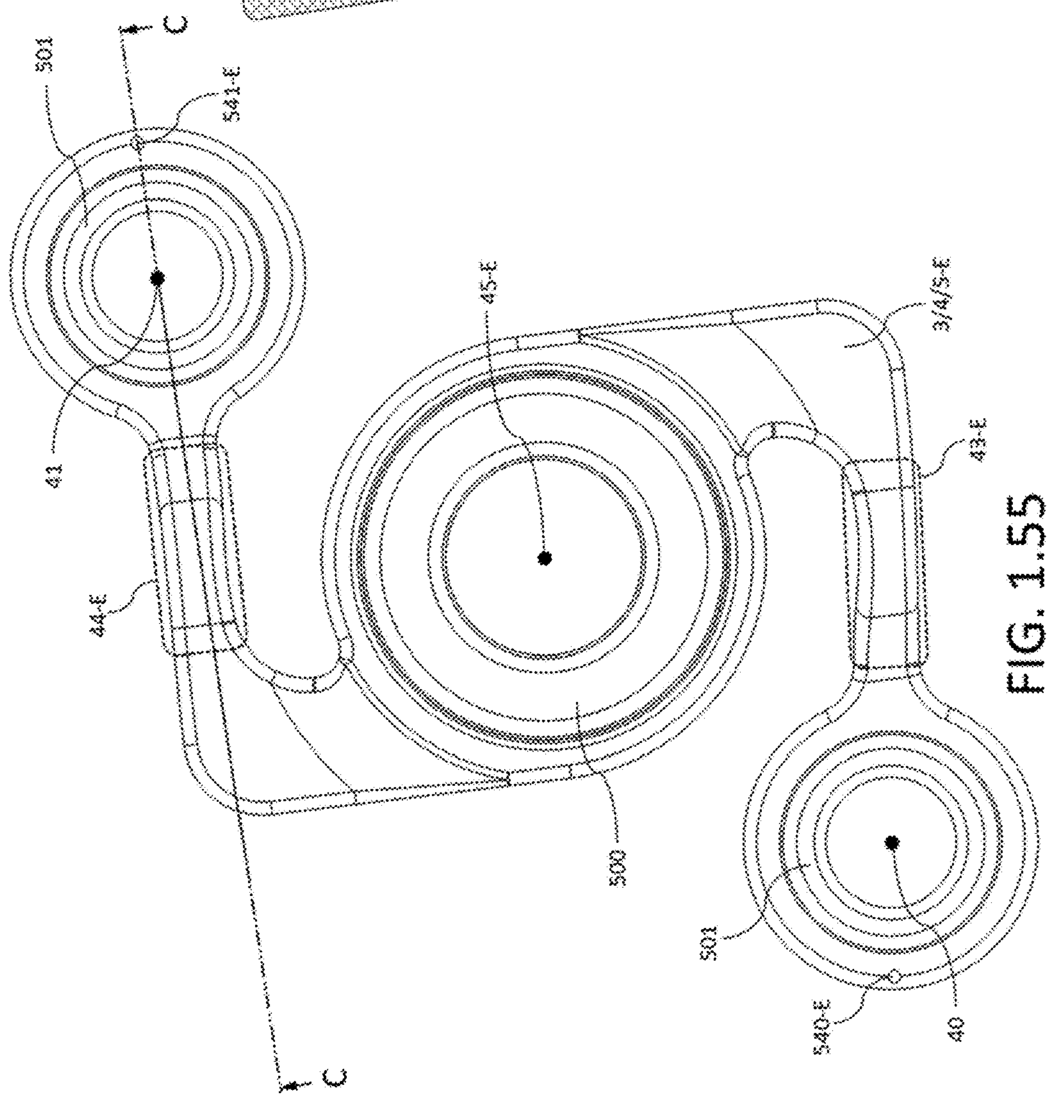
FIG. 1.55

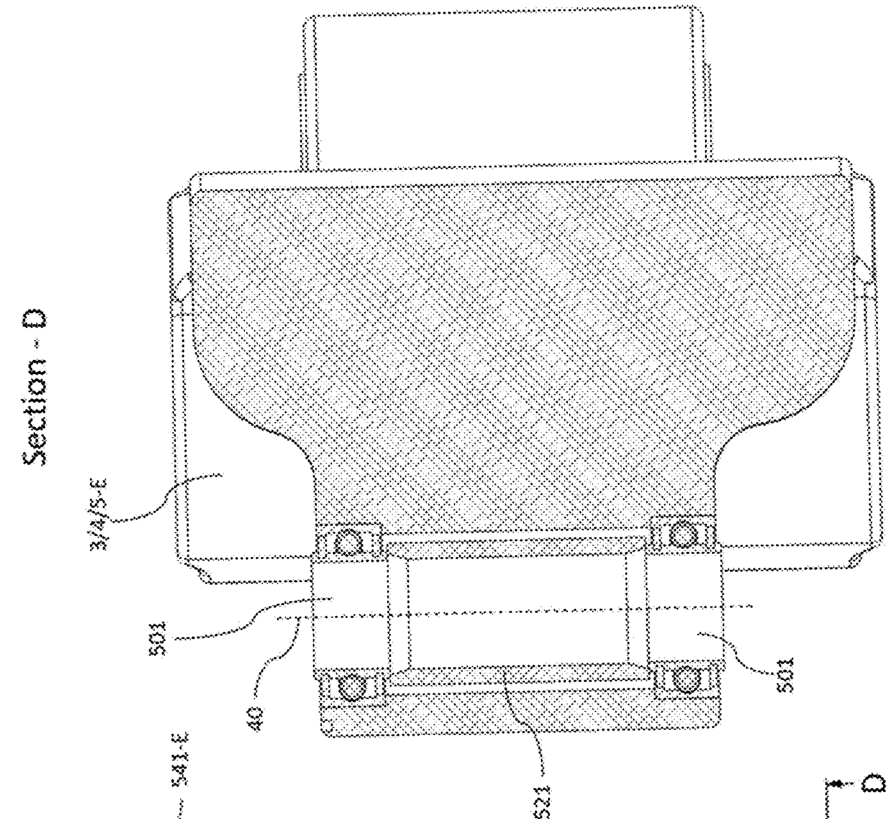
FIG. 1.58
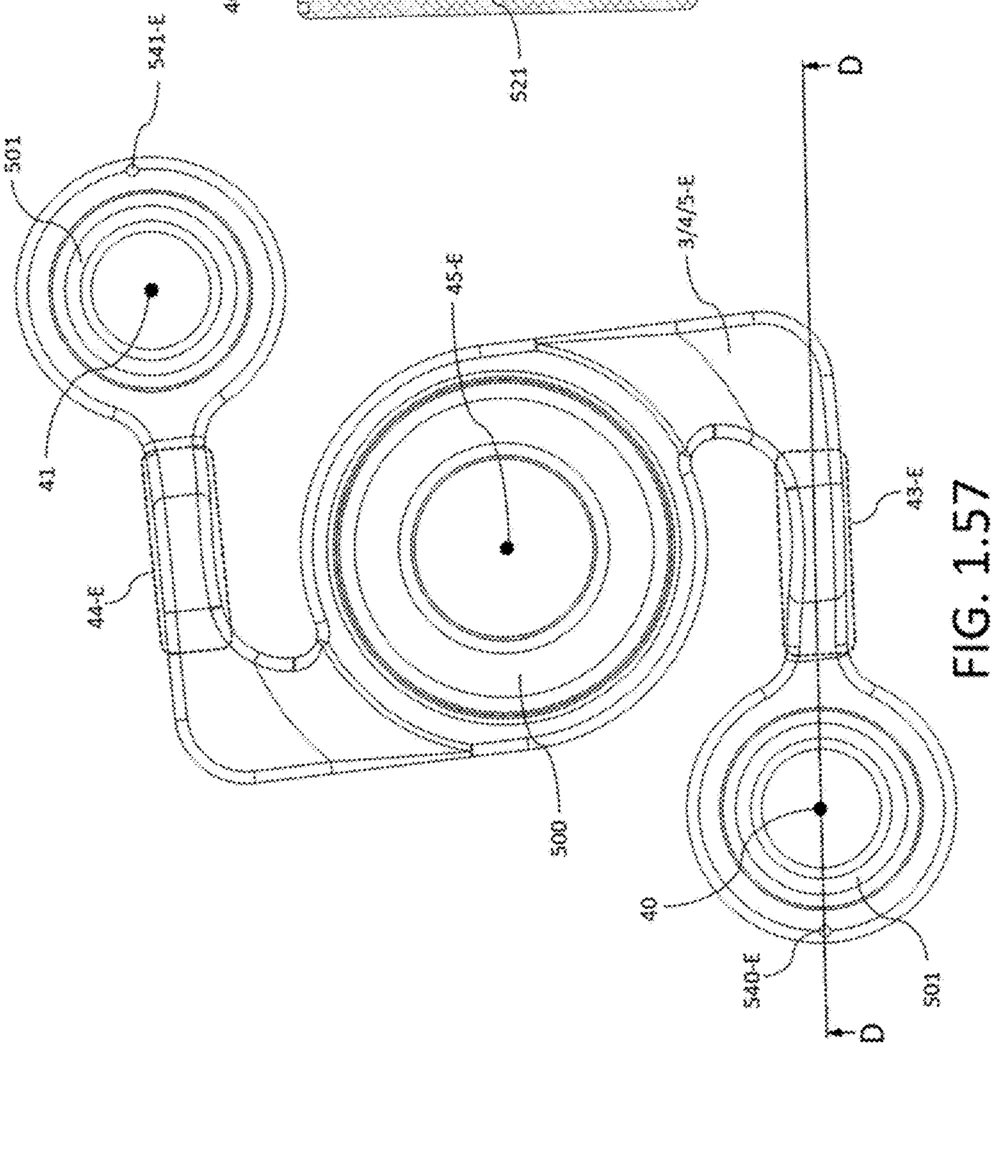
FIG. 1.57

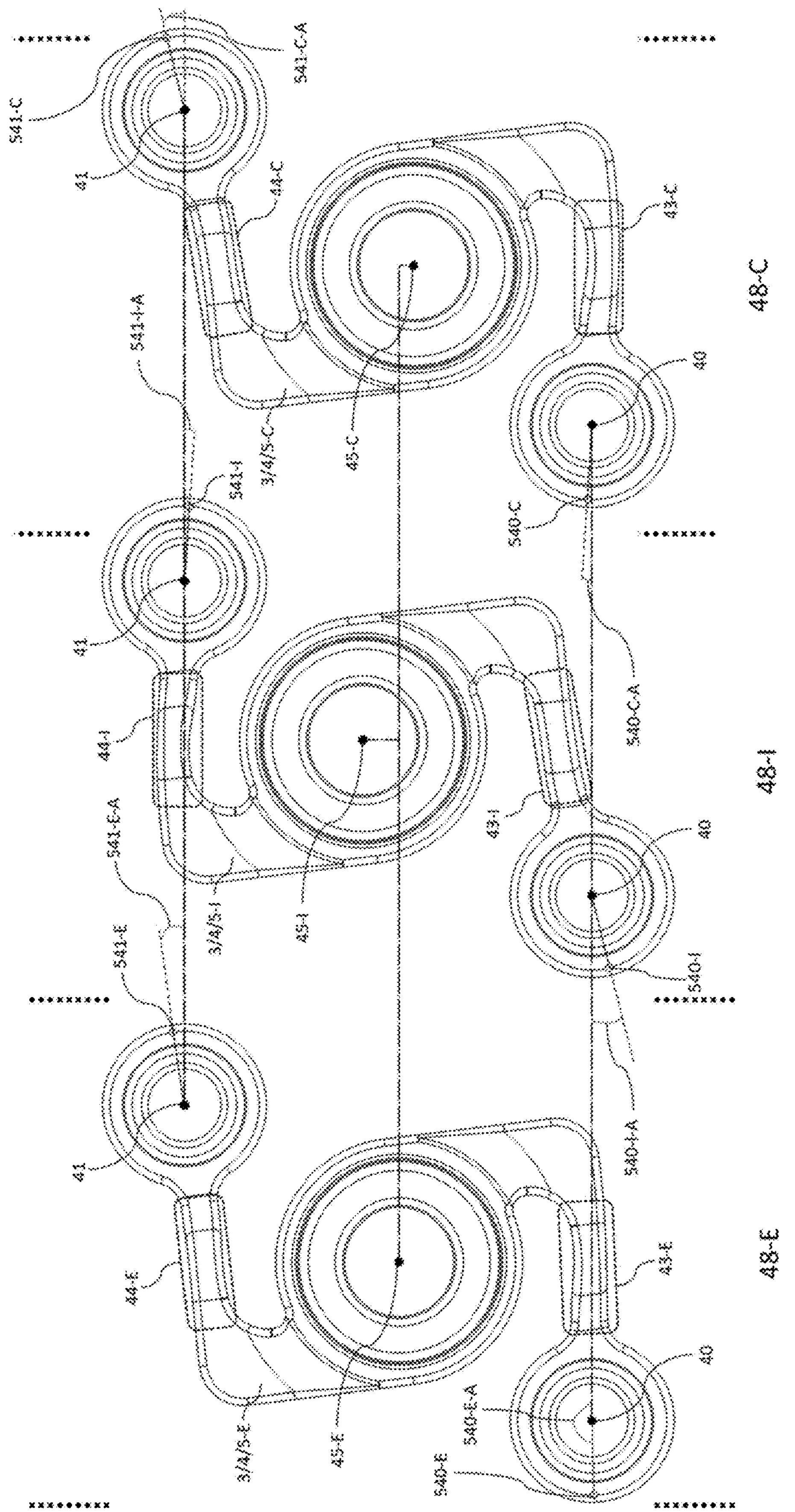
FIG. 1.59

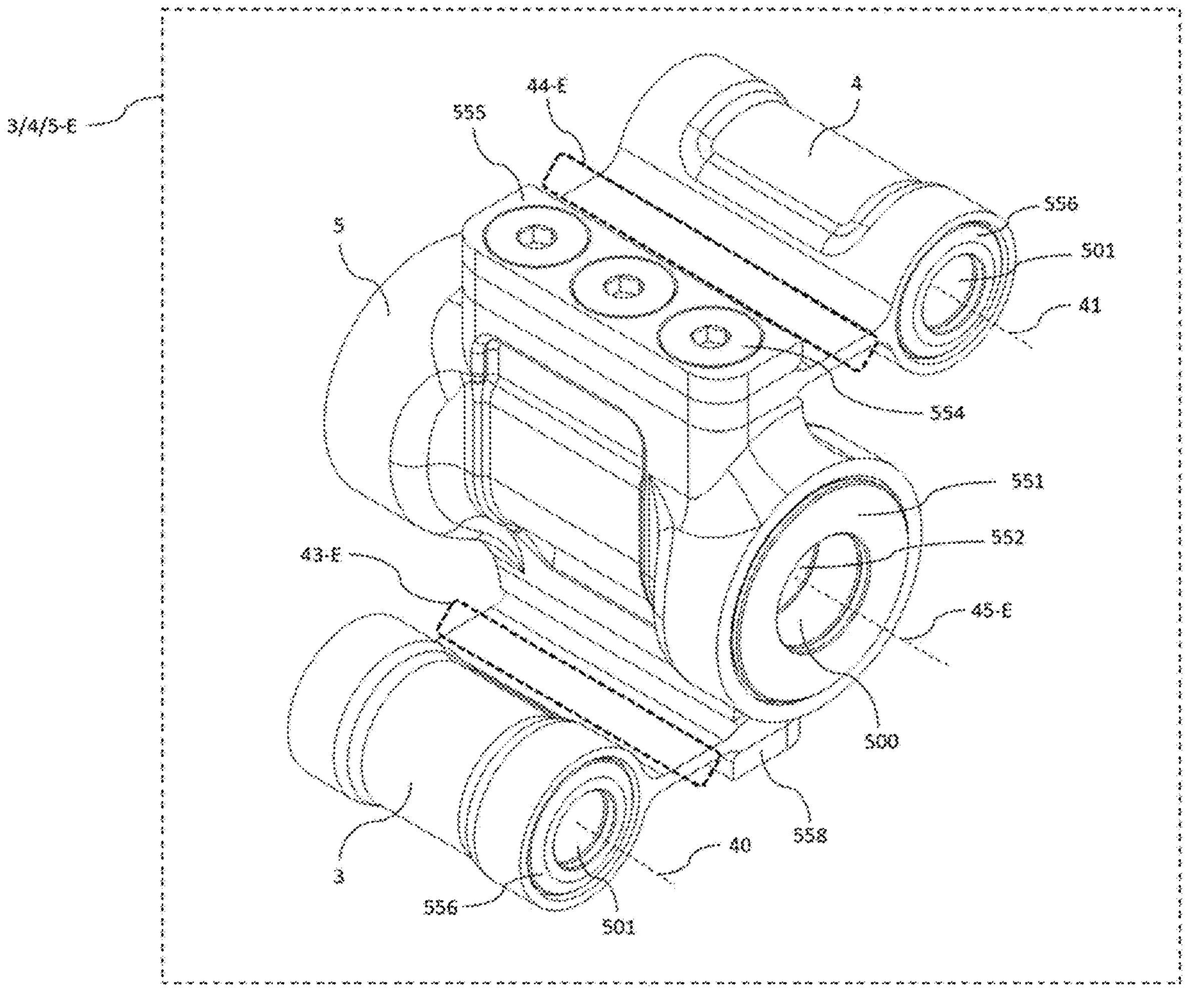
FIG. 1.60

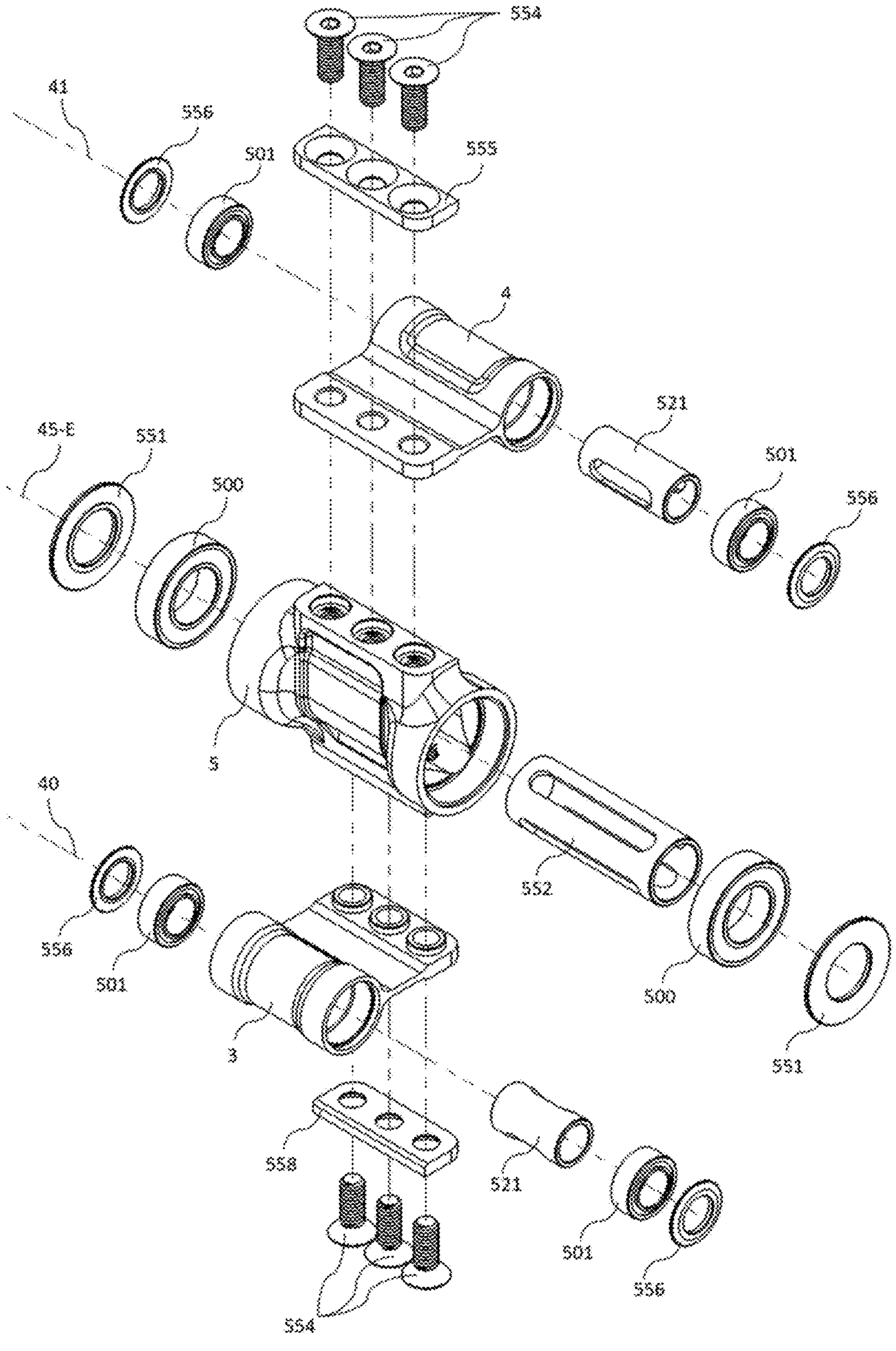
FIG. 1.61

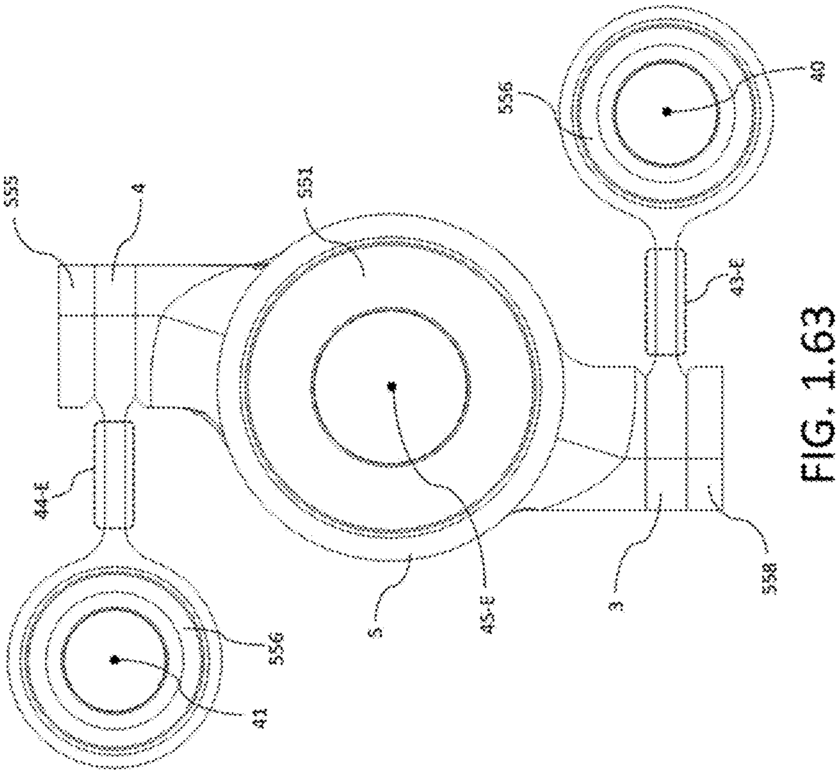
FIG. 1.63
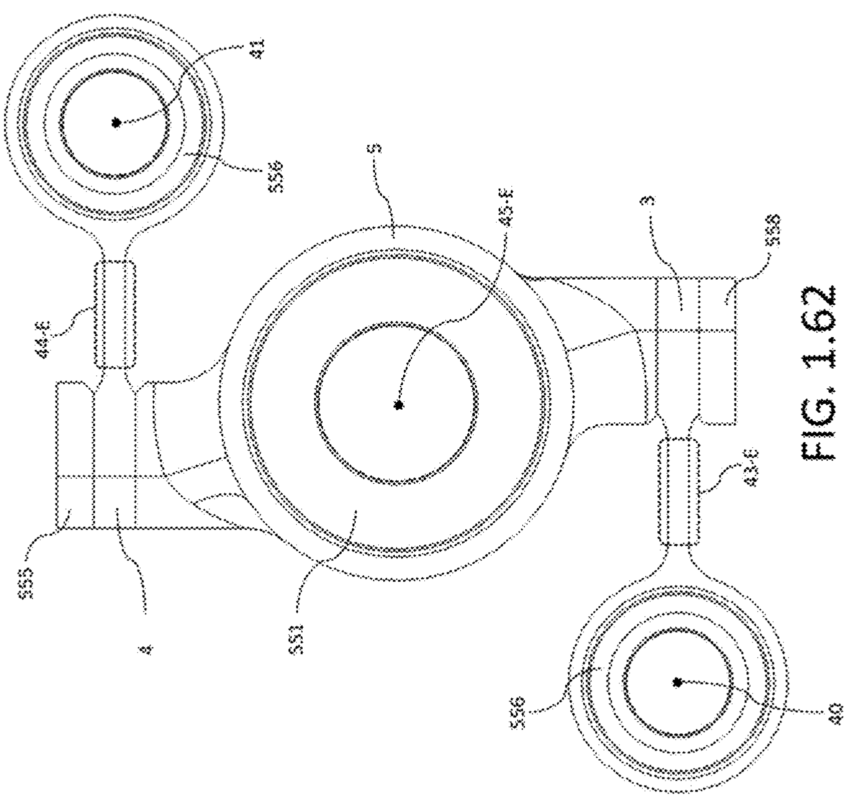
FIG. 1.62

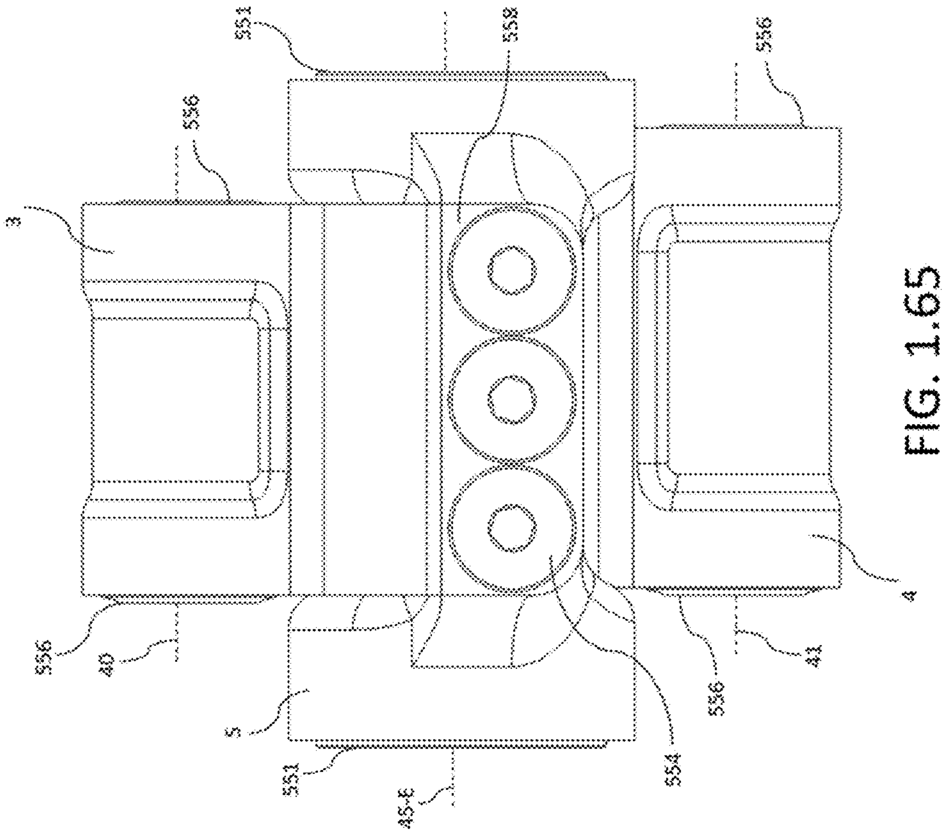
FIG. 1.65
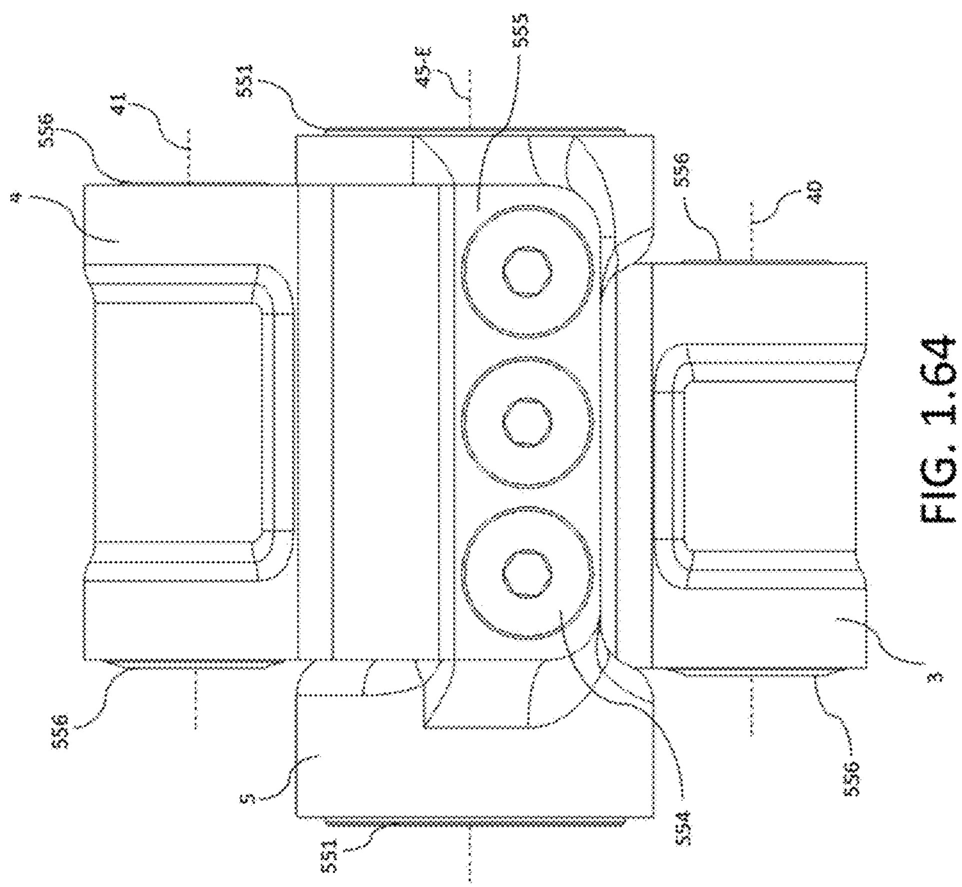
FIG. 1.64

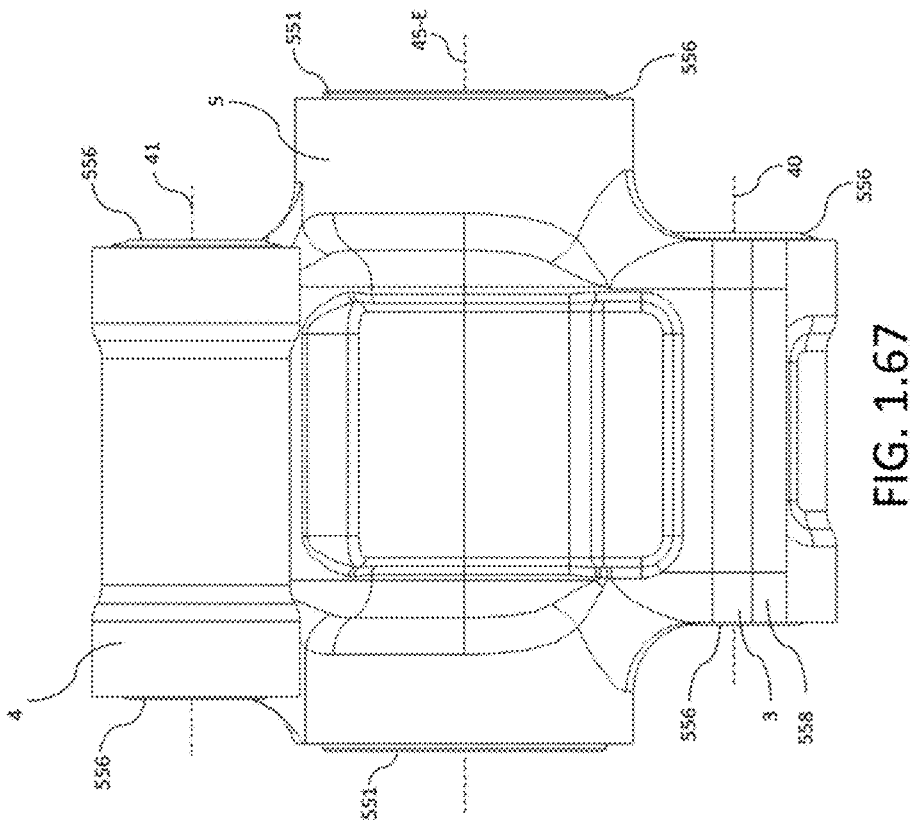
FIG. 1.67
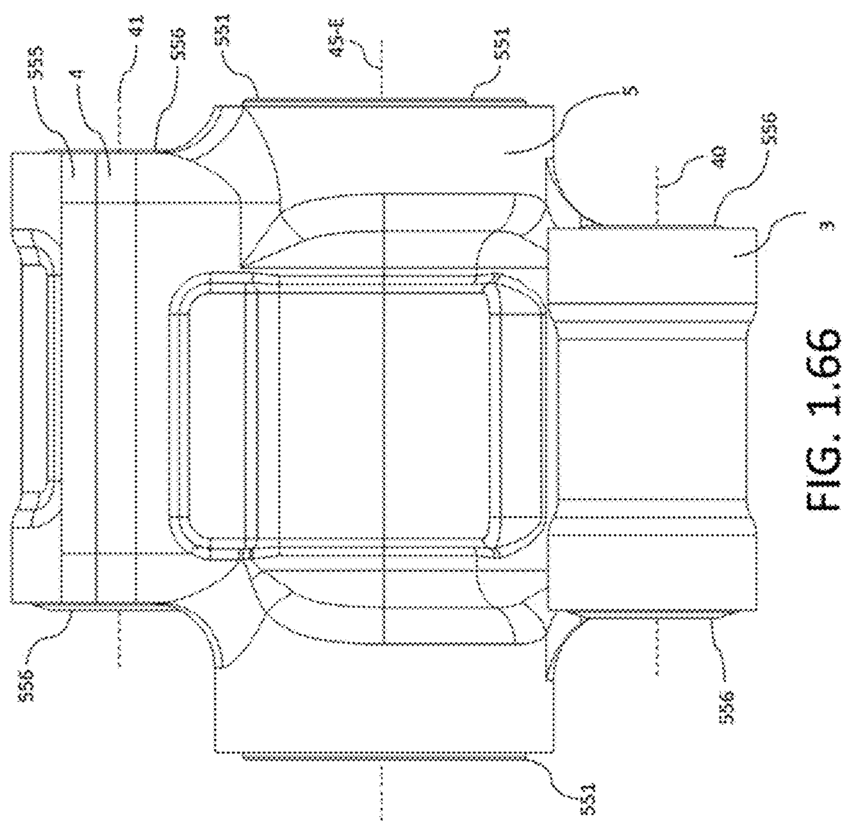
FIG. 1.66

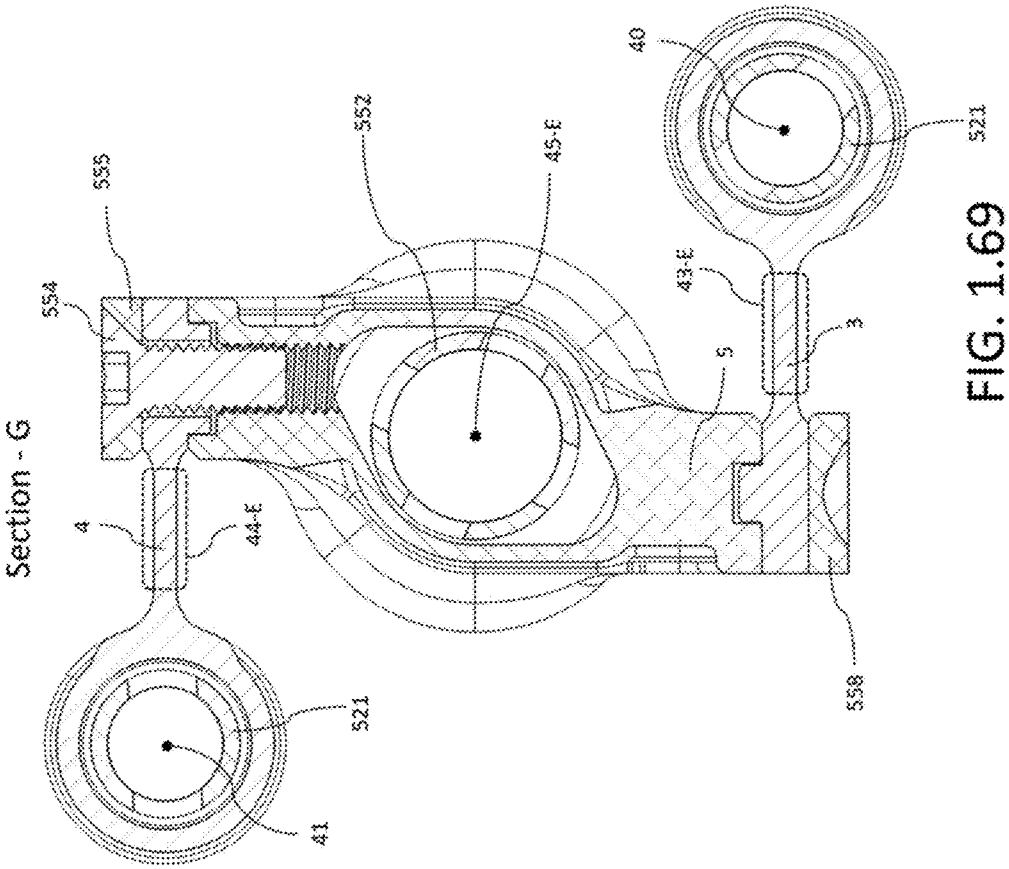
FIG. 1.69
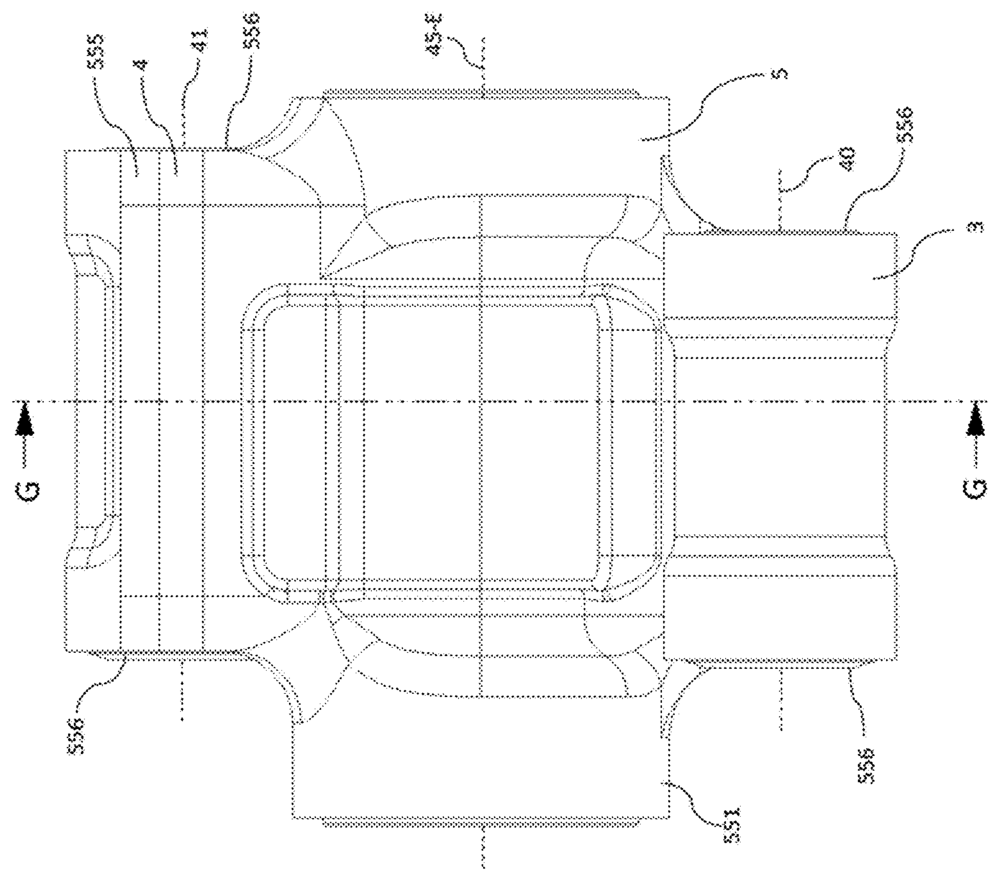
FIG. 1.68

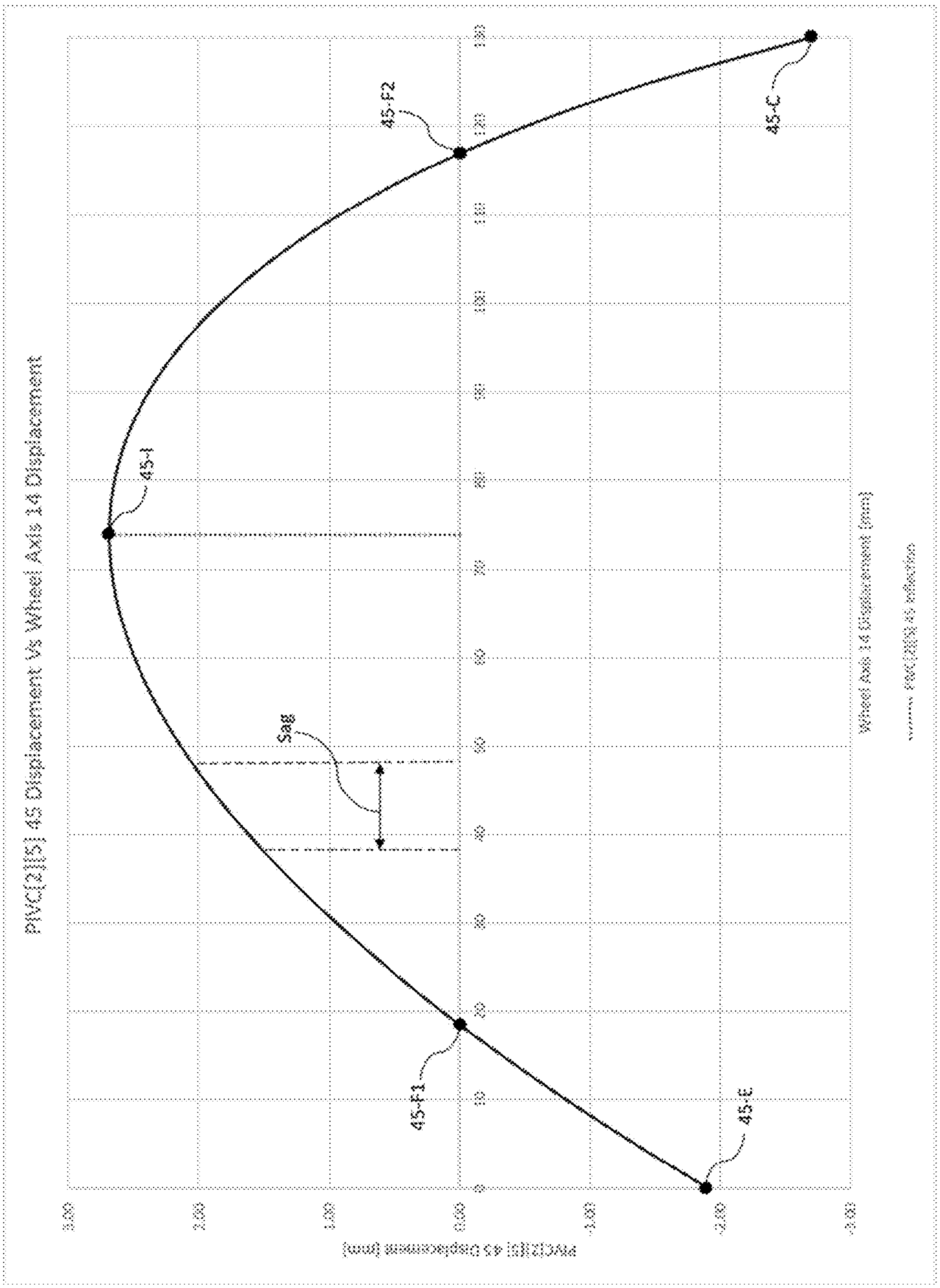
FIG. 1.70

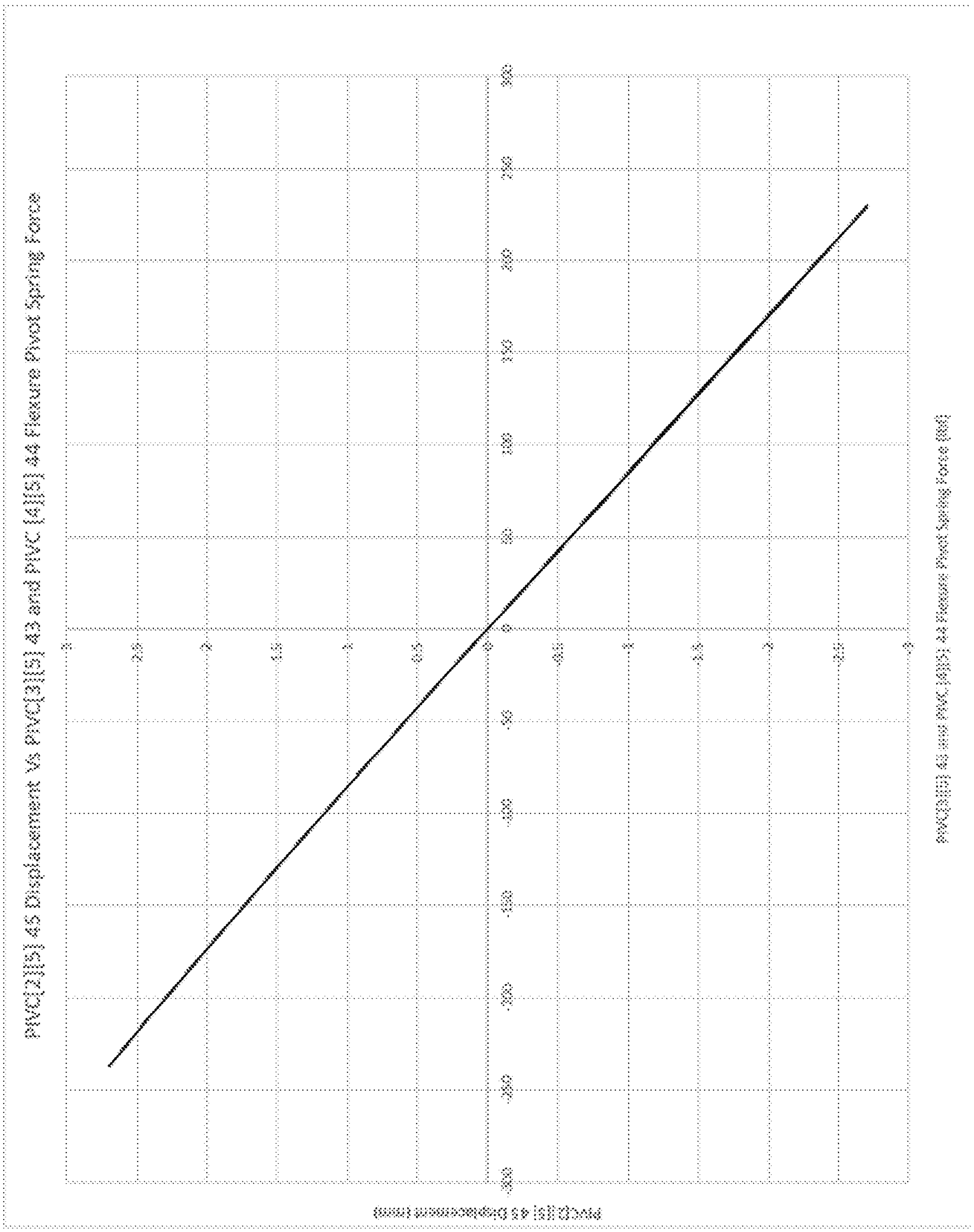
FIG. 1.71

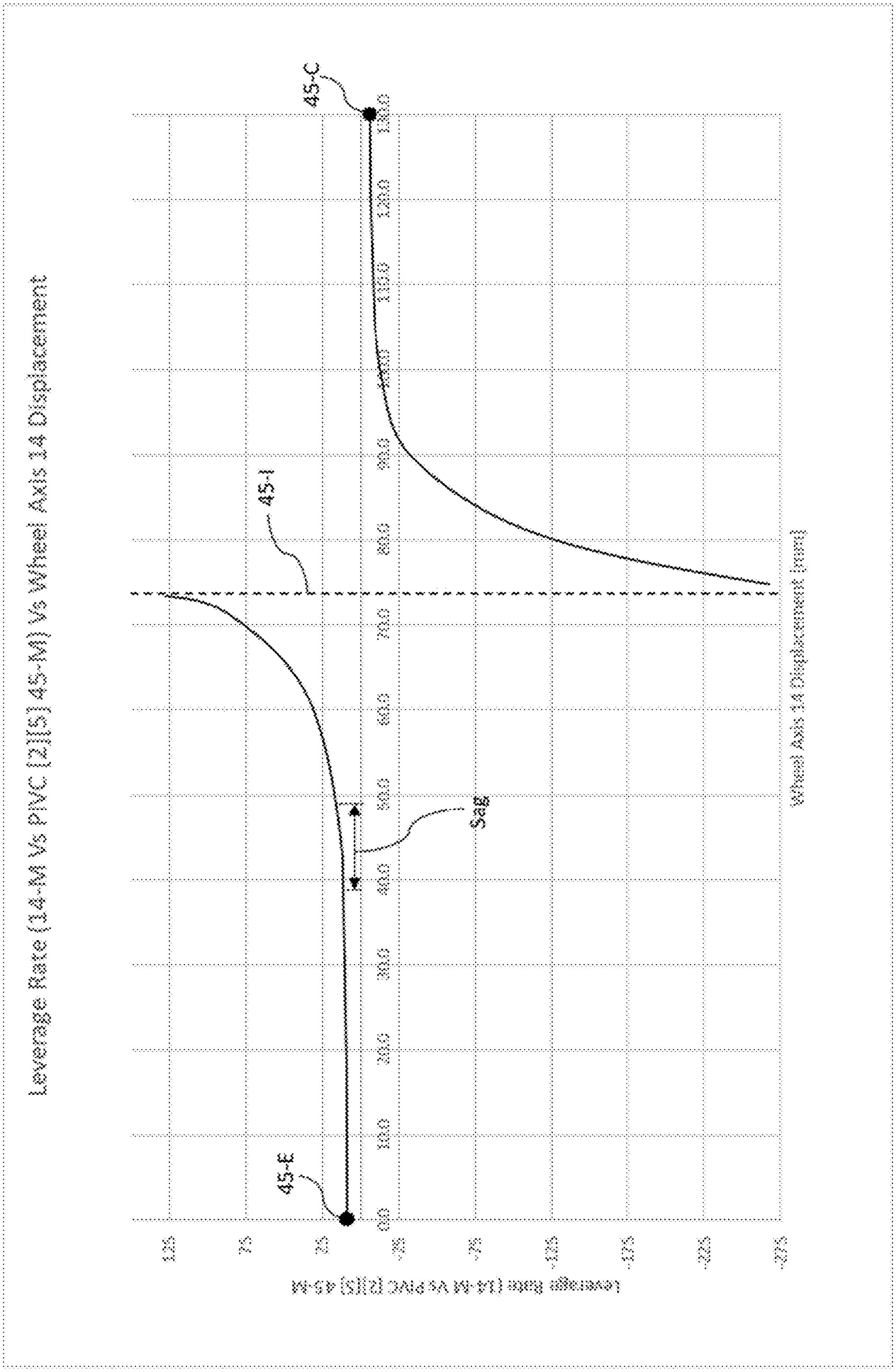
FIG. 1.72

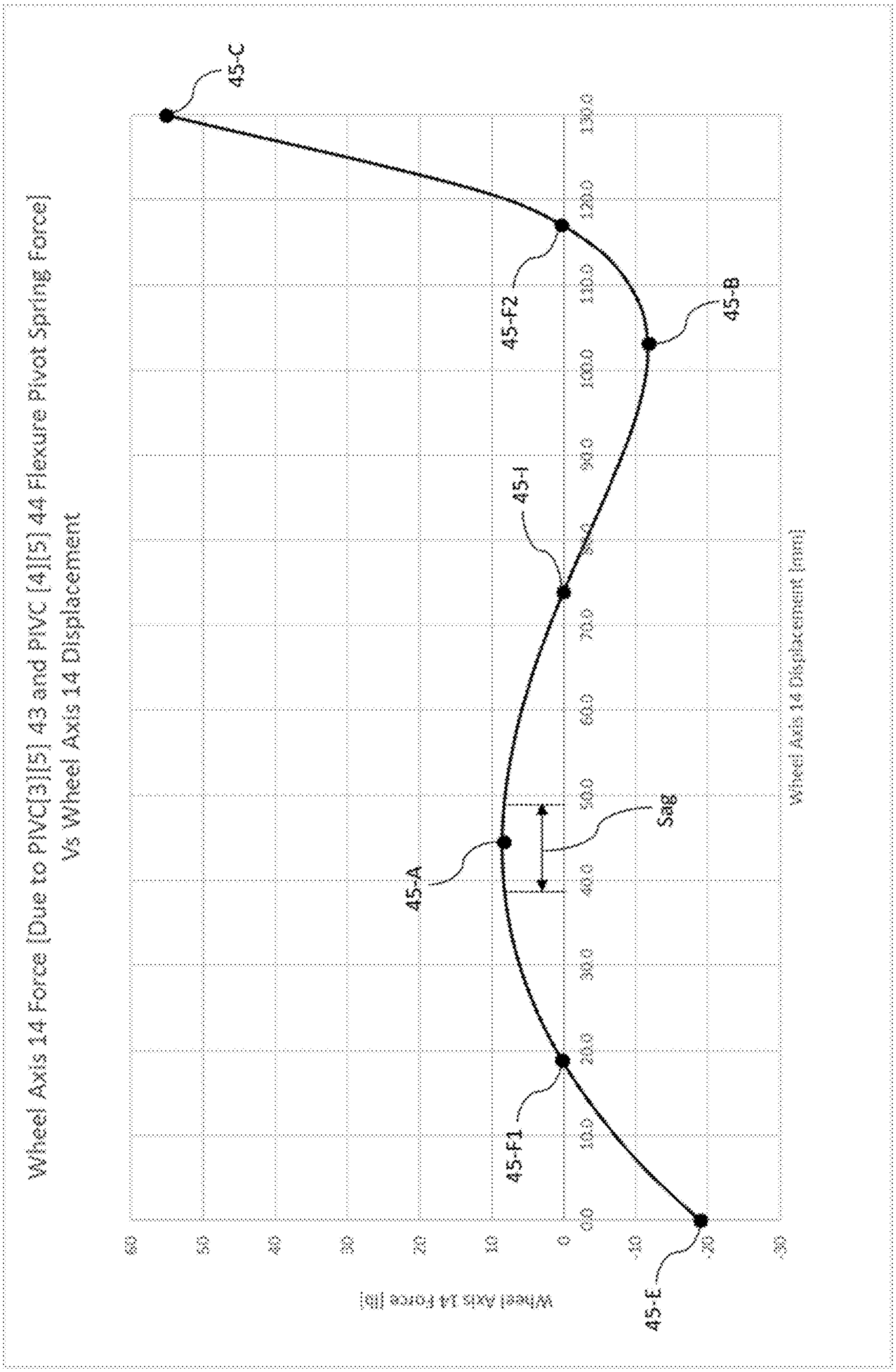
FIG. 1.73

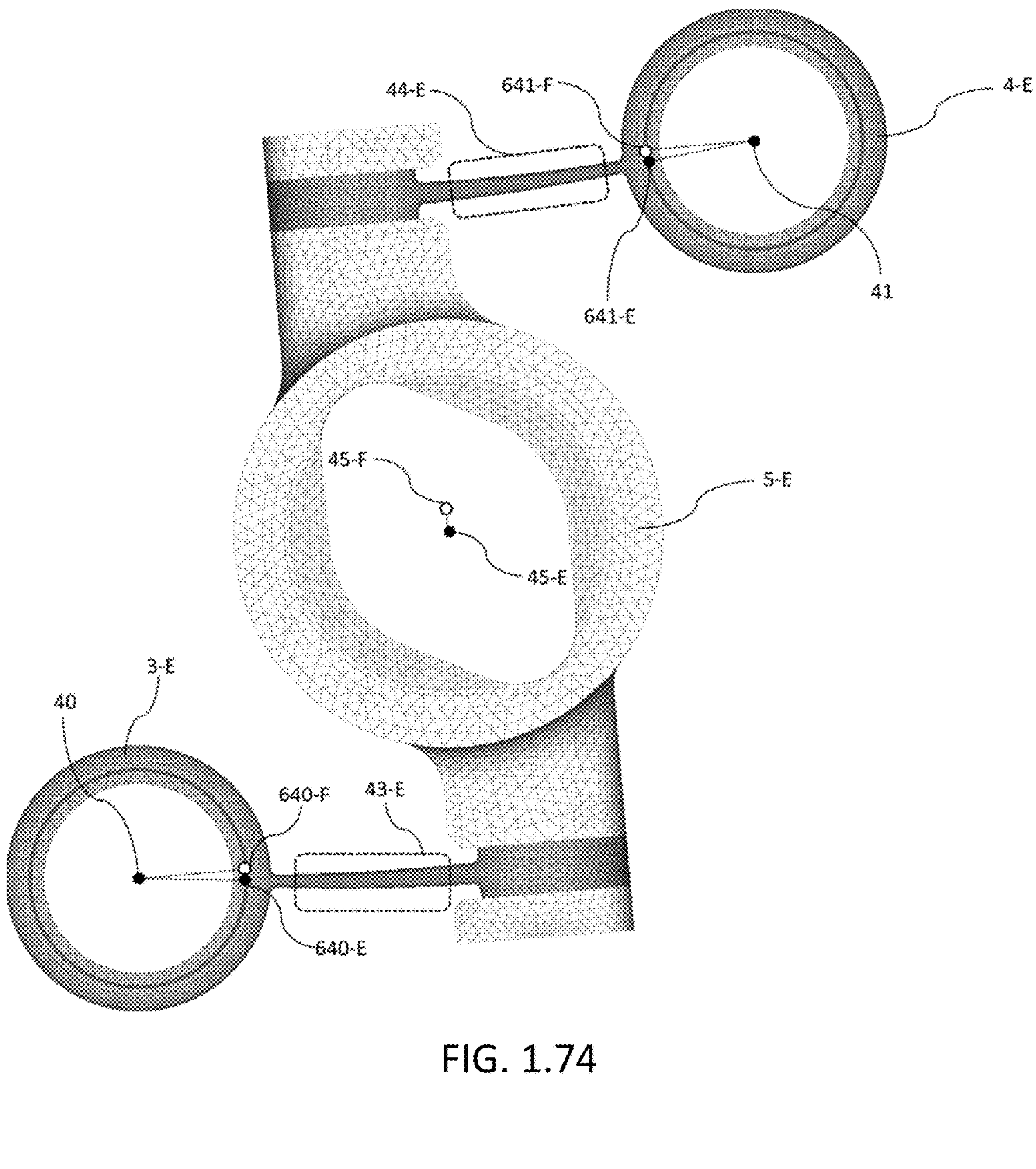
FIG. 1.74

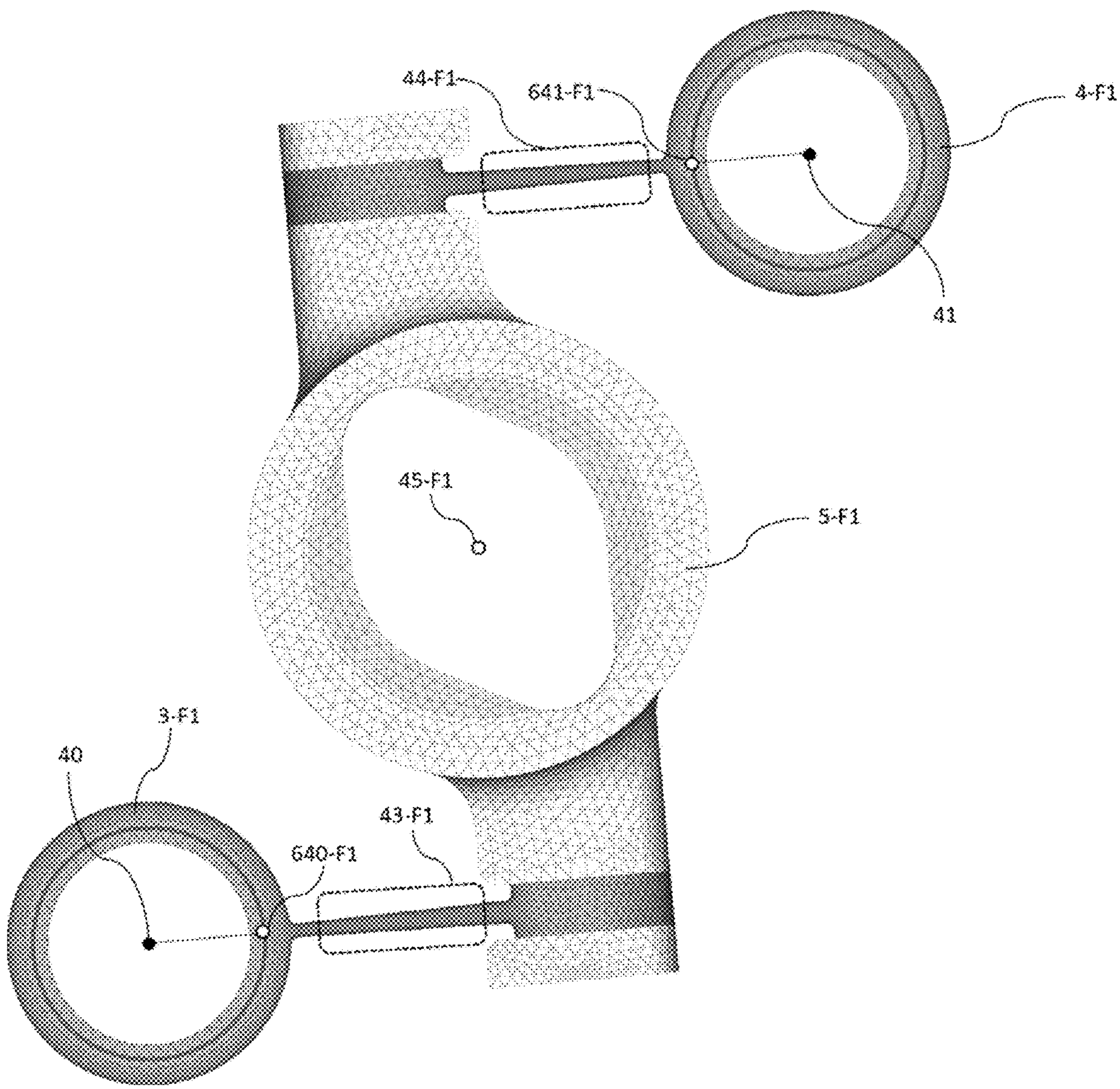
FIG. 1.75

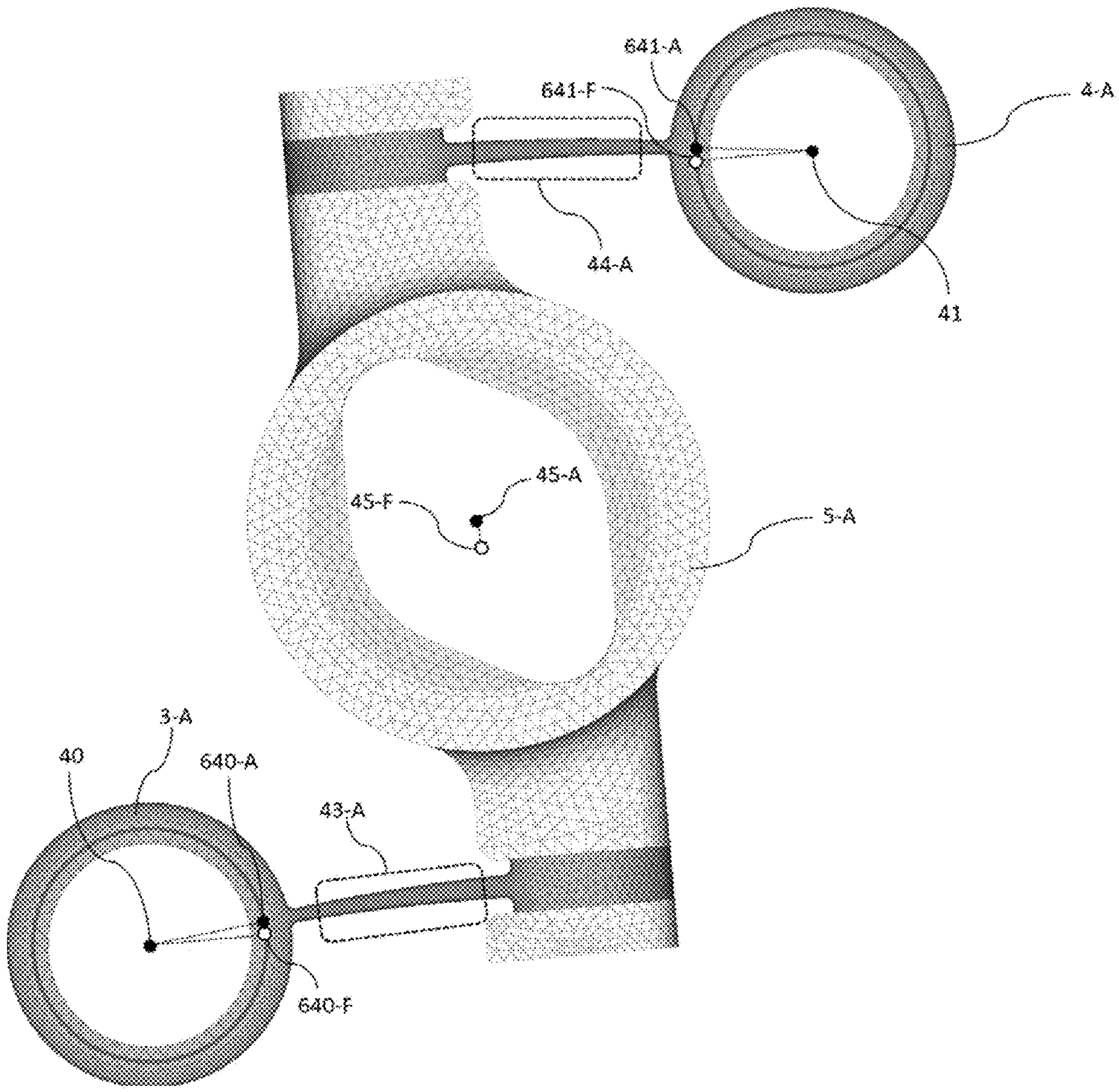
FIG. 1.76

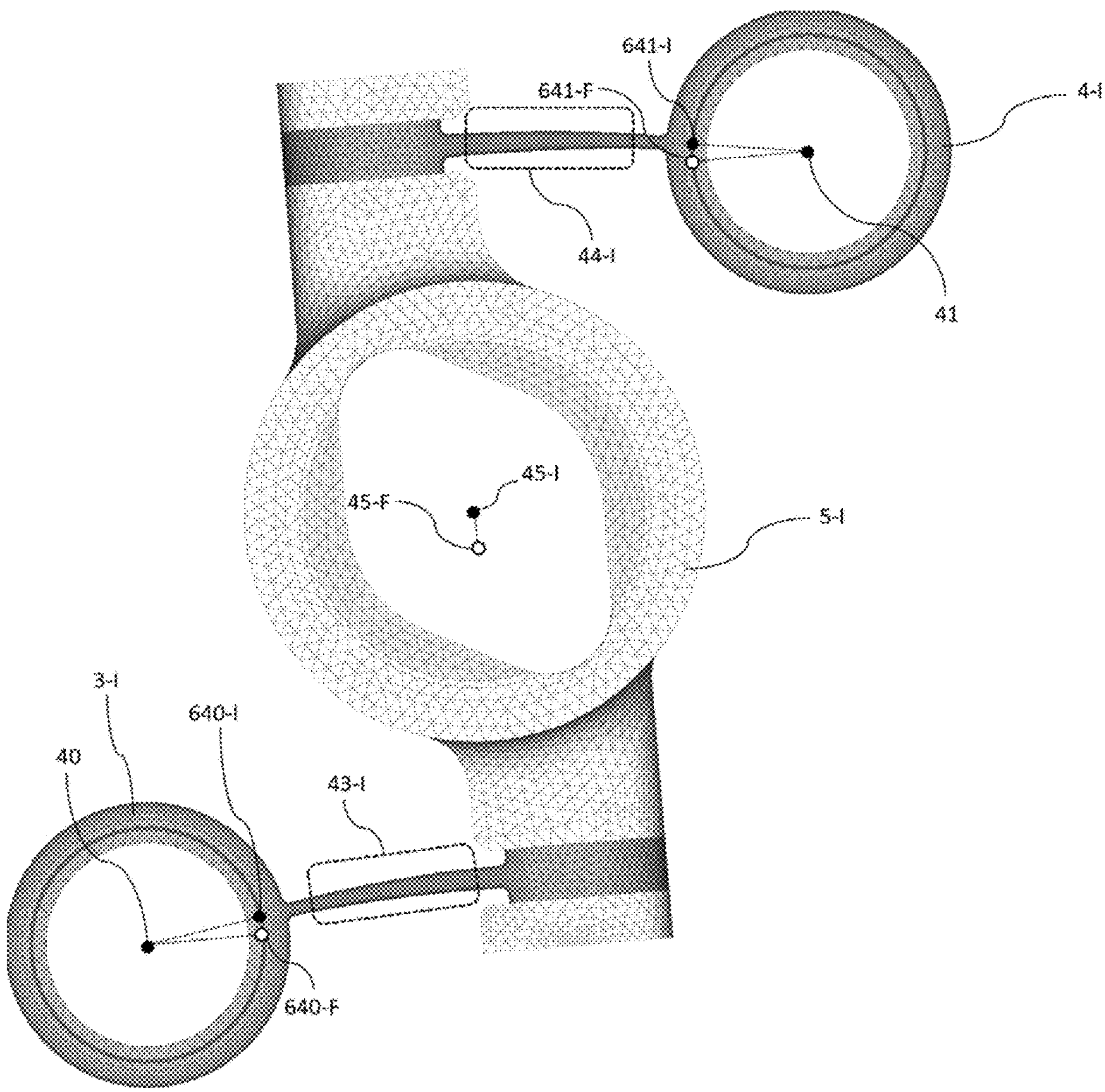
FIG. 1.77

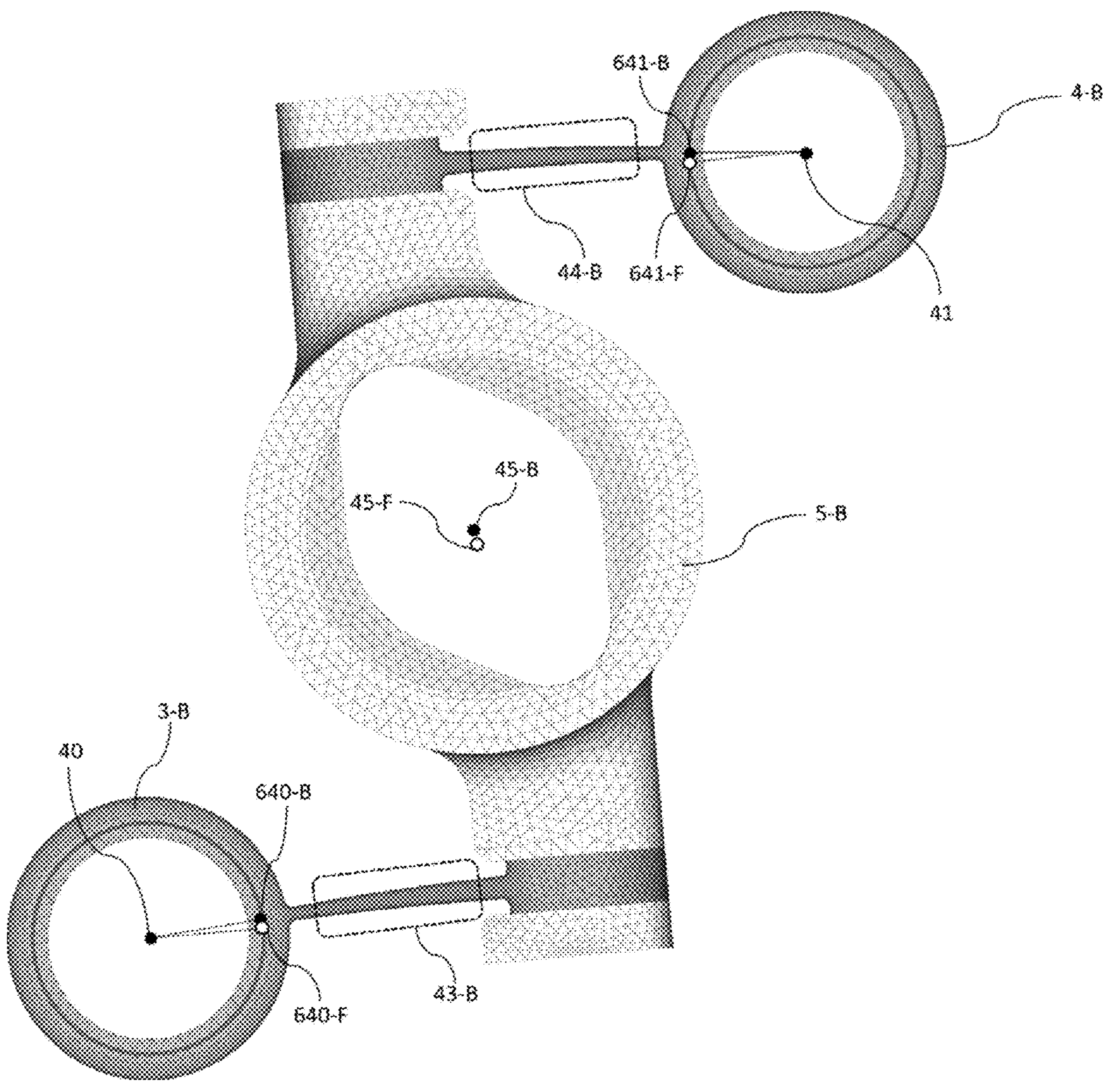
FIG. 1.78

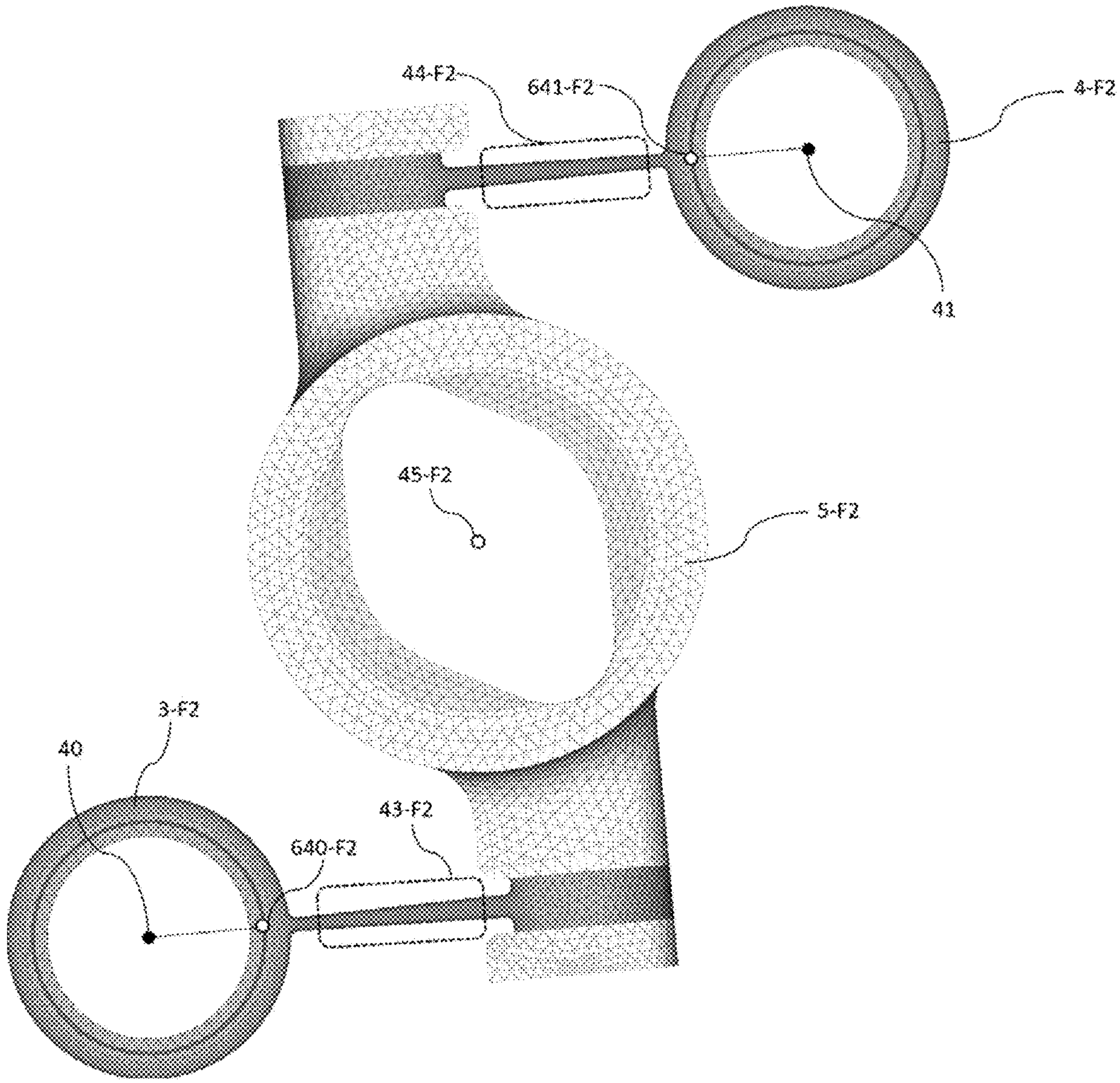
FIG. 1.79

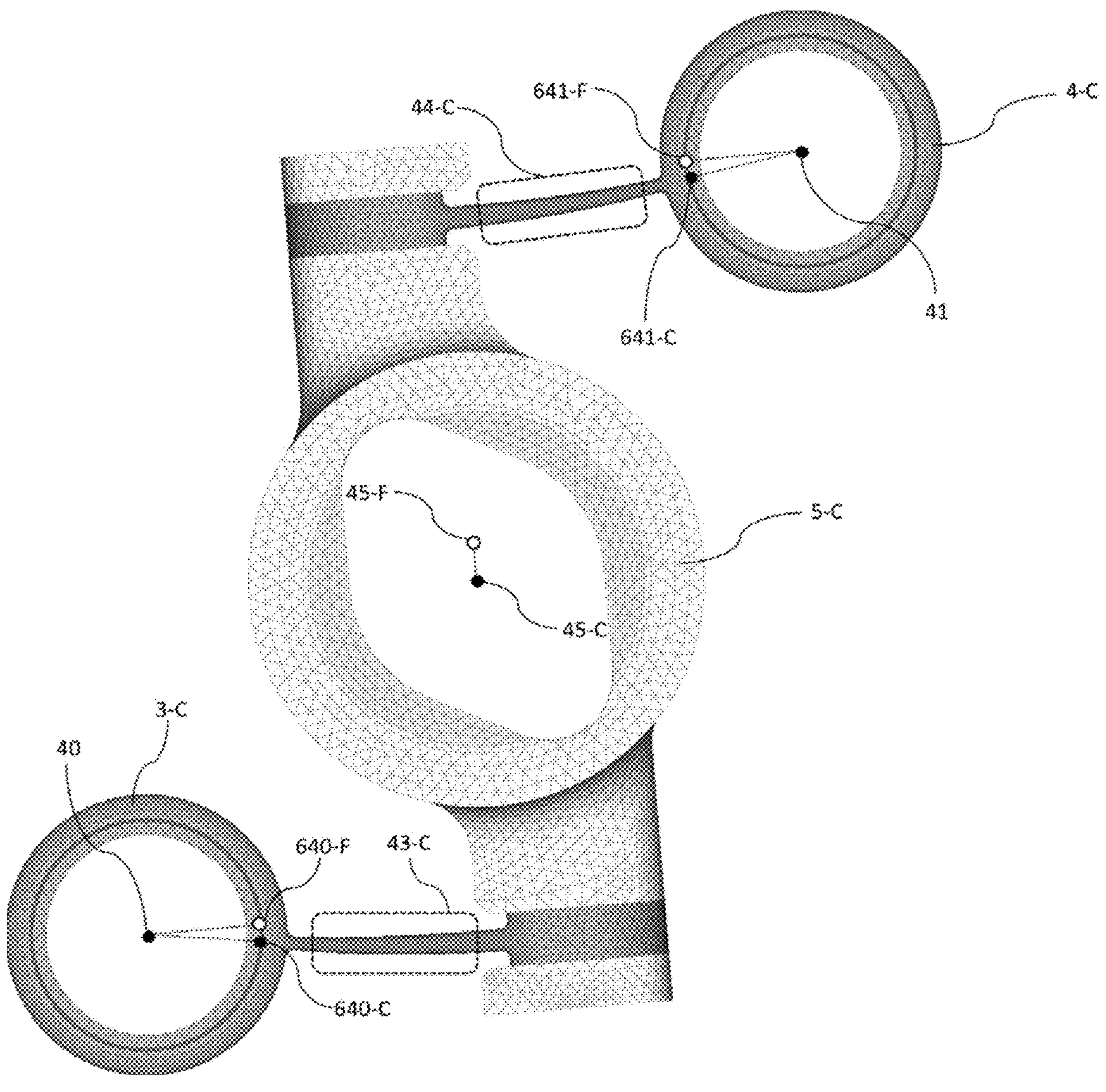
FIG. 1.80

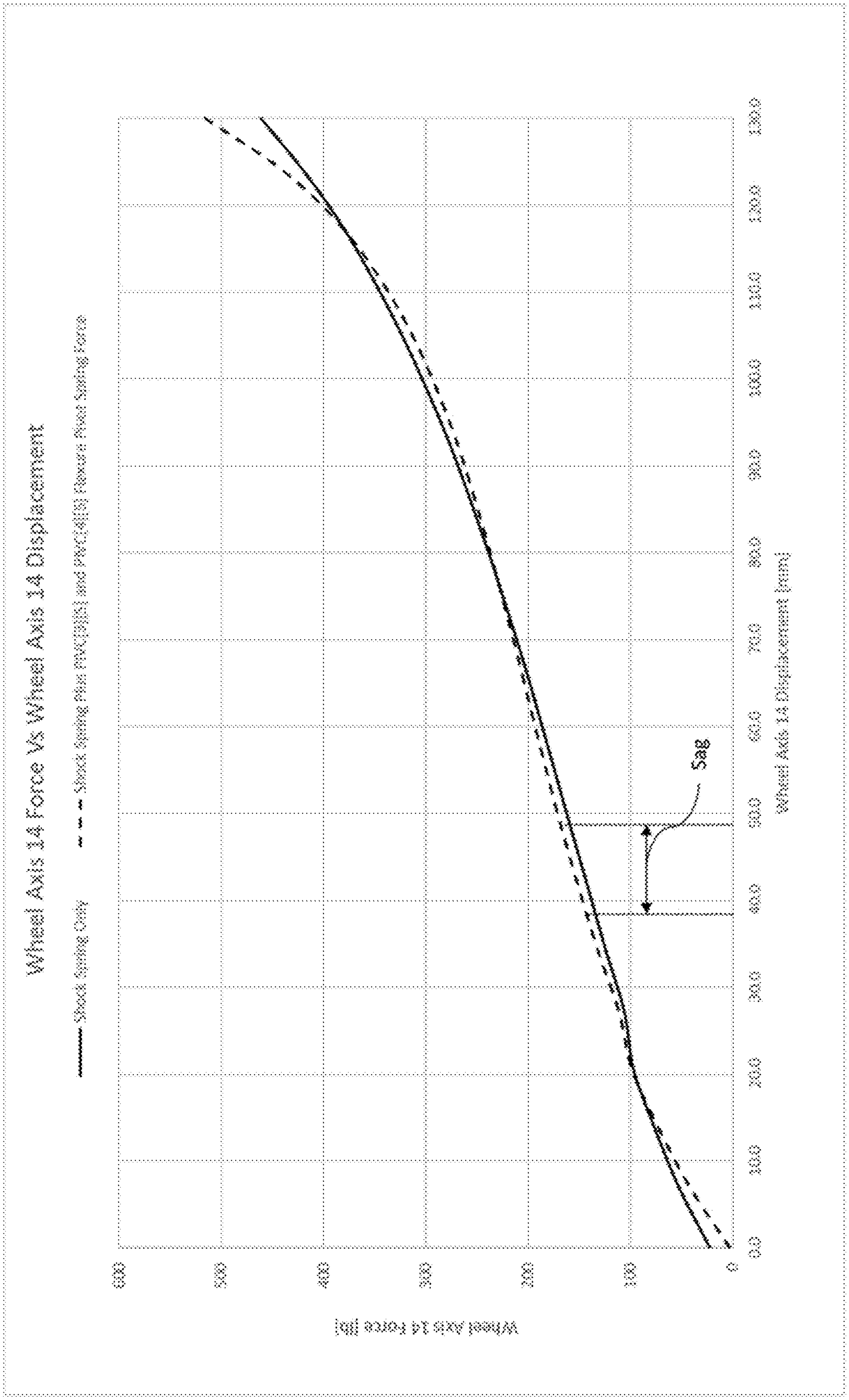
FIG. 1.81

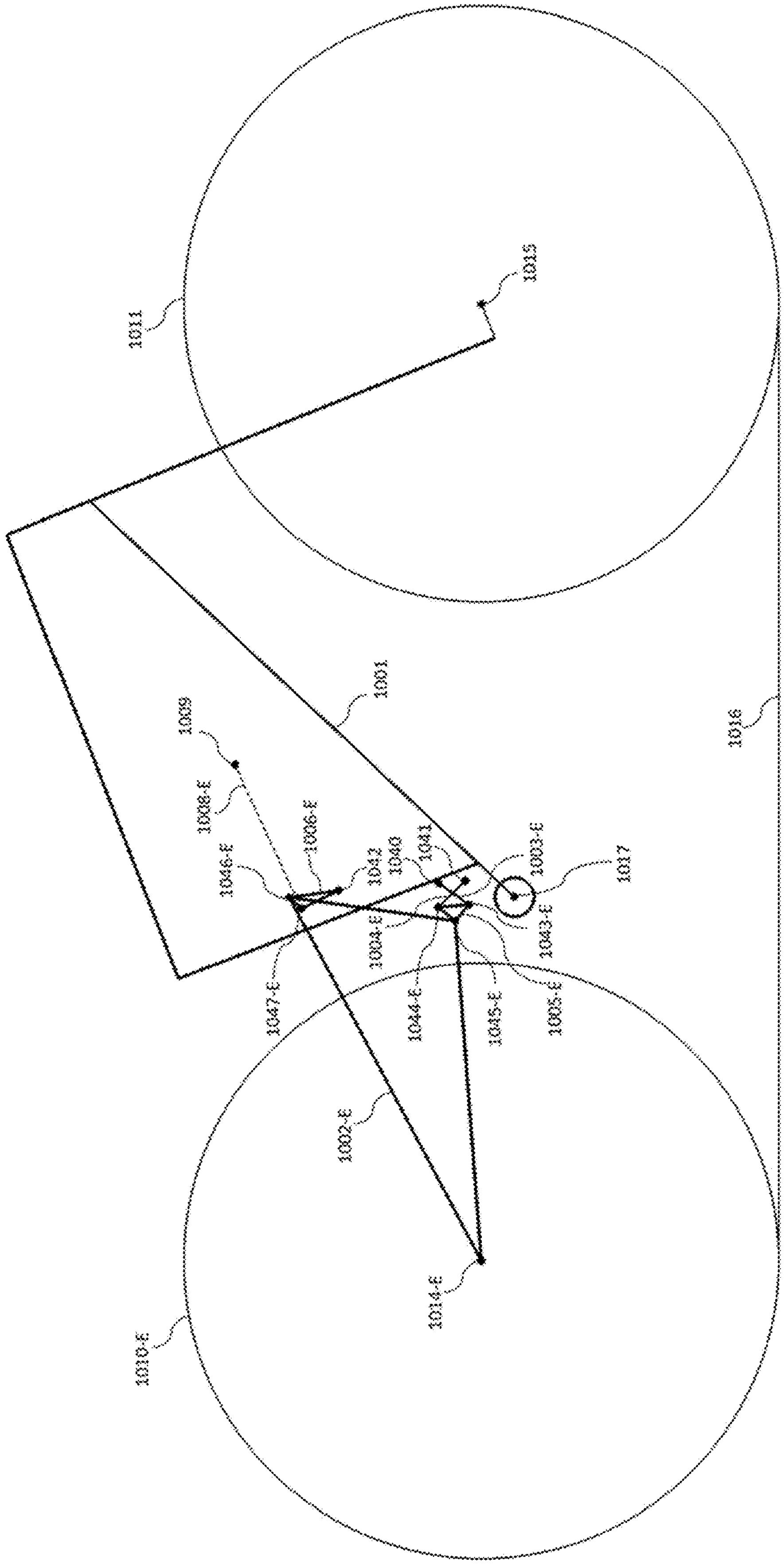
FIG. 2.1

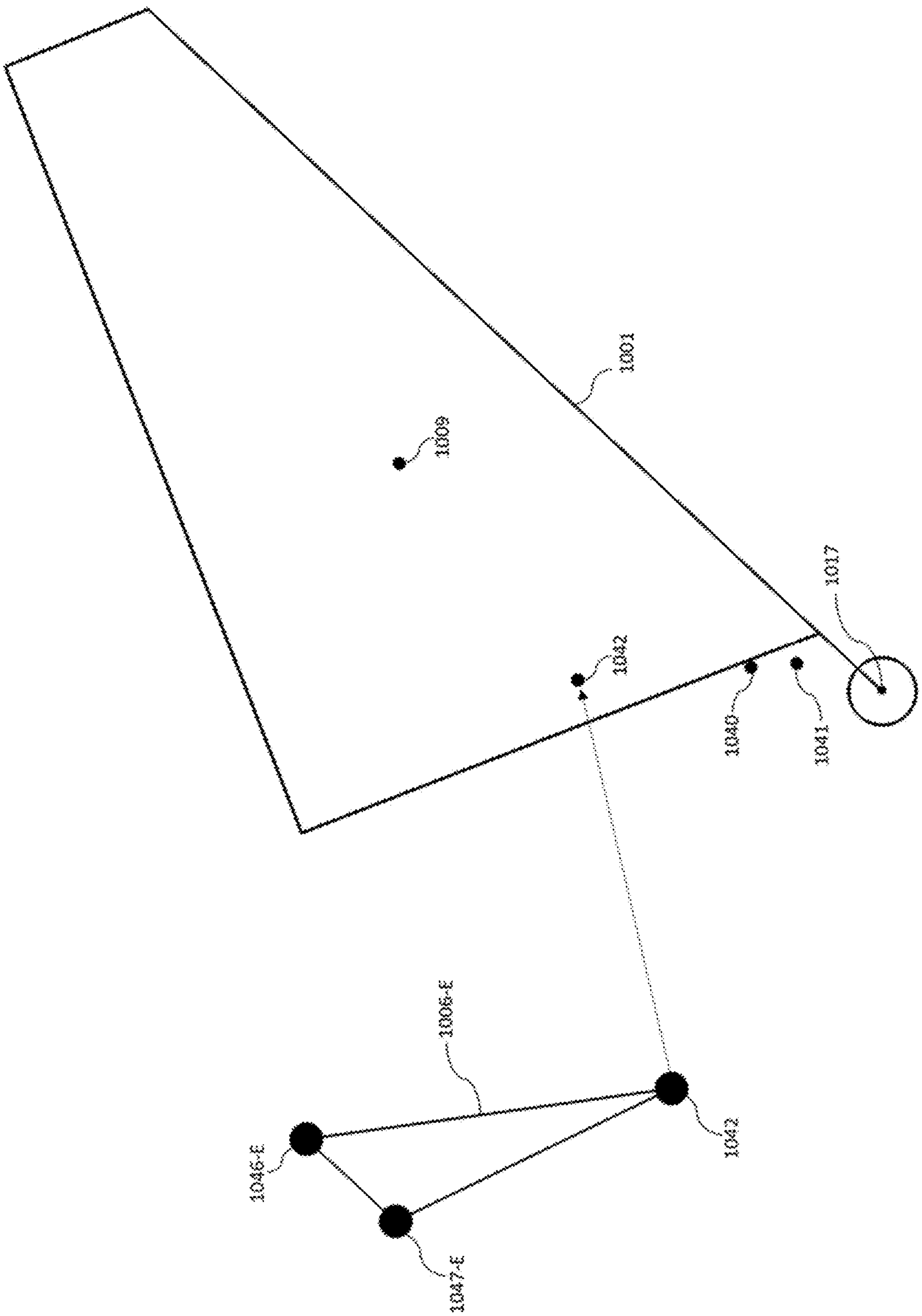
FIG. 2.2

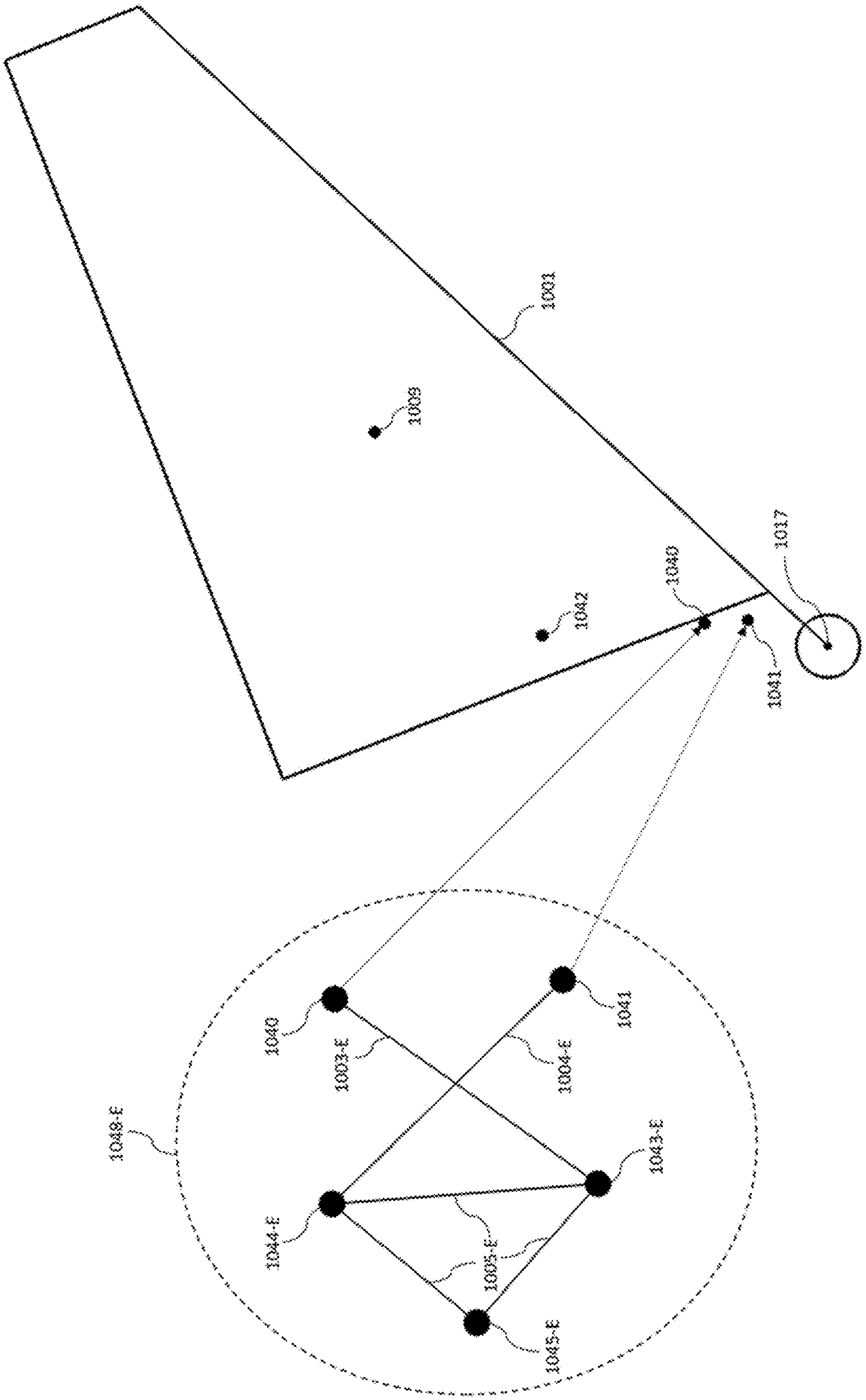
FIG. 2.3

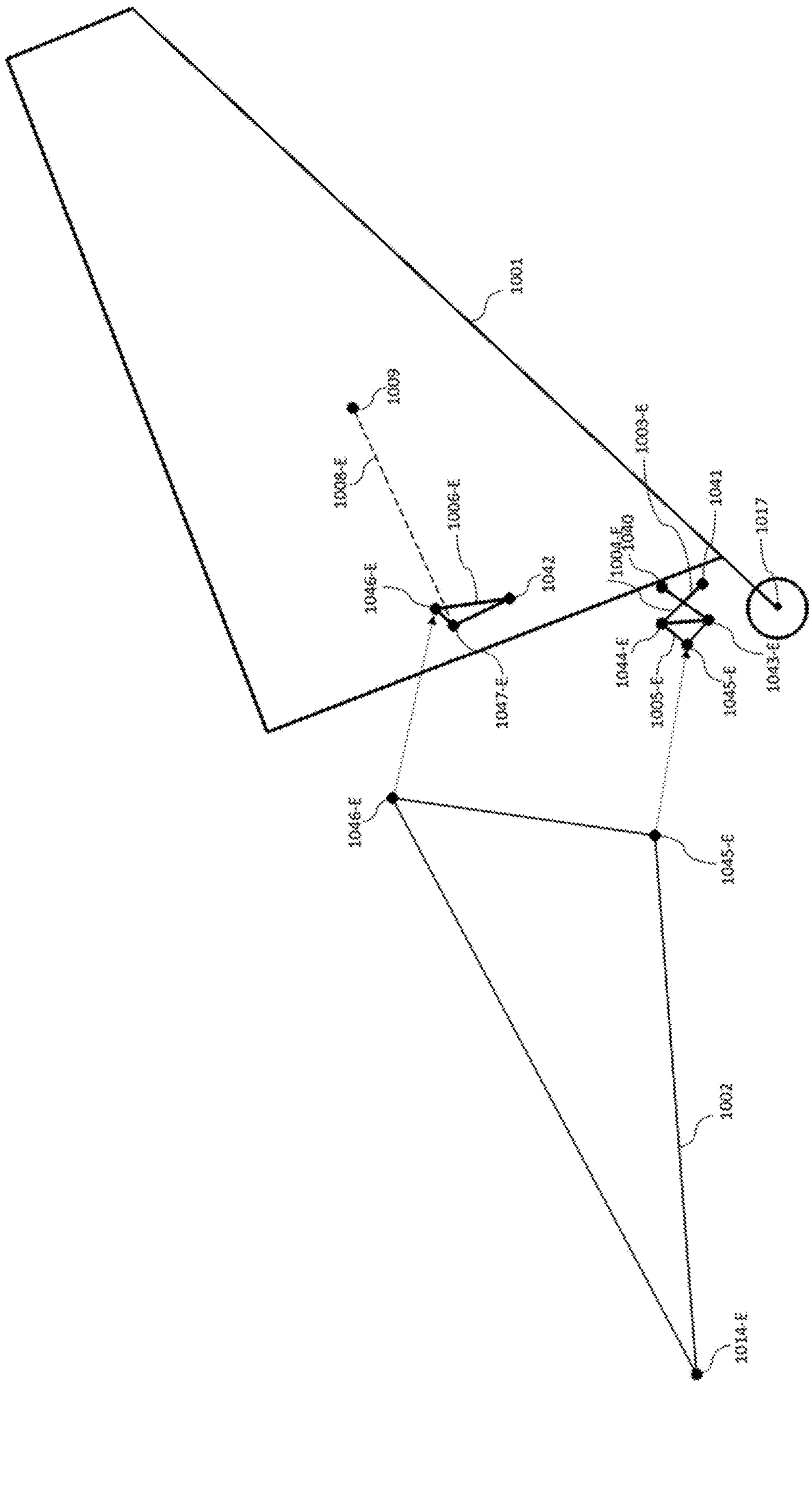
FIG. 2.4

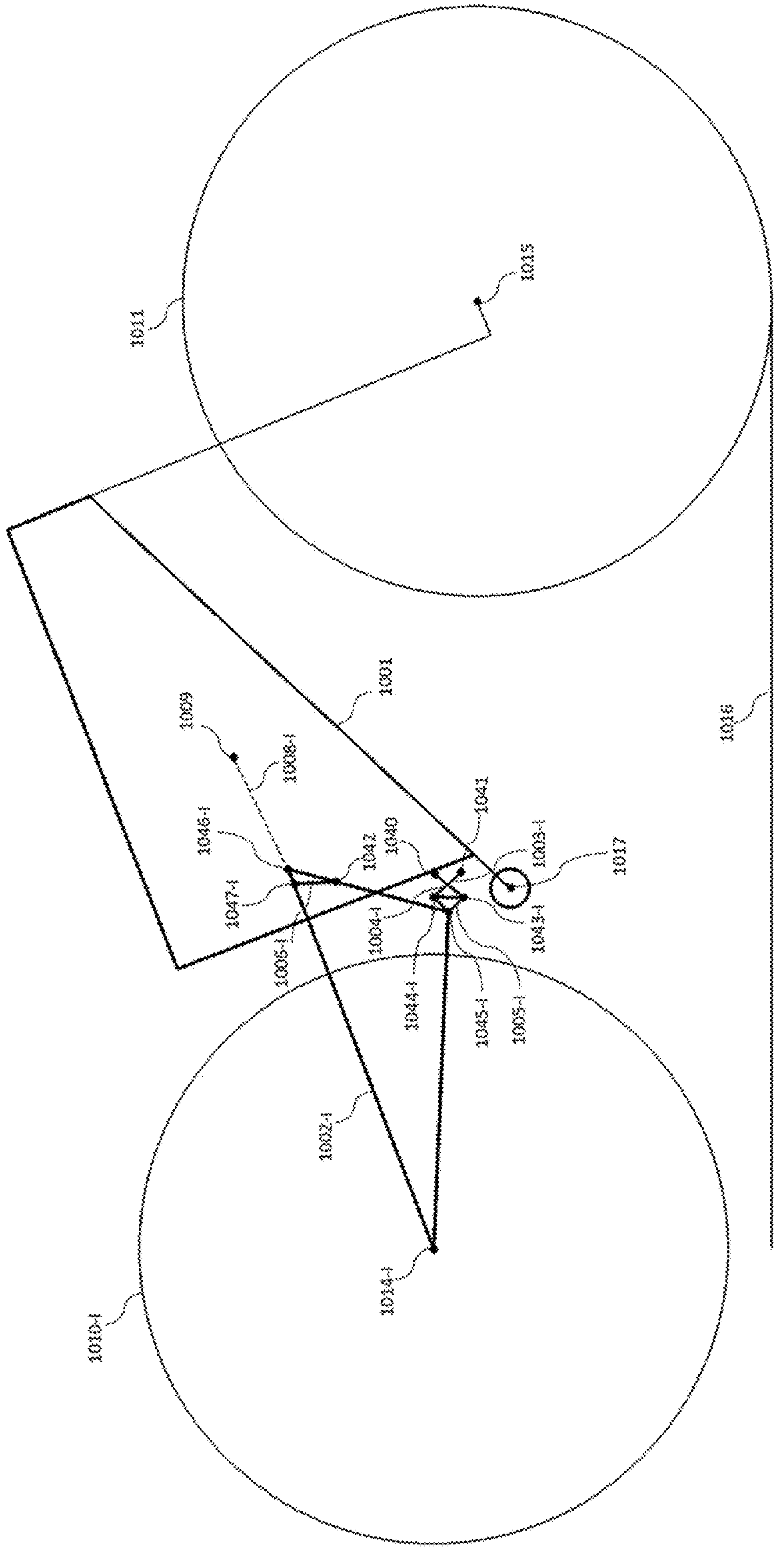
FIG. 2.5

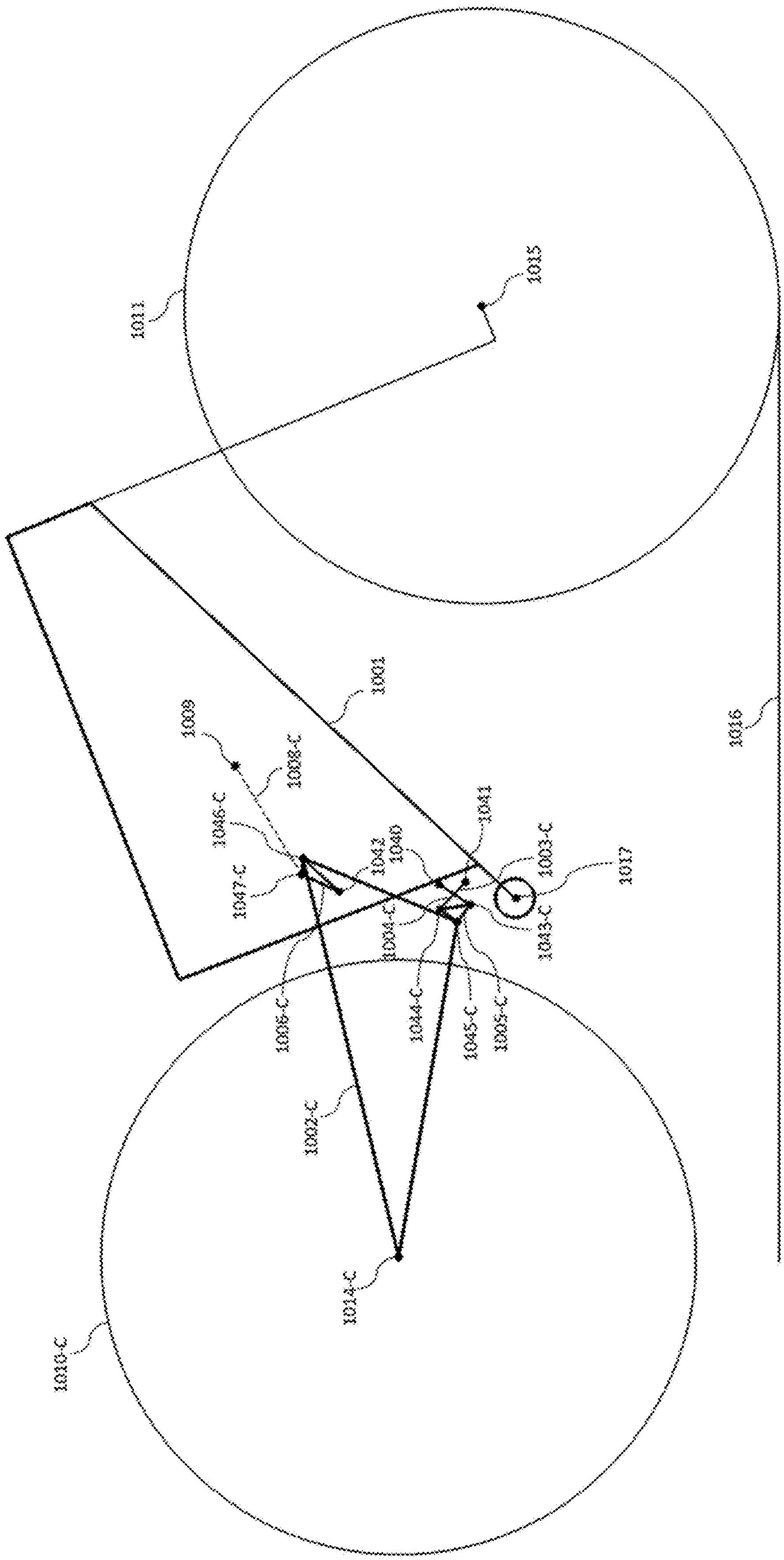
FIG. 2.6

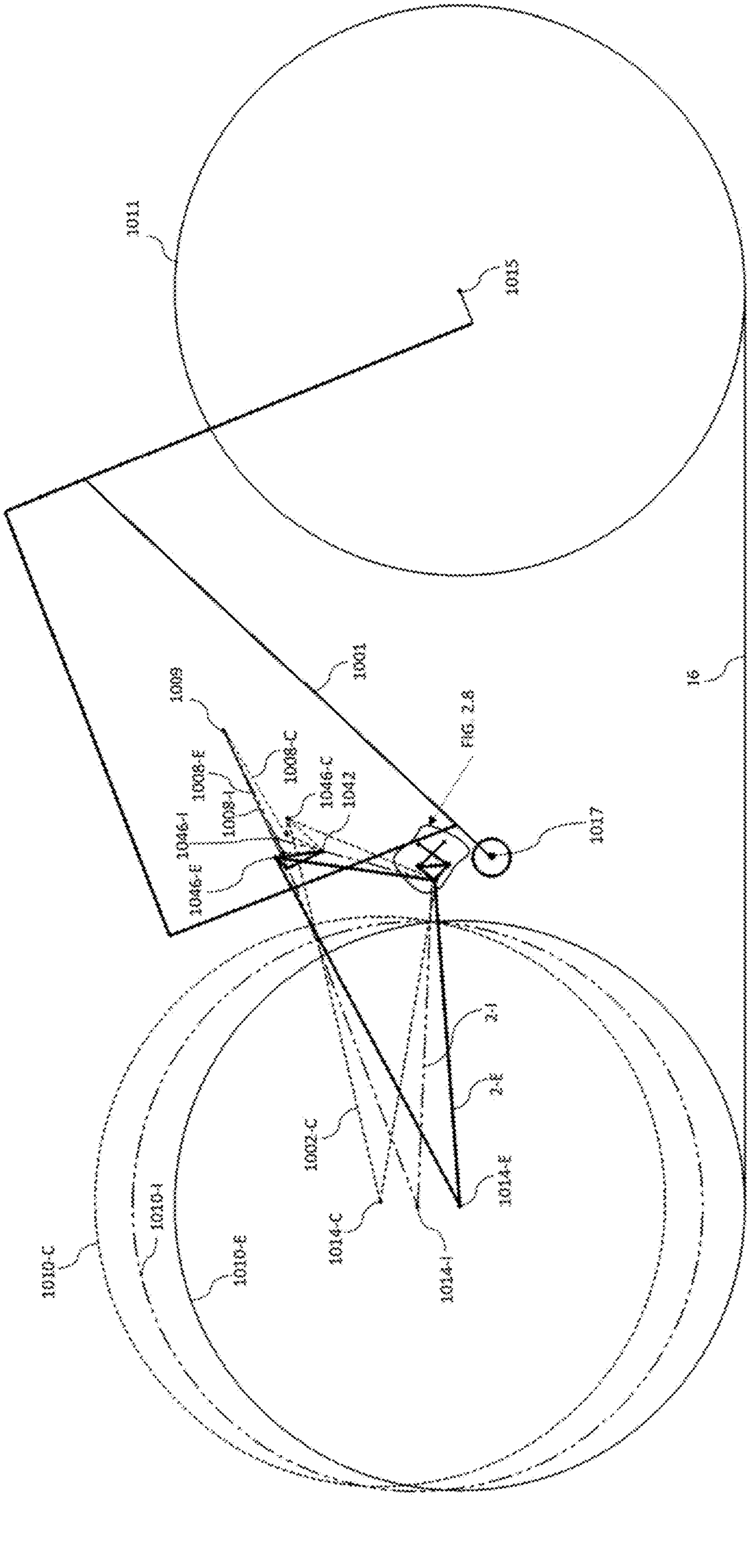
FIG. 2.7

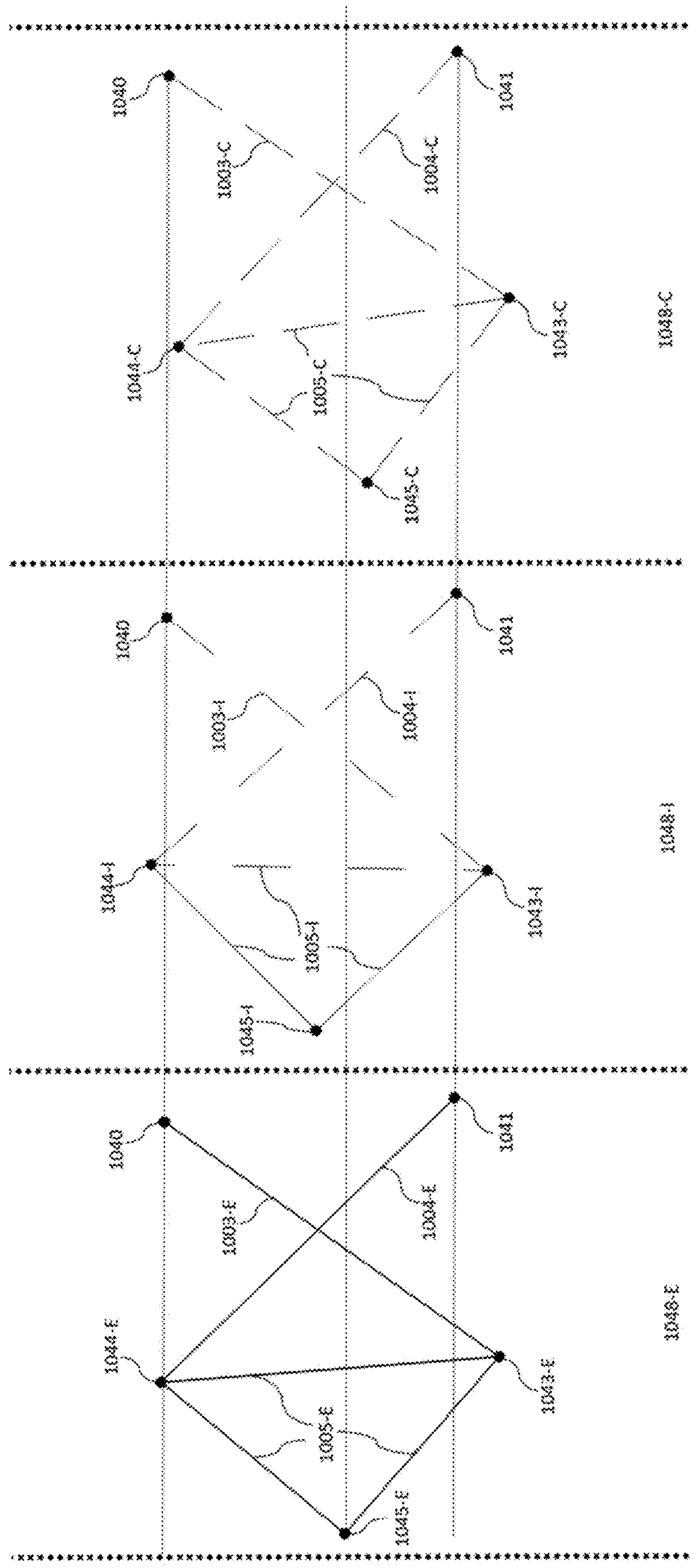
FIG. 2.8

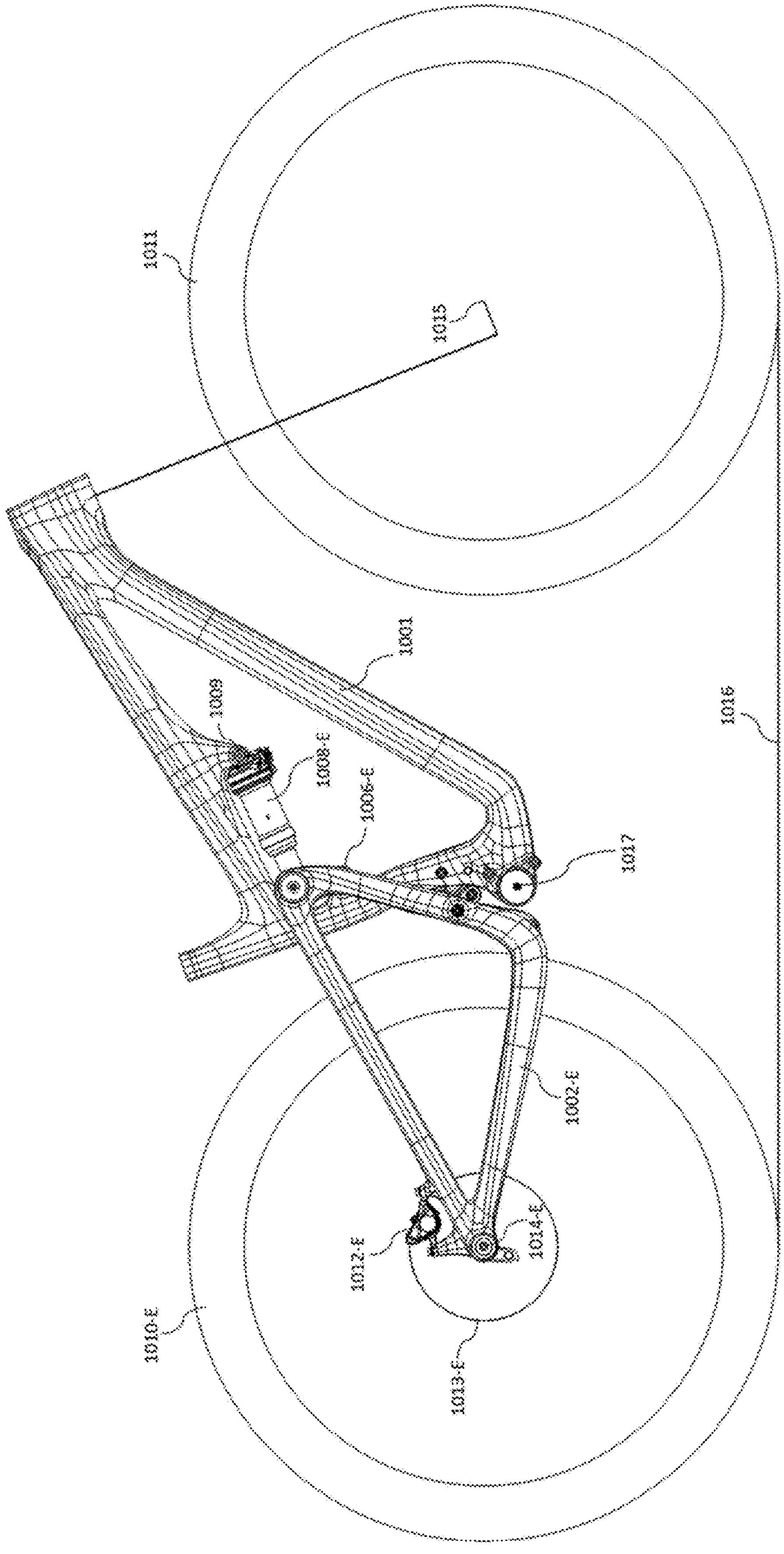
FIG. 2.9

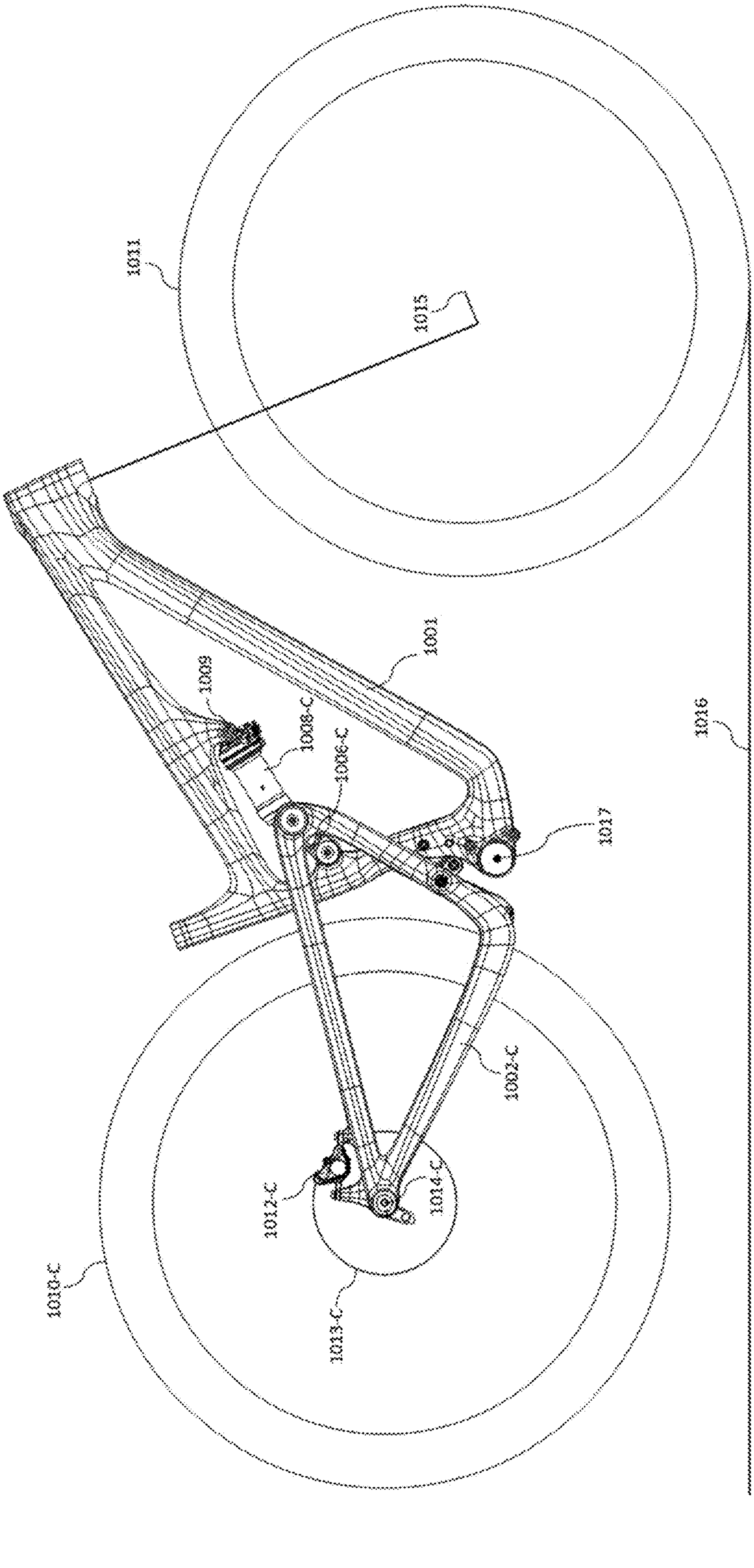
FIG. 2.10

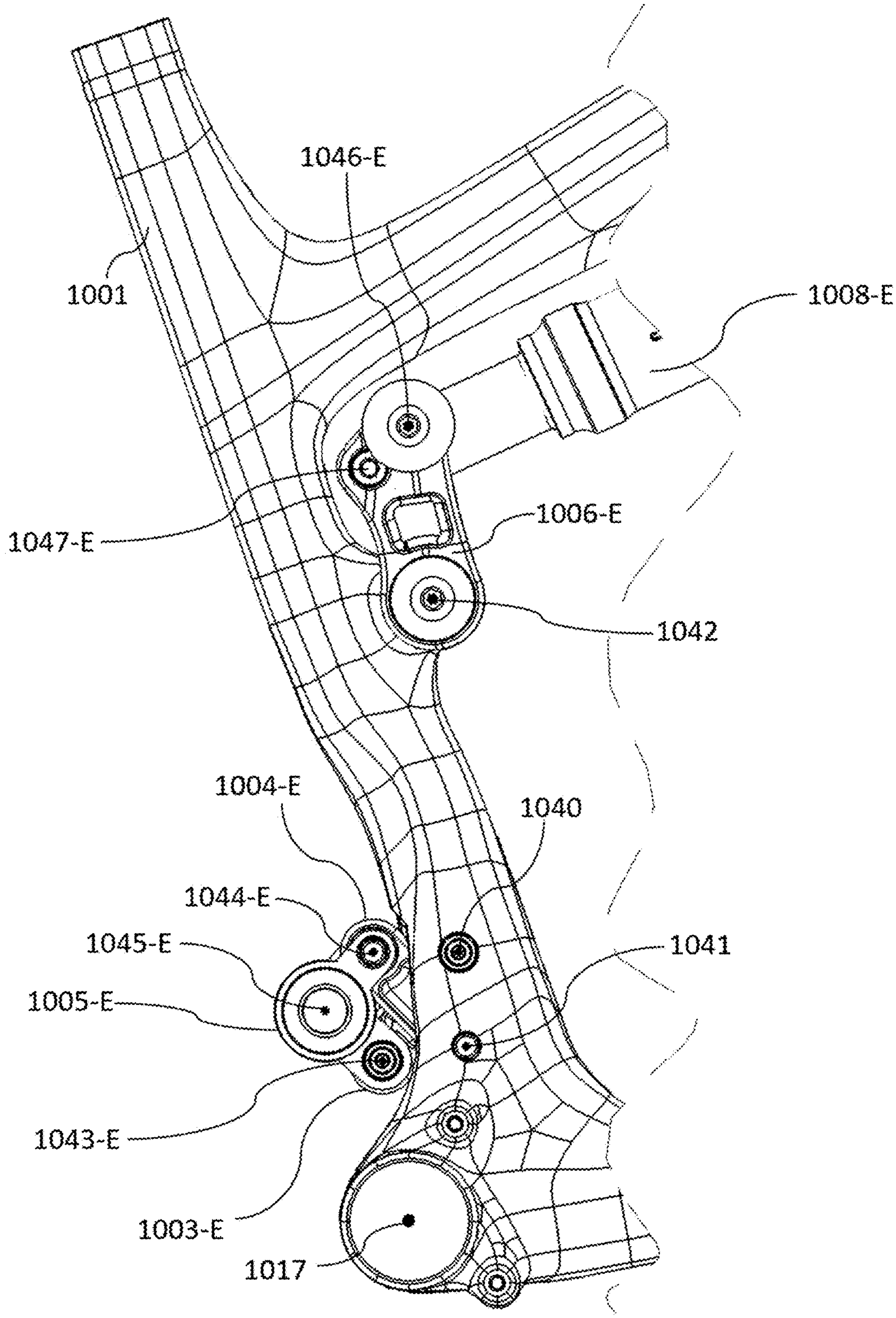
FIG. 2.11

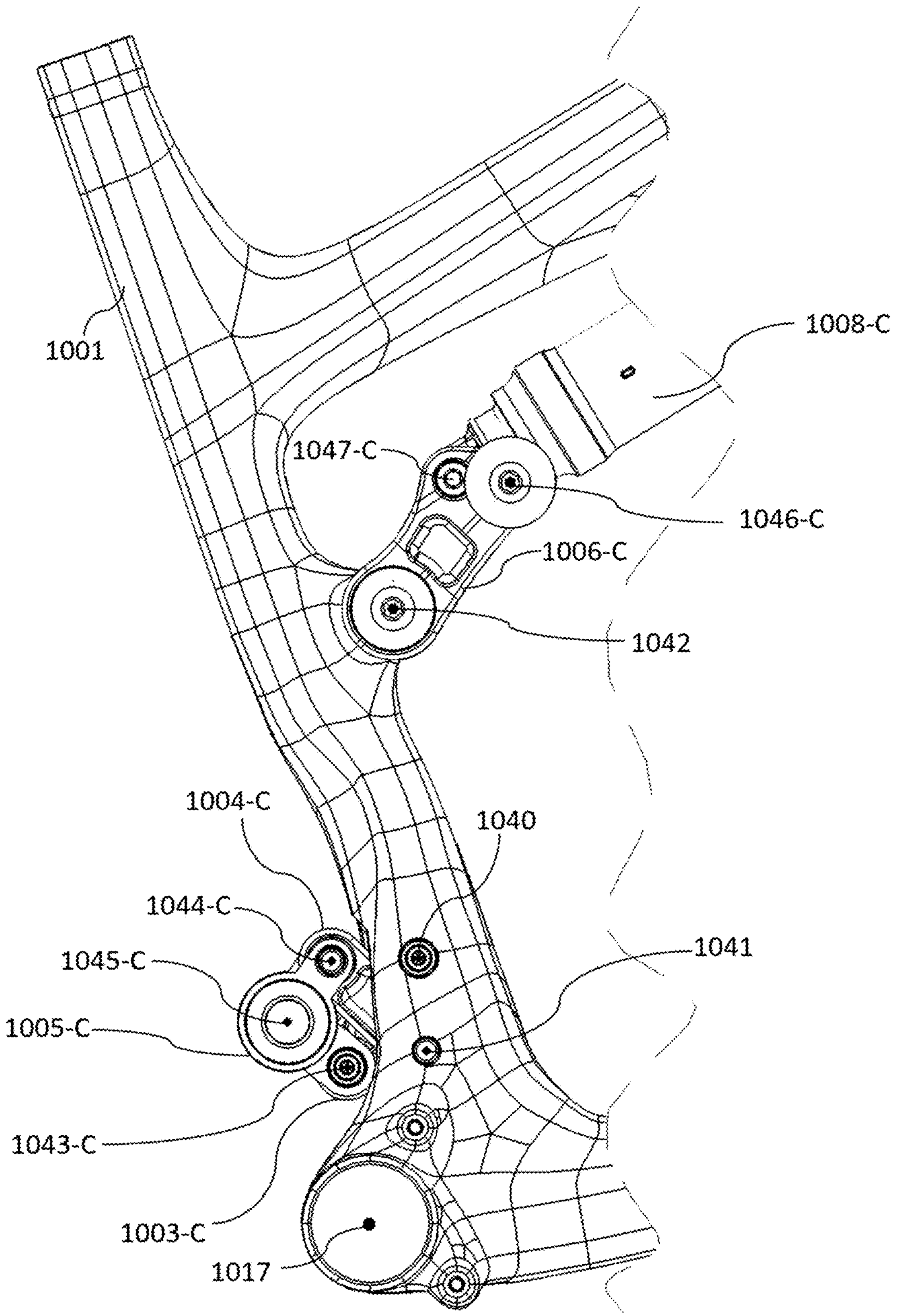
FIG. 2.12

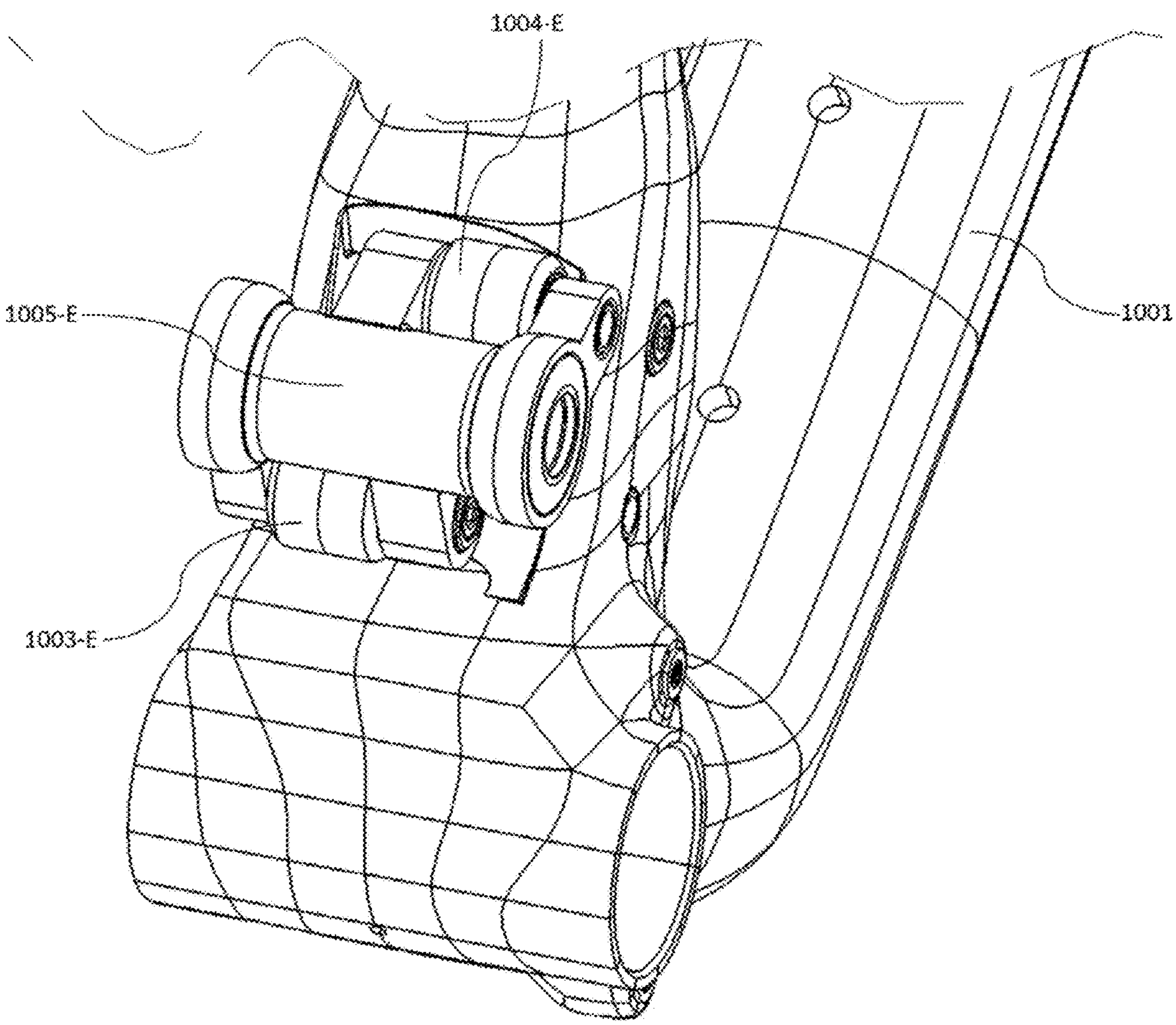
FIG. 2.13

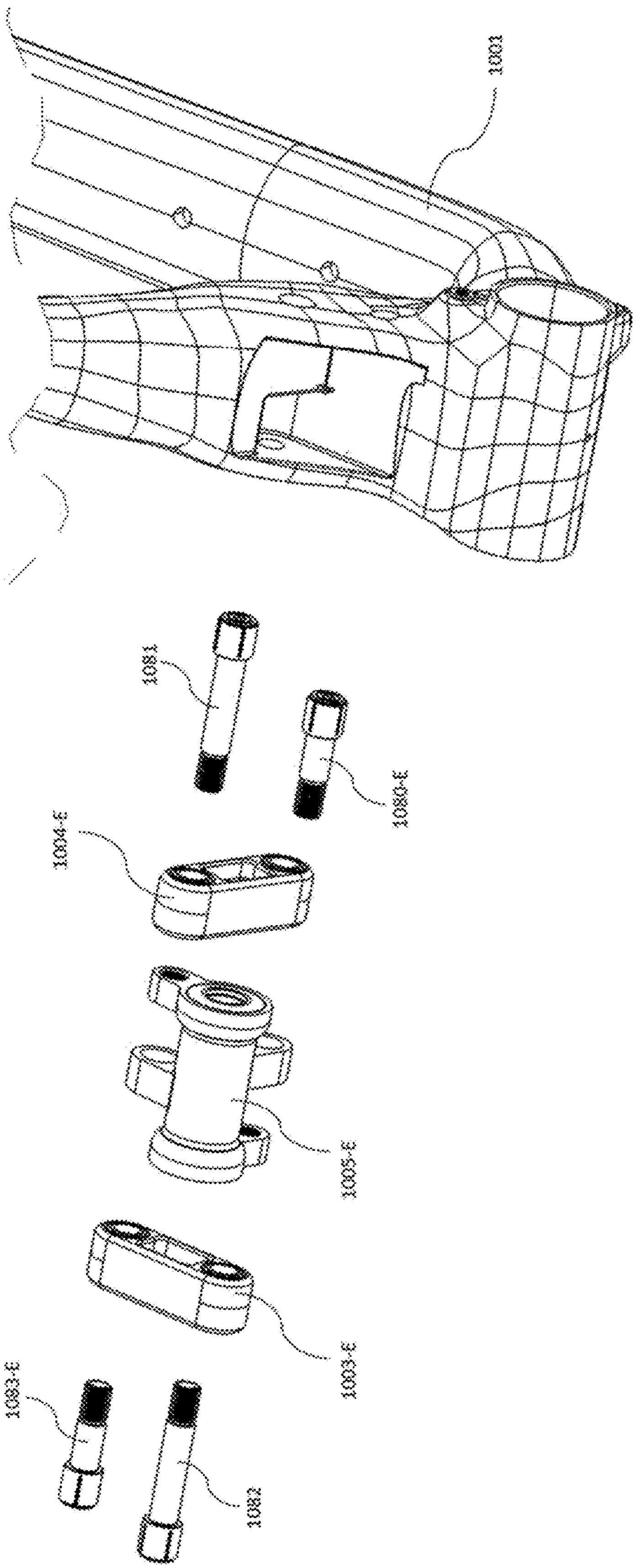
FIG. 2.14

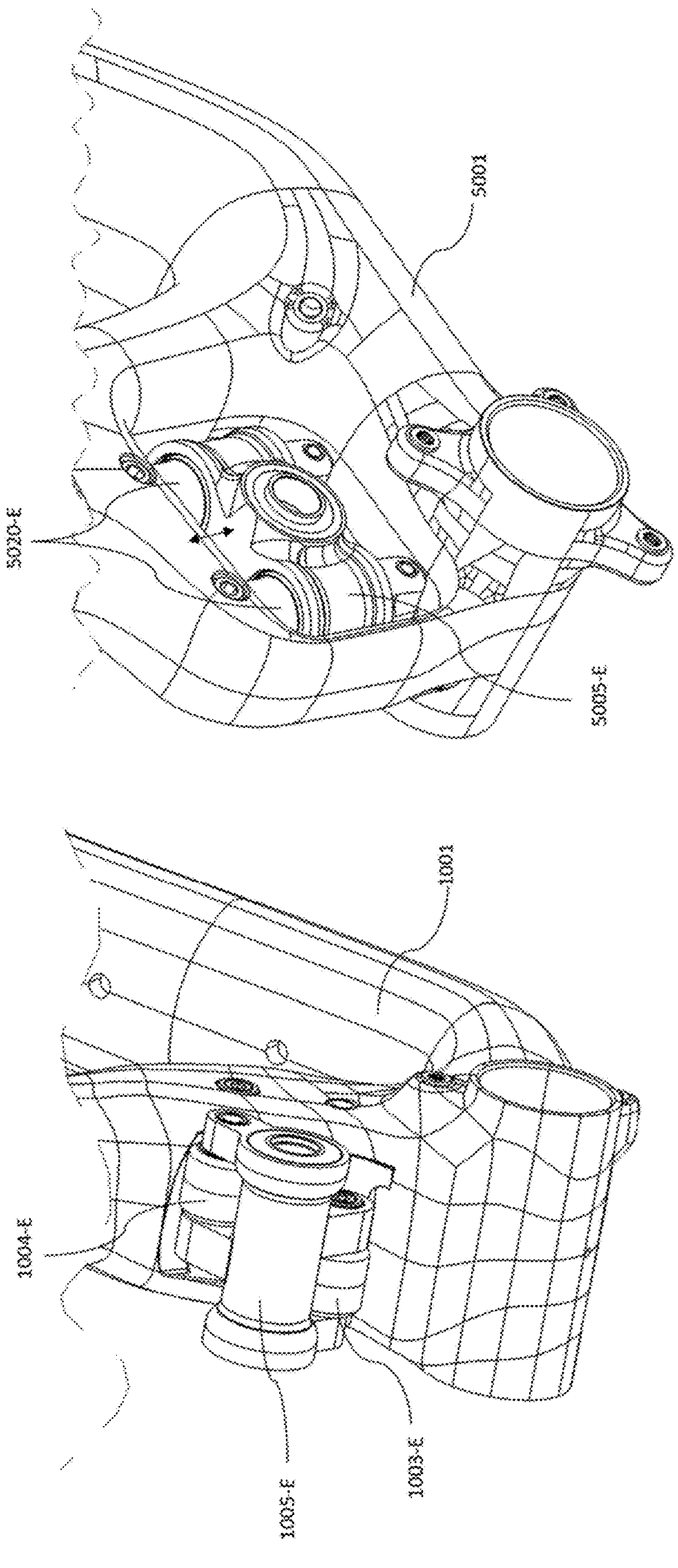
FIG. 2.15

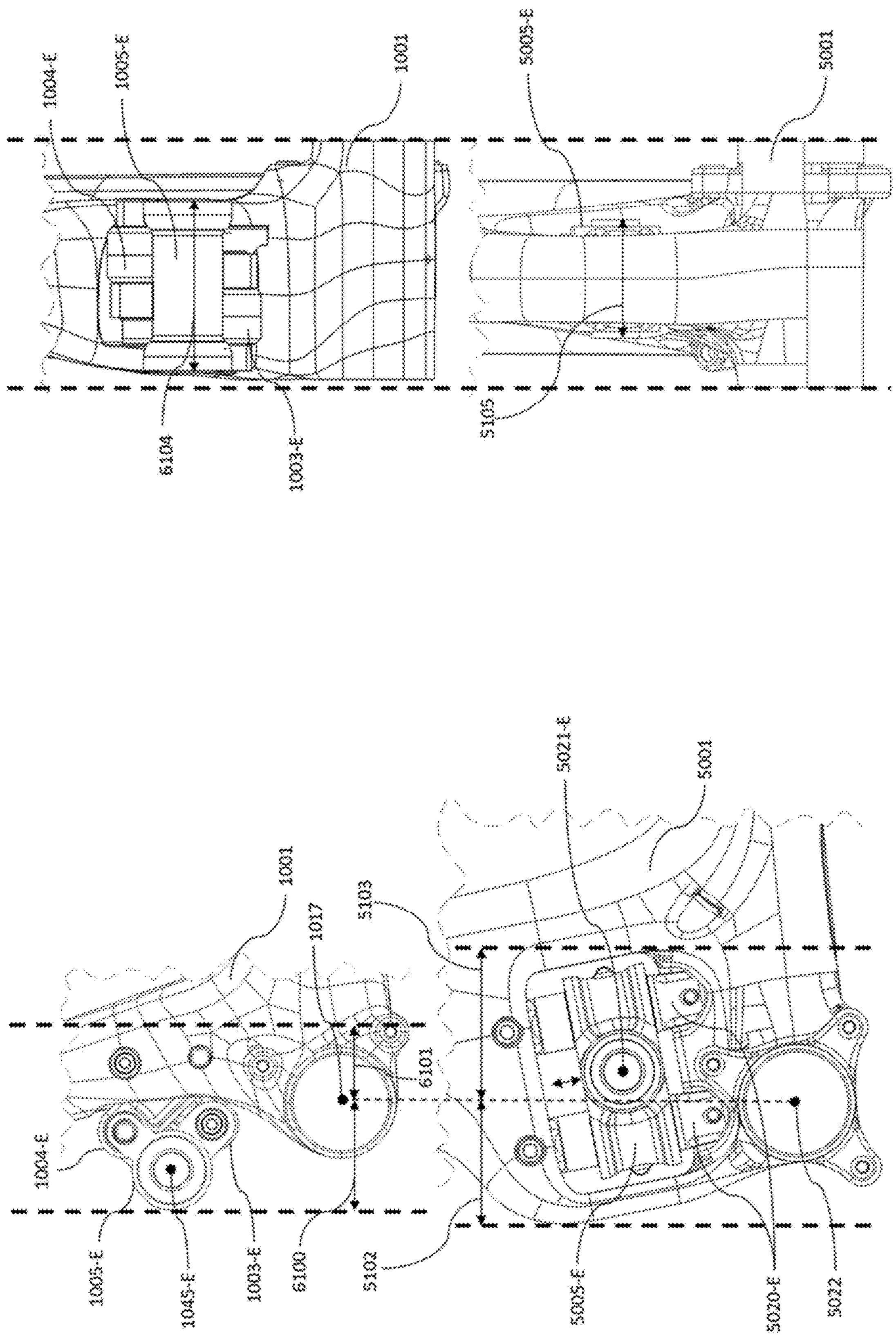
FIG. 2.16

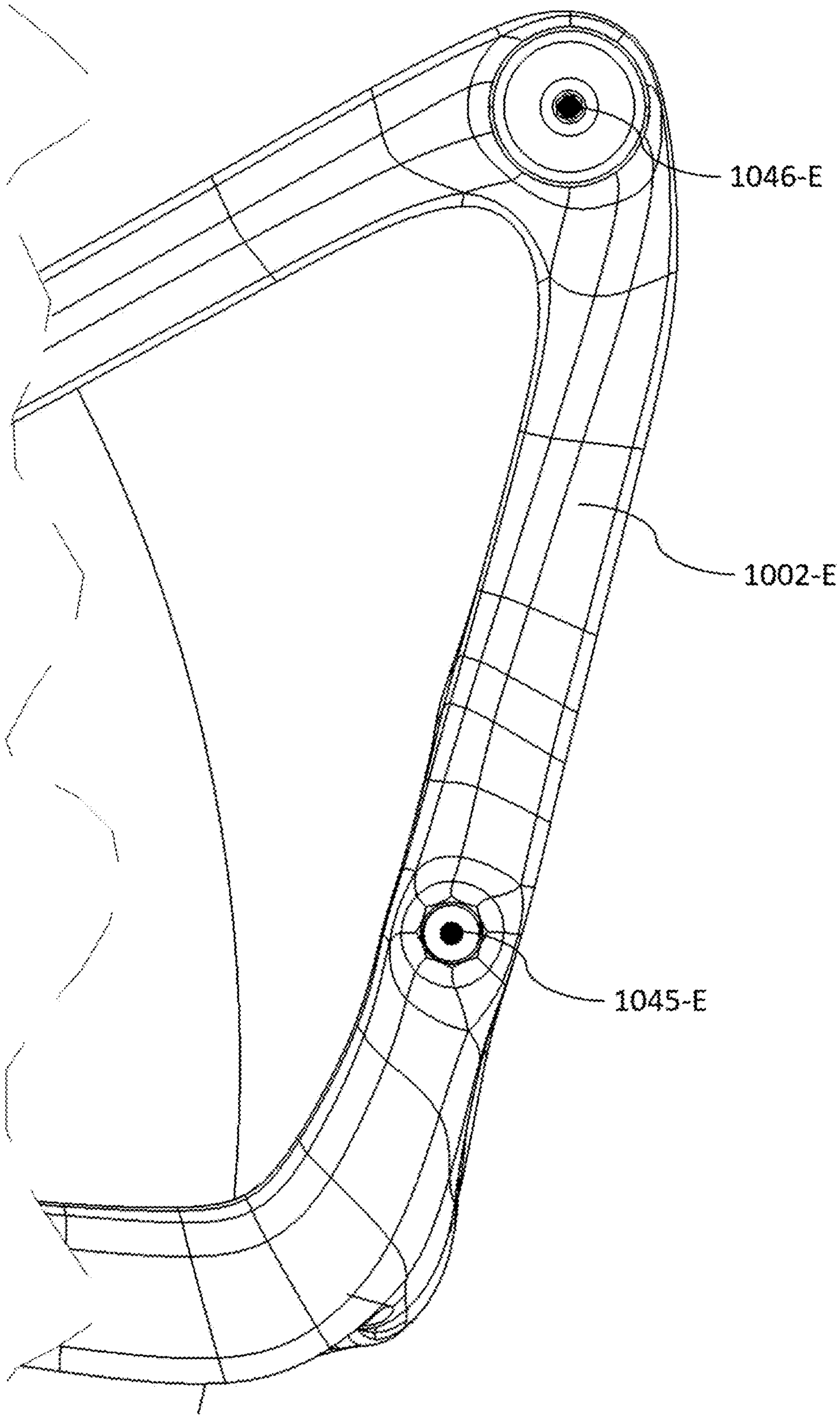
FIG. 2.17

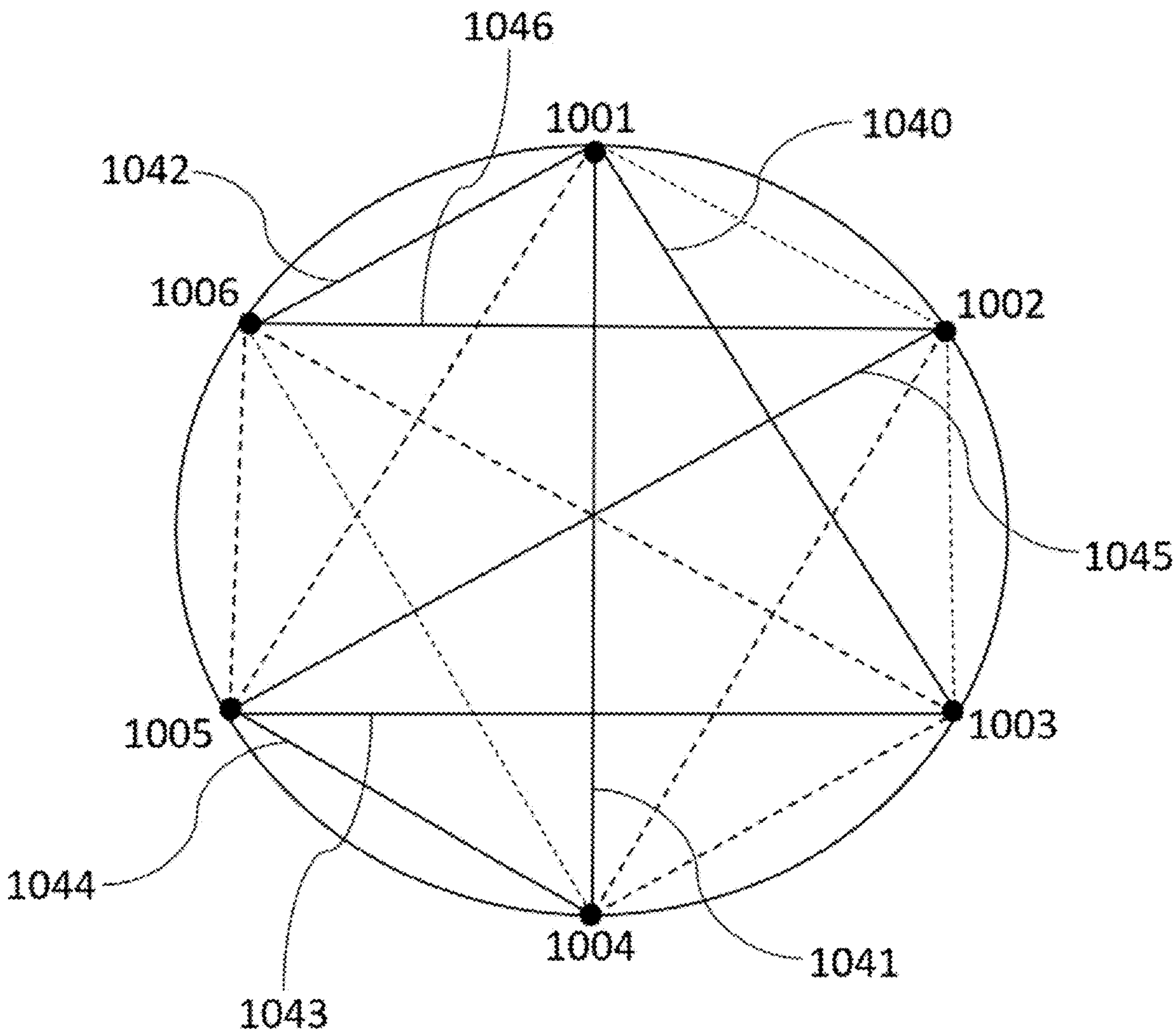
FIG. 2.18

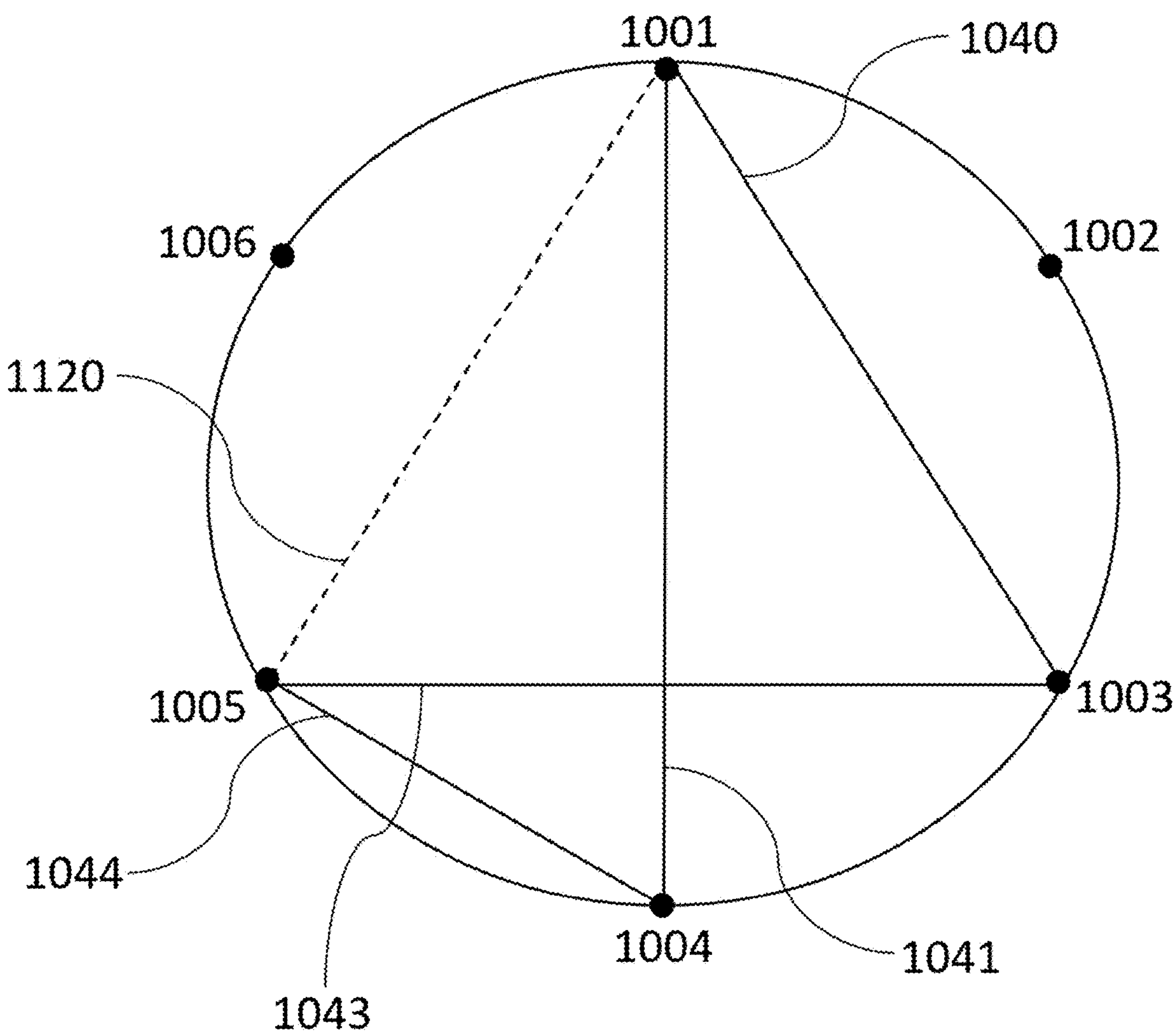
FIG. 2.19

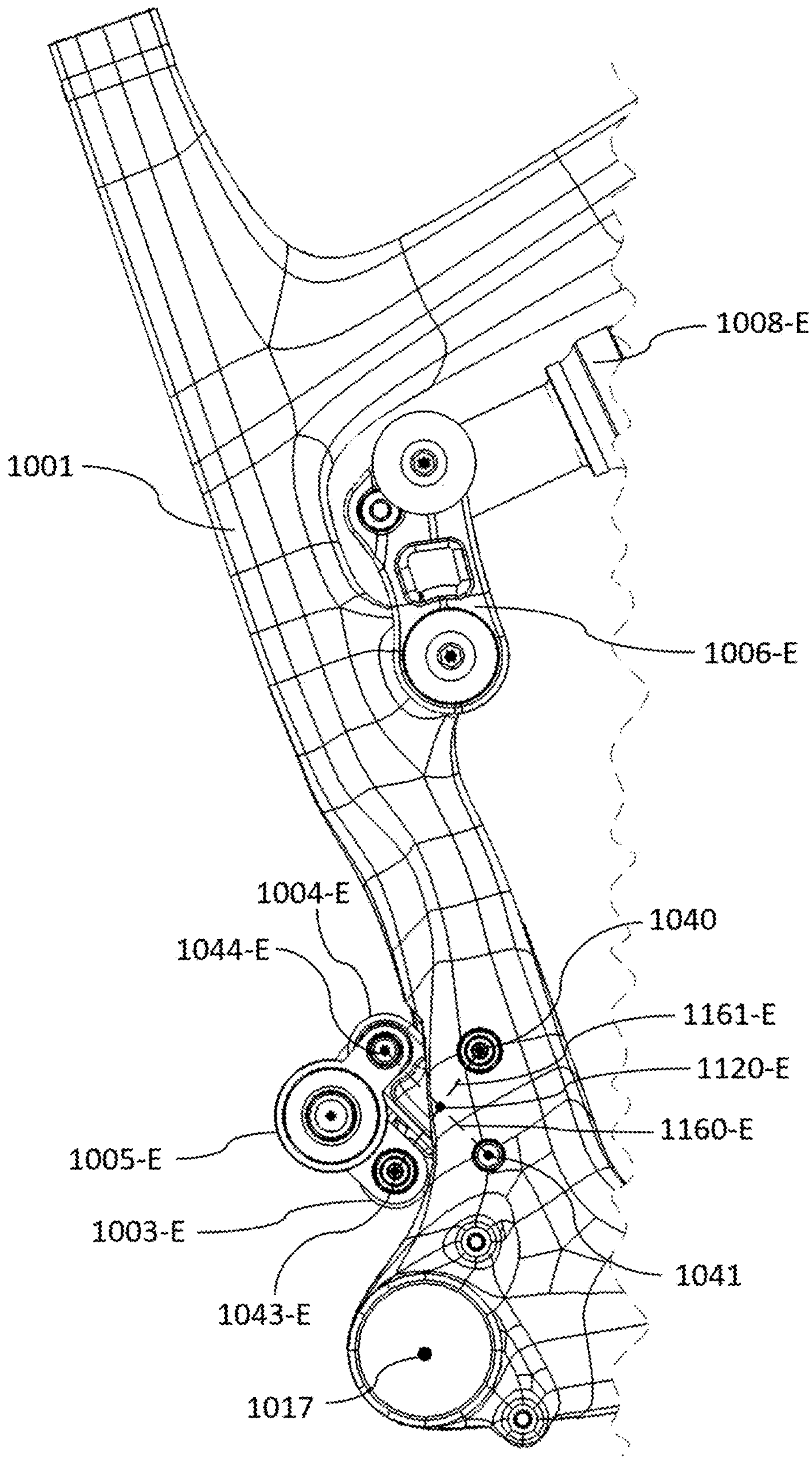
FIG. 2.20

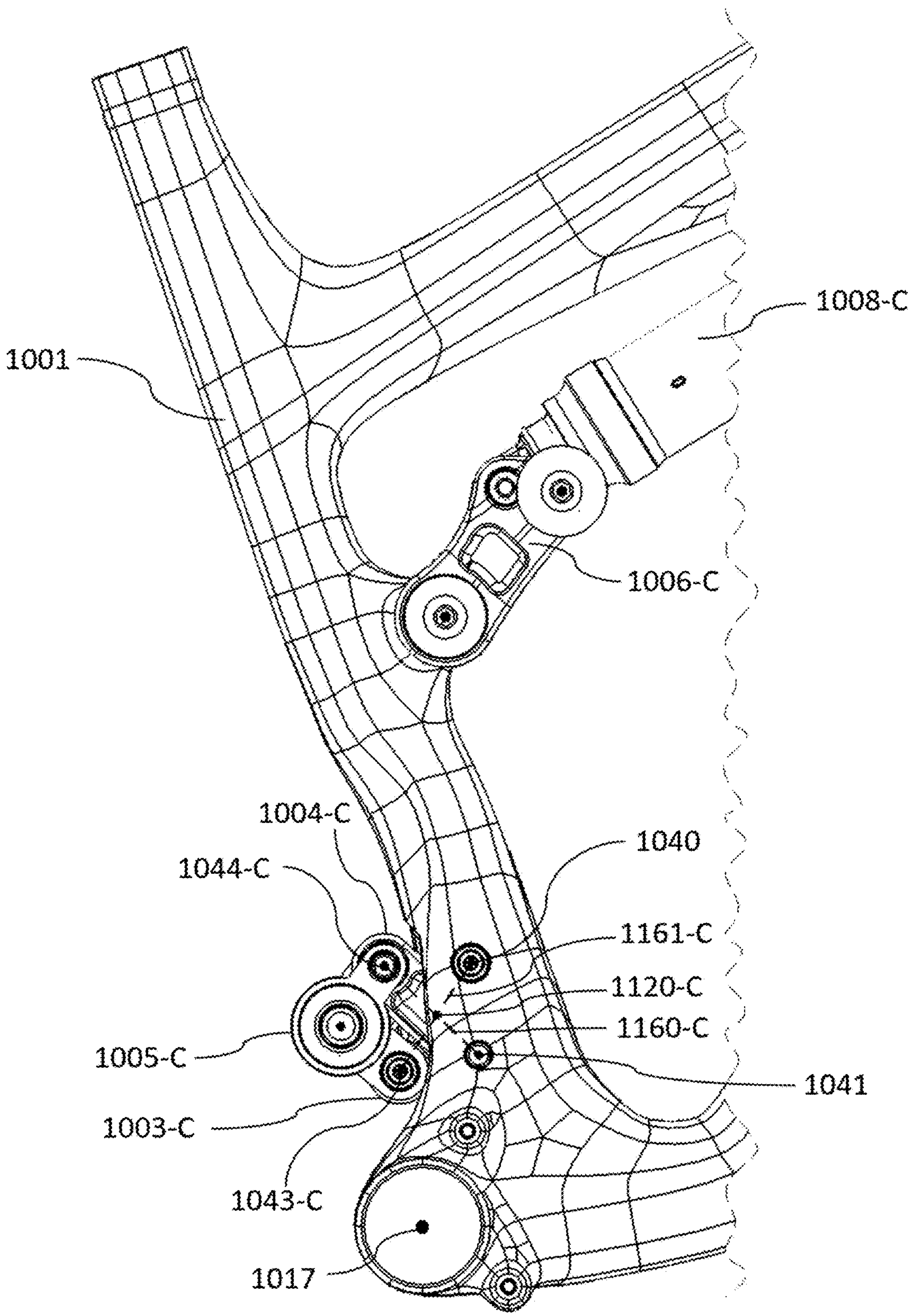
FIG. 2.21

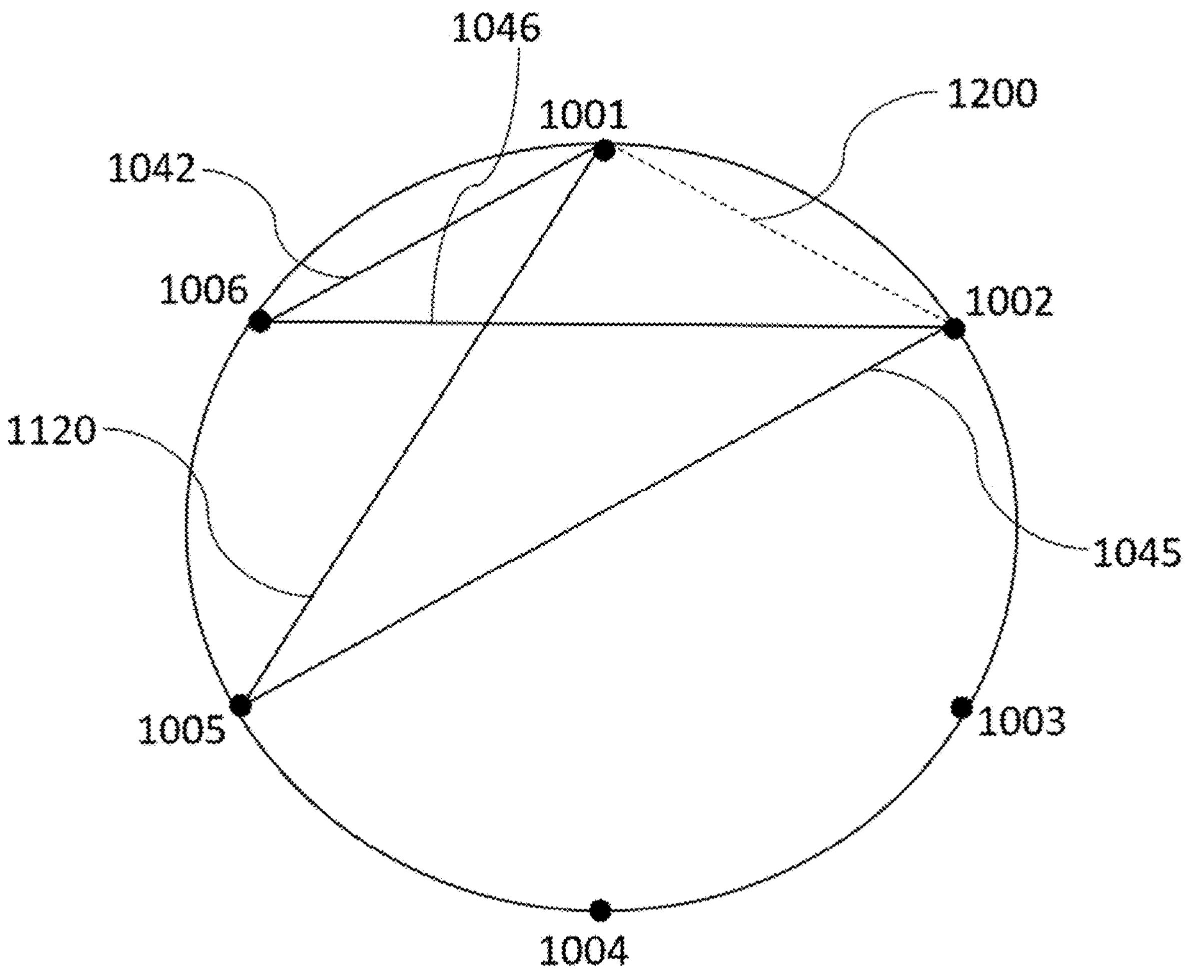
FIG. 2.22

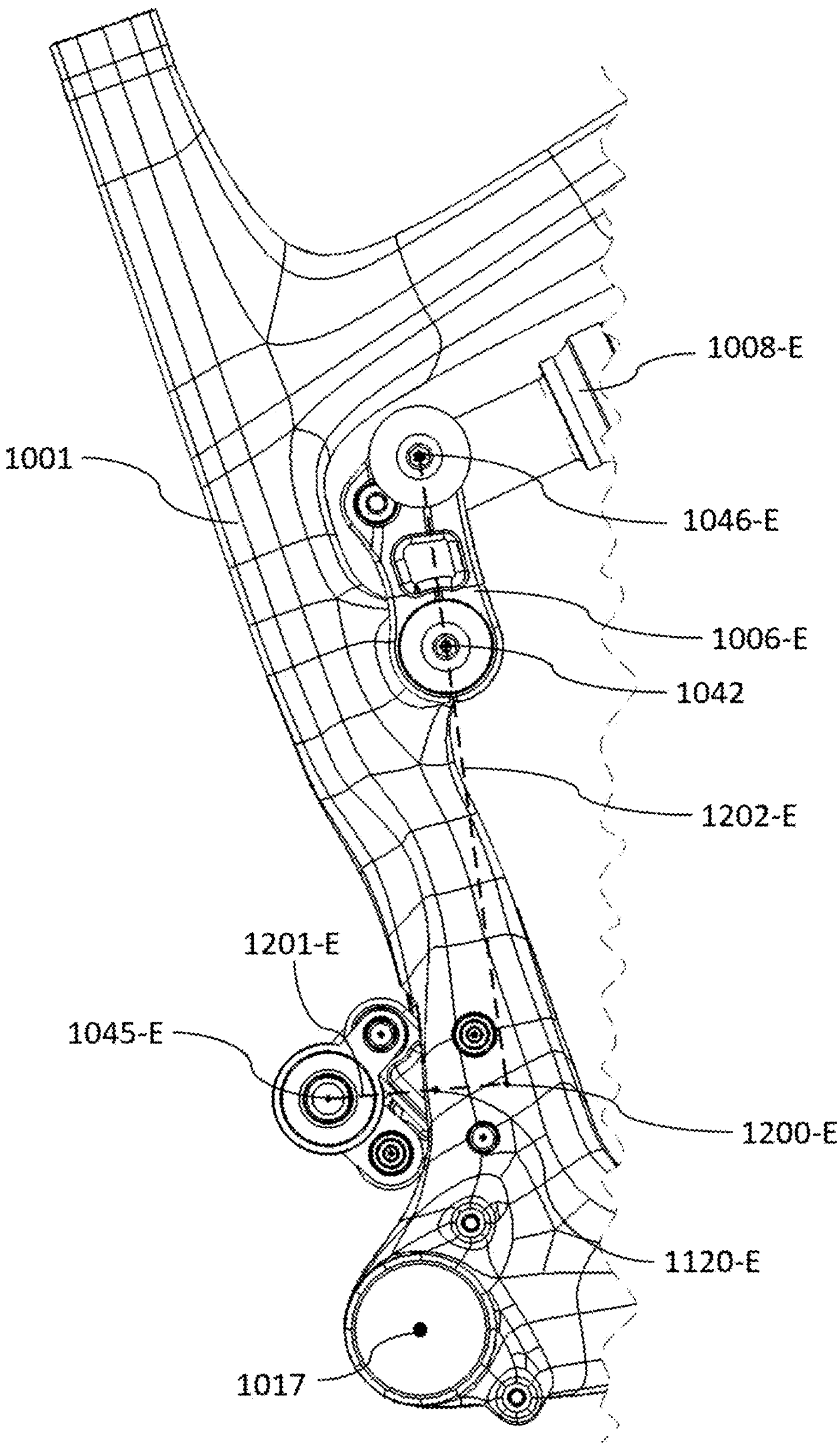
FIG. 2.23

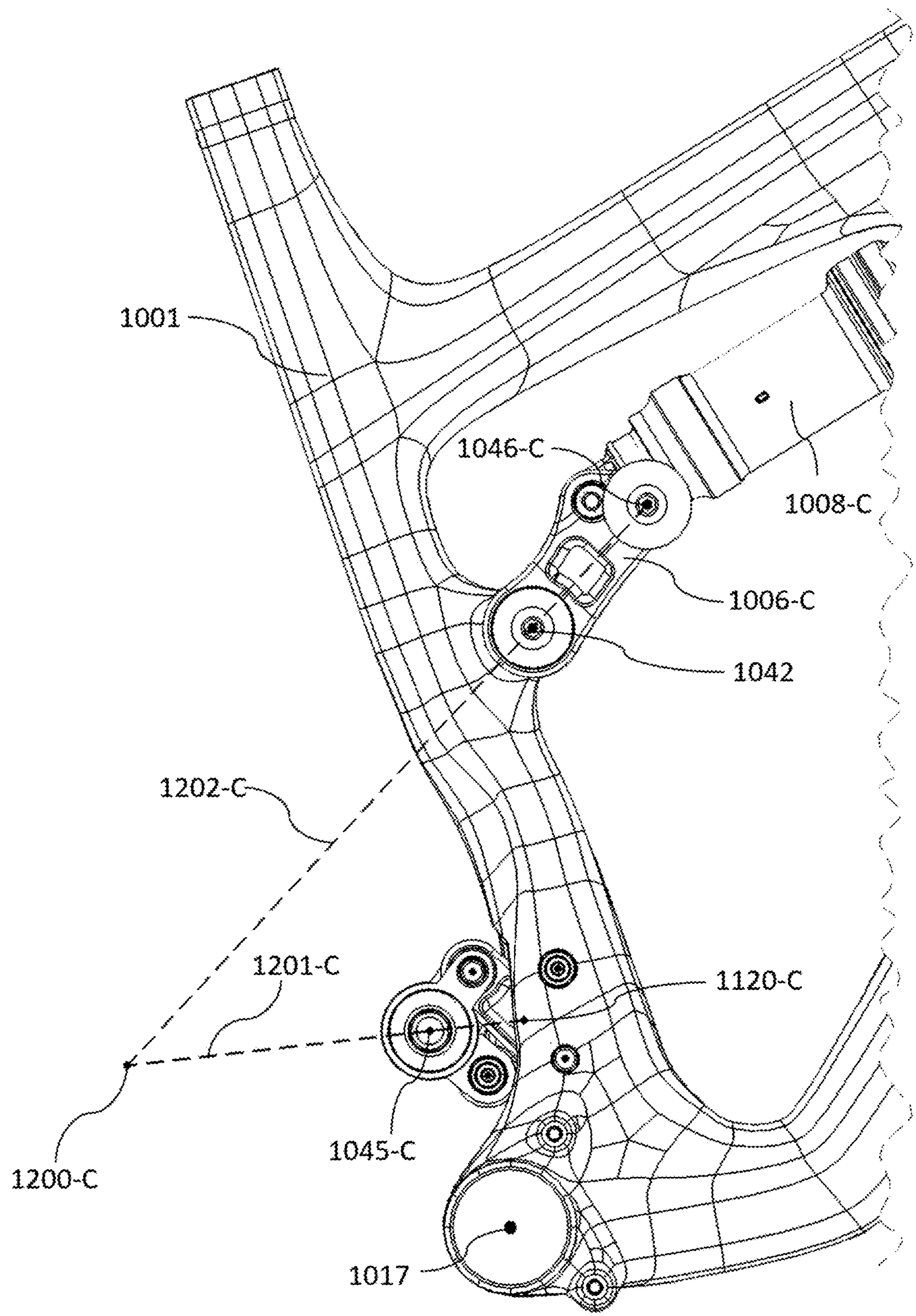
FIG. 2.24

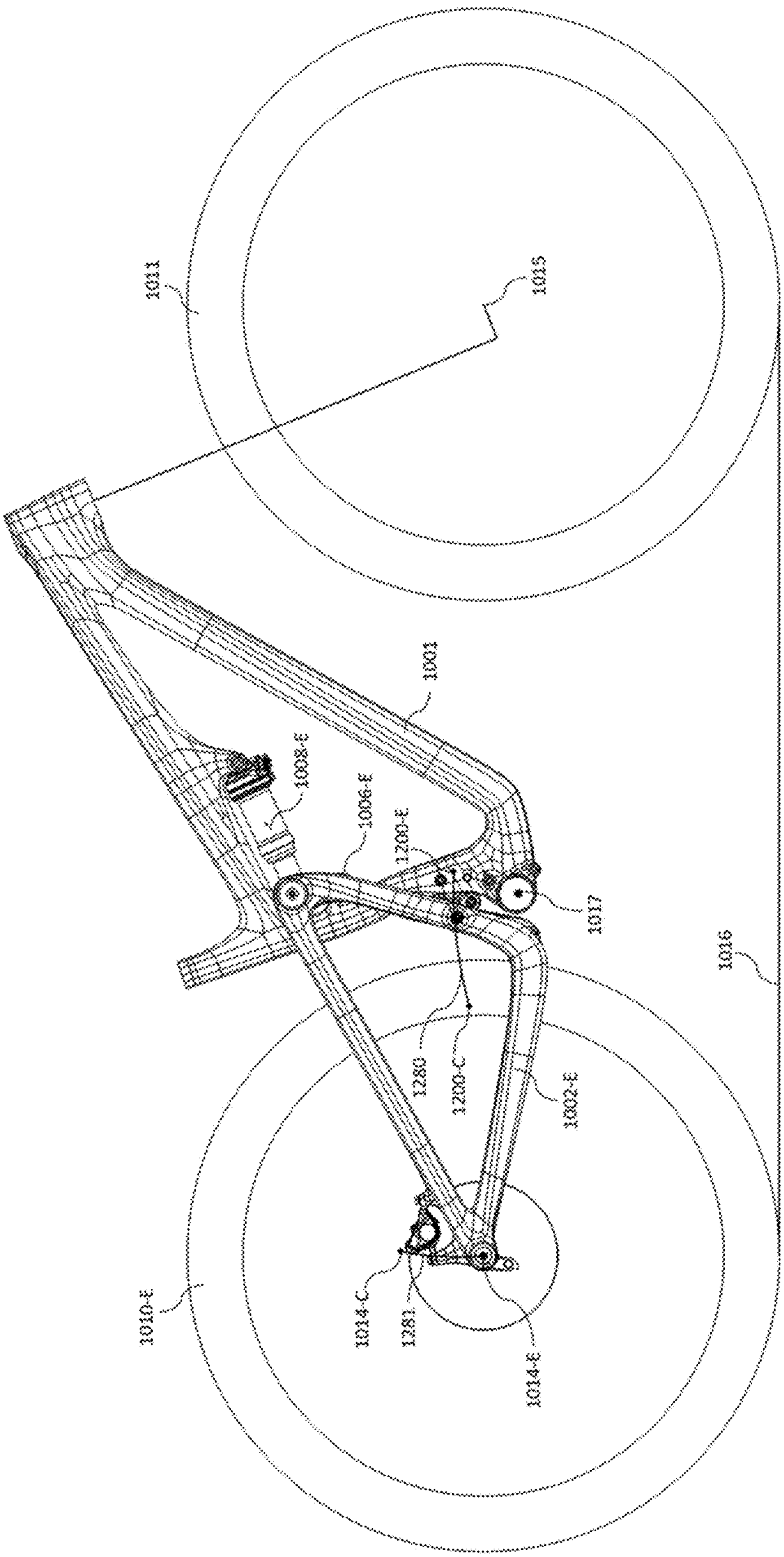
FIG. 2.25

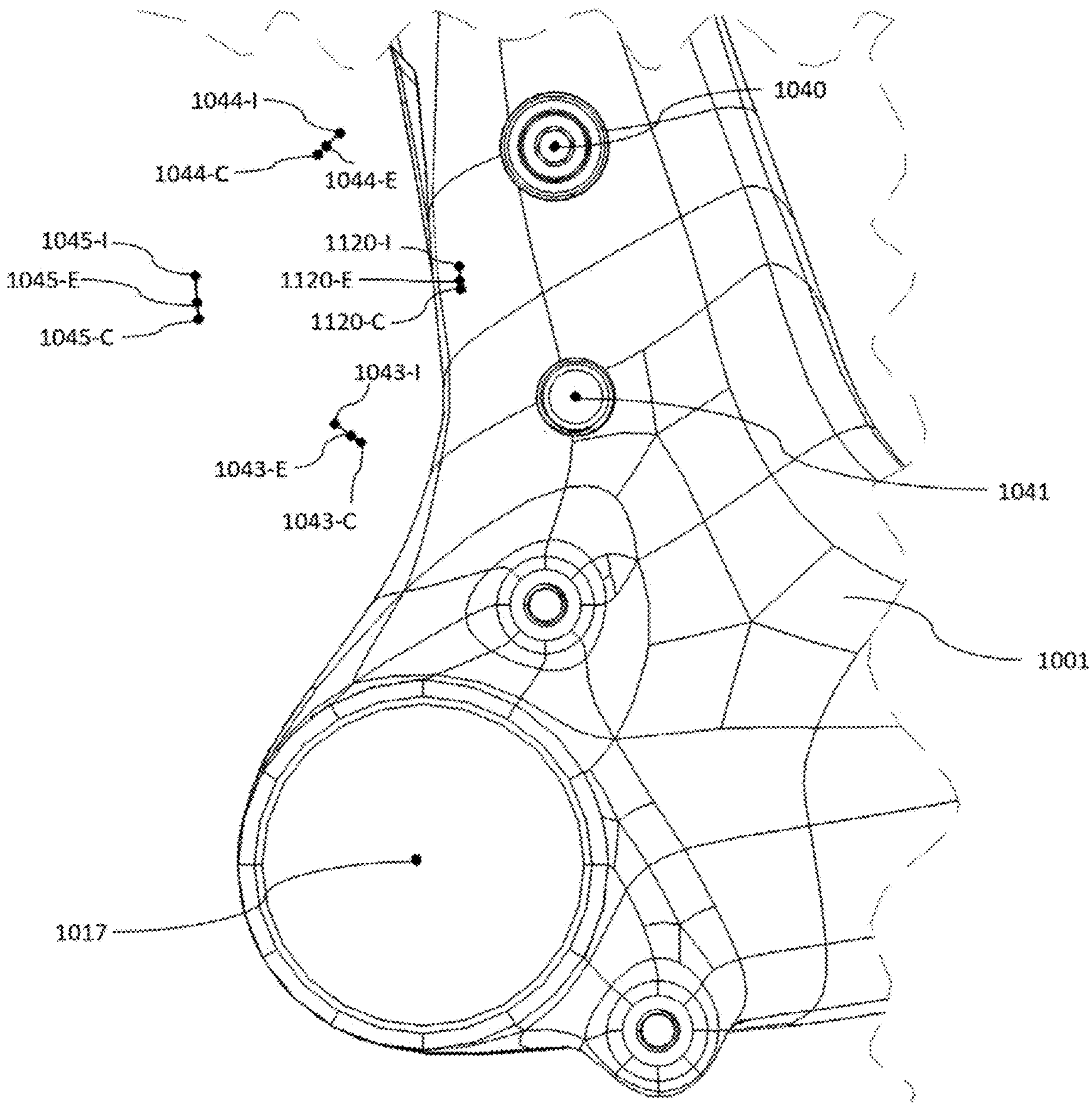
FIG. 2.26

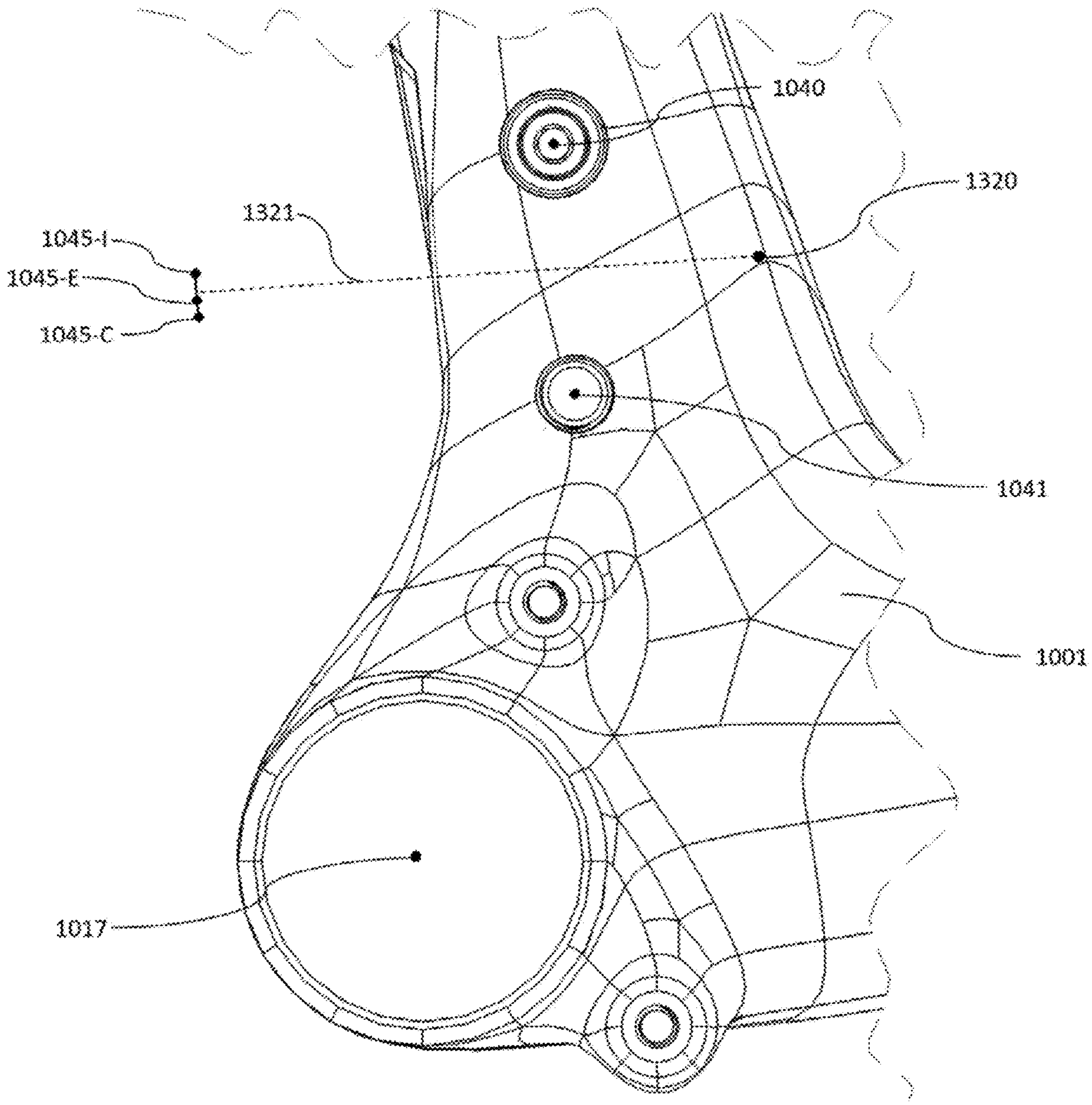
FIG. 2.27

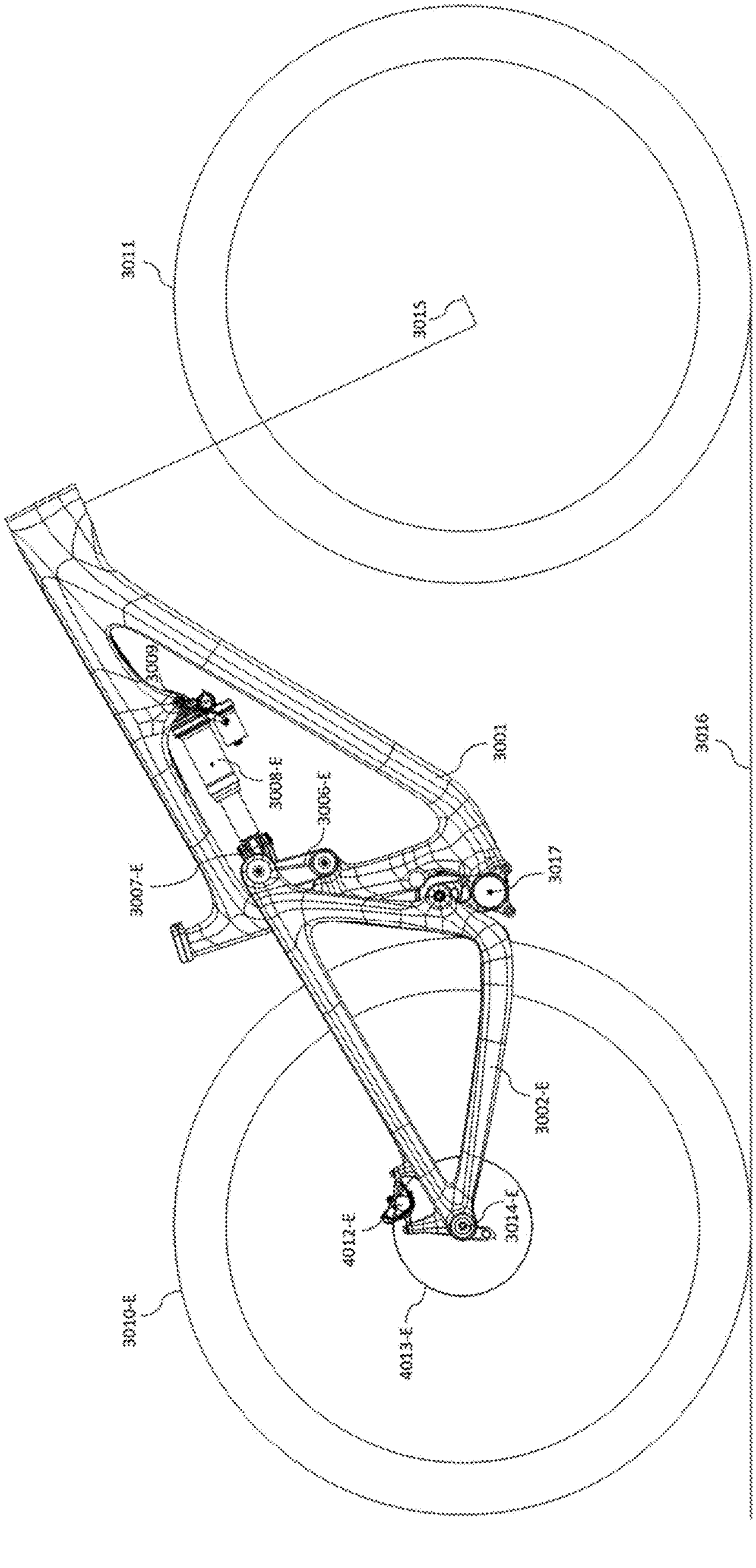
FIG. 3.1

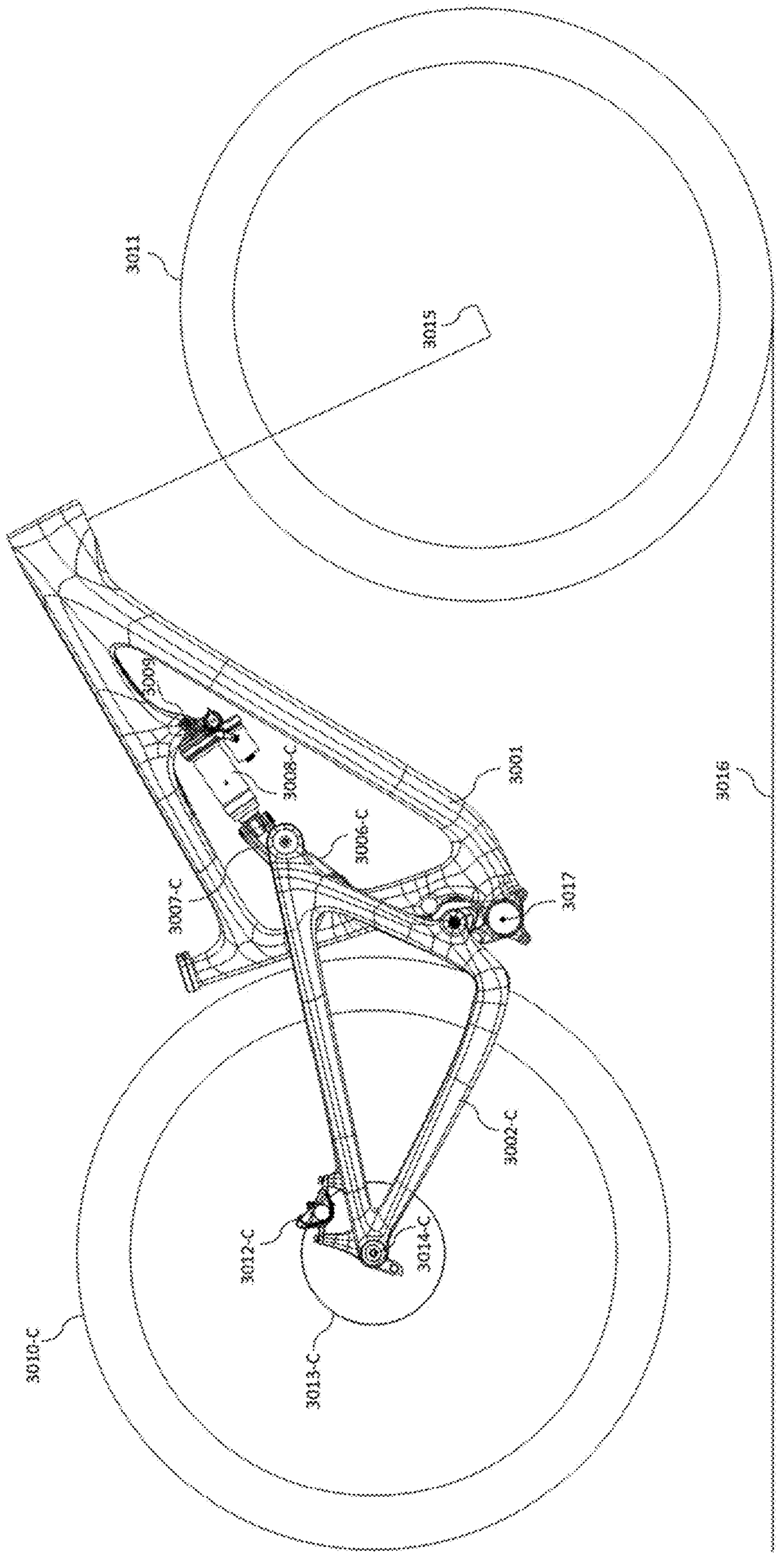
FIG. 3.2

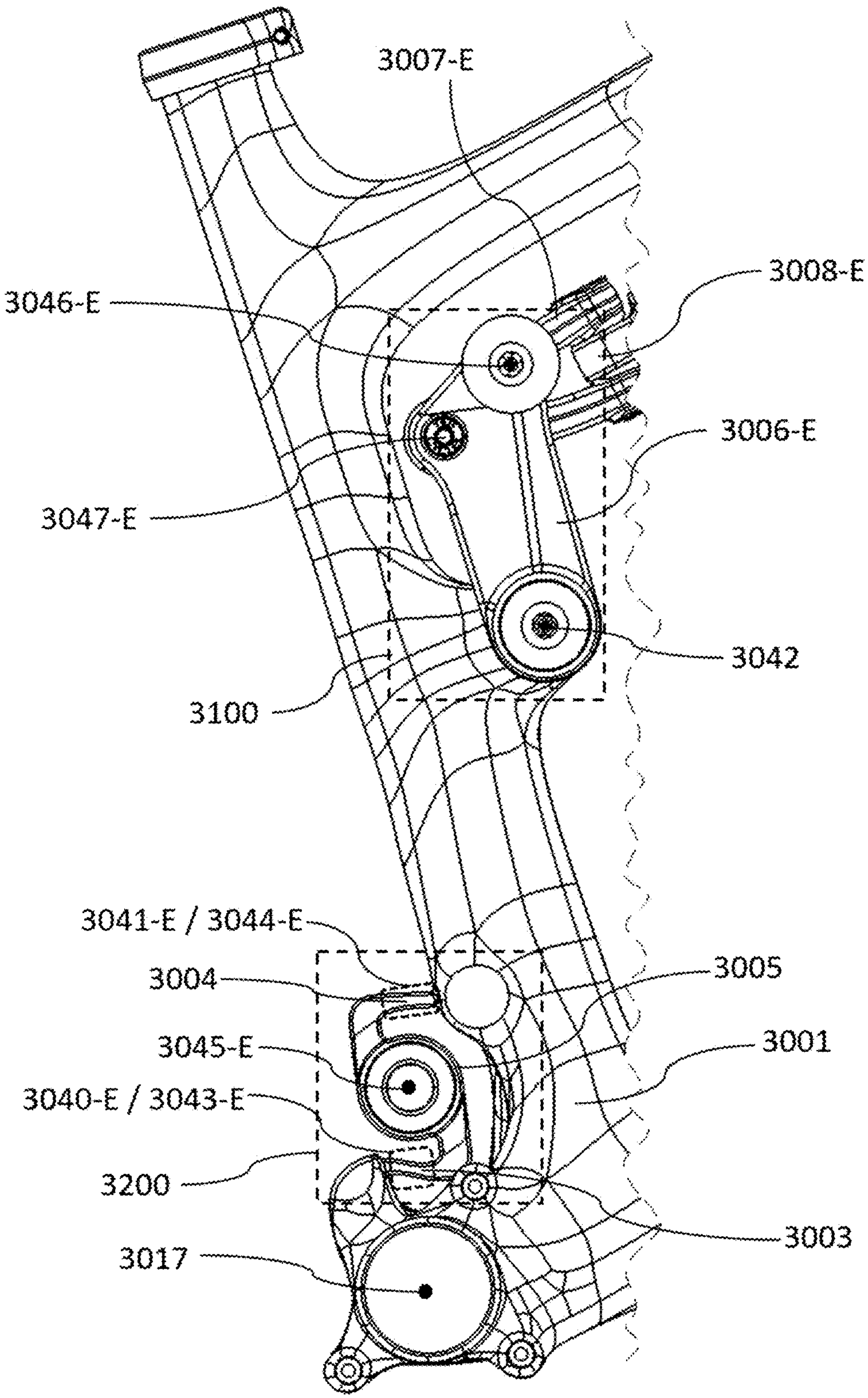
FIG. 3.3

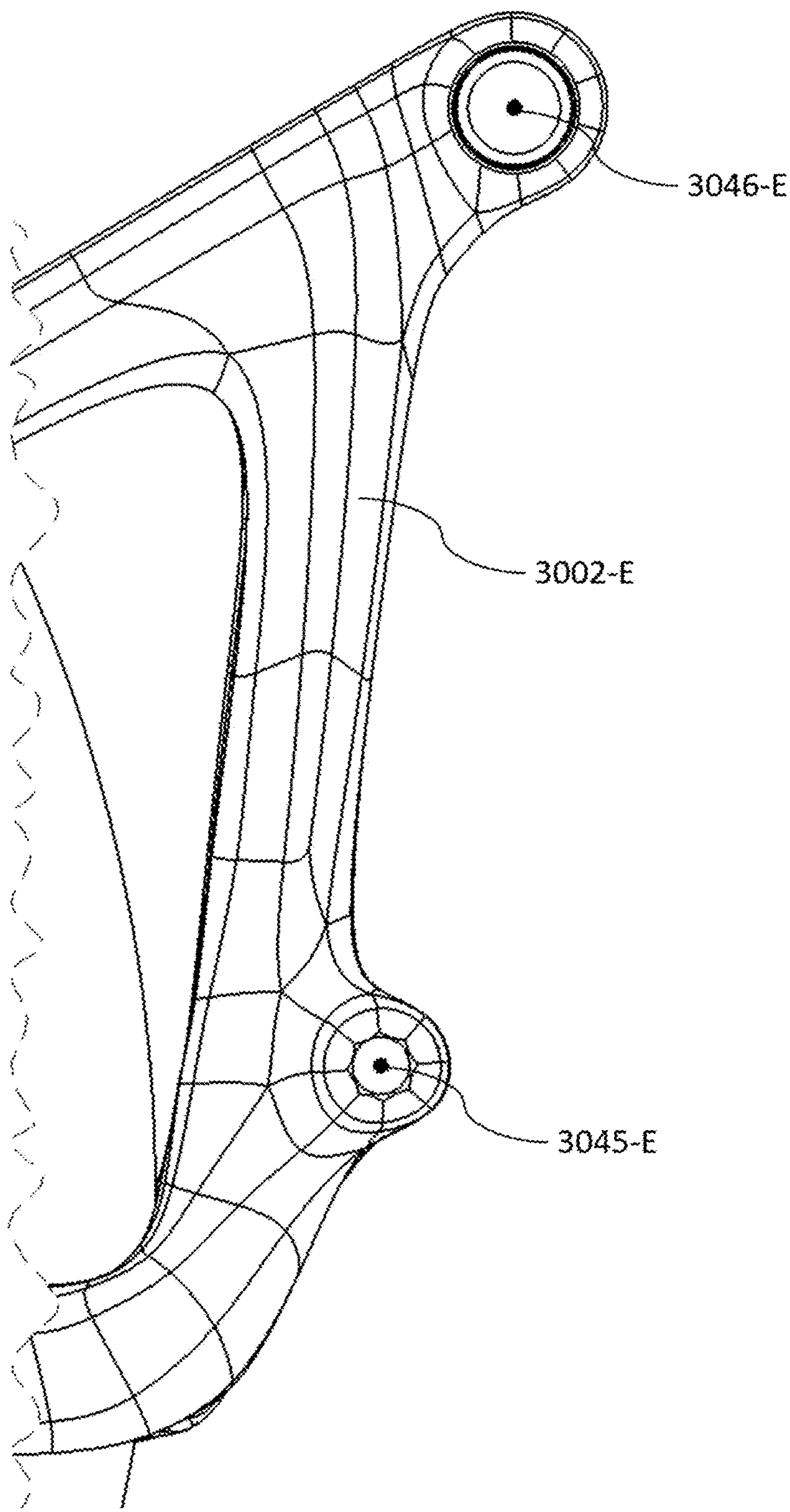
FIG. 3.4

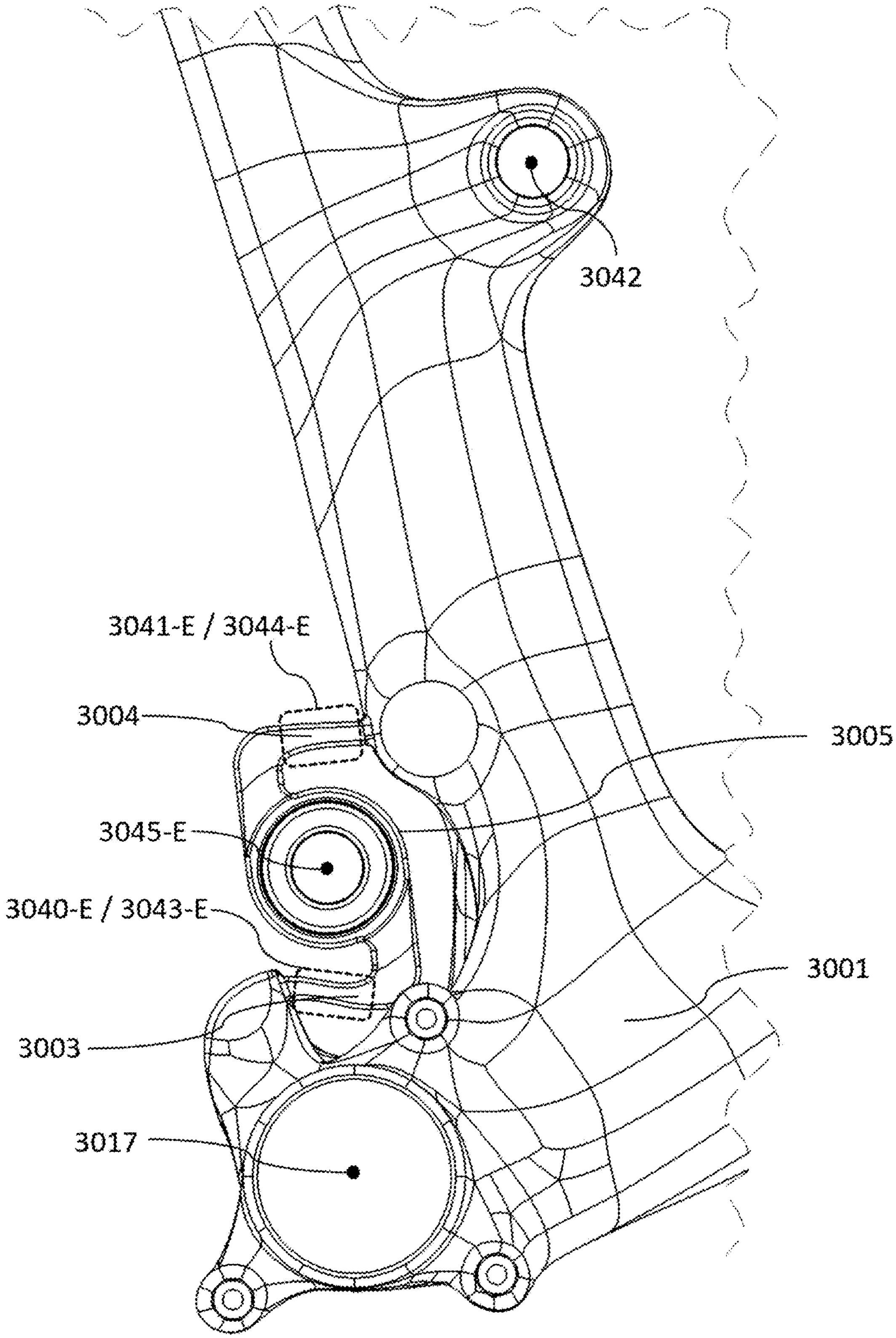
FIG. 3.5

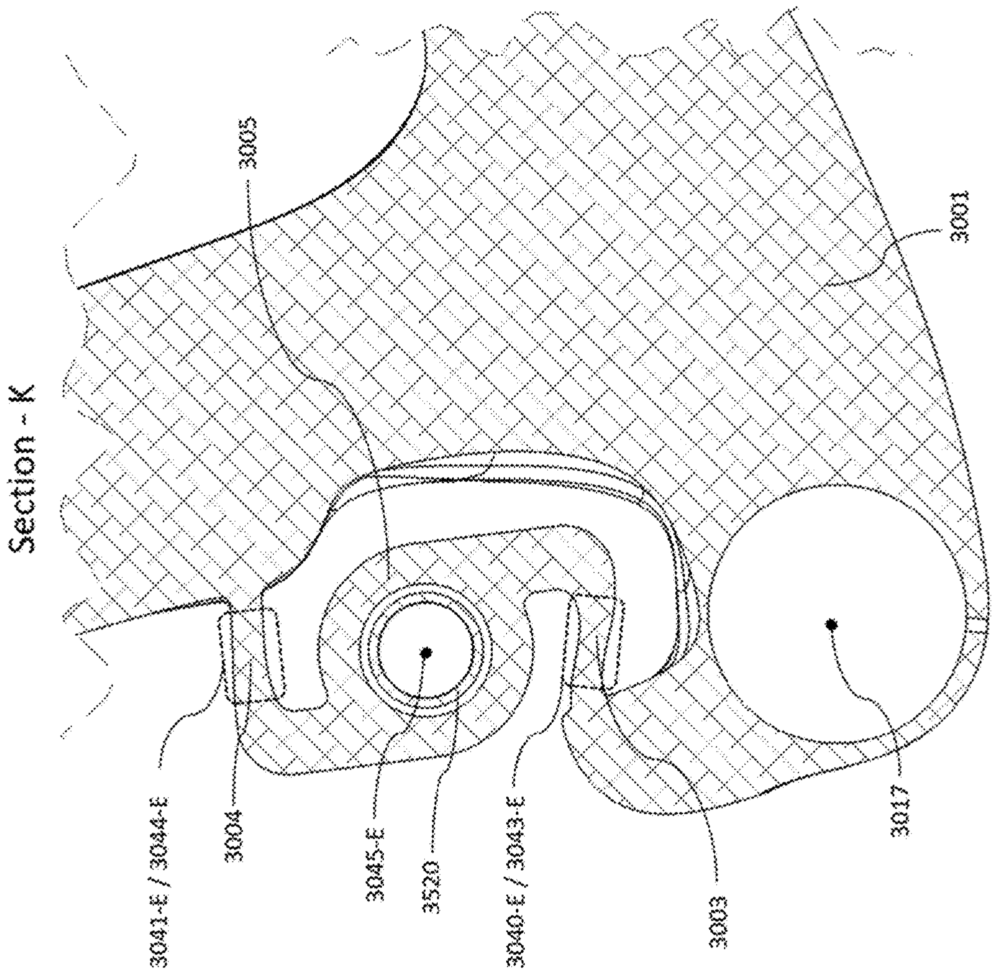
FIG. 3.7
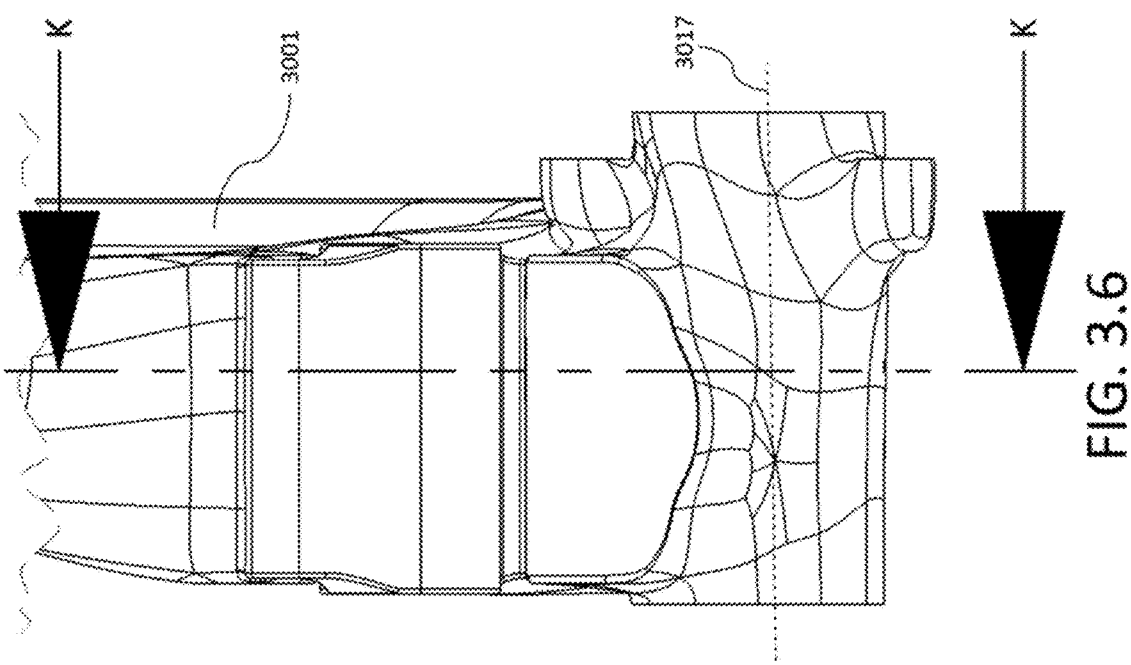
FIG. 3.6

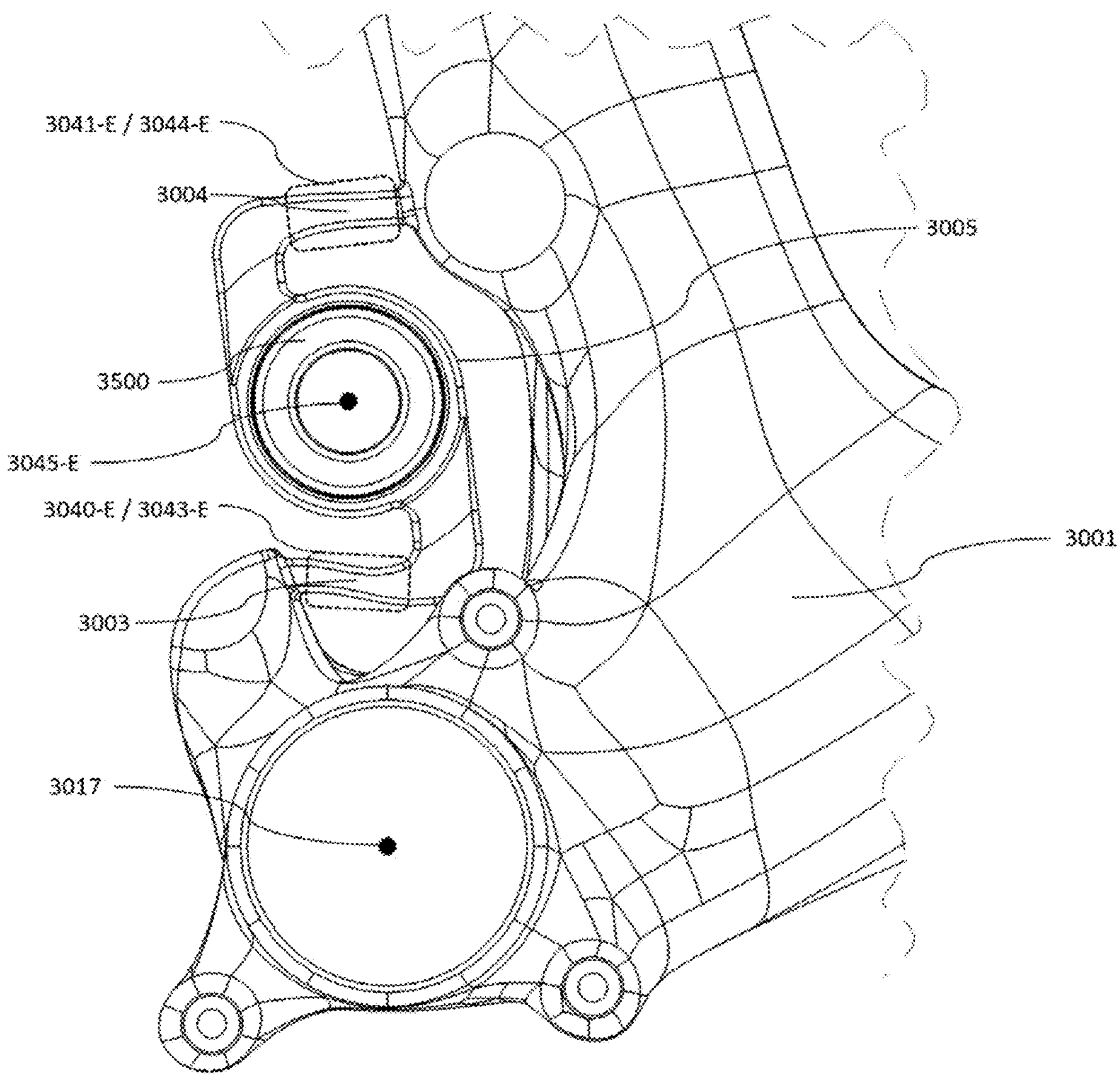
FIG. 3.8

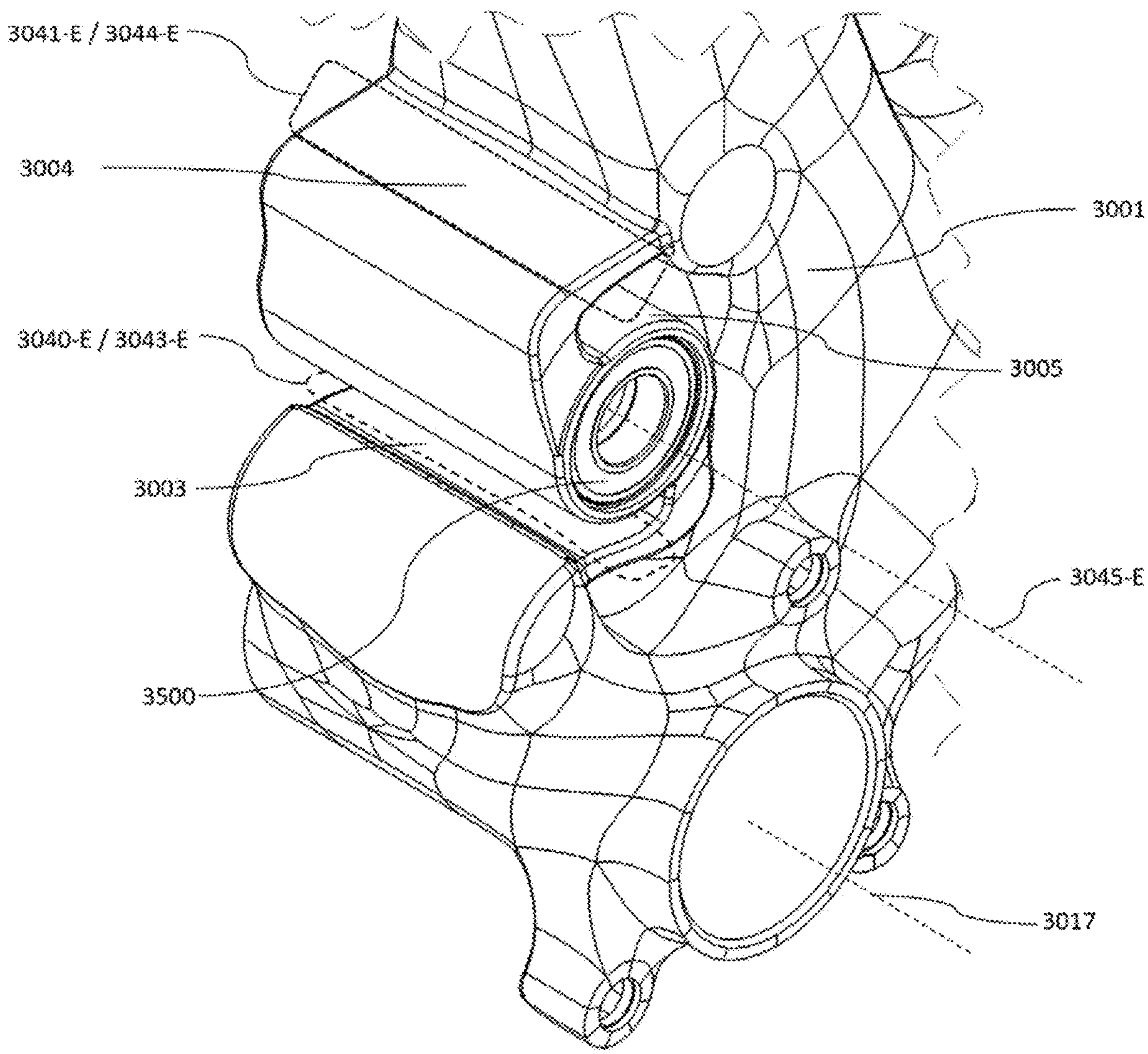
FIG. 3.9

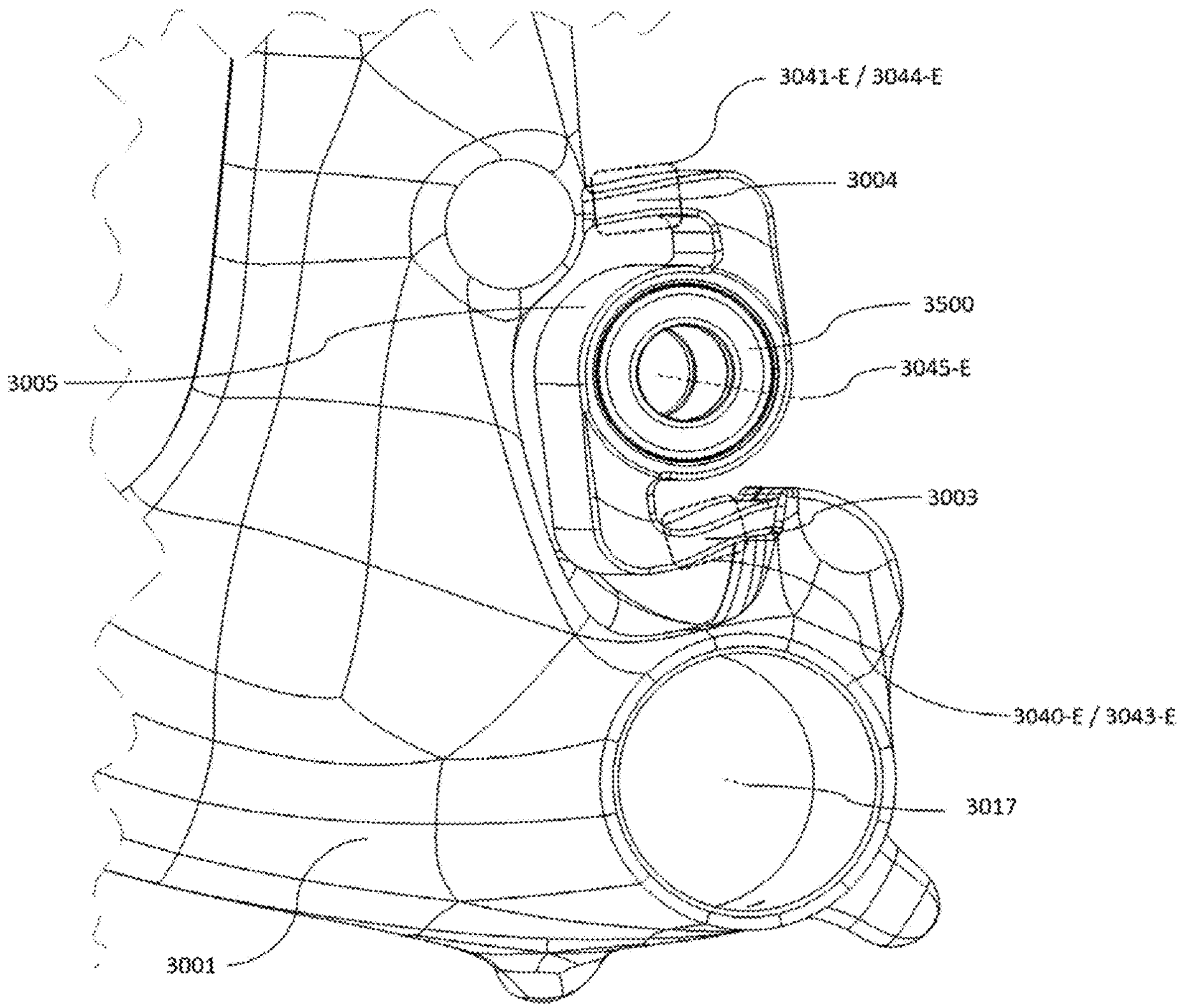
FIG. 3.10

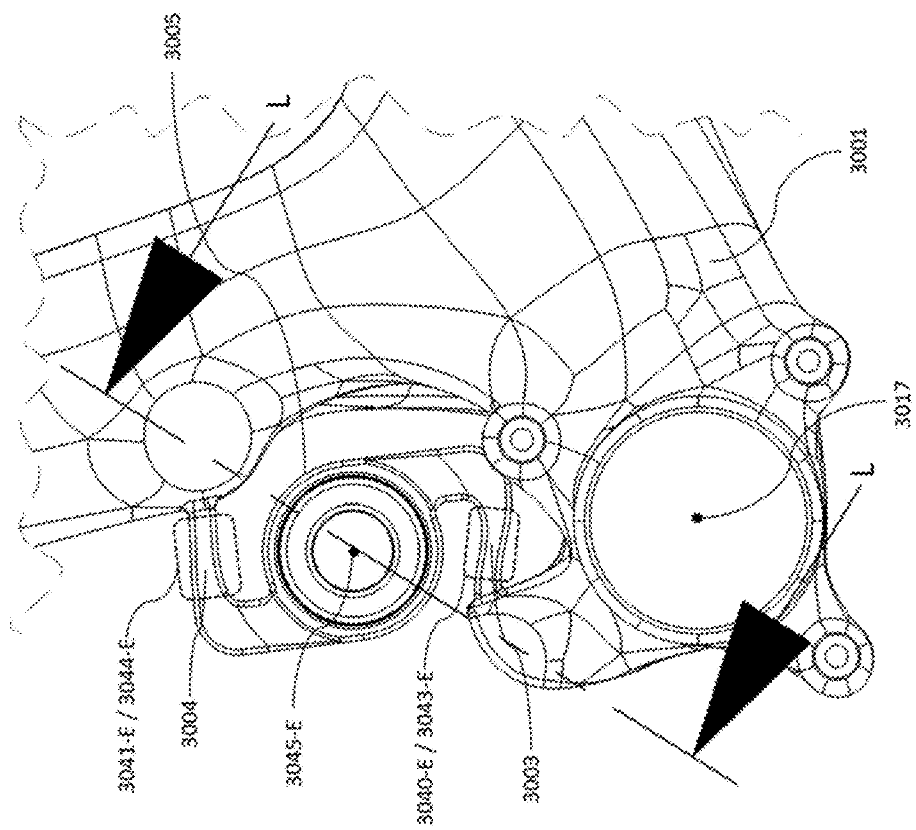
FIG. 3.11
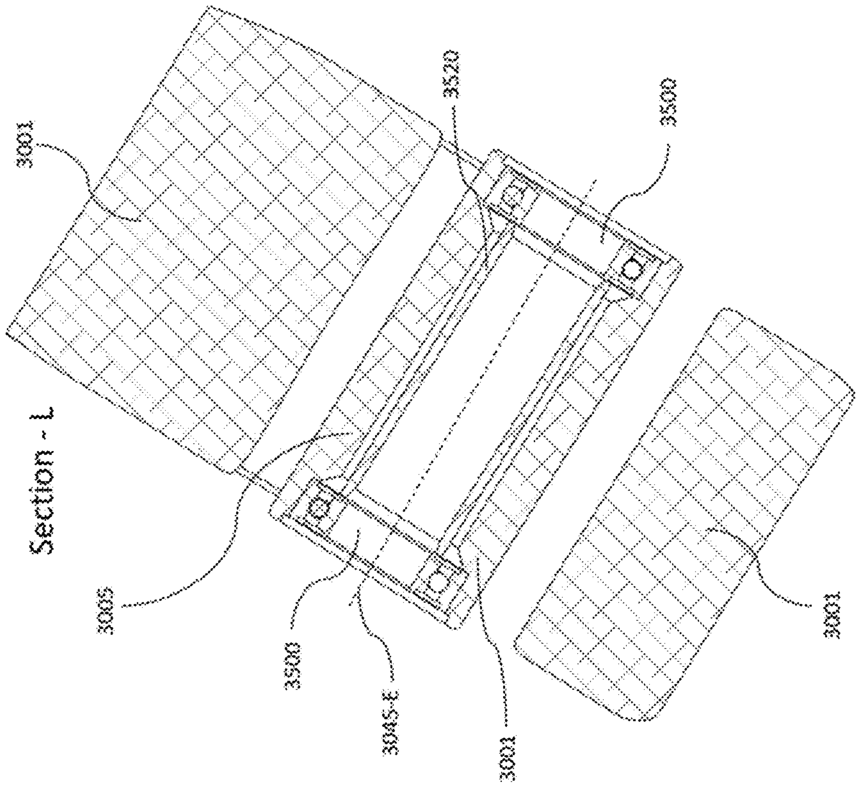
FIG. 3.12

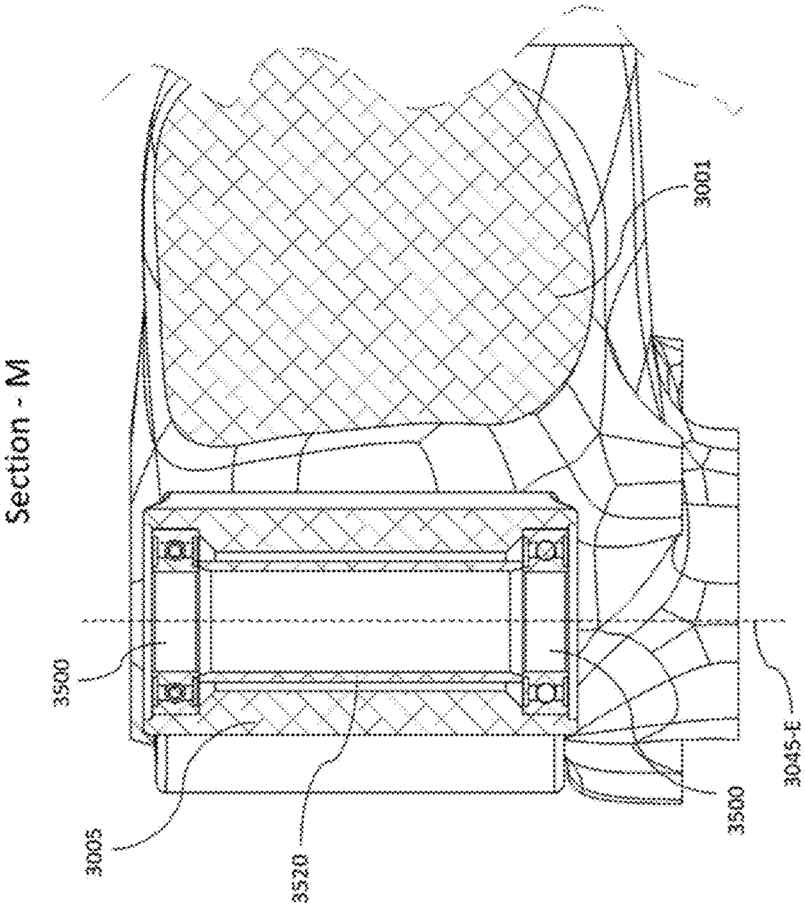
FIG. 3.14
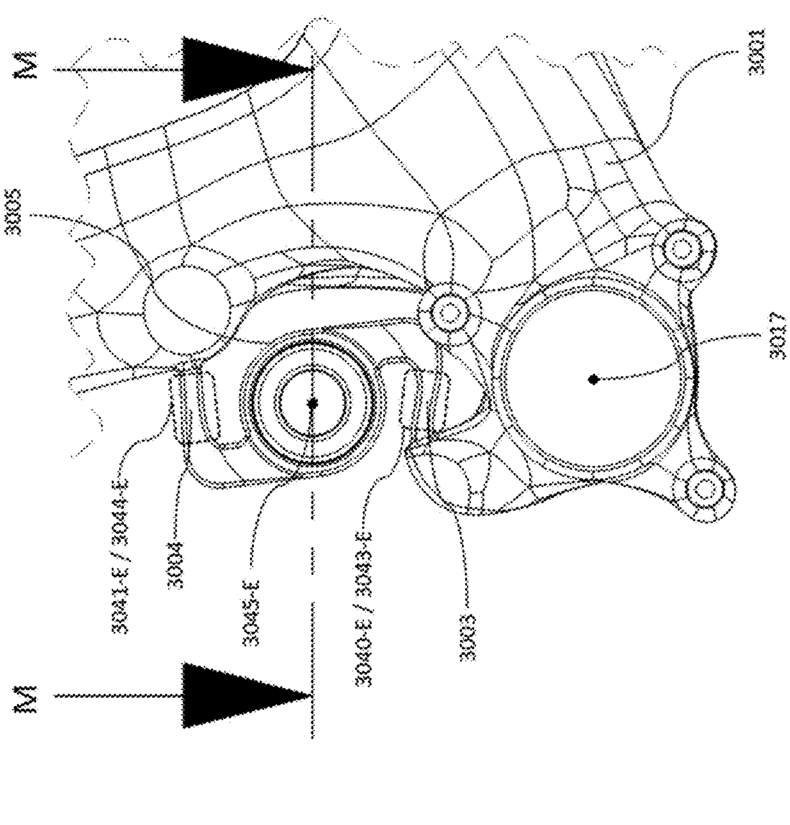
FIG. 3.13

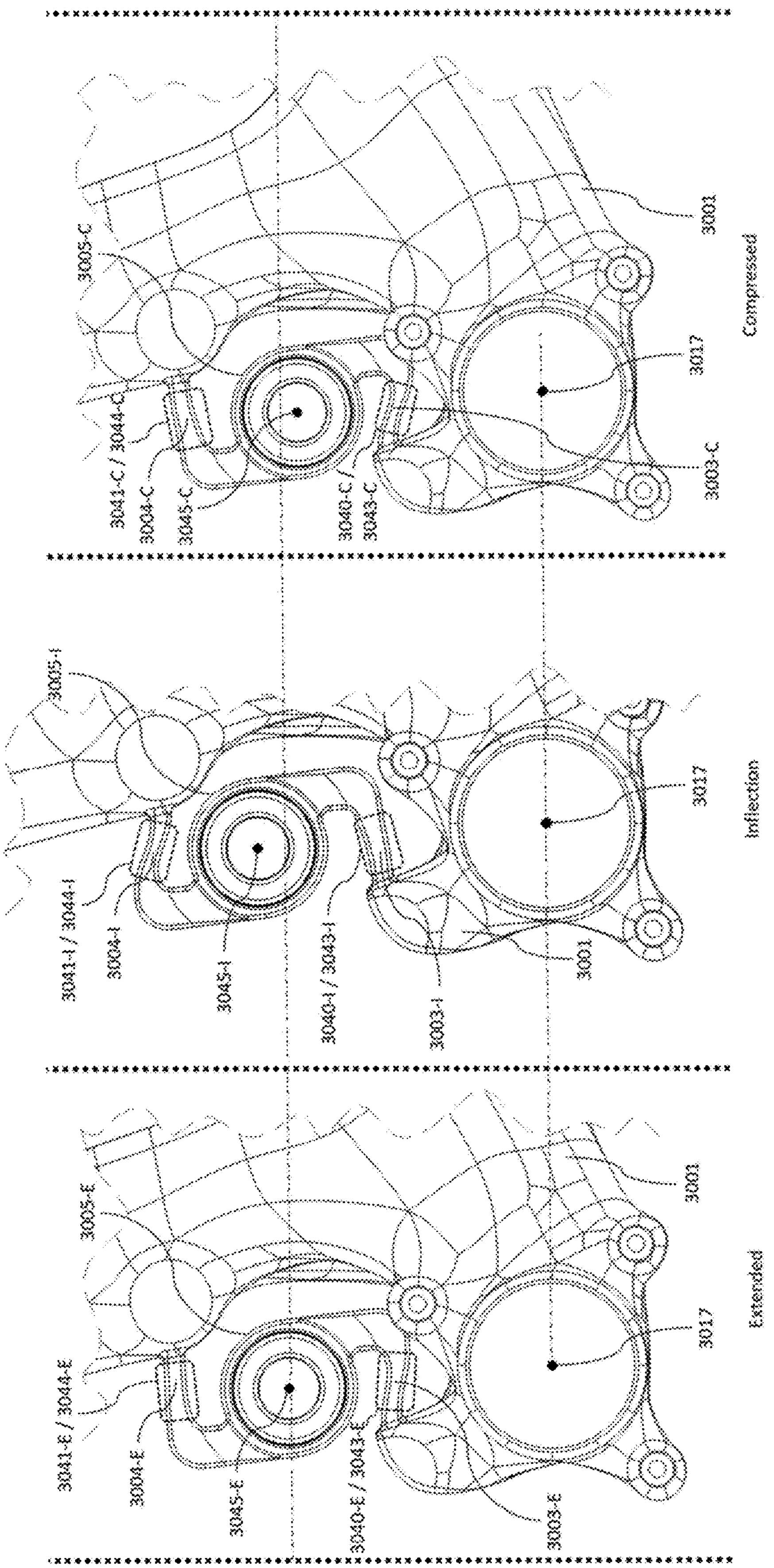
FIG. 3.15

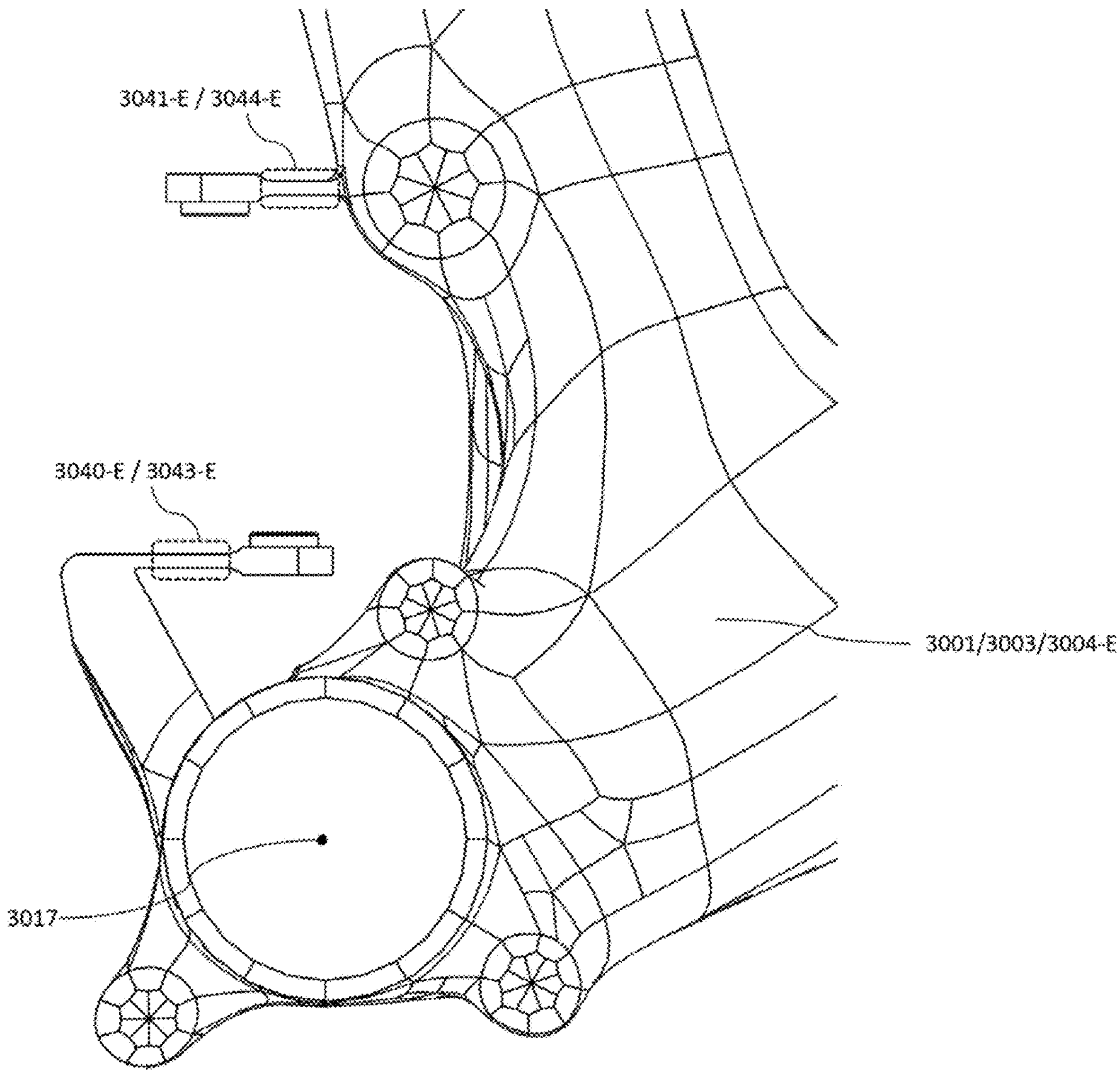
FIG. 3.16

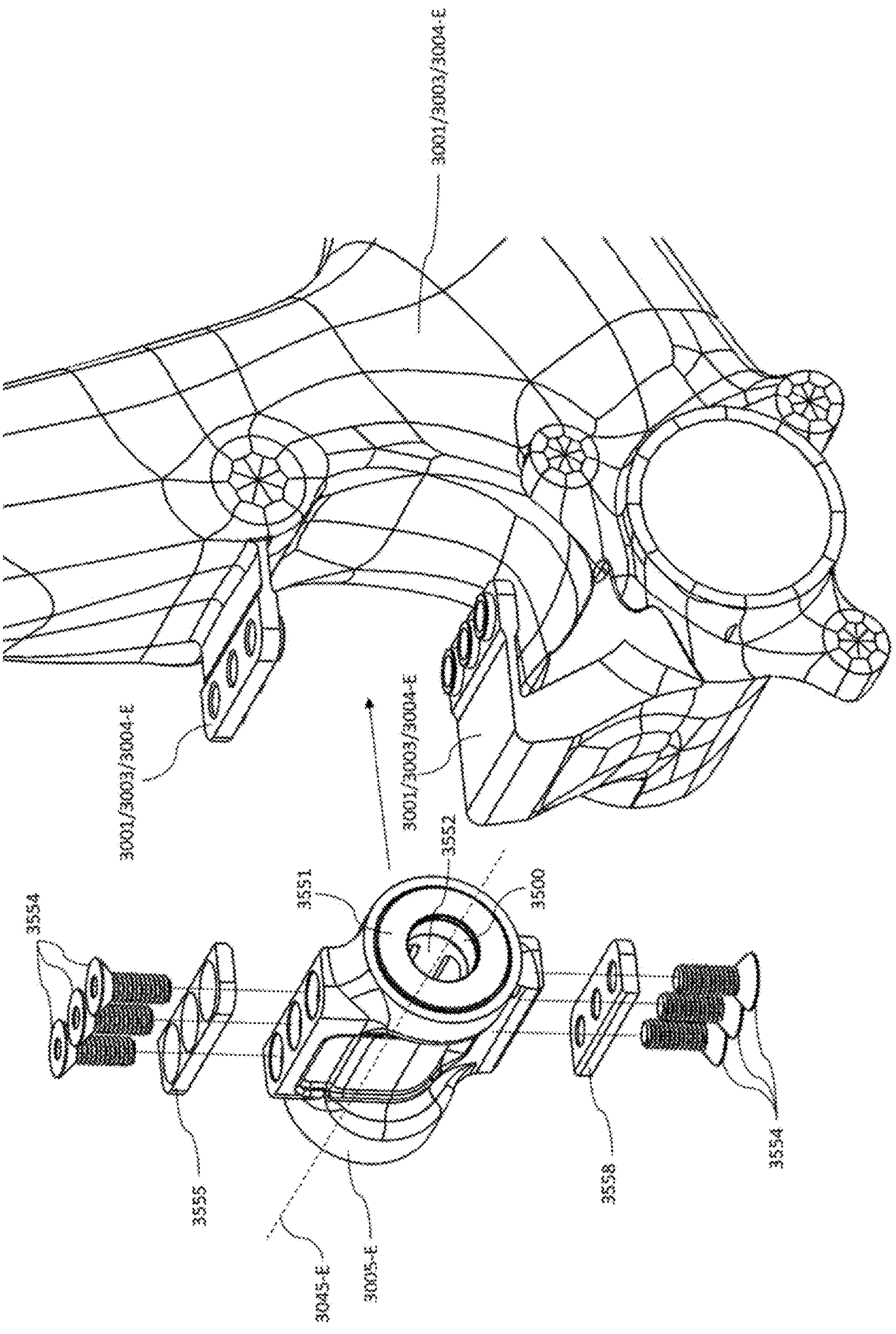
FIG. 3.17

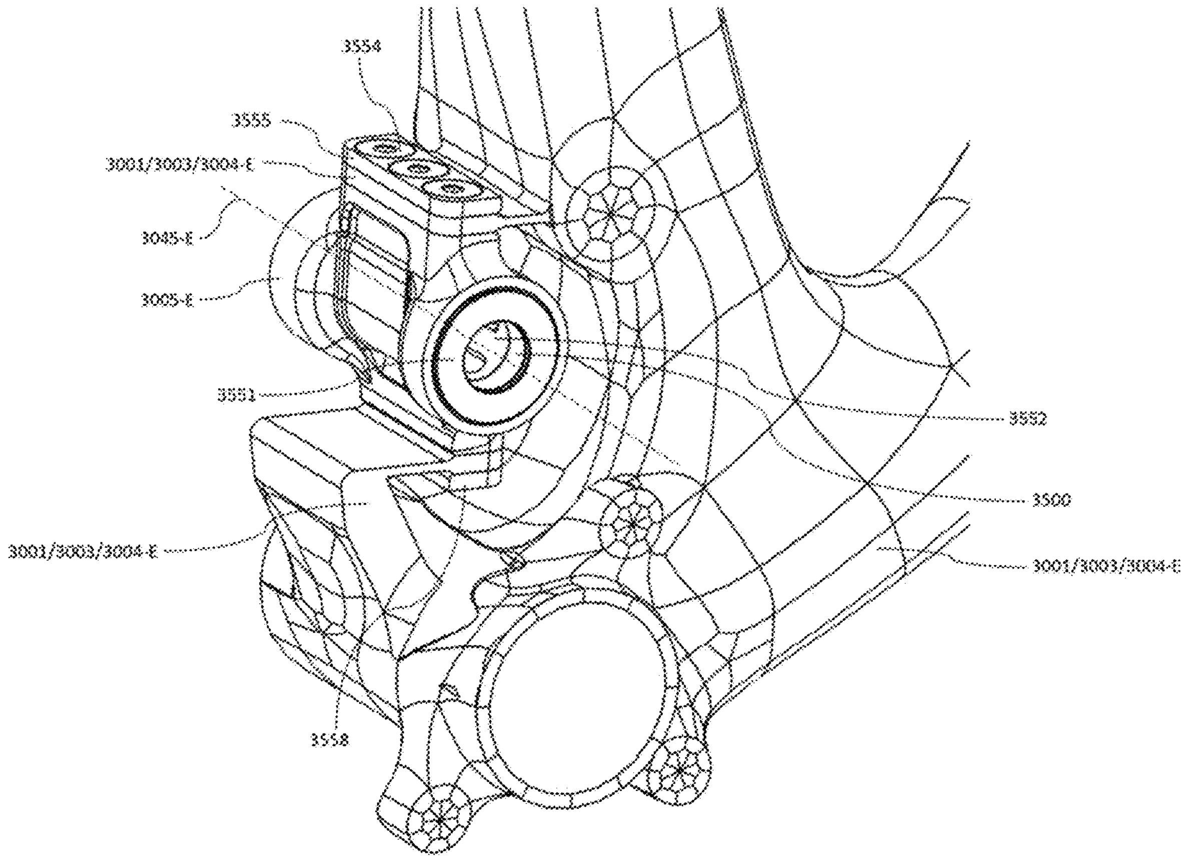
FIG. 3.18

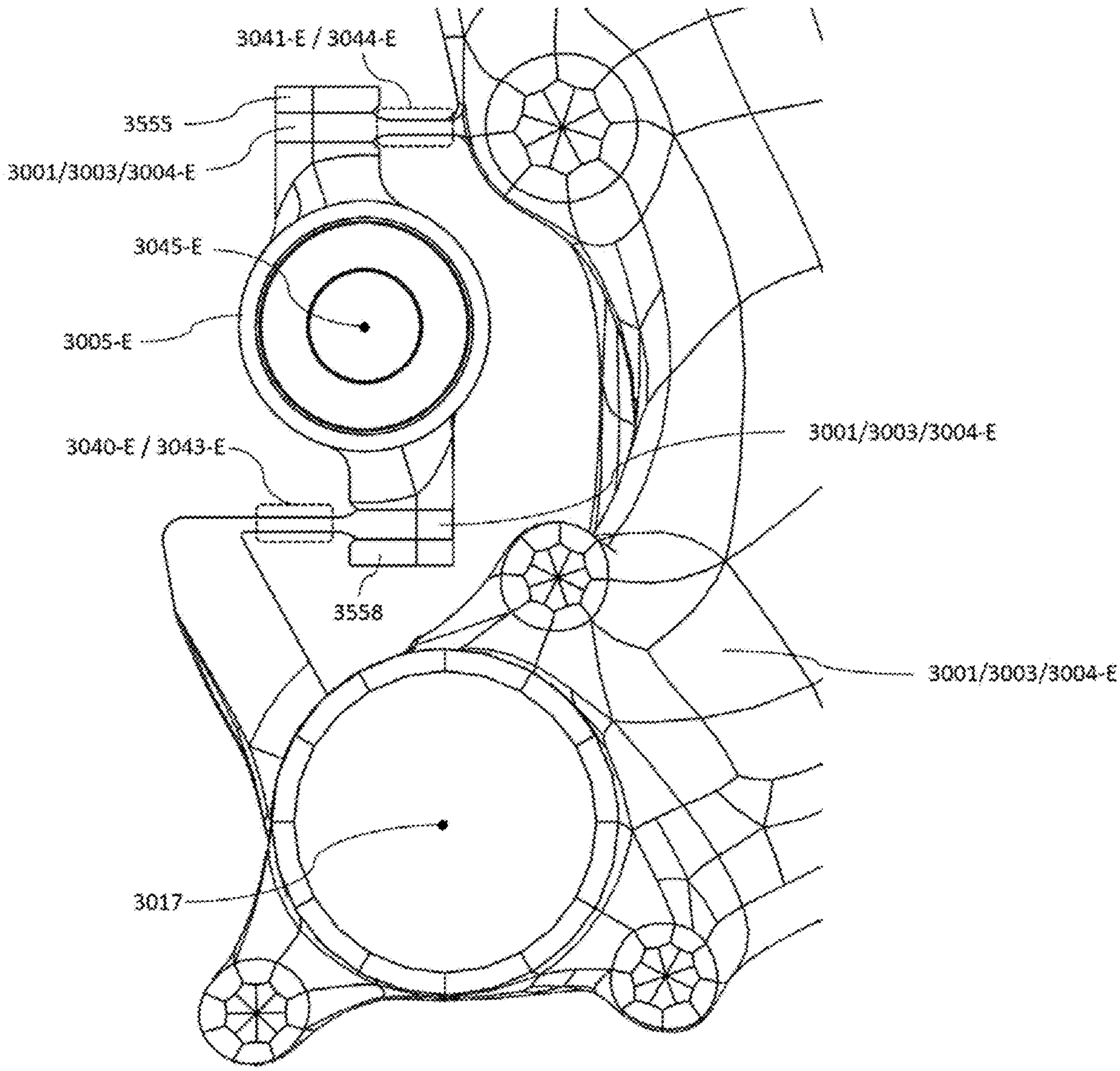
FIG. 3.19

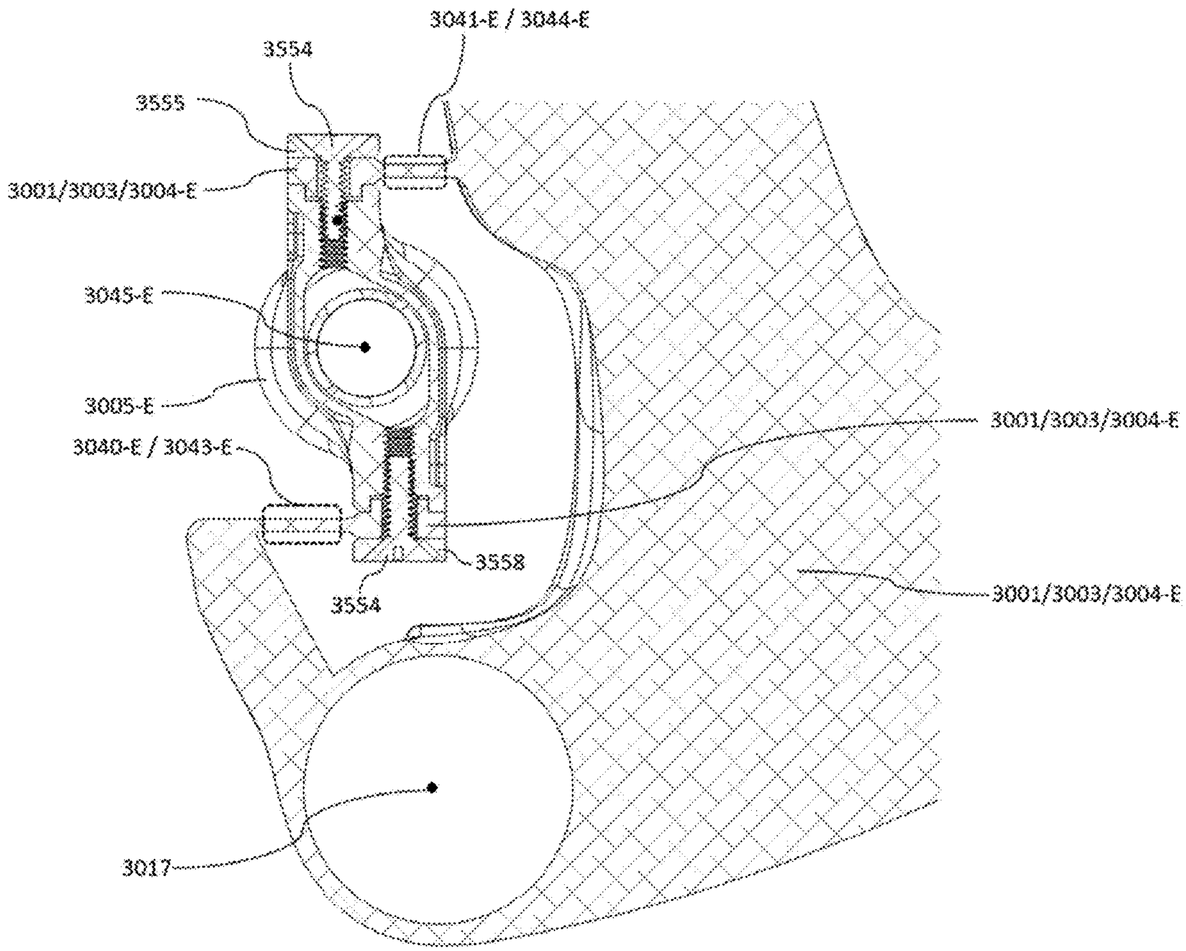
FIG. 3.20

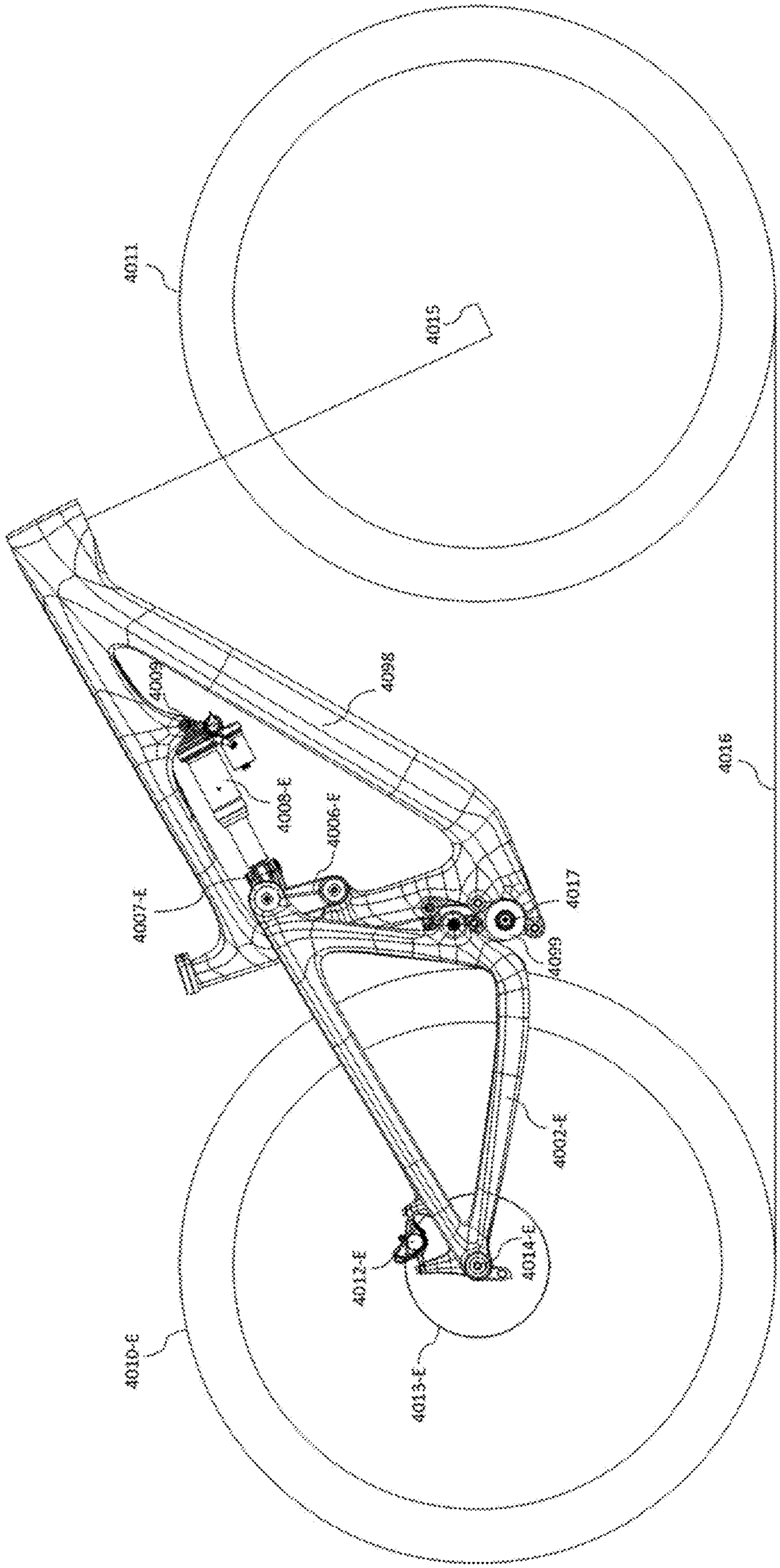
FIG. 4.1

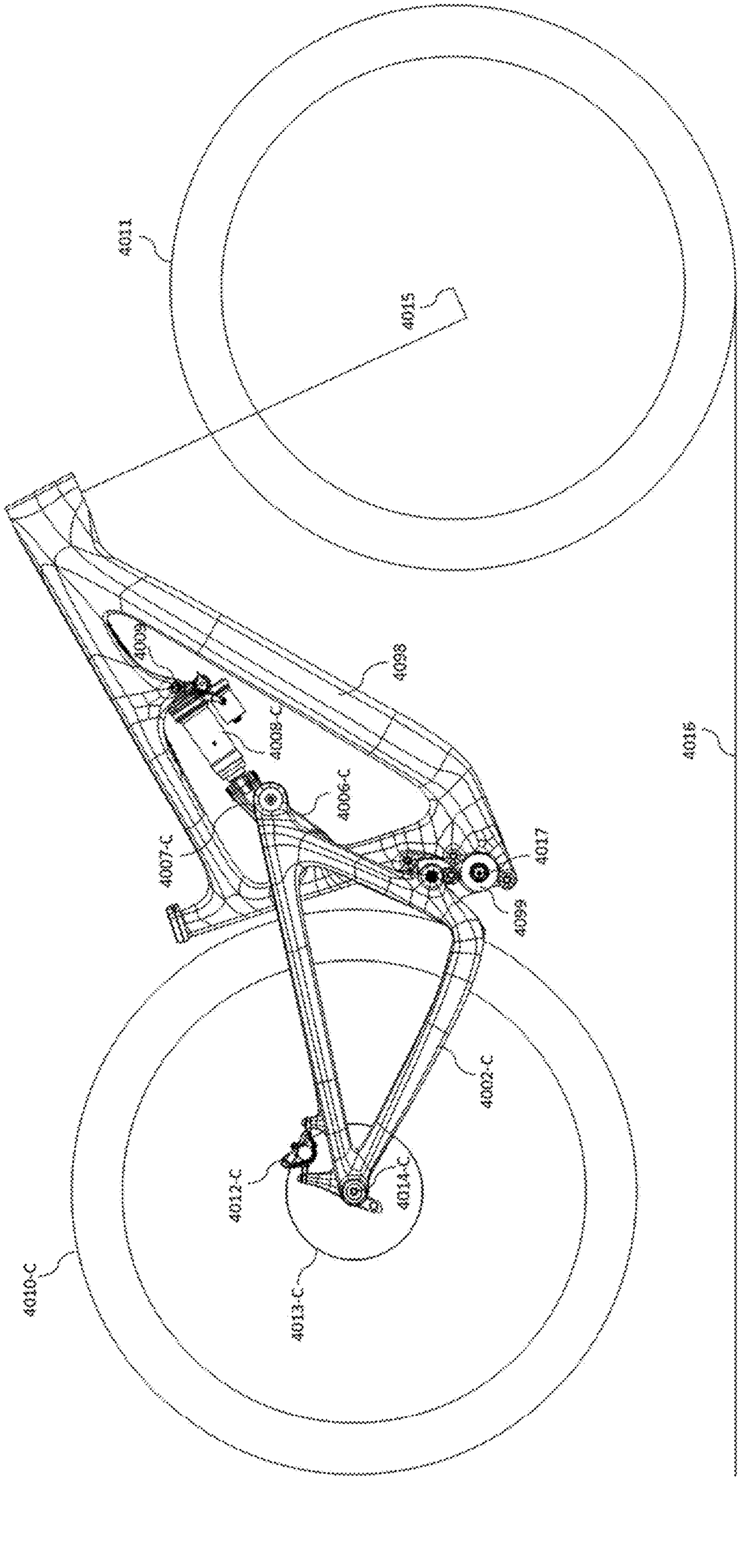
FIG. 4.2

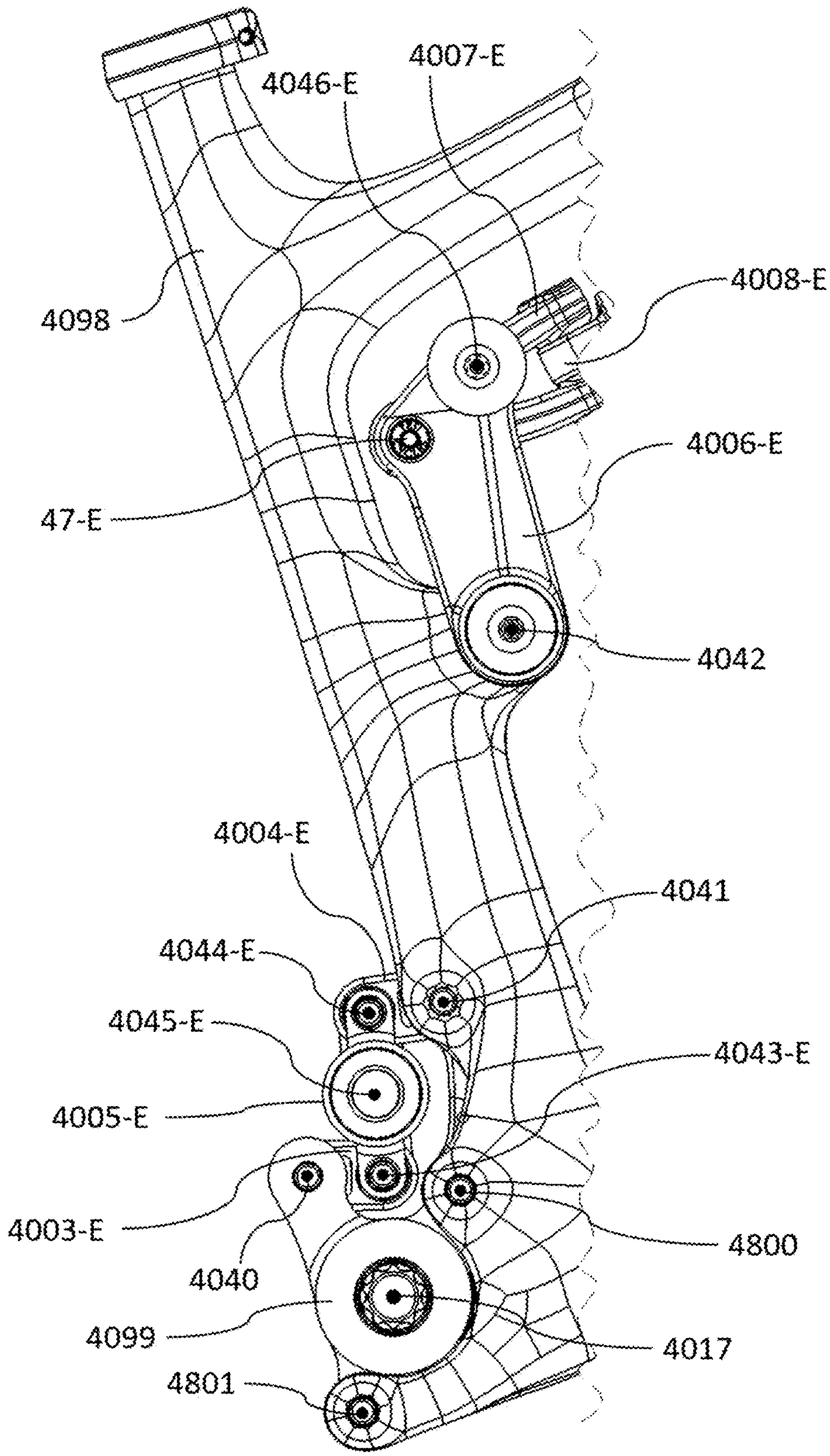
FIG. 4.3

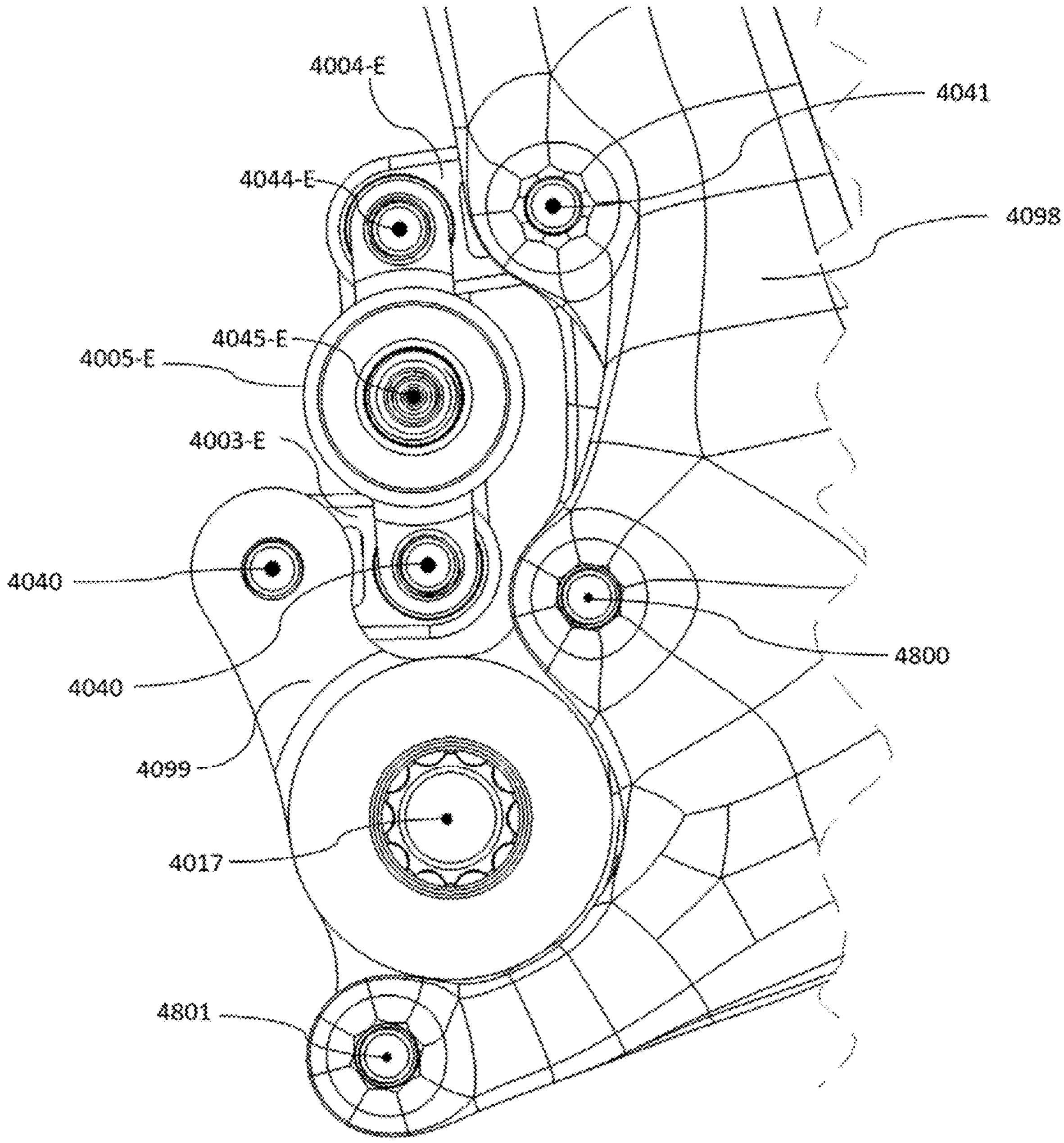
FIG. 4.4

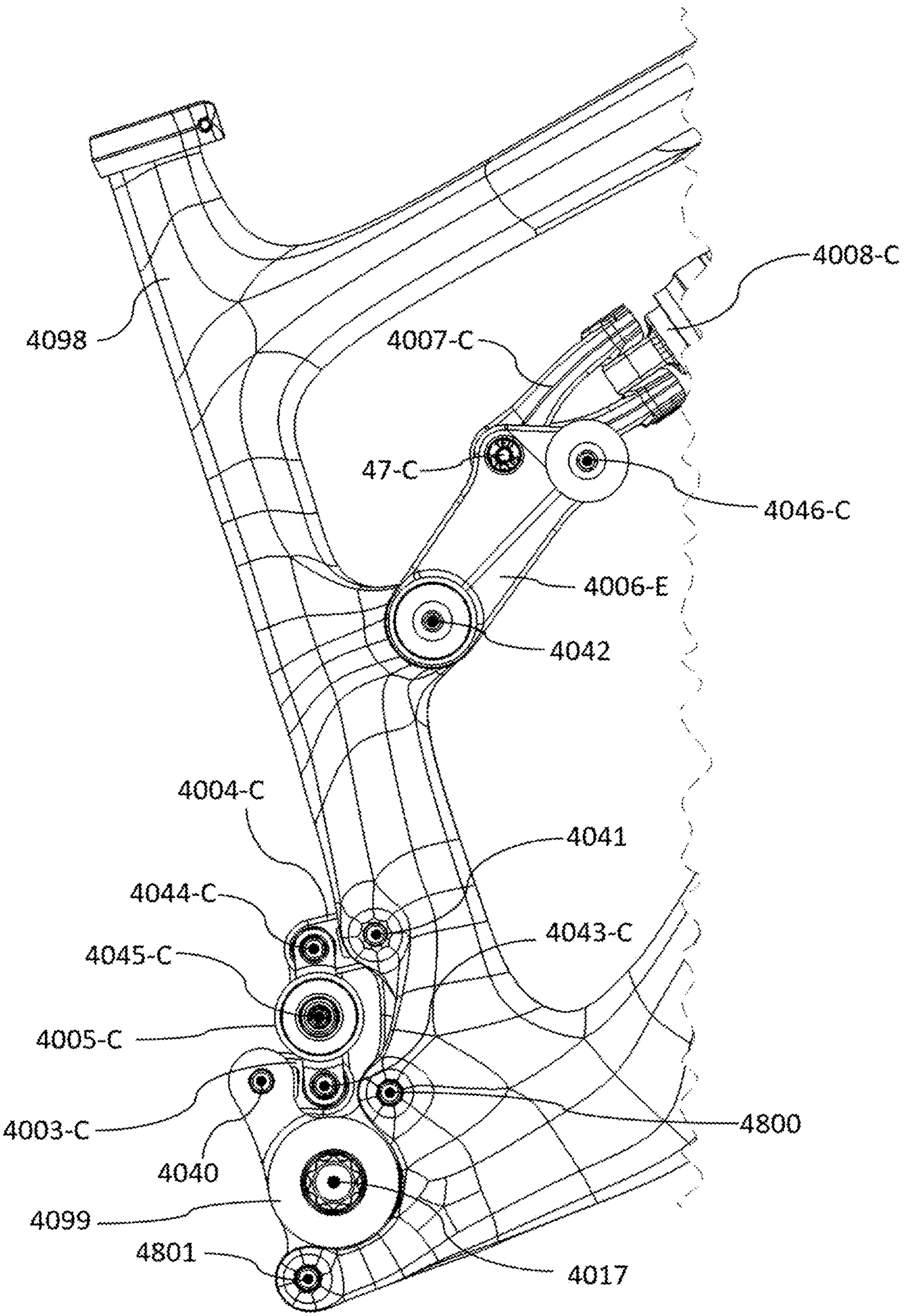
FIG. 4.5

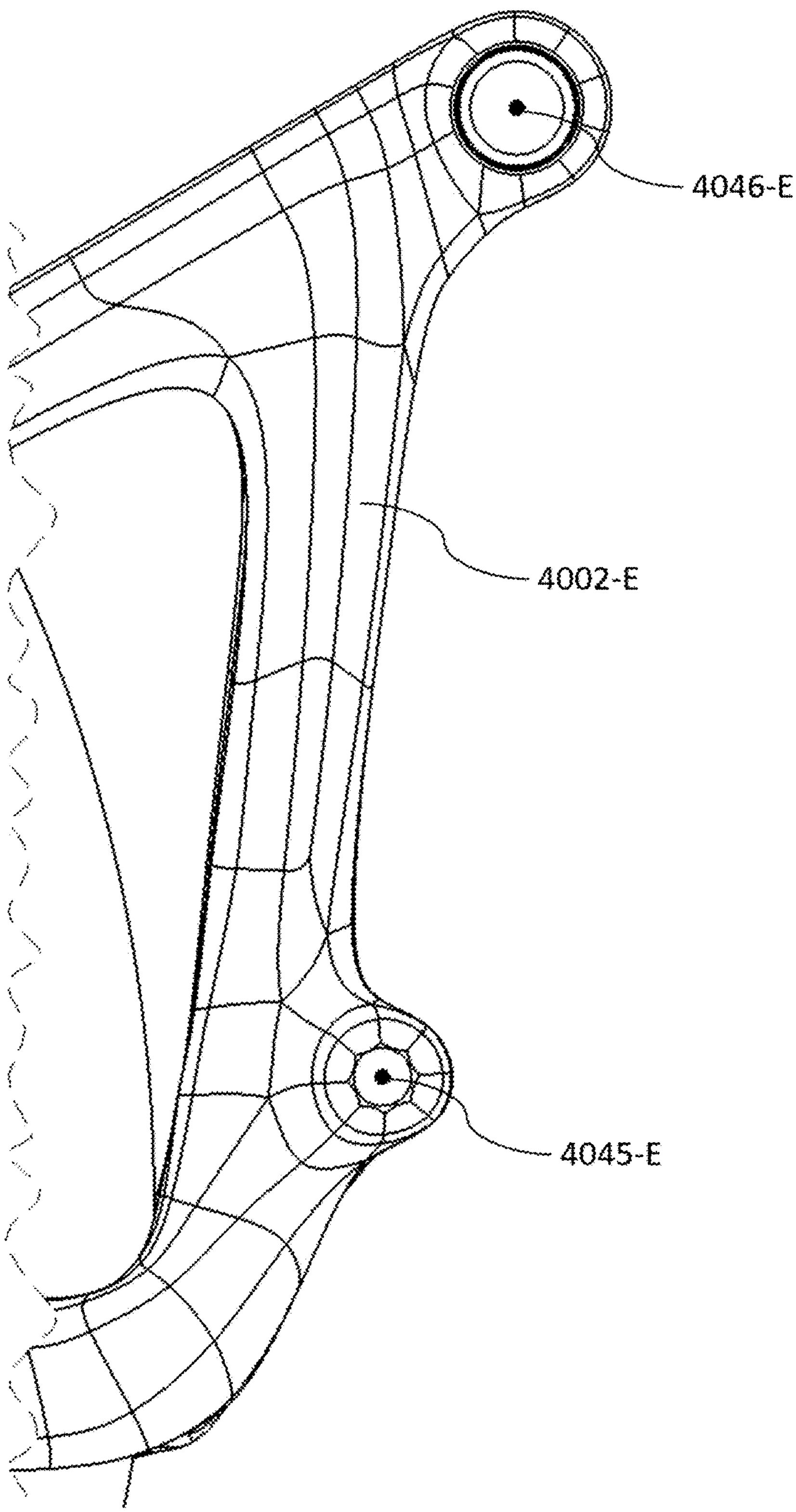
FIG. 4.6

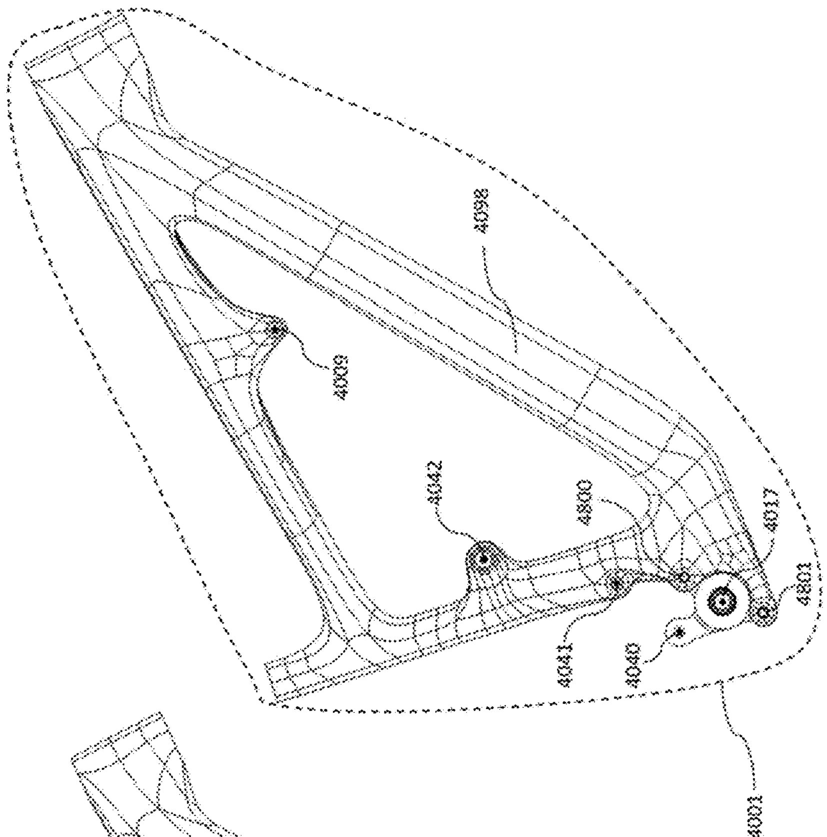
FIG. 4.8
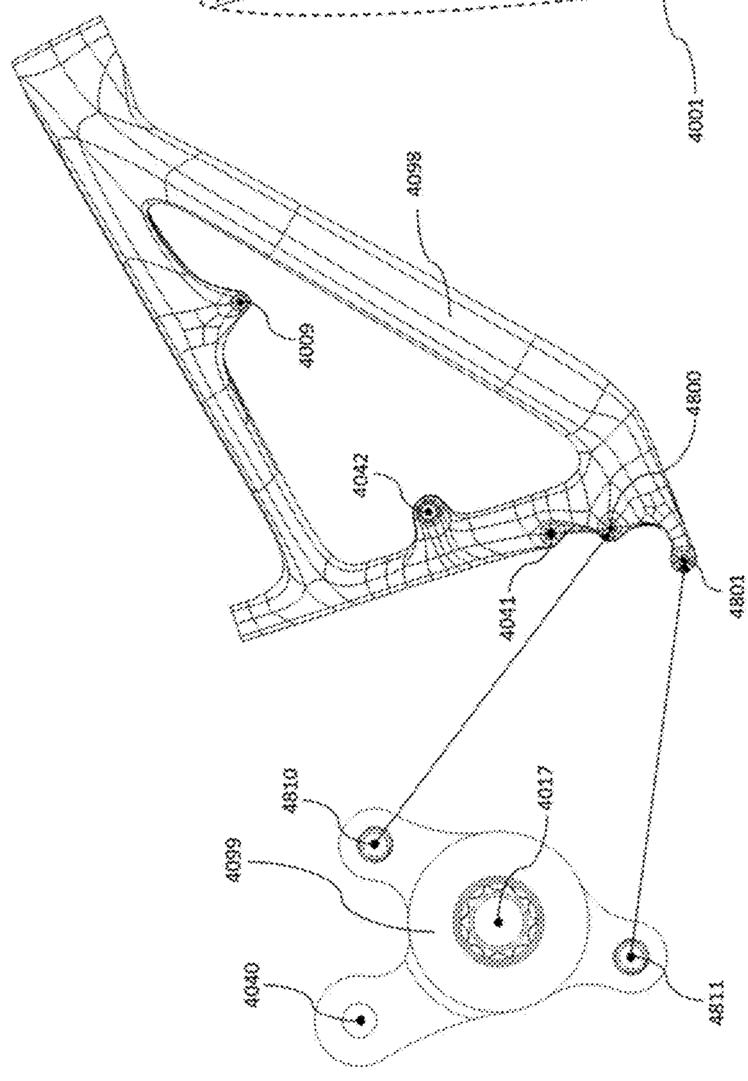
FIG. 4.7

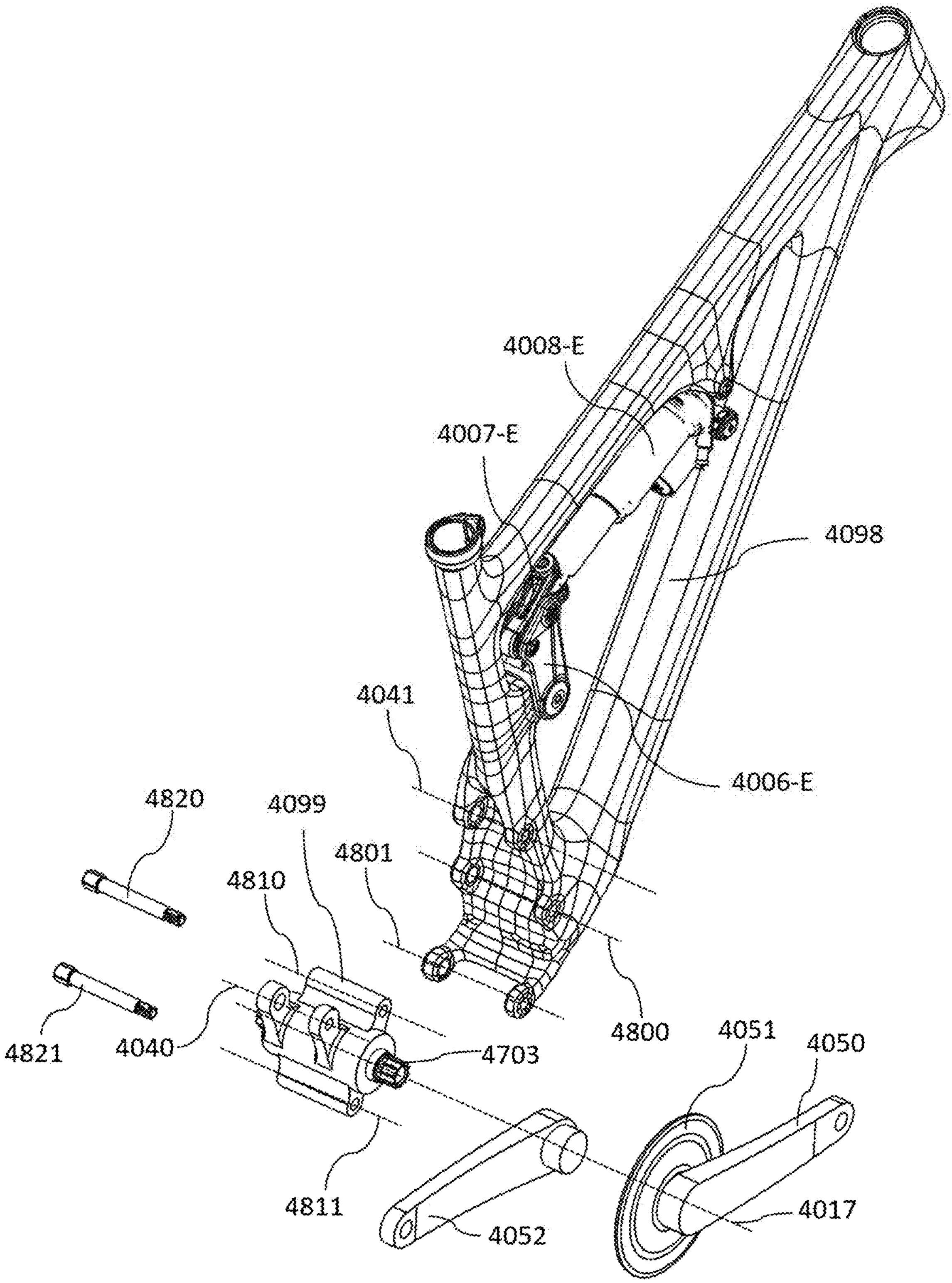
FIG. 4.9

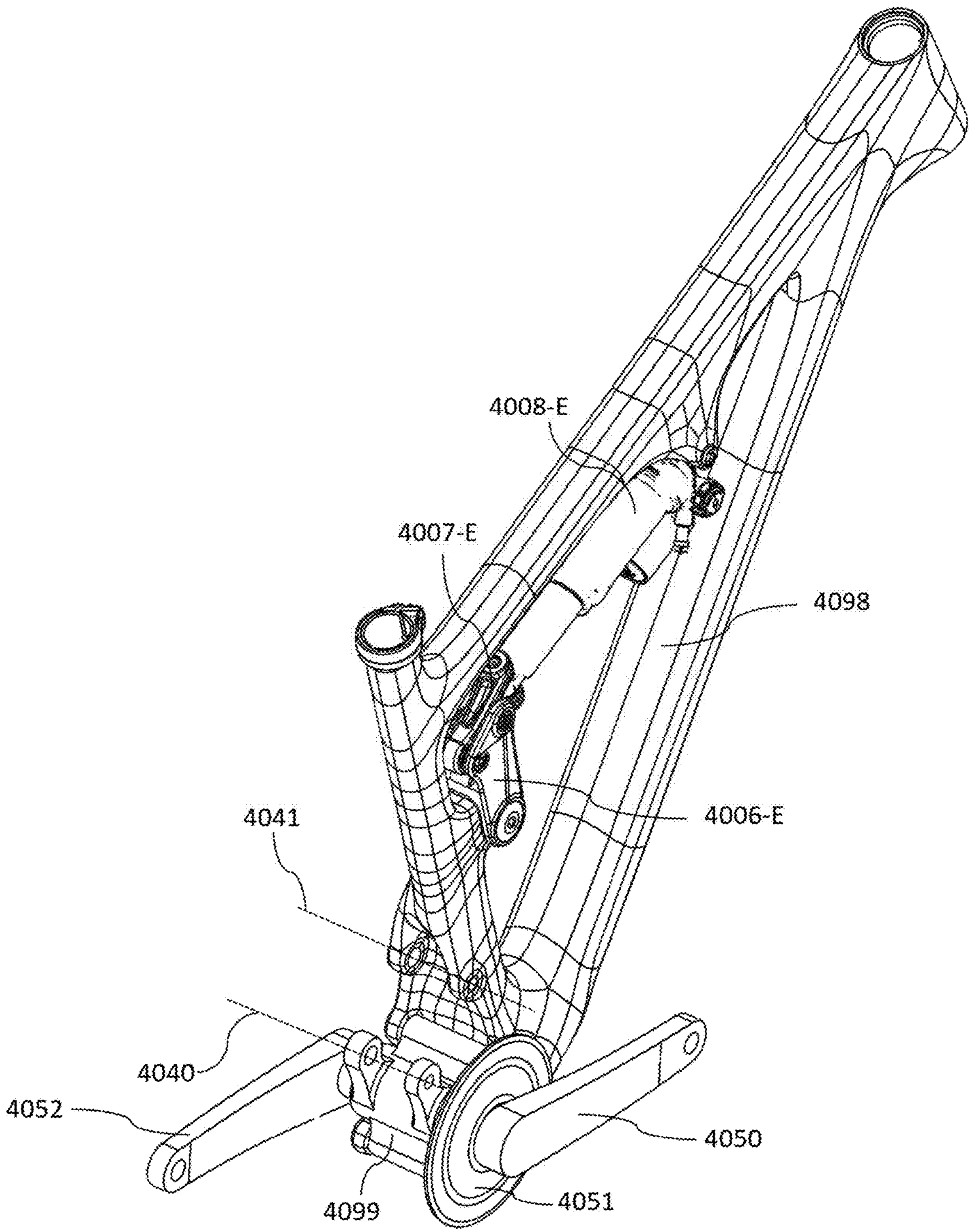
FIG. 4.10

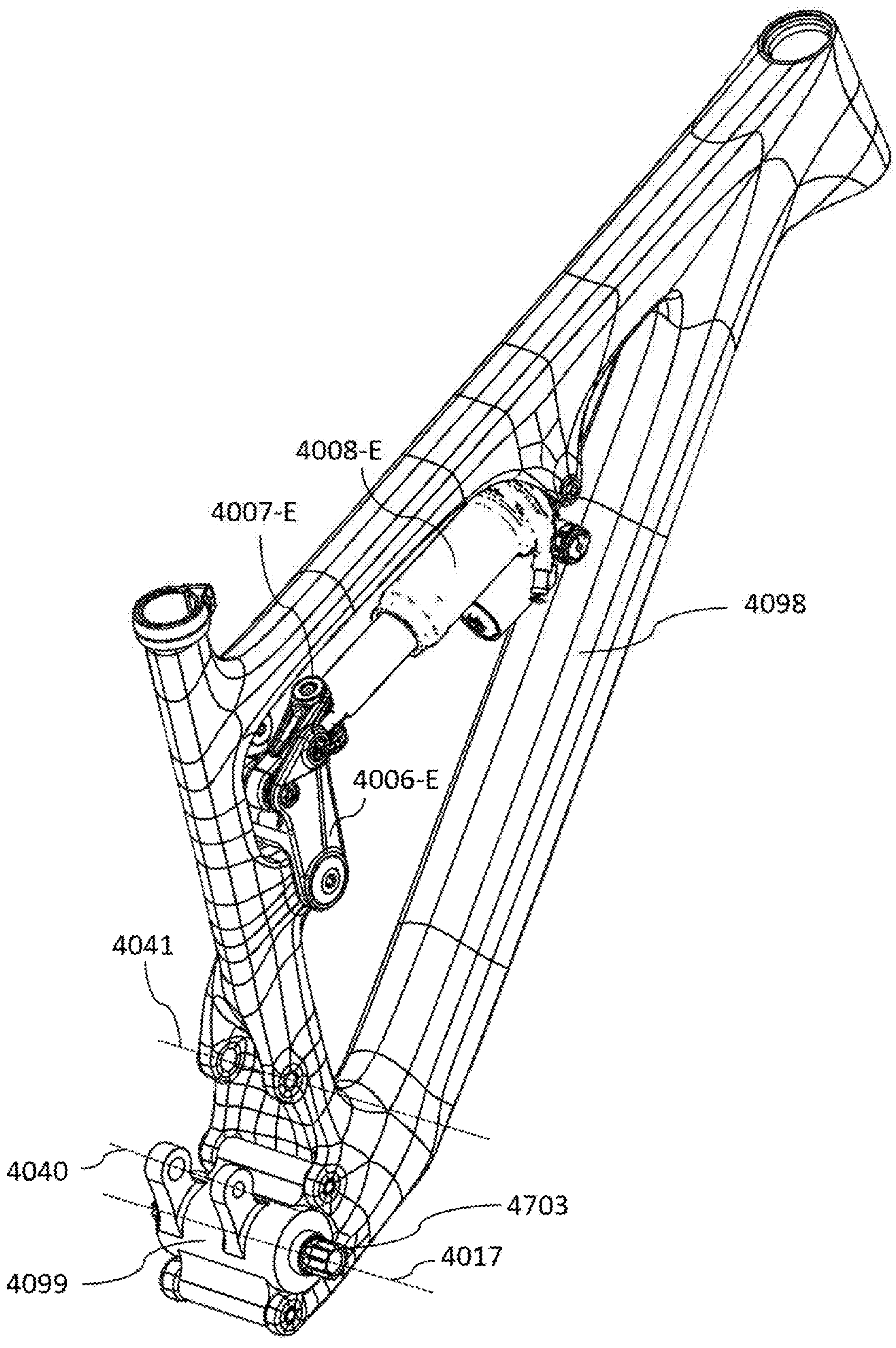
FIG. 4.11

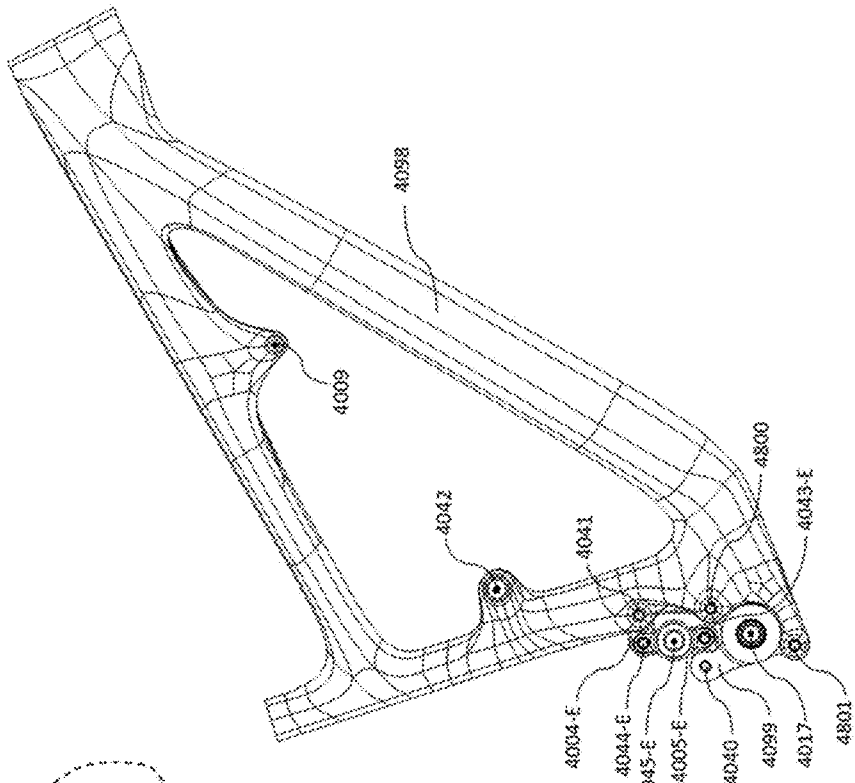
FIG. 4.13
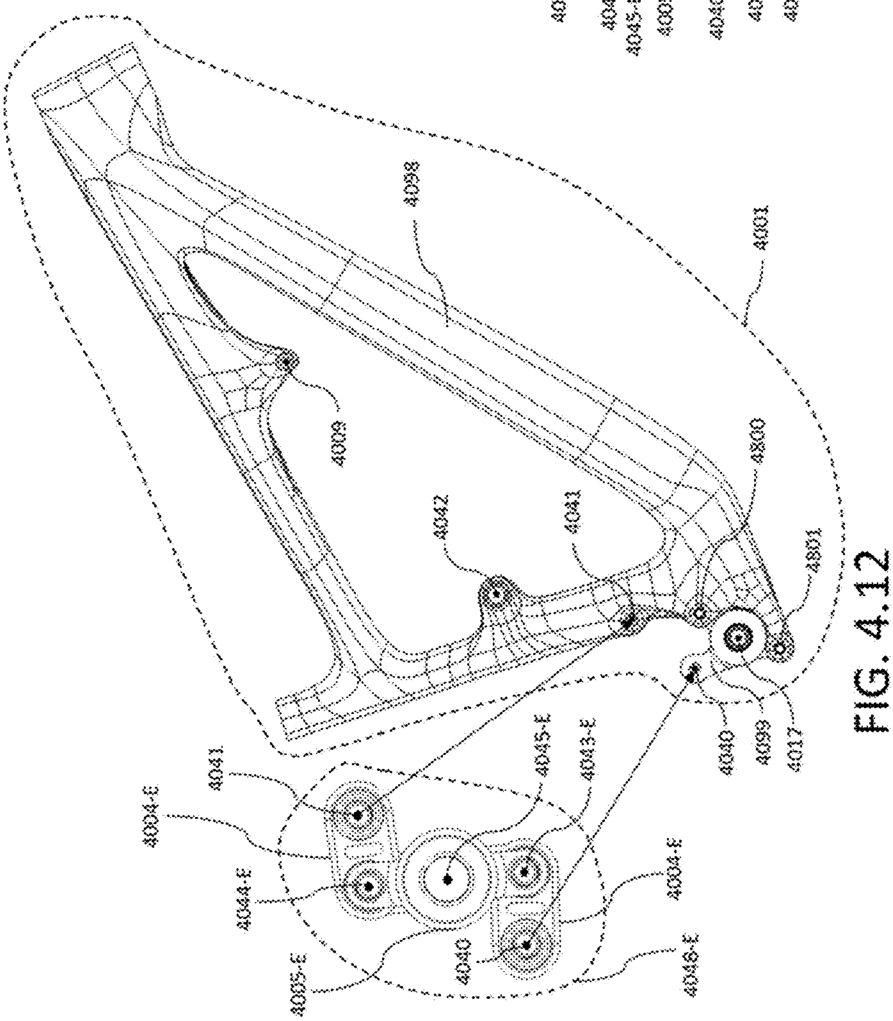
FIG. 4.12

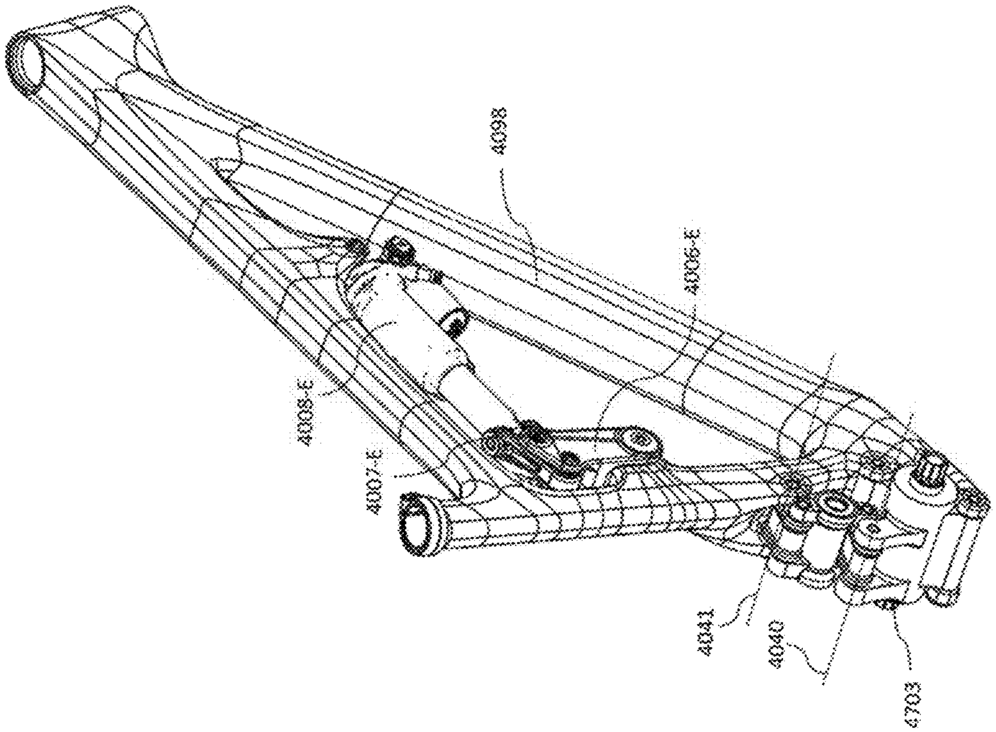
FIG. 4.15
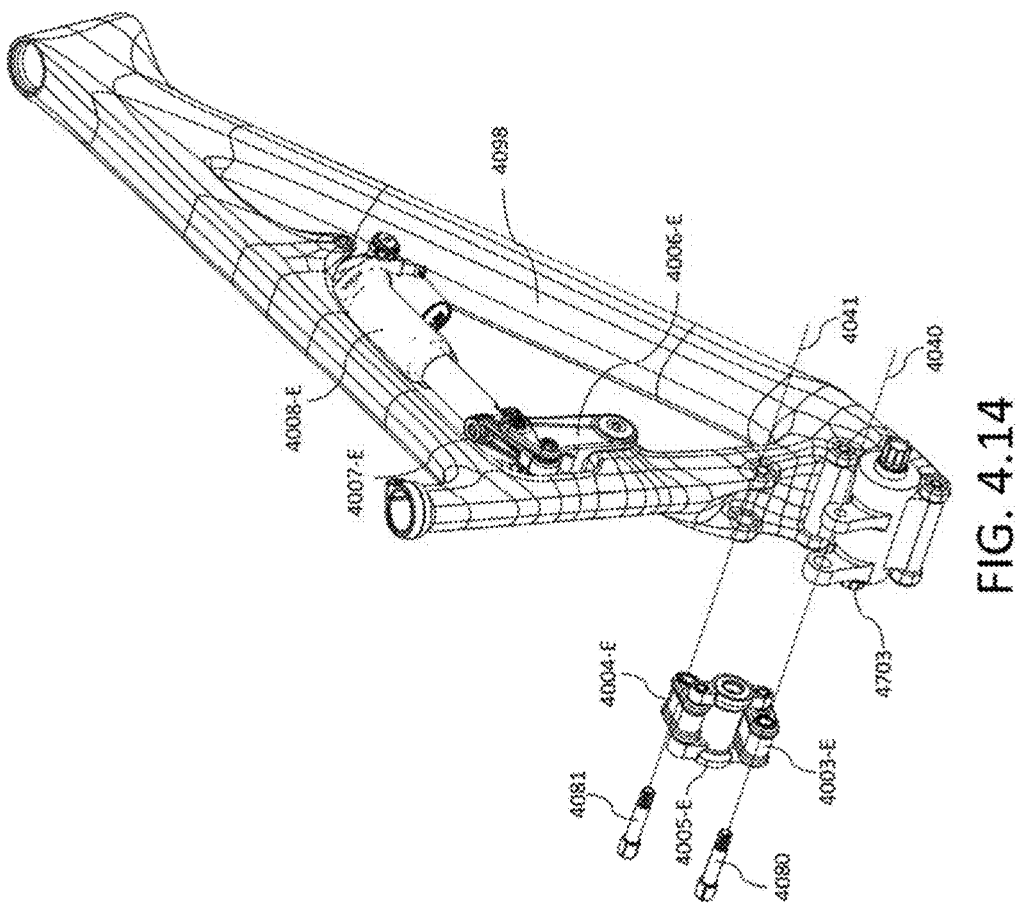
FIG. 4.14

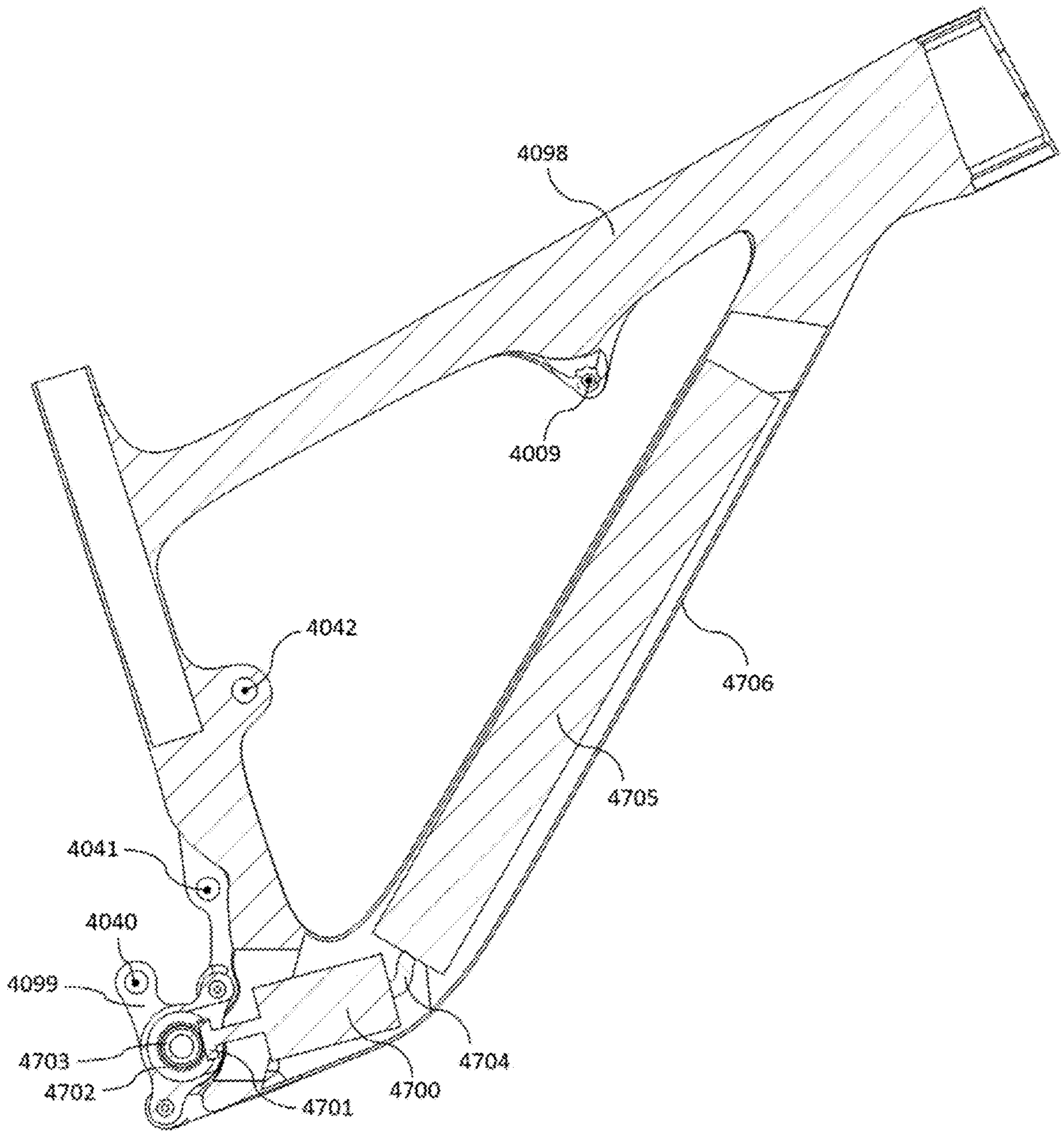
FIG. 4.16

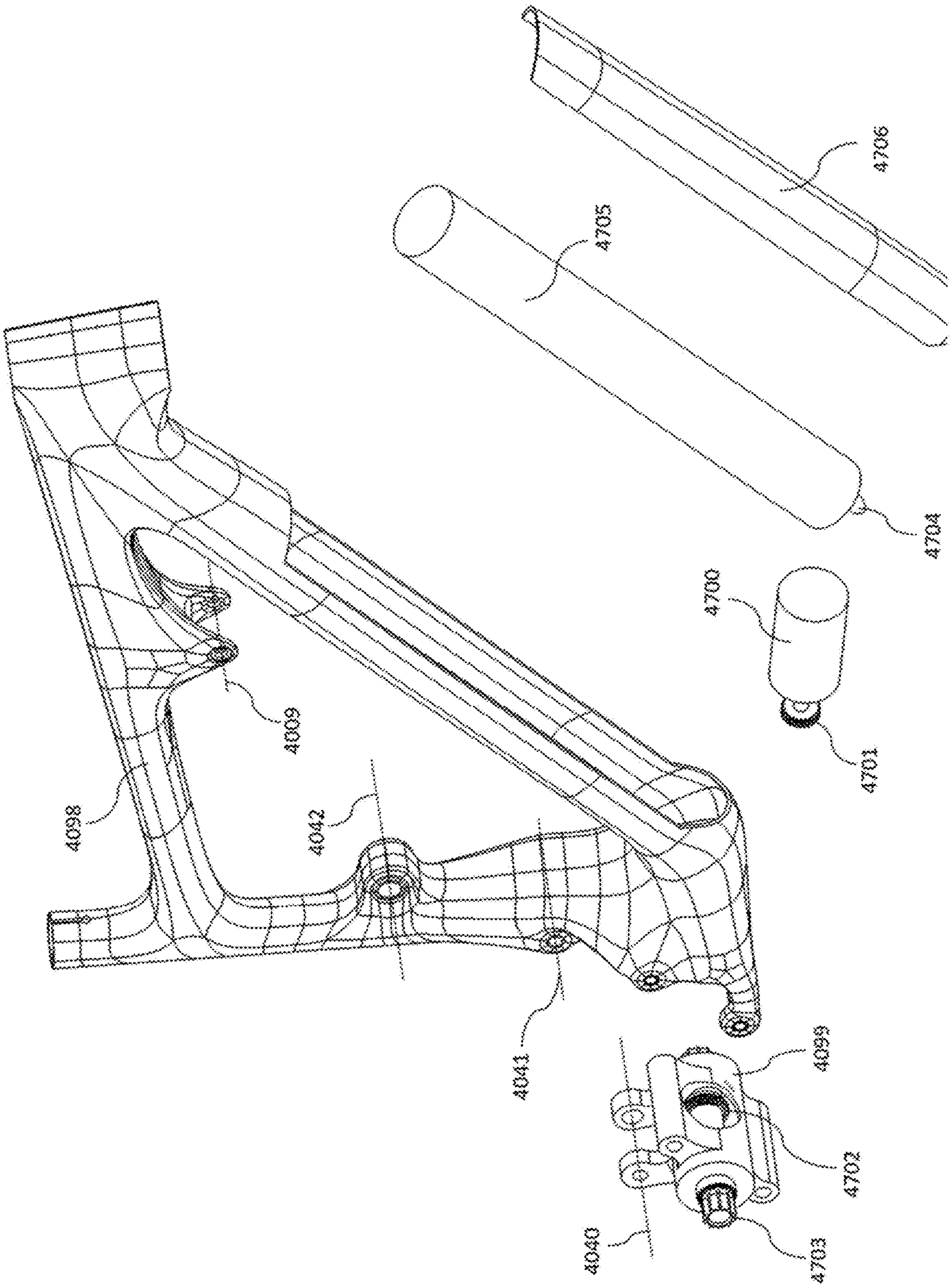
FIG. 4.17

MULTI-BODY VEHICLE SUSPENSION LINKAGE

RELATED APPLICATIONS

This application is a non-provisional application claiming priority to provisional applications including U.S. Provisional Patent Application No. 62/800,181 titled "Multi-Body Vehicle Suspension Linkage" and filed on Feb. 1, 2019; U.S. Provisional Patent Application No. 62/815,675 titled "Multi-Body Vehicle Suspension Linkage" filed on Mar. 8, 2019; U.S. Provisional Patent Application No. 62/833,496 titled "Multi-Body Vehicle Suspension Linkage" filed on Apr. 12, 2019; and U.S. Provisional Patent Application No. 62/867,169 titled, "Modular Multi-body Vehicle Suspension Linkage" filed on Jun. 26, 2019; and U.S. Provisional Patent Application No. 62/894,469 titled, "Multi-body Vehicle Suspension Linkage" filed on Aug. 30, 2019; each of which are incorporated herein by reference in its respective entirety.

TECHNICAL FIELD

The technology described herein relates to vehicle suspension systems, specifically, to linkages within a vehicle suspension system.

BACKGROUND

Vehicle suspension terminology depends upon the reference frame considered. Consider a static vehicle that has two wheels, each of which are supported by the ground and a suspended body, which is operatively coupled to each wheel. In a two-wheel vehicle, such as a bicycle, electric bicycle or pedelec or motorcycle, etc. there is typically one rear wheel known as the driven wheel, which includes a driven cog. There is also one front wheel. A driving cog is operatively coupled to the suspended body. A driving chain or belt connects the driven cog and the driving cog. The driving cog, which is connected to the driven cog via the driving chain/belt, is rotated by a crank under human power, or by a motor, or by combined motor and human power. The reaction of the driven wheel and the ground causes the vehicle to accelerate forward, or in the general direction from the rear wheel to the front wheel. Rearward is then defined as the general direction from the front wheel to the rear wheel.

A linkage operatively couples the suspended body and the driven wheel. A linkage may be composed of multiple bodies (often referred to as links or members) that are operatively coupled to each other in a manner that allows the bodies to flex, cam, rotate or translate relative to one another. The linkage constrains the movement in which the driven wheel and brake may travel relative to the suspended body. A combination of damper(s) and/or spring(s) is/are typically arranged to react to relative motion between the suspended body and the driven wheel. The linkage is highly responsible for the vehicle's dynamic response to acceleration and deceleration as well as the mechanical advantage over the shock/damper.

With a typical 4-bar linkage rear suspension system, the acceleration response, the deceleration response, and the mechanical advantage over the shock/damper are significantly dependent upon one another. This makes it difficult to optimize all three, and as a result these designs result in compromise in the quality of the ride.

The information included in this Background section of the specification, including any references cited herein and any description or discussion thereof, is included for technical reference purposes and is not to be regarded subject matter by which the scope of the invention as defined in the claims is to be bound.

SUMMARY

The technology disclosed herein relates to vehicle suspension linkages. In one embodiment, a two-wheel vehicle suspension linkage is provided. The suspension includes a suspended body-1, a swingarm body-2, a link body-3, a link body-4, a link body-5, and a link body-6 operatively coupled with one another. The link body-3 includes jointed connections with the suspended body-1 defining a IVC[1][3], and the link body-5 defining an IVC[3][5]. The link body-4 includes jointed connections with the suspended body-1 defining an IVC[1][4], and the link body-5 defining an IVC[4][5]. The link body-5 includes an additional jointed connection with swingarm body-2 defining an IVC[2][5]. The link body-6 includes jointed connections with the suspended body-1 defining an IVC[1][6], and the swingarm body-2 defining an IVC[2][6]. IVC[2][5] is not common with IVC[3][5] or IVC[4][5]. Suspended body-1, link body-3, link body-4 and link body-5 are arranged in a Watts 4-bar configuration. This arrangement defines seven "physical" IVCs known as PIVCs: PIVC[1][3], PIVC[1][4], PIVC[1][6], PIVC[3][5], PIVC[4][5], PIVC[2][5], PIVC[2][6]; which are further explained in the spec. The suspension includes a damper unit configured to resist movement between two or more of the suspended body-1, swingarm body-2, link body-3, link body-4, link body-5, or link body-6. The damper unit may include an extension body or bodies to increase its effective length.

In yet another embodiment, a two-wheel vehicle suspension linkage is provided. The suspension includes a suspended body-1, a swingarm body-2, a link body-3, a link body-4, a link body-5, and a link body-6 operatively coupled with one another. The link body-3 includes jointed connections with the suspended body-1 defining an IVC[1][3], and the link body-5 defining an IVC[3][5]. The link body-4 includes jointed connections with the suspended body-1 defining an IVC[1][4], and the link body-5 defining an IVC[4][5]. The link body-5 includes an additional jointed connection with swingarm body-2 defining an IVC[2][5]. The link body-6 includes jointed connections with the suspended body-1 defining an IVC[1][6], and the swingarm body-2 defining an IVC[2][6]. IVC[2][5] is not common with IVC[3][5] or IVC[4][5]. Suspended body-1, link body-3, link body-4 and link body-5 are arranged in a Chebushev 4-bar configuration. This arrangement defines seven PIVCs: PIVC[1][3], PIVC[1][4], PIVC[1][6], PIVC[3][5], PIVC[4][5], PIVC[2][5], PIVC[2][6]. The suspension includes a damper unit configured to resist movement between two or more of the suspended body-1, swingarm body-2, link body-3, link body-4, link body-5, or link body-6. The migration path of PIVC[2][5] defined from a fully extended to fully compressed state has curvature that inflects. The suspension includes a damper unit configured to resist movement between two or more of the suspended body-1, swingarm body-2, link body-3, link body-4, link body-5, or link body-6. The damper unit may include an extension body or bodies to increase its effective length.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In one aspect, migration paths of PIVC[2][5], PIVC[3][5], and PIVC[4][5] reverse as the suspension moves from the extended state at least partially to the compressed state.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In one aspect, the migration path of PIVC[2][5] defined from a fully extended to fully compressed state has curvature greater than 0 and a minimum radius of curvature greater than 1,000 mm. In another aspect, the migration path of PIVC[2][5] defined from a fully extended to fully compressed state has curvature greater than 0 and a minimum radius of curvature greater than 10,000 mm. In another aspect, the migration path of PIVC[2][5] defined from a fully extended to fully compressed state has curvature greater than 0 and a minimum radius of curvature greater than 100,000 mm. In another aspect, the migration path of PIVC[2][5] defined from a fully extended to fully compressed state has curvature greater than 0 and a minimum radius of curvature greater than 200,000 mm. In another aspect, the migration path of PIVC[2][5] defined from a fully extended to fully compressed state has curvature greater than 0 and a minimum radius of curvature greater than 300,000 mm. In another aspect, the migration path of PIVC[2][5] defined from a fully extended to fully compressed state has curvature greater than 0 and a minimum radius of curvature greater than 400,000 mm.

Various exemplary aspects of the embodiments described above are provided. Each of these aspects can be additionally or alternatively applied to each of the embodiments discussed above in the summary. In other configurations, each of these aspects can be absent from each of the embodiments discussed above in the summary. In one aspect, the curvature of migration path of PIVC[2][5] defined from a fully extended to fully compressed state has an inflection point. In another aspect, the radius of curvature of the migration path of PIVC[2][5] increases and then decreases from one end of the path to the other. In another aspect, the migration path of PIVC[2][5] defined from a fully extended to fully compressed state is located within the area of a circle with a diameter of 200 mm centered at the driving cog axis. In another aspect, the migration path of PIVC[2][5] defined from a fully extended to fully compressed state is located within the area of a circle with a diameter of 300 mm centered at the driving cog axis. In another aspect, the migration path of PIVC[2][5] defined from a fully extended to fully compressed state is located within the area of a circle with a diameter of 400 mm centered at the driving cog axis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 1.1 shows a simple line diagram of embodiment 1 of a 6-bar linkage of the disclosed suspension system in the extended state.

FIG. 1.2 shows a simple line diagram of suspended body-1 and link body 6 of embodiment 1 in the extended state, separated for clarity.

FIG. 1.3A shows a simple line diagram of suspended body-1, link body-3, link body-4 and link body-5 of embodiment 1 in the extended state, separated for clarity.

FIG. 1.3B shows an isolated view of lower linkage.

FIG. 1.4 shows a simple line diagram of suspended body-1, link body-3, link body-4, and link body-5 of embodiment 1 in the extended state, with swingarm body-2 separated for clarity.

FIG. 1.5 shows a simple line diagram of embodiment 1 at the point of inflection for link body-3, link body-4, and link body-5.

FIG. 1.6 shows a simple line diagram of embodiment 1 of a 6-bar linkage of the disclosed suspension system in the compressed state.

FIG. 1.7 shows a simple line diagram of embodiment 1 of a 6-bar linkage of the disclosed suspension system with extended, inflection, and compressed states overlaid, and a detailed view area defined for FIG. 1.8.

FIG. 1.8 shows the detailed view area of embodiment 1 defined in FIG. 1.7, in extended, inflection, and compressed states.

FIG. 1.9 shows embodiment 1 in the extended state.

FIG. 1.10 shows embodiment 1 in the compressed state.

FIG. 1.11A shows embodiment 1 in the extended state with the swingarm hidden for clarity.

FIG. 1.11B shows and alternate to embodiment 1 in the extended state with the swingarm hidden for clarity.

FIG. 1.12 shows embodiment 1 in the compressed state with the swingarm hidden for clarity.

FIG. 1.13 shows a detailed isometric view of linkage members 1, 3, 4, and 5 of a 6-bar linkage of embodiment 1 in the extended state with the swingarm hidden for clarity.

FIG. 1.14A shows a detailed, exploded, isometric view of linkage members 1, 3, 4, and 5 and associated mounting hardware of embodiment 1 in the extended state with the swingarm hidden for clarity.

FIG. 1.14B shows a detailed, exploded, isometric view of linkage members 1, 3, 4, and 5 and associated mounting hardware of and alternate to embodiment 1 in the extended state with the swingarm hidden for clarity.

FIG. 1.15 shows existing art of a 4-bar suspension system in its extended state used for comparison of component envelopes in FIGS. 1.16, 1.17, 1.18, 2.15, and 2.16.

FIG. 1.16 shows an isometric comparison of FIG. 1.15 and suspended body-1, link body-3, link body-4, and link body-5 of embodiment 1 in the extended state.

FIG. 1.17 shows rear-view and side-view comparisons of FIG. 1.15 and suspended body-1, link body-3, link body-4, and link body-5 of embodiment 1 in the extended state.

FIG. 1.18 shows a section of the swingarm of embodiment 1 in the extended state.

FIG. 1.19 is an analytical schematic representing the relationships between the various parts and IVCs of embodiment 1.

FIG. 1.20 is an analytical schematic showing a step of solving for one unknown IVC in a method of determining a selected unknown IVC in embodiment 1.

FIG. 1.21 is a detailed view of embodiment 1 in the extended state used to determine a spatial position of the solved-for IVC in FIG. 1.20.

FIG. 1.22 is a detailed view of a portion of embodiment 1 in the compressed state used to determine a spatial position of the solved-for IVC in FIG. 1.20.

FIG. 1.23 is an analytical schematic showing a step of solving for another unknown IVC in a method of determining a selected unknown IVC in embodiment 1.

FIG. 1.24 is a detailed view of embodiment 1 in the extended state used to determine a spatial position of the solved-for IVC in FIG. 1.23

FIG. 1.25 is a detailed view of a portion of embodiment 1 in the compressed state used to determine a spatial position of the solved-for IVC in FIG. 1.23

FIG. 1.26 shows a portion of IVC[1][5] migration paths of embodiment 1.

FIG. 1.27 shows another portion of IVC[1][5] migration paths of embodiment 1.

FIG. 1.28 shows another portion of IVC[1][5] migration paths of embodiment 1.

FIG. 1.29 shows another portion of IVC[1][5] migration paths of embodiment 1.

FIG. 1.30 shows migration path IVC[1][2] from the extended to the compressed state of embodiment 1.

FIG. 1.31 shows a selected portion of the 15 IVC migration paths from the extended to the compressed state of embodiment 1.

FIG. 1.32 is an analytical schematic defining the center of curvature and the radius of curvature of a curve/path FIG. 1.33 is an analytical schematic further defining the center of curvature, the radius of curvature, and a curvature inflection point of a curve/path FIG. 1.34 shows a possible migration path, center of curvature, and minimum radius of curvature of PIVC[2][5] from the extended to the compressed state of embodiment 1.

FIG. 1.35 shows a possible migration path, centers of curvature, minimum radii of curvature, and curvature inflection point of PIVC[2][5] from the extended to the compressed state of embodiment 1.

FIG. 1.356, 46-M shows a possible migration path of PIVC[2][6] 46 from extended state 46-E to compressed state 46-C. 46-M is arcuate meaning the radius of curvature is constant with a magnitude equal to length 80 a shown from PIVC[1][6] 42 to PIVC[2][6] 46-E.

FIG. 1.36 is a possible configuration of suspended body 1, link body 3, link body 4, and link body 5 show in the extended state. Here, link body 3-E, link body 4-E, and link body 5-E are combined as a single body 3/4/5-E with flexural pivots.

FIG. 1.37 is an exploded view of FIG. 1.36.

FIG. 1.38 shows FIG. 1.36 in the extended, inflection, and compressed state.

FIG. 1.39 is a graphical schematic showing an example calculation anti-squat and anti-rise of embodiment 1.

FIG. 1.40 is a graph depicting two possible anti-squat curves of embodiment 1.

FIG. 1.41 is a graph of a possible anti-rise curve of embodiment 1.

FIG. 1.42 is a graph of a possible leverage rate curve of embodiment 1.

FIG. 1.43 shows a top isometric view of an embodiment of single body link 3/4/5-E with flexural pivots.

FIG. 1.44 shows a top isometric transparent view of an embodiment of single body link 3/4/5-E with flexural pivots.

FIG. 1.45 shows a bottom isometric view of an embodiment of single body link 3/4/5-E with flexural pivots.

FIG. 1.46 shows a bottom isometric transparent view of an embodiment of single body link 3/4/5-E with flexural pivots.

FIG. 1.47 shows a top view of an embodiment of single body link 3/4/5-E with flexural pivots.

FIG. 1.48 shows a top transparent view of an embodiment of single body link 3/4/5-E with flexural pivots.

FIG. 1.49 shows a bottom view of an embodiment of single body link 3/4/5-E with flexural pivots.

FIG. 1.50 shows a bottom transparent view of an embodiment of single body link 3/4/5-E with flexural pivots.

FIG. 1.51 shows a side view of an embodiment of single body link 3/4/5-E with flexural pivots with cross-section line A.

FIG. 1.52 shows cross-section as viewed along cross-section line A of FIG. 1.51.

FIG. 1.53 shows a side view of an embodiment of single body link 3/4/5-E with flexural pivots with cross-section line B.

FIG. 1.54 shows cross-section as viewed along cross-section line B of FIG. 1.53.

FIG. 1.55 shows a side view of an embodiment of single body link 3/4/5-E with flexural pivots with cross-section line C.

FIG. 1.56 shows cross-section as viewed along cross-section line C of FIG. 1.55.

FIG. 1.57 shows a side view of an embodiment of single body link 3/4/5-E with flexural pivots with cross-section line D.

FIG. 1.58 shows cross-section as viewed along cross-section line of FIG. 1.57.

FIG. 1.59 shows FIG. 1.43 in the extended, inflection, and compressed states.

FIG. 1.60 shows a top isometric view of a possible embodiment of combined link body 3/4/5-E with flexural pivots.

FIG. 1.61 shows an exploded view of the assembled isometric view shown in FIG. 160.

FIG. 1.62 shows a right-side solid view of a possible embodiment of single body 3/4/5-E with flexural pivots composed of several components.

FIG. 1.63 shows a left-side solid view of a possible embodiment of single body 3/4/5-E with flexural pivots composed of several components.

FIG. 1.64 shows a top solid view of a possible embodiment of single body 3/4/5-E with flexural pivots composed of several components.

FIG. 1.65 shows a bottom solid view of a possible embodiment of single body 3/4/5-E with flexural pivots composed of several components.

FIG. 1.66 shows a rear solid view of a possible embodiment of single body 3/4/5-E with flexural pivots composed of several components.

FIG. 1.67 shows a front solid view of a possible embodiment of single body 3/4/5-E with flexural pivots composed of several components.

FIG. 1.68 shows a rear solid view with cross-section G of a possible embodiment of single body 3/4/5-E with flexural pivots composed of several components.

FIG. 1.69 shows cross-section G of a possible embodiment of single body 3/4/5-E with flexural pivots composed of several components.

FIG. 1.70 is a graph of migration path PIVC[2][5] 45-M Vs the swingarm rear wheel axis 14 displacement, where 0 displacement represents the free state of flexure body 3/4/5.

FIG. 1.71 is a graph of the force bending flexural body 3 about virtual PIVC [3][5] 43 and flexural body 4 about virtual PIVC [4][5] 44 versus PIVC[2][5] displacement.

FIG. 1.72 is a graph of the leverage rate of the rear wheel axis migration 14-M of swingarm body 2 versus the migration path PIVC[2][5] 45-M versus the swingarm rear wheel axis 14 displacement FIG. 1.73 is a graph of the force at the rear wheel axis 14 to move from the extended to the compressed states.

FIG. 1.74 shows flexure body 3/4/5 positioned at 45-E.

FIG. 1.75 shows flexure body 3/4/5 positioned at free state 45-F1.

FIG. 1.76 shows flexure body 3/4/5 positioned at 45-A.

FIG. 1.77 shows flexure body 3/4/5 positioned at 45-I.

FIG. 1.78 shows flexure body 3/4/5 positioned at 45-B.

FIG. 1.79 shows flexure body 3/4/5 positioned at free state 45-F2.

FIG. 1.80 shows flexure body 3/4/5 positioned at 45-C.

FIG. 1.81 is a graph of the resultant force at the swingarm wheel axis 14 as a result of the shock spring force only and the resultant force at swingarm wheel axis 14 of the shock spring force combined with the force due to the flexure body.

FIG. 2.1 shows a simple line diagram of embodiment 1002 of a 6-bar linkage of the disclosed suspension system in the extended state.

FIG. 2.2 shows a simple line diagram of suspended body-1001 and link body 1006 of embodiment 2 in the extended state, separated for clarity.

FIG. 2.3 shows a simple line diagram of suspended body-1001, link body-1003, link body-1004, and link body-1005 of embodiment 1002 in the extended state, separated for clarity.

FIG. 2.4 shows a simple line diagram of suspended body-1001, link body-1003, link body-1004, and link body-1005 of embodiment 1002 in the extended state, with swingarm body-1002 separated for clarity.

FIG. 2.5 shows a simple line diagram of embodiment 1002 at the point of inflection for link body-1003, link body-1004, and link body-1005.

FIG. 2.6 shows a simple line diagram of embodiment 2 of a 6-bar linkage of the disclosed suspension system in the compressed state.

FIG. 2.7 shows a simple line diagram of embodiment 2 of a 6-bar linkage of the disclosed suspension system with extended, inflection, and compressed states overlaid, and a detailed view area defined for FIG. 2.8.

FIG. 2.8 shows the detailed view area of embodiment 2 defined in FIG. 2.7, in extended, inflection, and compressed states.

FIG. 2.9 shows embodiment 2 in the extended state.

FIG. 2.10 shows embodiment 2 in the compressed state.

FIG. 2.11 shows embodiment 2 in the extended state with the swingarm hidden for clarity.

FIG. 2.12 shows embodiment 2 in the compressed state with the swingarm hidden for clarity.

FIG. 2.13 shows a detailed isometric view of linkage members 1001, 1003, 1004, and 1005 of embodiment 2 in the extended state with the swingarm hidden for clarity.

FIG. 2.14 shows a detailed, exploded, isometric view of linkage members 1001, 1003-E, 1004-E, and 1005-E and associated mounting hardware of embodiment 2 with the swingarm hidden for clarity.

FIG. 2.15 shows an isometric comparison of FIG. 1.15 and suspended body-1001, link body-1003, link body-1004, and link body-1005 of embodiment 2 in the extended state.

FIG. 2.16 shows rear-view and side-view comparisons of FIG. 1.15 and suspended body-1001, link body-1003, link body-1004, and link body-1005 of embodiment 2 in the extended state.

FIG. 2.17 shows a section of the swingarm of embodiment 2 in the extended state.

FIG. 2.18 is an analytical schematic representing the relationships between the various parts and IVCs of embodiment 2.

FIG. 2.19 is an analytical schematic showing a step of solving for one unknown IVC in a method of determining a selected unknown IVC in embodiment 2.

FIG. 2.20 is a detailed view of a portion of embodiment 2 in the extended state used to determine a spatial position of the solved-for IVC in FIG. 2.19.

FIG. 2.21 is a detailed view of a portion of embodiment 2 in the compressed state used to determine a spatial position of the solved-for IVC in FIG. 2.19.

FIG. 2.22 is an analytical schematic showing a step of solving for another unknown IVC in a method of determining a selected unknown IVC in embodiment 2.

FIG. 2.23 is a detailed view of a portion of embodiment 2 in the extended state used to determine a spatial position of the solved-for IVC in FIG. 2.22.

FIG. 2.24 is a detailed view of a portion of embodiment 2 in the compressed state used to determine a spatial position of the solved-for IVC in FIG. 2.22.

FIG. 2.25 shows migration path IVC[1][2] from the extended to the compressed state of embodiment 2.

FIG. 2.26 shows a selected portion of the 15 IVC migration paths from the extended to the compressed state of embodiment 2.

FIG. 2.27 shows migration path, center of curvature and minimum radius of curvature of PIVC[1002][1005] 1045 from the extended to the compressed state of embodiment 2.

FIG. 3.1 shows another embodiment of a suspension linkage in an extended state.

FIG. 3.2 shows the embodiment of FIG. 3.1 in a compressed state.

FIG. 3.3 shows the embodiment of FIG. 3.1 in an extended state with a swingarm hidden for clarity.

FIG. 3.4 shows a section of the swingarm of the embodiment of FIG. 3.1 in the extended state.

FIG. 3.5 shows the embodiment of FIG. 3.1 in the extended state with only the front triangle structure shown for clarity.

FIG. 3.6 shows a rear view of a portion of FIG. 3.5 with cross-section line K.

FIG. 3.7 shows a cross-section viewed along cross-section line K of FIG. 3.6.

FIG. 3.8 shows a detailed view of a portion of FIG. 3.5.

FIG. 3.9 shows an isometric view of FIG. 3.8.

FIG. 3.10 shows another isometric view of FIG. 3.8.

FIG. 3.11 shows FIG. 3.8 with cross-section line L.

FIG. 3.12 shows a cross-section viewed along cross-section line L of FIG. 3.11.

FIG. 3.13 shows FIG. 3.8 with cross-section line M.

FIG. 3.14 shows a cross-section viewed along cross-section line M of FIG. 3.13.

FIG. 3.15 shows FIG. 3.8 in the extended, inflection, and compressed state.

FIG. 3.16 shows a side view of a possible embodiment where link body 3003 and link body 3004 are integrated with suspended body 3001.

FIG. 3.17 is an isometric exploded view of FIG. 3.16.

FIG. 3.18 is an isometric view of the complete assembly with link body 3005-E fixed to combined body 3001/3003/3004-E.

FIG. 3.19 is a side view of the complete assembly shown in FIG. 3.18.

FIG. 3.20 is a cross-section view of the complete assembly shown in FIG. 3.19.

FIG. 4.1 shows another embodiment of a suspension linkage in the extended state.

FIG. 4.2 shows the embodiment of FIG. 4.1 in the compressed state.

FIG. 4.3 shows the embodiment of FIG. 4.1 in the extended state with the swingarm hidden for clarity.

FIG. 4.4 shows a section of the embodiment of FIG. 4.1 in the extended state with the swingarm hidden for clarity.

FIG. 4.5 shows the embodiment of FIG. 4.1 in the compressed state with the swingarm hidden for clarity.

FIG. 4.6 shows a section of the swingarm of the embodiment of FIG. 4.1 in the extended state.

FIG. 4.7 shows an exploded view of the modular gearbox housing and the front triangle structure of the suspended body of the embodiment of FIG. 4.1.

FIG. 4.8 shows an assembled view of the modular gearbox housing and the front triangle structure of the suspended body of the embodiment of FIG. 4.1.

FIG. 4.9 shows an isometric exploded view of the embodiment of FIG. 4.1 with cranks and driving cog with the rear triangle and a portion of the linkage hidden for clarity.

FIG. 4.10 shows an isometric assembled view of the embodiment of FIG. 4.1 with cranks and driving cog with the rear triangle and a portion of the linkage hidden for clarity.

FIG. 4.11 shows an isometric assembled view of the embodiment of FIG. 4.1 with cranks, driving cog, rear triangle and a portion of the linkage hidden for clarity.

FIG. 4.12 shows an exploded view of the 4-bar linkage and the suspended body of the embodiment of FIG. 4.1.

FIG. 4.13 shows an assembled view of the 4-bar linkage and the suspended body of the embodiment of FIG. 4.1.

FIG. 4.14 shows an isometric exploded view of the 4-bar linkage and the suspended body of the embodiment of FIG. 4.1.

FIG. 4.15 shows an isometric assembled view of the 4-bar linkage and the suspended body of the embodiment of FIG. 4.1.

FIG. 4.16 shows a cross section of the suspended body of the embodiment of FIG. 4.1 including the modular gearbox housing, modular electric motor housing, battery cable, modular battery housing, and access cover.

FIG. 4.17 shows an exploded view cross section of the suspended body of the embodiment of FIG. 4.1 including the modular gearbox housing, modular electric motor housing, battery cable, modular battery housing, and access cover.

DETAILED DESCRIPTION

Disclosed herein is as a system or linkage that operatively couples a suspended body to a driven wheel. In accordance with the various embodiments provided herein, the suspension system linkage improves suspension performance based on the interrelationships of its linkage bodies and the related instantaneous velocity centers (IVCs). In one example, the linkage has 15 IVCs. In particular, the linkage may be a 6-bar linkage.

Various theories, methods, algorithms or analysis systems are provided herein. These systems are provided for better understanding of the structures and configurations described. Unless specifically claimed, the systems are not limiting regardless of current accuracy or subsequent clarifications or understandings of the structures and configurations that may be determined by persons of ordinary skill in the art.

Accordingly, provided herein are various methods or algorithms suitable for analyzing suspension systems. For example, various methods are provided for calculating unknown IVCs of a linkage for a suspension system. Such analytical methods are provided for fuller understanding of the various mechanisms discussed herein. For example, a triangular method may be used to determine an unknown IVC of interest. Additionally, or alternatively, plotting the positional relationships of IVCs in a linkage of a suspension can be utilized. Accordingly, the positions of IVCs may change depending on the configuration of the system. A particular IVC may be in a different position depending on whether the system is in a compressed or extended state. IVC migration paths can be determined and vectors running tangential to such migration paths can be analyzed. Thus, the interrelationships between IVCs can be analyzed, allowing for a mathematical analysis of the movement of the linkage subsystem. Finally, methods to calculate anti-squat, anti-rise, and leverage rate is detailed.

It is understood that throughout this disclosure the relationship of various linkages are described with respect to characteristics of those linkages. One analysis system useful for assessing these relationships is the Mobility Analysis of Mechanisms. The Mobility Analysis of Mechanisms (Kutzbach (or Grübler) mobility criterion) may be used to describe the mobility, or output degree of freedom of a linkage. This system may be used to describe the mobility m of a planar linkage composed of n links that are coupled with p flexible joints/pivots. In the various embodiments, discussed herein, the links can be connected via these flexible joints/pivots allowing some degree of freedom between one another. Additionally, the relationship of the links via the joints define various characteristics such as instantaneous velocity centers (IVCs). In various examples as applied to the various embodiments discussed herein, the flexible joints/pivots, or pivotal connections can include revolute, slider, cam joints, or any other suitable flexible joints or pivots that allow one degree of freedom movement between the two links they connect. Notably, flexible joints may include intermediary devices connecting the linkages. Depending on the types of joints, quality of joints, or the tolerances in the joints, characteristics (e.g. the IVCs or other characteristics discussed herein) may have small variances between joints due to real world engineering constraints and calculations. Terminology such as generally, substantially, or other similar terms may be used to account for the expected, calculated, or otherwise real-world accuracy of the characteristics discussed herein while allowing for real world variance in the characteristics. Note that if bodies are coupled as one and not considered completely rigid, a specific joint (e.g. a revolute joint) may be assumed theoretically for analysis near the point of flexure in the flexible joint. Also, note that although the linkage is considered planar kinematically, the assembly of the mechanism may be 3-dimensional.

The following equation is used for analysis of the various systems herein:

$$\text{mobility}=m=3(n-1-p)+p$$

n=number of bodies (or links or members)

p=number of joints $\Sigma f$=sum of the kinetic variables in the mechanism

As an example, this equation may be applied to a 4-bar linkage. The following solves the equation for a 4-bar linkage:

$$p=n=4$$

$$m=3(n-1-p)+p$$

$$m=3(4-1-4)+4$$

$$m=3(-1)+4$$

$$m=-3+4$$

$$m=1$$

As another example, this equation may be applied to a 6-bar linkage. The following solves the equation for a 6-bar linkage:

$$n=6$$

$$p=7$$

$$m=3(n-1-p)+p$$

$$m=3(6-1-7)+7$$

$$m=3(-2)+7$$

$$m=-6+7$$

$$m=1$$

In both noted 4-bar and 6-bar linkages, m=1, or there is one degree of freedom of motion. Therefore, the path of the axis of the driven wheel, known as the driven wheel axis path (DWAP) may be constrained to planar motion along a defined path or curve relative to the suspended body. This path or curve includes one end-point defined as the extended state, and another end-point as the compressed state. Any point on this curve or path between the extended and compressed points is known as an intermediate state. An intermediate state on an IVC migration curve or path correlates to an intermediate state of the linkage positions.

Additionally, methods of analyzing vehicle suspension linkages design for its dynamic response is also disclosed. In one example, this method of analysis includes a collection of the system instantaneous velocity centers (IVCs), which can be determined graphically. An IVC is a point common to two linkage bodies where there is zero relative velocity. These IVCs change location instantaneously as the suspension is cycled from its extended to compressed state. The path of each IVC migration may then be plotted graphically as a path, curve, or spline from the extended to the compressed state. These IVC curves depend upon the reference frame considered. In various embodiments, the suspended body is considered fixed as the driven wheel moves from the extended to the compressed state. Total suspension travel (VWT[T]) is then defined as the perpendicular distance relative to the ground line at the extended state as measured between the extended suspension state point and the compressed suspension state point on the driven wheel axis path.

It is possible for an IVC, known as a stationary IVC (SIVC), to have little to no migration from the extended to the compressed state. One example would be an IVC where a link body is operatively connected to the suspended body. This is a result of the front-triangle remaining fixed in the reference frame chosen for suspension analysis.

For reference herein, specific instantaneous velocity centers of a linkage are denoted as IVC[Body-A][Body-B], Body-A and Body-B being the relevant bodies in the relationship. For example, IVC[1][2] is the instantaneous velocity center relative to a body-1 and a body-2. Additionally, IVC[1][2] is equivalent to IVC[2][1].

The structure surrounding the suspension system may include several bodies. In various examples, the structure may include a suspended body. In various embodiments, the suspended body can be suitable to be supported by suspension and support a user over the suspension. In various examples, the structure may include a "wheel carrier" body, which is operatively coupled to the driven wheel, a "brake carrier" body, which is operatively coupled to the driven wheel brake, or a "dynamic body" (DB), which is any combination of a wheel carrier and a brake carrier body (e.g., DB=wheel carrier body, or DB=brake carrier body, or DB=wheel and brake carrier body).

Specific IVC migrations called dynamic IVCs (DIVCs) may be utilized to determine the vehicle's dynamic response. The DIVCs depend upon the specific linkage layout but also depend upon suspended body-1 since this is the body in which a passenger or rider will be included. Suspended body-1 is often called the front triangle of a bicycle.

As used herein DIVC[AD] can define both the acceleration and deceleration response of the vehicle.

As used herein DIVC[A] can define the acceleration response of the vehicle.

As used herein DIVC[D] can define the deceleration response of the vehicle.

As used herein DIVC[C] is defined as a DIVC that includes the acceleration component. DIVC[C] can be equal to DIVC[A] or DIVC[AD].

As used herein DIVC[E] is defined as a DIVC that includes the deceleration component. DIVC[E] can be equal to DIVC[D] or DIVC[AD].

As used herein DIVC is a general term and therefore a DIVC may be a DIVC[AD] or a DIVC[A] or a DIVC[D] or a DIVC[C] or a DIVC[E]. As used herein DIVC[L] is the length of the DIVC migration path, spline or curve.

In accordance with various embodiments, the body-X can be both a wheel carrier and a brake carrier body. In such an embodiment, there is a single DIVC[AD] migration, DIVC[AD][1][X].

In accordance with various embodiments, wheel carrier body-Y can be separate from the brake carrier body-Z. In such an embodiment, there are two DIVCs, DIVC[A][1][Y] and DIVC[D][1][Z].

Finally, in accordance with various embodiments, the wheel carrier body-Y is pivotally concentric to a brake carrier body-Z. In this case, again there are two DIVCs, DIVC[A][1][Y] and DIVC[D][1][Z]].

Each of these various embodiments can be variously applied to the embodiments and examples of the various systems discussed in more detail below.

For purposes of understanding, but not to be limiting, it can be noted that the point in which the force of gravity acts on the sum of the suspended vehicle mass (also known as the sprung mass) and any additional mass such as a passenger or cargo that is supported by the suspension is known as the center of gravity (COG). In the static case, with both wheels on the ground, the force due to the suspended mass through the COG is supported by the vehicles two wheels. Depending on the COG location and the wheelbase of the vehicle, the distribution of force between the two wheels may vary. When the vehicle accelerates, load transfer occurs and the force distribution between the two wheels changes. The rear wheel load is increased while the front wheel load is decreased. Thus, the rear suspension tends to compress or squat. Driving forces of the vehicle such as a chain or belt may be utilized to counteract the tendency to squat during acceleration. This is known in vehicle dynamics as anti-squat.

Anti-squat is typically described as a percentage value. 100% anti-squat is when the anti-squat force is equal and opposite to the load transfer force due to acceleration. As a result, the system is in equilibrium and no suspension squat occurs. Over 100% anti-squat is when the anti-squat force is both opposite and greater than the load transfer force and therefore the suspension extends during acceleration. Anti-squat of 0% is when there is zero anti-squat force to counteract the load transfer and therefore suspension squats during acceleration. Anti-squat between 0-100% is when the anti-squat force is both opposite and less than the load transfer force and therefore the suspension squats during acceleration but to a lesser degree than with 0% anti-squat. A negative anti-squat percentage is when the anti-squat force acts in the same direction on the rear wheel as the load transfer force and therefore the squat due to load transfer is magnified. Anti-squat is directly related to the DIVC[C] migration of the suspension linkage. Anti-squat around or slightly above 100% is ideal where pedaling occurs typically around the first half of travel to improve pedaling efficiency. After this point, an anti-squat below 100% is ideal so that the driving force is minimized, and the suspension can be utilized later in the travel where pedaling typically does not occur. This also minimizes feedback from the driving force to the rider. Too high of an anti-squat is less than ideal because it results in high feedback from the driving force to the rider and is detrimental to pedaling efficiency because the load transfer and anti-squat force are far from equilibrium.

When the vehicle decelerates, the force distribution changes and the front wheel load is increased while the rear wheel load is decreased. As a result, the rear suspension tends to extend or rise. This is known in vehicle dynamics as anti-rise. The magnitude of anti-rise is directly related to the DIVC[E] migration.

100% anti-rise is when the anti-rise force is equal and opposite to the load transfer force due to deceleration. As a result, the system is in equilibrium and no suspension rise occurs. Over 100% anti-rise is when the anti-rise force is both opposite and greater than the load transfer force and therefore the suspension squats during deceleration. Anti-rise of 0% is when there is zero anti-rise force to counteract the load transfer and therefore suspension rises during deceleration. Anti-rise between 0-100% is when the anti-rise force is both opposite and less than the load transfer force and therefore the suspension rises during deceleration but to a lesser degree than with 0% anti-rise. A negative anti-rise percentage is when the anti-rise force acts in the same direction on the rear wheel as the load transfer force and therefore the rise due to load transfer is magnified. Anti-rise less than 100% may help improve traction while anti-rise greater than 0% may help stabilize geometry during deceleration. Therefore, an anti-rise in the 50-100% can be a suitable range for an improved ride.

Based upon the number of bodies present in the structure, the total number of instantaneous velocity centers (IVCs) can be determined. The following equation can be used:

$$\text{Number of Instance Centers} = N = \frac{n(n-1)}{2}$$

n=number of bodies moving relative to one another

N=total number of instantaneous velocity centers of the linkage

As an example, this equation may be applied to a 4-bar linkage. In this example, n=4. The following solves the equation for a 4-bar linkage:

$$N_4 = \frac{4(4-1)}{2} = \frac{12}{2} = 6$$

This example shows that there are 6 total instantaneous velocity centers for a 4-bar linkage.

As another example, this equation may be applied to a 6-bar linkage. In this example, n=6. The following solves the equation for a 6-bar linkage:

$$N_6 = \frac{6(6-1)}{2} = \frac{30}{2} = 15$$

This example shows that there are 15 total instantaneous velocity centers for a 6-bar linkage.

In accordance with various embodiments, the suspension system can include a suspension setup having more than four links. It may be noted that while some of the concepts discussed herein might be accomplished with four links, in some of the embodiments discuss herein, as shown herein by example, six links are used. As is suitable, more or fewer links can also be used to accomplish the various concepts as discussed herein.

As noted above, there are 15 IVCs in a 6-bar linkage.

$$N_6 = \frac{6(6-1)}{2} = \frac{30}{2} = 15$$

A selection of the 15 total IVCs can be determined visually without being derived using other IVCs as further described below. As used herein, these IVCs are known as physical IVCs, or PIVCs. PIVCs are defined at the pivotal axes or virtual pivotal axes of jointed linkage body members. There are four PIVCs in a 4-bar linkage while there are seven PIVCs in a 6-bar linkage. As an example, and with further explanation detailed below, solid lines shown in FIG. 1.19 represent the seven PIVCs of the fifteen IVCs of 6-bar linkage shown in FIG. 1.1. The dotted lines represent the remaining 8 IVCs that must be derived.

Turning now to the figures for embodiment 1, in accordance with various embodiments the suspension system can include a 6-bar linkage. FIG. 1.1 shows a simple line drawing of embodiment 1 in the extended state. In this embodiment, suspended body 1 is suspended by the suspension system at least at the rear of the bike and preferably by a suspension fork at the front, which is not shown herein for simplicity of the figures. In this example and as used herein, generally a suspended body is the frame portion of the vehicle that is configured to directly support the weight of a rider on a suspension system. The suspended body may also be referred to as the front triangle herein, however, this is not meant to be limiting of the shape of the suspended body but merely referential of the portion of the vehicle that is suspended or supports the weight of the rider. Swingarm body 2 is a dynamic body (DB), comprising a wheel carrier and a brake carrier. When the swingarm is composed of multiple linkage bodies that are pivotally connected, they are commonly known as the chainstay and seatstay. In accordance with some embodiments discussed herein, the chainstay and seatstay make up swingarm body 2. In some examples, the swingarm body 2 can be a unitary construction of the chainstay and the seatstay. In some examples, the swingarm body 2 can have rigidity between the chainstay and the seatstay such that under normal operating forces they do not rotate or flex relative to one another. In some examples, the swingarm body 2 can have an upper pivot (on the forward end of what would be the seat stay) and a lower pivot (what would be the forward end of the chain stay). In some examples, during operation of the suspension, the distance between the upper pivot and the lower pivot can be substantially constant. Brake features are not shown in this figure for clarity. Note that in other embodiments swingarm body 2 may be a wheel carrier, a brake carrier, or it can be a non-dynamic body. Although in other embodiments, combinations of each of these are also understood.

Note that in all figures, "-E" denotes the extended state, "-I" denotes the inflection state, "-C" denotes the compressed state, while "-M" denotes a migration path. It is possible that other embodiments do not have a state of inflection. For example, swingarm body 2 can refer to any position between the extended and compressed states, while swingarm body 2 is labeled as 2-E in FIG. 1.1 (The extended state), 2-I in FIG. 1.5 (The inflection state) and 2-C in FIG. 1.6 (The compressed state). Specific details of the inflection state are given below.

In FIG. 1.1, swingarm body 2-E can include a driven wheel axis 14, and suspended body 1 can include a driving cog axis 17. In accordance with the embodiment, the swingarm body 2-E is operatively coupled to a driven wheel 10-E. The driven wheel 10-E engages with the ground 16. Front wheel 11 is operatively connected to a fork at 15 which is operatively connected to suspended body 1. In accordance with various embodiments, the swingarm body 2 is operably coupled to the suspended body 1 via a linkage system. The linkage system can include an upper linkage 100 and/or a lower linkage 200. In accordance with various examples, the lower linkage 200 constrains the front lower pivot of the swingarm or chain stay to follow a path that includes a path portion that approximates rectilinear motion. Different styles or designs of linkages for both the upper linkage and lower linkage are contemplated herein with some examples given in more detail below. Examples of the approximated rectilinear motion are also discussed in more detail below.

In accordance with various embodiments, the lower linkage 200 can include a link 3, a link 4 and a link 5. In various examples, the link body 3-E is operatively coupled to suspended body 1 defining PIVC[1][3] 40 and link body 5-E defining PIVC[3][5] 43-E. Link body 4-E is operatively coupled to suspended body 1 defining PIVC[1][4] 41 and link body 5-E defining PIVC[4][5] 44-E. Link body 6-E is operatively coupled to suspended body 1 defining PIVC[1][6] 42 and swingarm body 2-E defining PIVC[2][6] 46-E. Swingarm body 2-E is operatively coupled to link body 5-E defining PIVC[2][5] 45-E. PIVC[2][5] is not common with PIVC[3][5] or PIVC [4][5]. Suspended body-1, link body-3, link body-4 and link body-5 are arranged in a Watts 4-bar configuration. Effective shock/damper body 8-E is operatively coupled to suspended body 1 at 9 and link body 6-E at 47-E.

Seven of the total 15 IVCs in the embodiment 1 are PIVCs: PIVC[1][3] 40, PIVC[1][4] 41, PIVC[1][6] 42; PIVC[3][5] 43-E, PIVC[4][5] 44-E, PIVC[2][5] 45-E, and PIVC[2][6] 46-E. Considering the reference frames discussed, the front triangle is assumed to be stationary for suspension analysis. As a result, PIVCs located on the front triangle may be stationary, or SIVCs. Therefore, these PIVCs do not have the notation of "-E", "-I" or "-C" discussed previously. Examples of these are: PIVC[1][3] 40, PIVC[1][4] 41, and PIVC[1][6] 42. Also, if the "-E", "-I" or "-C" suffix is not present, it may be that an IVC at an instance other than these three discrete locations is being discussed.

FIG. 1.2 is a simplification of FIG. 1.1 having suspended body-1 and link body 6-E are shown. Link body 6-E is shown disconnected to suspended body 1 to clarify the connection at 42.

FIG. 1.3A is a simplification of FIG. 1.1 having suspended body-1, link body 3-E, link body 4-E, and link body 5-E are shown. Link body 3-E, link body 4-E, and link body 5-E is denoted 4-bar sub-assembly 48-E. 4-bar sub-assembly 48 is shown disconnected to suspended body 1 to clarify the connection at 40 and 41.

FIG. 1.3B shows an example of an isolated view of lower linkage 200 with circular area 998 centered at PIVC[2][5] 45-E with a diameter 999. As illustrated, PIVC[3][5] 43-E, PIVC[4][5] 44-E and PIVC[2][5] 45-E are located with circular area 998. Utilizing such a configuration allows for the lower linkage 200 to be more compact decreasing weight while increasing stiffness and optimizing the kinematics. In accordance with various embodiments Diameter 999 may be less than half of the distance from the pivot 45-E to the rear wheel axis 14-E. In accordance with other embodiments, the diameter 999 may be less than 500 mm. The diameter 999 may be greater than 20 mm. In accordance with other embodiments, the diameter 999 may be less than 400 mm. In accordance with other embodiments, the diameter 999 may be less than 300 mm. In accordance with other embodiments, the diameter 999 may be less than 200 mm. In accordance with other embodiments, the diameter 999 may be between 30 mm and 100 mm. In accordance with other embodiments, the diameter 999 may be between 50 mm and 60 mm. In accordance with another embodiment, the diameter 999 may be about 54 mm.

FIG. 1.4 is combining FIG. 1.2 and FIG. 1.3A where swingarm body 2-E is shown disconnected to suspended body 1 to clarify the connection at 46-E and 45-E.

FIG. 1.5 shows a simple line drawing of embodiment 1 in the inflection state.

FIG. 1.6 shows a simple line drawing of embodiment 1 in the compressed state.

FIG. 1.7 shows a simple line drawing of embodiment 1 with an overlay of the extended, inflection, and compressed states. A detailed boundary box is defined to show zoomed Figs. of sub-assembly 48 in FIG. 1.8.

FIG. 1.8 shows sub-assembly 48 in the extended, inflection, and compressed state. Note that starting from PIVC[2][5] 45-E, PIVC[2][5] moves to 45-I, and then reverses direction to 45-C.

FIG. 1.9 shows a CAD rendering example of embodiment 1 in the extended state. Brake caliper 12 is operatively connected to swingarm body 2. Brake rotor 13 is operatively connected to driven wheel 10. All other bodies defined in FIG. 1.1 remain identical. Note that not all linkage bodies are shown for clarity. Those missing are shown in later Figs. wherein the view is ideal.

FIG. 1.10 shows a CAD rendering example of embodiment 1 in the compressed state. Brake caliper 12 is operatively connected to swingarm body 2. Brake rotor 13 is operatively connected to driven wheel 10. All other bodies defined in FIG. 1.6 remain identical. Note that not all linkage bodies are shown for clarity. Those missing are shown in later Figs. wherein the view is ideal.

FIG. 1.11A shows a detailed view of FIG. 1.9 with swingarm body 2 removed for clarity. Here the seven PIVCs are shown: PIVC[1][3] 40, PIVC[1][4] 41, PIVC[1][6] 42; PIVC[3][5] 43-E, PIVC[4][5] 44-E, PIVC[2][5] 45-E, and PIVC[2][6] 46-E. Suspended body 1, link body 3, link body 4, link body 5, link body 6, extender body 7, and damper/shock body 8 are also shown. Note that in FIGS. 1.1 and 1.4-7, effective shock body 8 represents extender body 7 and shock/damper body 8 combined. Extender body 7 is pivotally connected to link body 6 at 47-E. Note that in other embodiments, link body 3-E and link body 4-E can be arranged as eccentrics pivoting about PIVC 40 and PIVC 41 respectively. This would allow the effective link sizes to be reduced.

FIG. 1.11B shows an alternate embodiment of the detailed view of FIG. 1.9 with swingarm body 2 removed for clarity. The kinematic functionality remains, while the packaging and positioning of 6-E and 47-E are moved so that extender body 7 straddles front triangle body 1. Here the seven PIVCs are shown: PIVC[1][3] 40, PIVC[1][4] 41, PIVC[1][6] 42; PIVC[3][5] 43-E, PIVC[4][5] 44-E, PIVC[2][5] 45-E, and PIVC[2][6] 46-E. Suspended body 1, link body 3, link body 4, link body 5, link body 6, extender body 7 and damper/shock body 8 are also shown. Note that in FIGS. 1.1, and 1.4-7, effective shock body 8 represents extender body 7, and shock/damper body 8 combined. Extender body 7 is pivotally connected to link body 6 at 47-E. Note that in other embodiments, link body 3-E and link body 4-E can be arranged as eccentrics pivoting about PIVC 40 and PIVC 41 respectively. This can allow the effective link sizes to be reduced.

FIG. 1.12 shows a detailed view of FIG. 1.10 with swingarm body 2 removed for clarity. Here the seven PIVCs are shown: PIVC[1][3] 40, PIVC[1][4] 41, PIVC[1][6] 42; PIVC[3][5] 43-C, PIVC[4][5] 44-C, PIVC[2][5] 45-C, and PIVC[2][6] 46-C. Suspended body 1, link body 3, link body 4, link body 5, link body 6, extender body 7, and damper/shock body 8 are also shown. Note that in FIGS. 1.1, and 1.4-7, effective shock body 8 represents extender body 7 and shock/damper body 8 combined. Extender body 7 is pivotally connected to link body 6 at 47-C.

FIG. 1.13 shows an isometric detailed view of suspended body-1, link body 3-E, link body 4-E, and link body 5-E from FIG. 1.9.

FIG. 1.14A shows an exploded view of FIG. 1.13. Bolt 80 pivotally fastens link body 3-E to suspended body 1. Bolt 81 pivotally fastens link body 4-E to suspended body 1. Bolt 82-E pivotally fastens link body 3-E to link body 5-E. Bolt 83-E pivotally fastens link body 4-E to link body 5-E.

FIG. 1.14B shows an alternative embodiment of an exploded view of FIG. 1.13. Bolt 80 pivotally fastens link body 3-E to suspended body 1. Bolt 81 pivotally fastens link body 4-E to suspended body 1. Bolt 82-E pivotally fastens link body 3-E to link body 5-E. Bolt 83-E pivotally fastens link body 4-E to link body 5-E. In this embodiment, link body 5-E is in an "H" configuration at the pivotal mount to link body 4-E, and in an "I" configuration at the pivotal mount to link body 3-E. The kinematic function remains the same as in FIG. 1.14A.

FIG. 1.15 shows existing art of a 4-bar suspension system in its extended state used for comparison of component envelopes in FIGS. 1.16, 1.17, 1.18, 2.15, and 2.16. Shown are the following: Suspended body 5001, swingarm body 5002-E, link body 5005-E, link body guide shafts 5020, link body 5006-E, extension body 5007-E, shock/damper body 5008-E, shock pivot 5009, driving wheel axis 5014-E, and driving cog axis 5022. Link body guide shafts 5020 are fixed to suspended body 5001 and constrain link body 5005-E to linear motion. This is a 4-bar linkage design in which the migration path of PIVC[5002][5005] 5021 is linear, or has a curvature value of zero.

FIG. 1.16 shows an isometric comparison of FIG. 1.15 and suspended body-1, link body 3-E, link body 4-E, and link body 5-E of embodiment 1 in the extended state.

FIG. 1.17 shows rear-view and side-view comparisons of FIG. 1.15 and suspended body 1, link body 3-E, link body 4-E, and link body 5-E of embodiment 1 in the extended state. From the side view, 5100 is horizontal distance of the linkage envelope of embodiment one rearward of the driving cog axis 17. From the side view, 5101 is the horizontal distance of the linkage envelope of embodiment one forward of the driving cog axis. From the side view, 5102 is the horizontal distance of the linkage envelope of existing art shown in FIG. 1.15 rearward of the driving cog axis 5022. From the side view, 5103 is the horizontal distance of the linkage envelope of existing art shown in FIG. 1.15 forward of the driving cog axis. It is clear 5100<5102 and 5101<5103.

The smaller envelope of the linkage design as disclosed herein can have several advantages structurally: For example, there is more clearance between the rear tire and the suspended body allowing for a shorter distance from the driving cog axis to the driven wheel axis. This can be a performance benefit allowing for quicker turning. The added tire clearance provides more room for dirt and mud that can build up when riding. This added clearance also allows room for a larger "bridge" tying together the drive and non-drive sides of swingarm body 2 which aids in torsional stiffness. The added clearance in front of the driving cog axis provides more room to fit a water bottle and other accessories within the frame of suspended body 1.

The smaller envelope of the linkage design as disclosed herein can have several advantages kinematically because there is more freedom to locate PIVC[2][5] 45 and therefore a greater ability to tune parameters such as anti-squat, anti-rise, and leverage rate which translates to greater performance. Also, PIVC[2][5] migration paths are able to have an extremely large minimum radius of curvature, or unique curvature profiles with inflection points within this small linkage envelope. This is not possible with traditional links and allows for increased tunability of suspension behavior.

FIG. 1.17 also shows the rear view. Here 5104 is horizontal distance of the linkage interface between swingarm body 2-E and link body 5-E. 5105 is horizontal distance of the linkage interface between swingarm body 5002-E and link body 5005-E. It is clear that 5104>5105. The wider interface as disclosed herein allows for a stiffer interface between swingarm body 2-E and link body 5-E which translates to a stiffer interface between swingarm body 2-E and the suspended body 1. This allows greater performance by improving the handling accuracy of the vehicle.

FIG. 1.18 shows a detailed view of swingarm body 2-E with all other components removed for clarity. Here PIVC [2][5] 45-E and PIVC[2][6] 46-E are shown.

FIG. 1.19 is an analytical schematic representing the relationships between the various linkage bodies and IVCs of embodiment 1. Suspended body 1, swingarm body 2, link body 3, link body 4, link body 5, and link body 6 are represented by points along the circumference of the analytical schematic. Lines represent the 15 IVCs linking each part of the suspension system. Solid lines show the seven PIVCs: PIVC[1][3] 40, PIVC[1][4] 41, PIVC[1][6] 42; PIVC[3][5] 43, PIVC[4][5] 44, PIVC[2][5] 45, and PIVC [2][6] 46, while the dashed lines represent the eight IVCs, DIVC[AD][1][2], IVC[2][3], IVC[3][4], IVC[5][6], IVC[2] [4], IVC[1][5], IVC[3][6], and IVC[4][6] that are derived. This analytical schematic shows that there are three linkage bodies operatively coupled to front suspended body 1, link body 3, link body 4, and link body 6 because the solid-line connections with the suspended body 1 are limited to PIVC[1][3] 40, PIVC[1][4] 41 and PIVC[1][6] 42 in this example. Note that this analytical schematic can be used to derive any IVC at any point within its migration from extended to compressed states. In some cases, there is no migration.

As can be seen in FIG. 1.19, the 6-bar system is complex. For example, DIVC[AD][1][2] is derived using several IVC relationships. Notably, changes to the basic linkage layout can have a significant effect on IVC migration paths. This in effect gives rise to many more possible IVC migration paths through the suspension travel from a fully extended to a fully compressed state.

In embodiment 1, DIVC[AD][1][2] is not visually established, or in other words it is not a PIVC. DIVC[AD][1][2] can be ultimately solved for using both the known PIVCs (shown in solid lines) in FIG. 1.19, as well as derived IVCs that have been solved for. By using the information provided by two IVC "sets" that form a triangle with the unknown IVC, the unknown IVC can be derived. However, other methods are contemplated to solve for DIVC[AD][1][2] as well.

FIG. 1.20 shows the first step in the method of solving for DIVC[AD][1][2] using the analytical schematic. In this example, unknown IVC[1][5] 120 is determined using known positions PIVC[1][3] 40 and PIVC[3][5] 43 and known positions PIVC[1][4] 41 and IVC[4][5] 44.

FIG. 1.21 shows a method of determining the spatial positioning of the hidden IVC[1][5] 120 solved for in FIG. 1.20 within the suspension system in the extended state. In this example, the four known sides of the two triangles 40, 41, 43, 44 of FIG. 1.20 are represented as PIVC points 40, 41, 43-E, 44-E. Dashed lines are extended through two linkage points that each represent sides of the same triangle in FIG. 1.20. For example, dashed line 160-E is extended through PIVC[4][5] 44-E and PIVC[1][4] 41 and dashed line 161-E is extended through PIVC[3][5] 43-E and PIVC [1][3] 40. Dashed lines 160-E and 161-E intersect at IVC [1][5] 120-E.

FIG. 1.22 shows a method of determining the spatial positioning of the hidden IVC[1][5] 120 solved for in FIG. 1.20 within the suspension system in the compressed state. In this example, the four known sides of the two triangles 40, 41, 43, 44 of FIG. 1.20 are represented as PIVC points 40, 41, 43-C, 44-C. Dashed lines are extended through two linkage points that each represent sides of the same triangle in FIG. 1.20. For example, dashed line 160-E is extended through PIVC[4][5] 44-C and PIVC[1][4] 41 and dashed line 161-C is extended through PIVC[3][5] 43-C and PIVC [1][3] 40. Dashed lines 160-C and 161-C intersect at IVC [1][5] 120-C.

FIG. 1.23 shows an example of the final step in the method of solving for DIVC[AD][1][2] 200. In this example, unknown DIVC[AD][1][2] 200 is determined using known PIVC[1][6] 42 and known PIVC[2][6] 46 and known PIVC[2][5] 45 and solved-for IVC[1][15] 120.

FIG. 1.24 shows a method of determining the spatial positioning of the hidden DIVC[AD][1][2] 200 solved for in FIG. 1.23 within the suspension system in the extended state. In this example, the four known sides of the two triangles 42, 45, 46, 120 of FIG. 1.23 are represented as IVC point 120-E and PIVC points 45-E, 42, and 46-E. Dashed lines are extended through two linkage points that each represent sides of the same triangle in FIG. 1.23. For example, dashed line 201-E is extended through IVC[1][5] 120-E and PIVC[2][5] 45-E and dashed line 202-E is extended through PIVC[1][6] 42 and PIVC[2][6] 46-E. Dashed lines 201-E and 202-E intersect at DIVC[AD][1][2] 200-E.

FIG. 1.25 shows a method of determining the spatial positioning of the hidden DIVC[AD][1][2] 200 solved for in FIG. 1.23 within the suspension system in the compressed state. In this example, the four known sides of the two triangles 42, 45, 46, 120 of FIG. 1.23 are represented as IVC point 120-C and PIVC points 45-C, 42, and 46-C. Dashed lines are extended through two linkage points that each represent sides of the same triangle in FIG. 1.23. For example, dashed line 201-C is extended through IVC[1][5] 120-C and PIVC[2][5] 45-C and dashed line 202-C is extended through PIVC[1][6] 42 and PIVC[2][6] 46-C. Dashed lines 201-E and 202-C intersect at DIVC[AD][1][2] 200-C.

In several embodiments, IVC migration plots or curves can be plotted graphically by solving for the IVC at each position between the extended and compressed suspension states. A position of the linkage in between the extended and compressed states is known as an intermediate state. The IVC migration curves depend upon the reference frame considered. In most embodiments, the suspended body is considered fixed as the driven wheel moves from the extended to the compressed state. Note that "-M" refers to the migration of an IVC.

FIGS. 1.26-1.29 illustrate the migration path IVC[1][5] 120 of embodiment 1. Note that not all IVCs or IVC migrations are shown for clarity of the figure. Note that migration paths may be composed of multiple segments if there are inflection points. Due to the nature of the migration path of IVC[1][5] 120-M, it is helpful to break it up into individual sections from extended to compressed states.

FIG. 1.26 illustrates the migration path IVC[1][5] 120-M-1, with "-1" denoting migration 1 of 4 in this particular case as the driven wheel axis moves from extended state 14-E to a position between IVC[1][5] migration point section 1 and 2 shown as 240-1/2. Migration path IVC[1][5] 120-M-1 starts at IVC[1][5] 120-E and ends at IVC[1][5] 120-1. Note that this migration path is so long that it will not fit within the figure scale, as depicted by the broken brackets. Suspended body 1, swingarm body 2-E, link body 6-E, extension body 7-E, shock body 8-E, and driven wheel 10-E are also shown.

FIG. 1.27 illustrates the migration path IVC[1][5] 120-M-2, with "-2" denoting migration 2 of 4 in this particular case as the driven wheel axis moves from the migration 240-1/2 to the position at the start of 240-3. Migration path IVC[1][5] 120-M-2 starts at IVC[1][5] 120-2 and ends at IVC[1][5] 120-3. Note that this migration path is so long that it will not fit within the figure scale, as depicted by the broken brackets. Suspended body 1, swingarm body 2-E, link body 6-E, extension body 7-E, shock body 8-E, and driven wheel 10-E are also shown.

FIG. 1.28 illustrates the migration path IVC[1][5] 120-M-3, with "-3" denoting migration 3 of 4 in this particular case as the driven wheel axis moves from the migration 240-3 to the position between section 4 and 5 shown as 240-4/5. Migration path IVC[1][5] 120-M-3 starts at IVC [1][5] 120-3 and ends at IVC[1][5] 120-4. Suspended body 1, swingarm body 2-E, link body 6-E, extension body 7-E, shock body 8-E, and driven wheel 10-E are also shown.

FIG. 1.29 illustrates the migration path IVC[1][5] 120-M-4, with "-4" denoting migration 4 of 4 in this particular case as the driven wheel axis moves from the migration 240-4/5 to the position at the compressed state 14-C. Migration path IVC[1][5] 120-M-4 starts at IVC[1][5] 120-5 and ends at IVC[1][5] 120-C. Note that this migration path is so long that it will not fit within the figure scale, as depicted by the broken brackets. Suspended body 1, swingarm body 2-E, link body 6-E, extension body 7-E, shock body 8-E, and driven wheel 10-E are also shown.

As shown in FIG. 1.30, the various parts and IVCs of the suspension system may be located at different positions in the system depending on the state of the system. For example, the driven wheel axis may be located at different positions along the driven wheel axis migration path (DWAP) 281. For example, the driven wheel axis 14 may be at extended state position 14-E, at compressed state position 14-C as shown by the termination of DWAP 281, or at any other position along the DWAP 281. As another example, DIVC[AD][1][2] 200 may be located at different positions along the DIVC[AD][1][2] migration path 280. For example, DIVC[AD][1][2] may be at extended state position 200-E, at compressed state position 200-C, or at any other position along the DIVC[AD][1][2] migration path 280.

FIG. 1.31 shows various IVC migration paths from the extended to the compressed state. It also shows suspended body 1, PIVC[1][3] 40, and PIVC[1][4] 41. 43-M is the migration path of PIVC[3][5] 43, 44-M is the migration path of PIVC[4][5] 44, and 45-M is the migration path of PIVC[2][5] 45. Migration path 43-M starts at the extended state 43-E, moves to the migration path's inflection point 43-I, and then reverses direction to the compressed state 43-C. In other words, as DWAP 281 in FIG. 1.30 moves from the extended state 14-E to the compressed state 14-C, migration path 43-M first moves one direction to inflection point 43-I, and then reverses direction to compressed point 43-C. Migration path 44-M starts at the extended state 44-E, moves to the migration path's inflection point 44-I, and then reverses direction to the compressed state 44-C. In other words, as DWAP 281 in FIG. 1.30 moves from the extended state 14-E to the compressed state 14-C, migration path 44-M first moves one direction to inflection point 44-I, and then reverses direction to compressed point 44-C. Migration path 45-M starts at the extended state 45-E, moves to the migration path's inflection point 45-I, and then reverses direction to the compressed state 45-C. In other words, as DWAP 281 in FIG. 1.30 moves from the extended state 14-E to the compressed state 14-C, migration path 45-M first moves one direction to inflection point 45-I, and then reverses direction to compressed point 45-C.

In various embodiments, mathematical attributes of the IVC migration pathways may be analyzed. FIG. 1.32 shows one embodiment of an analysis schematic of an IVC migration path. As shown in FIG. 1.32, point 400 is a point located on curve/spline 401 where a circle 402 centered at 403 with radius 404 mathematically best fits curve/spline 401. The curvature k at point 400 of curve or spline 401 where R is radius 404 is defined by the following equation:

$$\text{Curvature} = k = \frac{1}{R}$$

As one example, the curvature of a straight line is defined to be zero since R=∞. Radius R is known as the radius of curvature (RC). Tangent vector (TV) 405 starts at point 400, is perpendicular to radius R 404, and points in the specified direction of curve 401. Point 403 is known as the center of curvature (CC) of curve 401 at point 400. The center of curvature (CC), the radius of curvature (RC), and the tangent vector (TV) may be found at every point along curve 401.

FIG. 1.33 shows another embodiment of an analysis schematic of an IVC migration path. FIG. 1.33 shows a circle 402B and a circle 4020 on a curve/spline 440. In FIG. 1.33, the large circle 402B point 441 is a point located on curve/spline 440 where circle 402B best fits curve/spline 440. The circle 402B comprises circle CC 442 and circle RC 443. The circle 4020 point 444 is a point located on curve/spline 440 where circle 4020 best fits curve/spline 440. Circle 402C comprises circle CC 445 and circle RC 446. Circle CC 442 is located on the opposite side of curve 440 compared to circle CC 445. If either CC 442 or 445 switches from one side of the curve to the other, curvature inflection results at inflection point 447 on curve 440, where k=0 and RC=∞. RC[min] 446 is the smallest RC value between a first end point 448 and a second end point 449 on curve 440.

Linear algebra may be used to estimate RC, CC, and k at a point on a curve C. However, other methods of estimation are also contemplated. Using linear algebra, at least three points a, b, and c along a path may be used to define the CC. A circle may be defined that mathematically best fits through the points a, b, and c. It may be noted that this is an approximation since there is a discretization error. The closer together points a, b and c are, the more accurate the RC, CC, and k values will be using this method. It is preferable that points a, b, and c are within a 5% distance of the length of curve C for each increment.

As an example, three different points on curve C may be selected at locations a, b, and c, where a and c are on opposite sides of b. An x,y coordinate can then be determined for both the CC and RC at point b using linear algebra. In this example, the RC magnitude is calculated and the CC (x,y) coordinates are determined. The following equations are representative of this method:

$$a = \begin{vmatrix} x_1 & y_1 & 1 \\ x_2 & y_2 & 1 \\ x_3 & y_3 & 1 \end{vmatrix}$$

$$a = x_1[(y_2*1) - (y_3*1)] - y_1[(x_2*1) - (x_3*1)] + 1[(x_2*y_3) - (x_3*y_2)]$$

$$b_x = -\begin{vmatrix} x_1^2+y_1^2 & y_1 & 1 \\ x_2^2+y_2^2 & y_2 & 1 \\ x_3^2+y_3^2 & y_3 & 1 \end{vmatrix}$$

$$b_x = -(x_1^2+y_1^2)[(y_2*1) - (y_3*1)] + y_1[((x_2^2+y_2^2)*1) - ((x_3^2+y_3^2)*1)] - 1[((x_2^2+y_2^2)*y_3) - ((x_3^2+y_3^2)*y_2)]$$

$$b_y = \begin{vmatrix} x_1^2+y_1^2 & x_1 & 1 \\ x_2^2+y_2^2 & x_2 & 1 \\ x_3^2+y_3^2 & x_3 & 1 \end{vmatrix}$$

$$b_y = (x_1^2+y_1^2)[(x_2*1) - (x_3*1)] - x_1[((x_2^2+y_2^2)*1) - ((x_3^2+y_3^2)*1)] + 1[((x_2^2+y_2^2)*x_3) - ((x_3^2+y_3^2)*x_2)]$$

$$c = \begin{vmatrix} x_1^2+y_1^2 & x_1 & y_1 \\ x_2^2+y_2^2 & x_2 & y_2 \\ x_3^2+y_3^2 & x_3 & y_3 \end{vmatrix}$$

$$c = -(x_1^2+y_1^2)[(x_2*y_3) - (x_3*y_2)] + x_1[((x_2^2+y_2^2)*y_3) - ((x_3^2+y_3^2)*y_2)] - y_1[((x_2^2+y_2^2)*x_3) - ((x_3^2+y_3^2)*x_2)]$$

$$\boxed{x = -\frac{b_x}{2a}}$$

$$\boxed{y = -\frac{b_y}{2a}}$$

-continued $$RC = \frac{\sqrt{b_x^2 + b_y^2 - 4ac}}{2|a|}$$

In FIG. 1.34, 45-M is the migration path of PIVC[2][5] 45 from the extended to the compressed state. It also shows suspended body 1, PIVC[1][3] 40, and PIVC[1][4] 41. Migration path 45-M starts at the extended state 45-E, moves to the migration path's inflection point 45-I, and then reverses direction to the compressed state 45-C. In other words, as DWAP 281 in FIG. 1.30 moves from the extended state 14-E to the compressed state 14-C, migration path 45-M first moves one direction to inflection point 45-I, and then reverses direction to compressed point 45-C. The center of curvature 320 of the minimum radius of curvature 321 of migration curve 45-M is also shown. Note that the minimum radius is so long that it will not fit within the figure scale, as depicted by the broken brackets. Also note that the minimum radius is for one particular location of the curve. In this example, the radius of curvature is not constant and varies throughout the entire migration path. In other examples, the radius of curvature can be constant. This is not true with linear motion where the curvature is 0, or with circular motion where the curvature is constant. The depicted PIVC [2][5] 45 migration curvature and minimum radius, as well as the varying radius of curvature, is characteristic of the acceleration (anti-squat) and deceleration (anti-rise) responses described in FIG. 1.40 and FIG. 1.41. The higher anti-squat percentage is ideal for pedaling efficiency in the beginning of the travel while the lower anti-squat percentage minimizes the anti-squat force where bump absorption takes precedence. Thus, suspension performance may be improved through the interrelationship between the 15 IVC migration paths.

Other methods can also be used for quantifying path curvature. For example, as an alternative, calculus may be used to determine curvature k should the equation of curve C be known; however, it is contemplated that the equation of curve C may not be known.

In another example, computer aided design (CAD) tools may be used to plot the DIVC migration curve with great resolution. The number of the divisions into which the suspension travel is divided (i.e., the total number of IVC points created to generate a curve) can be large resulting in more accurate results.

A tool in some CAD software is the ability to display "curvature combs", curvature inflection points, and minimum radii of a curve or spline. Curvature combs visually display the curvature of a curve or spline, by showing a network of "combs" or lines along the RC direction at a specified density along path C that represent the curvature K. The greater the magnitude of the comb, the greater K. In addition, the side of which the combs reside designate the curvature sign. Therefore, if the combs switch sides, there is an inflection point where K=0 and the curvature comb magnitude is zero.

In FIG. 1.35, 45-M is another possible migration path of PIVC[2][5] 45 from the extended to the compressed state. It also shows suspended body 1, PIVC[1][3] 40, and PIVC[1][4] 41. Migration path 45-M starts at the extended state 45-E, moves to the migration path's inflection point 45-I, and then reverses direction to the compressed state 45-C. In other words, as DWAP 281 in FIG. 1.30 moves from the extended state 14-E to the compressed state 14-C; migration path 45-M first moves one direction to inflection point 45-I, and then reverses direction to compressed point 45-C. In this case, the following are shown: center of curvature 322, minimum radius of curvature 323, and curvature comb 324. Also shown are center of curvature 325, minimum radius of curvature 326, and curvature inflection point 328. Note that the minimum radius 326 at the inflection point is so long that it will not fit within the Fig. scale, as depicted by the broken brackets. Also shown, center of curvature 327, minimum radius of curvature 328, and curvature inflection point 329. Center of curvature 322 and 328 are on opposing sides of 45-M. Migration path 45-M is located within an area defined by circle 220 centered at driving cog axis 17 with radius 331. The depicted PIVC[2][5] 45 migration curvature and minimum radius is characteristic of the acceleration (anti-squat) and deceleration (anti-rise) responses described in FIG. 1.40 and FIG. 1.41. This migration path behavior is not possible with a traditional link with a perfectly arcuate path. The higher anti-squat percentage is for pedaling efficiency in the beginning of the travel while the lower anti-squat percentage minimizes the anti-squat force where bump absorption takes precedence. It also allows for greater tunability of suspension performance. Thus, suspension performance may be improved through the interrelationship between the 15 IVC migration paths.

FIG. 1.358, 46-M shows a possible migration path of PIVC[2][6] 46 from extended state 46-E to compressed state 46-C. 46-M is arcuate such that the radius of curvature can be a constant with a magnitude equal to length 80 as shown for example from PIVC[1][6] 42 to PIVC[2][6] 46-E. Another example of a migration path with a constant radius of curvature would be a straight line having zero curvature. In this embodiment, swingarm body 2 is connected to link 6 at PIVC[2][6] 46 and to link 5 at PIVC[2][5]. 46-M can have a constant radius of curvature, while 45-M can have a non-constant radius of curvature. The combination of a constant radius of curvature and non-constant radius of curvature PIVC migrations is characteristic of the acceleration (anti-squat) and deceleration (anti-rise) responses described in FIG. 1.40 and FIG. 1.41. The higher anti-squat percentage is for pedaling efficiency in the beginning of the travel while the lower anti-squat percentage minimizes the anti-squat force where bump absorption takes precedence. The combination also allows for greater tunability of suspension performance since many possible non-constant radius of curvature migration paths can be achieved. Thus, suspension performance may be improved through the interrelationship between the 15 IVC migration paths.

FIG. 1.36 is a possible configuration of suspended body 1, link body 3, link body 4 and link body 5. Show in the extended state, link body 3-E, link body 4-E, and link body 5-E are combined as a single body 3/4/5-E. However, kinematically they function as individual linkages due to flexural pivots allowing for relative motion between virtual link body 3, virtual link body 4, and virtual link body 5.

FIG. 1.37 is an exploded view of FIG. 1.36. Here, bolt 80 pivotally fastens link body 3/4/5-E to suspended body 1 and bolt 81 pivotally fastens lower linkage 200 which is composed of link body 3/4/5-E to suspended body 1.

FIG. 1.38 shows FIG. 1.36 in the extended, inflection, and compressed state. Note that these configurations are labeled 48-E, 48-I and 48-C as in FIG. 1.8. Note that starting PIVC[3][5] 44 and PIVC[4][5] 43 are virtual since body 3, body 4, and body 5 are combined into a single body. Virtual body 3 can flex relative to virtual body 5, and virtual body 4 can flex relative to virtual body 5. This assembly achieves the kinematics as if bodies 3-5 were separated with pivotal joints, but with a lighter, simpler assembly with fewer parts.

FIGS. 1.43-1.59 illustrate another embodiment of combined link body 3/4/5-E in the extended state. FIG. 1.43 shows a top isometric view of a possible embodiment of single body 3/4/5-E with flexural pivots. In various embodiments, such as those shown in FIGS. 1.43-1.59, the linkages discussed above can be replaced with a flexural single body link 3/4/5. To reiterate, body 3/4/5 can be a flexural linkage replacement for the rigid member linkage version, e.g. lower linkage 200 noted in FIG. 1.3A, 1.3B, in which body 3, body 4, and body 5 are substantially ridged members that are jointly connected. The body 3/4/5 works to allow for relatively similar movement as the movement paths discussed above. PIVC [2][5] 45-E is shown as an axis in this non-planar, isometric view. About PIVC [2][5] 45-E is a cylindrical structure at or near the central portion of the body that houses a bearing 500 on opposing sides. While bearings are shown in this embodiment, it is understood that any other suitable rotary joint assembly such as a bushing may be used for relative pivotal motion. From this central cylindrical housing stems opposing protrusions that extend outwardly and then laterally to terminal ends. In this embodiment the structure profile view makes an "S" or "Z" shaped structure depending on the normal view chosen, which will be further explained. At one terminal end is another cylindrical structure about PIVC [1][4] 41 which houses a bearing 501 on opposing sides. Note that reference marker 541-E is for reference only and is used to clearly show relative angular motion in later figures. Connecting the central cylindrical structure about PIVC [2][5] 45-E and the terminal end cylindrical structure about PIVC [1][4] 41 is a relatively thin structure that flexes about this beam length, and virtually represents PIVC [4][5] 44-E as PIVC [2][5] 45 migrates per path 45-M (described in FIGS. 1.31 and 1.34) and cylindrical structure about PIVC [1][4] 41 rotates about bearings 501. The initial extension outward from the central cylindrical structure may be thicker than the lateral extension to the terminal cylindrical structure. The thinner structure aids in flex for virtual PIVC [4][5] 44. PIVC [1][3] 40 and PIVC [1][4] 41 are pivotally mated to suspended body 1 as shown in FIG. 1.36. The thicker outward extension, mounting points for PIVC [1][3] 40 and PIVC [1][4] 41 on opposite side of the central cylindrical structure, as well as a wide flexural beam for virtual PIVC [4][5] 44 in the direction of the IVC axes aid in supporting body 3/4/5 from deflecting in directions other than that of path 45-M. The direction of the beam flex of virtual pivot PIVC [4][5] 44 and the direction of angular rotation of the cylindrical structure about PIVC [1][4] 41 depends upon the direction of movement of PIVC [2][5] 45. These specifics are noted in further figures.

FIG. 1.44 is a transparent view of FIG. 1.43 to more clearly see the layout and the bearing locations. FIG. 1.45 shows a bottom isometric solid view of a possible embodiment of single body 3/4/5-E with flexural pivots. PIVC [2][5] 45-E is shown as an axis in this non-planar, isometric view. About PIVC [2][5] 45-E is a cylindrical structure at or near the central portion of the body that houses a bearing 500 on opposing sides. While bearings are shown in this embodiment, it is apparent based on the disclosure herein that any other suitable rotary joint assembly such as a bushing may be used for relative pivotal motion. From this central cylindrical housing stems opposing protrusions that extend outwardly and then laterally to terminal ends. In this embodiment the structure profile view makes an "S" or "Z" shaped structure depending on the normal view chosen, which will be further explained. At one terminal end is another cylindrical structure about PIVC [1][3] 40 which houses a bearing 501 on opposing sides. Note that reference marker 540-E is for reference only and is used to clearly show relative angular motion in later figures. Connecting the central cylindrical structure about PIVC [2][5] 45-E and the terminal end cylindrical structure about PIVC [1][3] 40 is a relatively thin structure that flexes about this beam length, and virtually represents PIVC [3][5] 43-E as PIVC [2][5] 45 migrates per path 45-M (described in FIGS. 1.31 and 1.34) and cylindrical structure about PIVC [1][3] 40 rotates about bearings 501. The initial extension outward from the central cylindrical structure may be thicker than the lateral extension to the terminal cylindrical structure. The thinner structure aids in flex for virtual PIVC [3][5] 43. PIVC [1][3] 40 and PIVC [1][4] 41 are pivotally mated to suspended body 1 as shown in FIG. 1.36. The thicker outward extension, mounting points for PIVC [1][3] 40 and PIVC [1][4] 41 on opposite side of the central cylindrical structure, as well as a wide flexural beam for virtual PIVC [3][5] 43 in the direction of the IVC axes aid in supporting body 3/4/5 from deflecting in directions other than that of path 45-M. The direction of the beam flex of virtual pivot PIVC [3][5] 43 and the direction of angular rotation of the cylindrical structure about PIVC [1][3] 40 depends upon the direction of movement of PIVC [2][5] 45. These specifics are noted in further figures.

FIG. 1.46 is a transparent view of FIG. 1.45 to more clearly see the layout and the bearing locations. Body 3/4/5 may be made of many different materials such as carbon fiber, other composites, titanium, or other metals. Carbon fiber or titanium may be well suited due to their high fatigue life suitable for flexural structures. With the omission of a rotary joint assembly such as a ball bearing or a bushing at PIVC [3][5] 43 and PIVC [4][5] 44, as well as the hardware to assemble body 3 to body 5 and body 4 to body 5, the flexure the weight of the assembly is reduced. In addition, manufacturability may be increased by decreasing the number of parts in the lower linkage 200.

FIG. 1.47 shows a top solid view of a possible embodiment of single body 3/4/5-E with flexural pivots. Here PIVC [1][4] 41 and PIVC [2][5] 45-E are shown. In addition, the flexural beam area of virtual PIVC [4][5] 44-E are shown.

FIG. 1.48 shows a top transparent view of a possible embodiment of single body 3/4/5-E with flexural pivots. FIG. 1.49 shows a bottom solid view of a possible embodiment of single body 3/4/5-E with flexural pivots. Here PIVC [1][3] 40 and PIVC [2][5] 45-E are shown. In addition, the flexural beam area of virtual PIVC [3][5] 43-E are shown. FIG. 1.50 shows a bottom transparent view of a possible embodiment of single body 3/4/5-E with flexural pivots. FIG. 1.51 shows a side solid view of a possible embodiment of single body 3/4/5-E with flexural pivots with cross-section line A. From this view the "S" structure described above is clear, as well as the wider outwardly supports from the central cylindrical structure about PIVC [2][5] 45-E, the thinner lateral structures for virtual PIVC [3][5] 43-E, and virtual PIVC [4][5] 44-E.

FIG. 1.52 shows cross-section A of FIG. 1.51. Here, bearings 500 can be seen on opposing sides of the central cylindrical structure about PIVC [2][5] 45-E, as well as spacer 520 between said bearings. This spacer aids in preventing the ball bearings from binding when fastened to swingarm body 2. However, in various embodiments, such a spacer is omitted. Bearings 501 are also shown on opposing sides of the central cylindrical structure about PIVC [1][4] 41, as well as spacer 521 between said bearings. This spacer aids in preventing the ball bearings from binding when fastened to suspended body 1. Bearings 501 are also shown on opposing sides of the central cylindrical structure about PIVC [1][3] 40, as well as spacer 521 between said bearings. Again, this spacer aids in preventing the ball bearings from binding when fastened to suspended body 1.

FIG. 1.53 shows a side solid view of a possible embodiment of single body 3/4/5-E with flexural pivots with cross-section line B. FIG. 1.54 shows cross-section B of FIG. 1.53. This view shows the relatively thin structure that flexes, and virtually represents PIVC [3][5] 43-E and PIVC [4][5] 44-E as PIVC [2][5] 45 migrates per path 45-M (described in FIGS. 1.31 and 1.34) and cylindrical structure about PIVC [1][3] 40 and cylindrical structure about PIVC [1][4] 41 rotates about bearings 501.

FIG. 1.55 shows a side solid view of a possible embodiment of single body 3/4/5-E with flexural pivots with cross-section line C. FIG. 1.56 shows cross-section C of FIG. 1.55. This view shows the relatively thin structure that flexes, and virtually represents PIVC [4][5] 44-E as PIVC [2][5] 45 migrates per path 45-M (described in FIGS. 1.31 and 1.34) and cylindrical structure about PIVC [1][4] 41 rotates about bearings 501.

FIG. 1.57 shows a side solid view of a possible embodiment of single body 3/4/5-E with flexural pivots with cross-section line D. FIG. 1.58 shows cross-section D of FIG. 1.57. This view shows the relatively thin structure that flexes, and virtually represents PIVC [3][5] 43-E as PIVC [2][5] 45 migrates per path 45-M (described in FIGS. 1.31 and 1.34) and cylindrical structure about PIVC [1][3] 40 rotates about bearings 501.

FIG. 1.59 shows FIG. 1.43 in the extended (48-E), inflection (48-I), and compressed (48-C) state. In the extended state 48-E, angle 541-E-A is that between a line defined from PIVC [1][4] 41 to reference 541-E, and a horizontal line that intersects with PIVC [1][4] 41. In the extended state 48-E, angle 540-E-A is that between a line defined from PIVC [1][3] 40 to reference 540-E, and a horizontal line that intersects with PIVC [1][3] 40. The beam structure that flexes as Virtual PIVC [4][5] 44-E can be shown to be relatively parallel with the line defined between PIVC [1][4] 41 to reference 541-E, and a horizontal line that intersects with PIVC [1][4] 41. The beam structure that flexes as Virtual PIVC [3][5] 43-E can be shown to be relatively parallel with the line defined between PIVC [1][3] 40 to reference 540-E, and a horizontal line that intersects with PIVC [1][4] 41. These angles change, and the beam structures flex as PIVC [2][5] 45 migrates from the extended to the inflection to the compressed states.

From extended state 48-E to the inflection state 48-I, the cylindrical structure about PIVC [1][4] 41 has rotated clockwise and angle 541-1-A has changed accordingly. The beam structure that flexes as Virtual PIVC [4][5] 44-E has deformed accordingly to allow for a degree of freedom. From extended state 48-E to the inflection state 48-I, the cylindrical structure about PIVC [1][3] 40 has rotated counter-clockwise and angle 540-1-A has changed accordingly. The beam structure that flexes as Virtual PIVC [3][5] 43-E has deformed accordingly to allow for a degree of freedom.

From inflection state 48-I to the compressed state 48-C, the cylindrical structure about PIVC [1][4] 41 has rotated counter-clockwise and angle 541-C-A has changed accordingly. The beam structure that flexes as Virtual PIVC [4][5] 44-E has deformed accordingly to allow for a degree of freedom. From inflection state 48-I to the compressed state 48-C, the cylindrical structure about PIVC [1][3] 40 has rotated clockwise and angle 541-C-A has changed accordingly. The beam structure that flexes as Virtual PIVC [3][5] 44-E has deformed accordingly to allow for a degree of freedom.

The force to deform the beam structures for virtual PIVC [4][5] 43 and PIVC [4][5] 44 may also be advantageous for suspension performance. Flexure body 3/4/5 may be designed so that the position of beam structures at virtual PIVC [3][5] 43 and PIVC [4][5] 44 are within any position of 43-M or 44-M respectively as shown in FIG. 1.31, before the body is pivotally mounted to suspended body 1 at PIVC [1][3] 40 and PIVC [1][4] 41, or in its free state. As a result, the deformation of beam structures at virtual PIVC [3][5] 43 and PIVC [4][5] 44 may apply a force to PIVC [2][5] 45 in either direction of migration path 45-M depending on design intent. As an example, the free state of flexure body 3/4/5 may be designed so that a downward force is applied relative to migration path 45-M of PIVC [2][5] 45 which would inhibit the motion of swingarm body 2 as it moves from the state of extension to the state of inflection. This may aid in pedaling efficiency by working in tandem with anti-squat forces and the extension of the swingarm to prevent suspension bobbing. In another example the free-state of flexure body 3/4/5 may be designed at the sag position (described below). As a result, the equilibrium of beam flexure forces tends to position the swingarm at the sag position of travel. This may aid in pedaling efficiency by working in tandem with anti-squat forces and the extension of the swingarm to prevent suspension bobbing. As a final example the free-state of flexure body 3/4/5 may be designed at the mid-point of migration paths 43-M and 44-M. As a result, the amount of beam flexure deflection at virtual PIVC [3][5] 43 and PIVC [4][5] 44 would be equal minimizing the flexural force on the linkage system, so that it more similarly represents a non-flexural system, but with the weight savings and manufacturability advantages.

Another advantage of the single flexural body 3/4/5 is that there may be very little flex due to the relatively short migration paths of 43-M and 44-M, and with the ability for the cylindrical structures about virtual PIVC [3][5] 43 and virtual PIVC [4][5] 44. As a result, the internal stresses when the beam structure flexes can be minimized as well as the force on the linkage system as described above. Therefore, the flexure system can closely mimic that of the mechanical linkage version, but with the added weight savings and manufacturability advantages.

Looking at FIG. 1.59, the structure about PIVC [1][3] 40 and PIVC [1][4] 41 may be fixed rather than pivotally connected to suspended body 1. As a result, there would no change to angle 540 or 541 as the 45-E moves about 45-M. Therefore, the assembly may be lightened further by removing the need for a rotary/revolute assembly such as a bearing or bushing. In this case the beam flexure force described above may be increased which may have advantages to suspension performance depending upon the free-state position of single flexural body 3/4/5 as described above.

FIGS. 1.60-1.69 illustrate another embodiment of combined link body 3/4/5-E in the extended state. FIG. 1.60 shows a top isometric view of a possible embodiment of combined link body 3/4/5-E with flexural pivots. Note that the extended state was chosen arbitrarily, and the free state of the combined link body 3/4/5 could be at any position from the extended to the compressed state. This embodiment is similar to that in FIGS. 1.43-1.59, however in this case the combined link body 3/4/5-E is composed of several assembled components to form a final body. PIVC [2][5] 45-E is shown as an axis in this non-planar isometric view. About PIVC [2][5] 45-E is the central body 5 that houses bearing 500 on opposing sides. While bearings are shown in this embodiment, it is understood that any other suitable rotary joint assembly such as a bushing may be used for relative pivotal motion. Inner race extensions 551 may interface with bearing 500 and the mounting surface. Spacer 552 may be used to interface with bearings 500 in order to support the inner races when the bearing is pre-loaded axially. From this central cylindrical housing stems opposing protrusions that extend outwardly. Rather than continuing laterally to terminal ends as in FIG. 1.43, these protrusions end as a mounting interface to accept additional components. Upper flexural component 4 is fixed to central body 550 at the upper protrusion mounting interface via screws 554 that are threaded into central body 550. Washer 555 is placed between upper flexural component 553 and screws 554 to aid in distributing the force of screws 554 about upper flexural component 553. On the opposing side of upper flexural component 4 is a cylindrical structure about PIVC [1][4] 41 which houses a bearing 501 on opposing sides. Inner race extensions 556 may interface with bearing 501 and the mounting surface. From the fixed end of upper flexural component 4 the terminal end cylindrical structure about PIVC [1][4] 41 is a relatively thin structure that flexes about this beam length, and virtually represents PIVC [4][5] 44-E as PIVC [2][5] 45 migrates per path 45-M (described in FIGS. 1.31 and 1.34) and cylindrical structure about PIVC [1][4] 41 rotates about bearings 501. The thinner structure aids in flex for virtual PIVC [4][5] 44. Lower flexural component 3 is fixed to central body 5 at the lower protrusion mounting interface via screws 554 (not visible in this view) that are threaded into central body 5. Washer 558 is placed between lower flexural component 3 and screws 554 to aid in distributing the force of screws 554 about lower flexural component 3. On the opposing side of lower flexural component 3 is a cylindrical structure about PIVC [1][3] 40 which houses a bearing 501 on opposing sides. Inner race extensions 556 may interface with bearing 501 and the mounting surface. From the fixed end of lower flexural component 3 the terminal end cylindrical structure about PIVC [1][3] 40 is a relatively thin structure that flexes about this beam length, and virtually represents PIVC [3][5] 43-E as PIVC [2][5] 45 migrates per path 45-M (described in FIGS. 1.31 and 1.34) and cylindrical structure about PIVC [1][3] 40 rotates about bearings 501. The thinner structure aids in flex for virtual PIVC [3][5] 43. PIVC [1][3] 40 and PIVC [1][4] 41 are pivotally mated to suspended body 1 as shown in FIG. 1.36. Mounting points for PIVC [1][3] 40 and PIVC [1][4] 41 on opposite side of the central cylindrical structure, as well as a wide flexural beam for virtual PIVC [4][5] 44 in the direction of the IVC axes aid in supporting body 3/4/5 from deflecting in directions other than that of path 45-M. The direction of the beam flex of virtual pivot PIVC [4][5] 44 and the direction of angular rotation of the cylindrical structure about PIVC [1][4] 41 depends upon the direction of movement of PIVC [2][5] 45.

FIG. 1.61 shows an exploded view of the assembled isometric view shown in FIG. 1.60. Here spacers 521 are shown which were not visible in FIG. 160, which may be used to interface with bearings 501 in order to support the inner races when the bearing is pre-loaded axially.

FIG. 1.62 shows a right-side solid view of a possible embodiment of single body 3/4/5-E with flexural pivots composed of several components.

FIG. 1.63 shows a left-side solid view of a possible embodiment of single body 3/4/5-E with flexural pivots composed of several components.

FIG. 1.64 shows a top solid view of a possible embodiment of single body 3/4/5-E with flexural pivots composed of several components. Note that the width of flex body 3 and flex body 4 may differ. In addition, they may be positions so that they are offset from the centerline of body 5, which may allow for greater clearance to other bicycle components such as the drivetrain. Flex bodies 3 and 4 may also have equivalent widths or be centered about body 5. Flex bodies 3 and 4 may also be equivalent, which would reduce the number of unique parts in the assembly increasing production efficiencies.

FIG. 1.65 shows a bottom solid view of a possible embodiment of single body 3/4/5-E with flexural pivots composed of several components. Note that the width of flex body 3 and flex body 4 may differ. In addition, they may be positions so that they are offset from the centerline of body 5, which may allow for greater clearance to other bicycle components such as the drivetrain. Flex bodies 3 and 4 may also have equivalent widths or be centered about body 5. Flex bodies 3 and 4 may also be equivalent that reduced the number of unique parts in the assembly increasing production efficiencies.

FIG. 1.66 shows a rear solid view of a possible embodiment of single body 3/4/5-E with flexural pivots composed of several components.

FIG. 1.67 shows a front solid view of a possible embodiment of single body 3/4/5-E with flexural pivots composed of several components.

FIG. 1.68 shows a rear solid view with cross-section G of a possible embodiment of single body 3/4/5-E with flexural pivots composed of several components.

FIG. 1.69 shows cross-section G of a possible embodiment of single body 3/4/5-E with flexural pivots composed of several components.

Separating the combined body into several assembled components has several advantages. First, the parts may be composed of varying materials with varying material properties, each of which may be chosen to optimize the properties such as weight, cost, stiffness, manufacturability, fatigue life, etc. For example, central body 5 may be made from aluminum, which is lightweight and easily machinable. This component does not see cyclic flexural loads as with flexural components 4 and 3. Flexural components 4 and 3 may be made from titanium or composite such as carbon fiber, which has a high or infinite fatigue life ideal for the cyclic bending loads that will occur with these components. Making the entire structure as shown in FIG. 1.43 out of titanium would likely be more cost prohibitive and heavier than a hybrid of materials possible in FIG. 1.60. The materials of flexural bodies 3 and 4 may also differ from one another allowing for different flex properties and therefore different forces that flex the system. This may aid in the tuning the spring force the combined body has on the suspension system as discussed above. The form or thickness of flexural bodies 3 and 4 may also differ to provide varying spring forces of the system. This offers more tunability then if only one flexural body was in the system. Another advantage of dividing the structure into assembled components is manufacturability. The structures of bodies 5, 4, and 3 are simplified as individual components and therefore easier to manufacture.

Note that combined link body 3/4/5-E with flexural pivots shown in FIG. 1.60 would undergo the same general motion as described in FIG. 1.59 at the varying points of travel within the suspension range.

The spring force due to the bending of flexure body 3/4/5 can be calculated as the resultant force that can move swingarm body 2 from the extended state to the compressed state. This force can vary and can be tuned dependent upon factors such as linkage geometry and material, or other factors. It can also be tuned based on the flexure body 3/4/5 free state position. As an example, consider the case where migration path PIVC[2][5] 45-M is 2.7 mm upwards from 45-E to 45-I, and is 2.7 mm downwards from 45-I to 45-C as shown in FIG. 1.70. The sag range is also shown in several figures which is discussed further below. The free state of the flexure body 3/4/5 chosen in this example is at half of the total range of travel from the inflection state to the compressed state. In this example, there are two points from the extended state to the compressed state in which the flexure body 3/4/5 is in its free state as denoted by 45-F1 and 45-F2. From 45-E to 45-I PIVC[2][5] 45 is moving upwards. From 45-I to 45-C PIVC[2][5] 45 is moving downwards. This can be seen in FIG. 1.59. From 45-E to 45-F1 the spring force is promoting movement of the swingarm rear wheel axis towards the compressed state. At 45-F1 there is no spring force provided by the flexure body 3/4/5 since it is at its free state. From 45-F1 to 45-I the spring force is increasingly resisting movement of the swingarm rear wheel axis towards the compressed state. This is occurring within the sag band of travel in this example. From 45-I to 45-F2 the spring force is decreasingly promoting movement of the swingarm rear wheel axis towards the compressed state. At 45-F2 there is no spring force provided by the flexure body 3/4/5 since it is at its free state. From 45-F2 to 45-C the spring force is resisting movement of the swingarm rear wheel axis towards the compressed state.

The resultant spring force at rear wheel axis 14 can be calculated in the following way: First, a force that bends flexural body 3 about virtual PIVC [3][5] 43 and flexural body 4 about virtual PIVC [4][5] 44 versus PIVC[2][5] displacement is determined, as shown for example in FIG. 1.71. In this example the spring force is linear, however this can be tuned to be non-linear with changes to flexure geometry and material.

Next, the leverage rate of the rear wheel axis migration 14-M of swingarm body 2 versus the migration path PIVC [2][5] 45-M is determined. This leverage rate can be calculated as the ratio of the change in 14-M migration to the change in 45-M migration and can be seen for example in FIG. 1.72. The greater the leverage rate, the greater the mechanical advantage migration path 14-M has over 45-M. Note the asymptote at inflection point 45-I.

Next, the force derived in FIG. 1.71, based on displacements in FIG. 1.70 is divided by leverage rate in FIG. 1.72 to calculate the force at the rear wheel axis 14 from the extended to the compressed states as shown in FIG. 1.73. There are seven locations defined in this plot: 45-E, 45-F1, 45-A, 45-I, 45-B, 45-F2 and 45-C, as follows: 45-A is the first point of inflection of the force curve and 45-B is the second point of inflection of the force curve. Infection point 45-A can be within the sag range, as illustrated. Points 45-A and 45-B are not to be confused with the inflection point 45-M. Negative wheel axis 14 force values correspond to a force that is promoting movement of the swingarm rear wheel axis towards the compressed state while positive wheel axis 14 force values correspond to a force that is resisting movement of the swingarm rear wheel axis towards the compressed state.

FIGS. 1.74-1.80 show the flexure body positioned to the corresponding 7 locations noted in FIG. 1.73 above. These are side profile Finite Element Analysis models of the example of a flexure assembly shown in FIG. 1.60, with several components removed for simplification and clarity. Simulations of the bending of the flexure bodies can be clearly seen.

FIG. 1.74 shows the flexure body 3/4/5 positioned at 45-E. Note that 45-F in this example is equivalent to 45-F1 and 45-F2. 641-F is a reference locator denoting the position of body 4 at the flexure body free state. 641-E is a reference locator on body 4 to visualize the rotation seen about PIVC[1][4] 41 from the flexure body free state 4-F to the flexure body extended state 4-E. Here it can be seen that body 5-E is positioned below free state 45-F. 4-E has rotated counter-clockwise from 641-F about PIVC[1][4] 41 to 641-E, and 3-E has rotated clockwise from 640-F about PIVC [1][3] 40 to 640-E. Bending of the thin portion of body 4-E can be seen about 44-E and bending of the thin portion of body 3-E can be seen about 43-E.

FIG. 1.75 shows the flexure body 3/4/5 positioned at free state 45-F1. Note that 45-F in this example is equivalent to 45-F1 and 45-F2. Here there is no rotation of body 3-F1 or 3-F1 and there is no bending of the thin portion of body 4-F1 can be seen about 44-F1 and bending of the thin portion of body 3-F1 can be seen about 43-F1.

FIG. 1.76 shows the flexure body 3/4/5 positioned at 45-A. Here it can be seen that body 5-A is positioned above free state 45-F. As a result 4-A has rotated clockwise from 641-F about PIVC[1][4] 41 to 641-A, and 3-A has rotated counter-clockwise from 640-F about PIVC[1][3] 40 to 640-A. Bending of the thin portion of body 4-A can be seen about 44-A and bending of the thin portion of body 3-A can be seen about 43-A.

FIG. 1.77 shows the flexure body 3/4/5 positioned at 45-I. Here it can be seen that body 5-I is positioned above free state 45-F. As a result 4-I has rotated further clockwise from 641-F about PIVC[1][4] 41 to 641-I, and 3-I has rotated further counter-clockwise from 640-F about PIVC[1][3] 40 to 640-I. Bending of the thin portion of body 4-I can be seen about 44-I and bending of the thin portion of body 3-I can be seen about 43-I.

FIG. 1.78 shows the flexure body 3/4/5 positioned at 45-B. Here, it can be seen that body 5-B is positioned above free state 45-F. 4-B has rotated counter clockwise from 641-I about PIVC[1][4] 41 to 641-B, and 3-B has rotated clockwise from 640-I about PIVC[1][4] 41 to 640-B. From the free state, 4-B has rotated clockwise from 641-F about PIVC[1][4] 41 to 641-B, and 3-B has rotated counter-clockwise from 640-F about PIVC[1][3] 40 to 640-B. Bending of the thin portion of body 4-B can be seen about 44-B and bending of the thin portion of body 3-B can be seen about 43-B.

FIG. 1.79 shows the flexure body 3/4/5 positioned at free state 45-F2. Note that 45-F in this example is equivalent to 45-F1 and 45-F2. Here there is no rotation of body 3-F2 or 3-F2 and there is no bending of the thin portion of body 4-F2 can be seen about 44-F2 and bending of the thin portion of body 3-F2 can be seen about 43-F2.

FIG. 1.80 shows the flexure body 3/4/5 positioned at 45-C. Here it can be seen that body 5-C is positioned below free state 45-F. As a result 4-C has rotated counter-clockwise from 641-F2 about PIVC[1][4] 41 to 641-C, and 3-C has rotated clockwise from 640-F about PIVC[1][3] 40 to 640-C. Bending of the thin portion of body 4-C can be seen about 44-C, and bending of the thin portion of body 3-C can be seen about 43-C.

FIG. 1.81 shows two different curves plotted. The first (the solid line) is of the resultant force at the swingarm wheel axis 14 as a result of the shock spring force only. The shock spring force is resisting movement in the direction of swingarm movement from the extended to the compressed states. The second (dashed line) is the resultant force at swingarm wheel axis 14 of the shock spring force combined with the force due to the flexure body 3/4/5. The addition of the flexure spring force initially decreases the overall resultant spring force at the swingarm wheel axis 14, which can increase small bump sensitivity. It then increases around sag which aids in the pedaling platform, then decreases after sag helping make use of the travel after sag, and then increases again towards the compressed state to prevent the shock from bottoming out under heavy forces. As a result, the ride characteristics of the suspension may be improved. Depending on the free-state position chosen, the bicycle's performance can be tuned to behave differently depending on the intended terrain and rider's style.

Tony Foale (Foale, Tony. *Motorcycle Handling and Chassis Design the Art and Science. Second Edition*. Spain: Tony Foale Designs by Tony Foale, 2002. PDF accessed 2011.) incorporated herein by reference in its entirety, details a simple graphical method to determine anti-squat and anti-rise percentages by using a side view of a belt or chain-driven two-wheel vehicle.

The method described in Tony Foale is used in the analysis shown in FIG. 1.39. Shown in FIG. 1.39 are the following: Driven wheel 500; front wheel 501; Front wheel axis 502; Driven wheel axis at the extended state 503; Driven wheel axis at an intermediate state 504; Driven wheel axis at the compressed state 505; Driven wheel axis path (DWAP) 506 with length DWAP[L]; Ground line tangent to driven wheel at extended state and perpendicular to gravity 507; Tangent point 508 of front wheel 501 to ground line 507; Ground line at an intermediate state 509 is parallel to 507; Driven wheel tire to ground tangent point at an intermediate state 510; Total driven wheel suspension travel distance perpendicular to the ground line is known as the total vertical wheel travel 511; Intermediate driven wheel suspension travel distance perpendicular to the ground line is known as the intermediate vertical wheel travel 512; Driving cog 513 and driving cog axis 533; Driven cog 514; Chain force vector 515 that is tangent to the tops of the driving cog 513 and the driven cog 514; DIVC[AD] at the extended state 516; DIVC[AD] at an intermediate state 517; DIVC[AD] at the compressed state 518; DIVC[AD] migration path 519; Driving force vector 520 drawn through the driven wheel axis at an intermediate state 504 and the DIVC[AD] at an intermediate state 517; Instantaneous Force Center (IFC) 521 located at the intersection of chain force vector 515 and driving force vector 520; Anti-Squat force vector 522 drawn through the driven wheel tire to ground tangent point at an intermediate state 510 and the Instantaneous Force Center (IFC) 521; Squat layout line 523 which is perpendicular to the ground and passes through the front wheel axis; Anti-Squat definition point 524 where Anti-Squat force vector 522 intersects with Squat layout line 523; Anti-Squat measured distance 525 is the perpendicular distance from the ground line 508 to the Anti-Squat definition point 524; Anti-Rise force vector 526 is drawn through driven wheel tire to ground tangent point at an intermediate state 510 and DIVC[AD] at an intermediate state 517; Anti-Rise definition point 527 where Anti-Rise force vector 526 intersects the Squat layout line 523; Anti-Rise measured distance 528 is the perpendicular distance from the ground line 508 to the Anti-Rise definition point 527; COG 529 is the mass of the suspended body of the vehicle including the rider, passengers and any cargo; COG horizontal 530 is a line drawn parallel to the ground through COG 529; COG definition point 531 is the point in which the COG horizontal 530 intersects the Squat layout line 523; COG measured distance 532 is the perpendicular distance from the ground line 507 to the COG horizontal 530.

Anti-Squat may be defined as:

$$\text{Anti-Squat} = \left(\frac{\text{Anti-Squat measured distance}}{COG\text{ measured distance}}\right)100\%$$

Anti-Squat in this example is then equal to:

$$\text{Anti-Squat} = \left(\frac{\text{Anti-Squat measured distance (525)}}{COG\text{ measured distance (532)}}\right)100\%$$

Anti-Rise may be defined as:

$$\text{Anti-Rise} = \left(\frac{\text{Anti-Rise measured distance}}{COG\text{ measured distance}}\right)100\%$$

Anti-Rise in this example is then equal to:

$$\text{Anti-Rise} = \left(\frac{\text{Anti-Rise measured distance (528)}}{COG\text{ measured distance (532)}}\right)100\%$$

Anti-squat and anti-rise may be calculated at all points from the extended state to the compressed state to generate anti-squat and anti-rise curves. These curves are typically plotted as a function of "vertical wheel travel" which is equivalent to the total driven wheel suspension travel distance 511 perpendicular to the ground line 507 in FIG. 1.39. The anti-squat curve will change depending upon the sizes of driving cog 513 and driven cog 514 since this will change the location of the Instantaneous Force Center (IFC) 521. Note that in this example the DIVC[AD] is considered. As a result, both the anti-squat and anti-rise may be calculated using the DIVC[AD] migration. If the suspension linkage was arranged so that the DIVC[A] was separate from the DIVC[D], the DIVC[A] migration would be used to calculate the anti-squat, while the DIVC[D] migration would be used to calculate the anti-rise using the same methodology.

When the suspended body is loaded with a rider, passenger or cargo the suspension will compress or sag to a desired vertical wheel travel at sag point 615 between the extended and compressed state shown in FIG. 1.40. The preferred sag point varies depending upon desired ride characteristics but typically ranges between 15-45%. The suspension will be positioned near this sag point as the vehicle accelerates from a static position.

The sag percentage is defined as the following:

$$\text{Sag} = \left(\frac{\text{Vertical wheel travel value at sag point}}{\text{Total vertical wheel travel value}}\right)100\%$$

FIG. 1.40 shows two embodiments of anti-squat curves in accordance with various linkages disclosed herein with the same size driving cog. Sag percentage in this example is then equal to:

$$\text{Sag} = \left(\frac{\text{Vertical wheel travel at sag point 615}}{\text{Total vertical wheel travel 616}}\right)100\%$$

Anti-squat curve 600 has a smaller driven cog than anti-squat curve 605. Anti-squat curve 600 has a generally stable anti squat value from the extended state 601 and the around sag point 612. Anti-squat curve 600 initially has a positive slope as shown by tangent line 602. Anti-squat curve 600 then has a negative slope at the compressed state 603 as shown by tangent line 604. Anti-squat curve 605 has a generally stable anti squat value from the extended state 606 and the around sag point 613. Anti-squat curve 605 has a negative slope at the extended state 606 as shown by tangent line 607. Anti-squat curve 605 then has a slope at intermediate state 608 that has a negative slope as shown by tangent line 609. Tangent line 609 is more negative than tangent line 607. Anti-squat curve 605 has a negative slope at the compressed state 610 shown by tangent line 611. Tangent line 611 is more negative than tangent line 609. Note that this is one embodiment and many other properties are possible due to the ability to greatly adjust and fine tune with the disclosed linkage layout.

Both anti-squat curve A 600 and anti-squat curve B 605 provide a force opposing the weight transfer force. This results in efficient power transfer during acceleration since energy is not being wasted to compress the shock/damper. There is then a quick drop off around the sag point 612 and 613 to the compressed state 603 and 610. This is beneficial because continuing a similar anti-squat percentage from 601 to 606 is detrimental in this portion of the travel since it would inhibit suspension compression from absorbing impacts.

FIG. 1.41 shows a possible anti-rise curve 700 using this embodiment where 701 is the extended state of the suspension and 702 is the compressed state of the suspension. The anti-squat remains in the 30-110% range which is ideal. Anti-rise less than 100% may help improve traction while anti-rise greater than 0% may help stabilize geometry during deceleration.

The leverage rate (LR) is the ratio of the change in vertical wheel travel to the change in shock stroke. A plot can be generated to represent the instantaneous leverage rate from the fully extended to the fully compressed state. The motion ratio (MR) is the inverse of the LR. The higher the leverage rate the greater the mechanical advantage on the shock/damper and the lower the force that compresses the shock. The lower the leverage rate the lesser the mechanical advantage on the shock/damper and the higher the force that compresses the shock.

FIG. 1.42 shows a possible leverage rate curve 900 using this embodiment where 901 is the extended state of the suspension and 902 is the compressed state of the suspension. The LR falls generally linearly from 901 to 902. This is preferable because the higher LR in the beginning of the travel helps improve small bump sensitivity, and the lower leverage rate at the end of the travel helps prevent harsh bottom outs. In addition, the general linear trend of the LR curve provides a supported mid-stroke and the aids in shock tuning as there are no dramatic changes in the LR.

Note that anti-squat, anti-rise and leverage ratio are typically highly dependent variables in a typical 4-bar linkage or other suspension designs. As a result, the behavior of these three variables is limited with these designs. The disclosed 6-bar linkage allows for greater separation of these variables so that each can be adjusted or optimized as discussed above to improve the ride quality.

Turning now to the figures for embodiment 2, in accordance with various embodiments the suspension system can include a 6-bar linkage. FIG. 2.1 shows a simple line drawing of embodiment 2 in the extended state. In this embodiment, suspended body 1001 is suspended by the suspension system at least at the rear of the bike and preferably by a suspension fork at the front, which is not shown herein for simplicity of the figures. In this example, and as used herein generally a suspended body is the frame portion of the vehicle that is configured to directly support the weight of a rider on a suspension system. The suspended body may also be referred to as the front triangle herein, however, this is not meant to be limiting of the shape of the suspended body but merely referential of the portion of the vehicle that is suspended or supports the weight of the rider. Swingarm body 1002 is a dynamic body (DB), comprising a wheel carrier and a brake carrier. When the swingarm is composed of multiple linkage bodies that are pivotally connected, they are commonly known as the chainstay and seatstay. In the case of the disclosure herein, the chainstay and seatstay make up the single rigid swingarm body 1002. Brake features are not shown in this figure for clarity. Note that in other embodiments swingarm body 1002 may be a wheel carrier alone, a brake carrier alone, or it can be a non-dynamic body. Although in other embodiments, combinations of each of these are also understood.

Note that in all figures, "-E" denotes the extended state, "-I" denotes the inflection state, and "-C" denotes the compressed state. It is possible that other embodiments do not have a state of inflection. For example, swingarm body 1002 can refer to any position between the extended and compressed states, while swingarm body 1002 is labeled as 1002-E in FIG. 2.1 (The extended state), 1002-I in FIG. 2.5 (The inflection state) and 1002-C in FIG. 2.6 (The compressed state). Specific details of the inflection state are given below.

In FIG. 2.1, swingarm body 1002-E can include a driven wheel axis 1014, and suspended body 1001 can include a driving cog axis 1017. In accordance with the embodiment, the swingarm body 1002-E is operatively coupled to a driven wheel 1010-E. The driven wheel 1010-E engages with the ground 1016. Front wheel 1011 is operatively connected to a fork at 1015 which is operatively connected to suspended body 1001. Link body 1003-E is operatively coupled to suspended body 1001 defining PIVC[1001][1003] 1040 and link body 1005-E defining PIVC[1003][1005] 1043-E. Link body 1004-E is operatively coupled to suspended body 1001 defining PIVC[1001][1004] 1041 and link body 1005-E defining PIVC[1004][1005] 1044-E. Link body 1006-E is operatively coupled to suspended body 1001 defining PIVC[1001][1006] 1042 and swingarm body 1002-E defining PIVC[1002][1006] 1046-E. Swingarm body 1002-E is operatively coupled to link body 1005-E defining PIVC[1002][1005] 1045-E. PIVC[1002][1005] is not common with PIVC[1003][1005] or PIVC [1004][1005]. Suspended body-1001, link body-1003, link body-1004 and link body-1005 are arranged in a Chebushev 4-bar configuration. Shock/damper body 1008-E is operatively coupled to suspended body 1001 at 1009 and link body 1006-E at 1047-E.

Seven of the total 15 IVCs in the embodiment 2 are PIVCs: PIVC[1001][1003] 1040, PIVC[1001][1004] 1041, PIVC[1001][1006] 1042; PIVC[1003][1005] 1043-E, PIVC[1004][1005] 1044-E, PIVC[1002][1005] 1045-E, and PIVC[1002][1006] 1046-E. Considering the reference frames discussed, the front triangle is assumed to be stationary for suspension analysis. As a result, PIVCs located on the front triangle will be stationary, or SIVCs. Therefore, these PIVCs do not have the notation of "-E", "-I" or "-C"

discussed previously. Examples of these are: PIVC[1001][1003] 1040, PIVC[1001][1004] 1041, and PIVC[1001][1006] 1042.

FIG. 2.2 is a simplification of FIG. 2.1 where suspended body-1001 and link body 1006-E are shown. Link body 1006-E is shown disconnected to suspended body 1001 to clarify the connection at 1042.

FIG. 2.3 is a simplification of FIG. 2.1 where suspended body-1001, link body 1003-E, link body 1004-E, and link body 1005-E are shown. Link body 1003-E, link body 1004-E, and link body 1005-E is denoted 4-bar sub-assembly 1048-E. 4-bar sub-assembly 1048 is shown disconnected to suspended body 1001 to clarify the connection at 1040 and 1041.

FIG. 2.4 is combining FIG. 2.2 and FIG. 2.3 where swingarm body 1002-E is shown disconnected to suspended body 1001 to clarify the connection at 1046-E and 1045-E.

FIG. 2.5 shows a simple line drawing of embodiment 2 in the inflection state.

FIG. 2.6 shows a simple line drawing of embodiment 2 in the compressed state.

FIG. 2.7 shows a simple line drawing of embodiment 2 with an overlay of the extended, inflection, and compressed states. I detailed boundary box is defined to show zoomed Figs. of sub-assembly 1048 in FIG. 2.8.

FIG. 2.8 shows sub-assembly 1048 in the extended, inflection, and compressed state. Note that starting from PIVC[1002][1005] 1045-E, PIVC[1002][1005] moves to 1045-I, and then reverses direction to 1045-C.

FIG. 2.9 shows a CAD rendering example of embodiment 2 in the extended state. Brake caliper 1012 is operatively connected to swingarm body 1002. Brake rotor 1013 is operatively connected to driven wheel 1010. All other bodies defined in FIG. 2.1 remain identical. Note that not all linkage bodies are shown for clarity. Those missing are shown in later Figs. wherein the view is ideal.

FIG. 2.10 shows a CAD rendering example of embodiment 2 in the compressed state. Brake caliper 1012 is operatively connected to swingarm body 1002. Brake rotor 1013 is operatively connected to driven wheel 1010. All other bodies defined in FIG. 2.6 remain identical. Note that not all linkage bodies are shown for clarity. Those missing are shown in later Figs. wherein the view is ideal.

FIG. 2.11 shows a detailed view of FIG. 2.9 with swingarm body 1002 removed for clarity. Here the seven PIVCs are shown: PIVC[1001][1003] 1040, PIVC[1001][1004] 1041, PIVC[1001][1006] 1042; PIVC[1003][1005] 1043-E, PIVC[1004][1005] 1044-E, PIVC[1002][1005] 1045-E, and PIVC[1002][1006] 1046-E. Suspended body 1001, link body 1003, link body 1004, link body 1005, link body 1006, and damper/shock body 1008 is also shown which is pivotally connected to link body 1006 at 1047-E.

FIG. 2.12 shows a detailed view of FIG. 2.10 with swingarm body 1002 removed for clarity. Here the seven PIVCs are shown: PIVC[1001][1003] 1040, PIVC[1001][1004] 1041, PIVC[1001][1006] 1042, PIVC[1003][1005] 1043-C, PIVC[1004][1005] 1044-C, PIVC[1002][1005] 1045-C, and PIVC[1002][1006] 1046-C. Suspended body 1001, link body 1003, link body 1004, link body 1005, link body 1006, and damper/shock body 1008 are also shown. Shock/damper body 1008 is pivotally connected to link body 1006 at 1047-C.

FIG. 2.13 shows an isometric detailed view of suspended body-1001, link body 1003-E, link body 1004-E, and link body 1005-E from FIG. 2.9.

FIG. 2.14 shows an exploded view of FIG. 2.13. Bolt 1082 pivotally fastens link body 1003-E to suspended body 1. Bolt 1081 pivotally fastens link body 1004-E to suspended body 1. Bolt 1083-E pivotally fastens link body 1003-E to link body 1005-E. Bolt 1080-E pivotally fastens link body 1004-E to link body 1005-E.

FIG. 2.15 shows an isometric comparison of FIG. 1.15 and suspended body-1001, link body-1003, link body-1004 and link body-1005 of embodiment 2 in the extended state.

FIG. 2.16 shows rear-view and side-view comparisons of FIG. 1.15 and suspended body-1001, link body-1003, link body-1004 and link body-1005 of embodiment 2 in the extended state. From the side view, 6100 is horizontal distance of the linkage envelope of embodiment one rearward of the driving cog axis 1017. From the side view, 6101 is the horizontal distance of the linkage envelope of embodiment 1 forward of the driving cog axis. From the side view, 5102 is the horizontal distance of the linkage envelope of existing art shown in FIG. 1.15 rearward of the driving cog axis 5022. From the side view, 5103 is the horizontal distance of the linkage envelope of existing art shown in FIG. 1.15 forward of the driving cog axis. It is clear 6100<5102 and 6101<5103.

The smaller envelope of the linkage design, as disclosed herein, has several advantages structurally: There is more clearance between the rear tire and the suspended body, allowing for a shorter distance from the driving cog axis to the driven wheel axis. This can be a performance benefit allowing for quicker turning. The added tire clearance provides more room for dirt and mud that can build up when riding. This added clearance also allows room for a larger "bridge," tying together the drive and non-drive sides of swingarm body 1002 which aids in torsional stiffness. The added clearance in front of the driving cog axis provides more room to fit a water bottle and other accessories within the frame of suspended body 1001.

The smaller envelope of the linkage design, as disclosed herein, has several advantages kinematically because there is more freedom to locate PIVC[1002][1005] 1045 and therefore a greater ability to tune parameters such as anti-squat, anti-rise, and leverage rate which translates to greater performance. Also, PIVC[1002][1005] 1045 migration paths are able to have an extremely large minimum radius of curvature, or unique curvature profiles with inflection points within this small linkage envelope. This is not possible with traditional links and allows for increased tunability of suspension behavior.

FIG. 2.16 also shows the rear view. Here 6104 is horizontal distance of the linkage interface between swingarm body 1002-E and link body 1005-E. 5105 is horizontal distance of the linkage interface between swingarm body 5002-E and link body 5005-E. It is clear 6104>5105. The wider interface as disclosed herein allows for a stiffer interface between swingarm body 1002-E and link body 1005-E which translates to a stiffer interface between swingarm body 1002-E and the suspended body 2. This allows greater performance by improving the handling accuracy of the vehicle.

FIG. 2.17 shows a detailed view of swingarm body 1002-E with all other components removed for clarity. Here PIVC[1002][1005] 1045-E and PIVC[1002][1006] 1046-E are shown.

FIG. 2.18 is an analytical schematic representing the relationships between the various linkage bodies and IVCs of embodiment 2. Suspended body 1001, swingarm body 1002, link body 1003, link body 1004, link body 1005, and link body 1006 are represented by points along the circumference of the analytical schematic. Lines represent the 15 IVCs linking each part of the suspension system. Solid lines show the seven PIVCs: PIVC[1001][1003] 1040, PIVC [1001][1004] 1041, PIVC[1001][1006] 1042, PIVC[1003] [1005] 1043, PIVC[1004][1005] 1044, PIVC[1002][1005] 1045, and PIVC[1002][1006] 1046, while the dashed lines represent the eight IVCs: DIVC[AD][1001][1002], IVC [1002][1003], IVC[1003][1004], IVC[1005][6], IVC[1002] [1004], IVC[1001][1005], IVC[1003][1006], and IVC [1004][1006] that are derived. This analytical schematic shows that there are three linkage bodies operatively coupled to front suspended body 1001: link body 1003, link body 1004, and link body 1006 because the solid-line connections with the suspended body 1001 are limited to PIVC[1001][1003] 1040, PIVC[1001][1004] 1041, and PIVC[1001][1006] 1042 in this example. Note that this analytical schematic can be used to derive any IVC at any point within its migration from extended to compressed states. In some cases, there is no migration.

As can be seen in FIG. 2.18, the 6-bar system is complex. For example, DIVC[AD][1001][1002] is derived using several IVC relationships. Notably, changes to the basic linkage layout effects the on IVC migration paths. This in effect gives rise to many more possible IVC migration paths through the suspension travel from a fully extended to a fully compressed state.

In embodiment 2, DIVC[AD][1001][1002] is not visually established, or in other words it is not a PIVC. DIVC[AD] [1001][1002] can be ultimately solved for using both the known PIVCs (shown in solid lines) in FIG. 2.18, as well as derived IVCs that have been solved for. By using the information provided by two IVC "sets" that form a triangle with the unknown IVC, the unknown IVC can be derived. However, other methods are contemplated to solve for DIVC[AD][1001][1002] as well.

FIG. 2.19 shows the first step in the method of solving for DIVC[AD][1001][1002] using the analytical schematic. In this example, unknown IVC[1001][1005] 1120 is determined using known positions PIVC[1001][1003] 1040, PIVC[1003][1005] 1043, PIVC[1001][1004] 1041, and IVC [1004][1005] 1044.

FIG. 2.20 shows a method of determining the spatial positioning of the hidden IVC[1001][1005] 1120 solved for in FIG. 2.19 within the suspension system in the extended state. In this example, the four known sides of the two triangles 1040, 1041, 1043, and 1044 of FIG. 2.19 are represented as PIVC points 1040, 1041, 1043-E, and 1044-E. Dashed lines are extended through two linkage points that each represent sides of the same triangle in FIG. 2.20. For example, dashed line 1160-E is extended through PIVC [1004][1005] 1044-E and PIVC[1001][1004] 1041, and dashed line 1161-E is extended through PIVC[1003][1005] 1043-E and PIVC[1001][1003] 1040. Dashed lines 1160-E and 1161-E intersect at IVC[1001][1005] 1120-E.

FIG. 2.21 shows a method of determining the spatial positioning of the hidden IVC[1001][1005] 1120 solved for in FIG. 2.19 within the suspension system in the compressed state. In this example, the four known sides of the two triangles 1040, 1041, 1043, and 1044 of FIG. 2.19 are represented as PIVC points 1040, 1041, 1043-C, and 1044-C. Dashed lines are extended through two linkage points that each represent sides of the same triangle in FIG. 2.19. For example, dashed line 1160-E is extended through PIVC [1004][1005] 1044-C and PIVC[1001][1004] 1041, and dashed line 1161-C is extended through PIVC[1003][1005] 1043-C and PIVC[1001][1003] 1040. Dashed lines 1160-C and 1161-C intersect at IVC[1001][1005] 1120-C.

FIG. 2.22 shows an example of the final step in the method of solving for DIVC[AD][1001][1002] 1200. In this example, unknown DIVC[AD][1001][1002] 1200 is determined using known PIVC[1001][1006] 1042, known PIVC [1002][1006] 1046, known PIVC[1002][1005] 1045, and solved-for IVC[1001][1005] 1120.

FIG. 2.23 shows a method of determining the spatial positioning of the hidden DIVC[AD][1001][1002] 1200 solved for in FIG. 2.22 within the suspension system in the extended state. In this example, the four known sides of the two triangles 1042, 1045, 1046, and 1120 of FIG. 2.22 are represented as IVC point 1120-E and PIVC points 1045-E, 1042, and 1046-E. Dashed lines are extended through two linkage points that each represent sides of the same triangle in FIG. 2.22. For example, dashed line 1201-E is extended through IVC[1001][1005] 1120-E, and PIVC[1002][1005] 1045-E and dashed line 1202-E is extended through PIVC [1001][1006] 1042 and PIVC[1002][1006] 1046-E. Dashed lines 1201-E and 1202-E intersect at DIVC[AD][1001] [1002] 1200-E.

FIG. 2.24 shows a method of determining the spatial positioning of the hidden DIVC[AD][1001][1002] 1200 solved for in FIG. 2.22 within the suspension system in the compressed state. In this example, the four known sides of the two triangles 1042, 1045, 1046, and 1120 of FIG. 2.22 are represented as IVC point 1120-C and PIVC points 1045-C, 1042, and 1046-C. Dashed lines are extended through two linkage points that each represent sides of the same triangle in FIG. 2.22. For example, dashed line 1201-C is extended through IVC[1001][1005] 1120-C and PIVC [1002][1005] 1045-C, and dashed line 1202-C is extended through PIVC[1001][1006] 1042 and PIVC[1002][1006] 1046-C. Dashed lines 1201-E and 1202-C intersect at DIVC [AD][1001][1002] 1200-C.

In several embodiments, IVC migration plots or curves can be plotted graphically by solving for the IVC at each position between the extended and compressed suspension states. A position of the linkage in between the extended and compressed states is known as an intermediate state. The IVC migration curves depend upon the reference frame considered. In most embodiments, the suspended body is considered fixed as the driven wheel moves from the extended to the compressed state. Note that "-M" refers to the migration of an IVC.

As shown in FIG. 2.25, the various parts and IVCs of the suspension system may be located at different positions in the system depending on the state of the system. For example, the driven wheel axis may be located at different positions along the driven wheel axis migration path (DWAP) 1281. For example, the driven wheel axis 1014 may be at extended state position 1014-E, at compressed state position 1014-C as shown by the termination of DWAP 1281, or at any other position along the DWAP 1281. As another example, DIVC[AD][1001][1002] 1200 may be located at different positions along the DIVC[AD][1001] [1002] migration path 1280. For example, DIVC[AD][1001] [1002] may be at extended state position 1200-E, at compressed state position 1200-C, or at any other position along the DIVC[AD][1001][1002] migration path 1280.

FIG. 2.26 shows various IVC migration paths from the extended to the compressed state. It also shows suspended body 1001, PIVC[1001][1003] 1040, and PIVC[1001] [1004] 1041. 1043-M is the migration path of PIVC[1003] [1005] 1043, 1044-M is the migration path of PIVC[1014] [1005] 1044, and 1045-M is the migration path of PIVC [1002][1005] 1045. Migration path 1043-M starts at the extended state 1043-E, moves to the migration path's inflection point 1043-I, and then reverses direction to the compressed state 1043-C. In other words, as DWAP 1281 in FIG.

2.25 moves from the extended state 1014-E to the compressed state 1014-C, migration path 1043-M first moves one direction to inflection point 1043-I, and then reverses direction to compressed point 1043-C. Migration path 1044-M starts at the extended state 1044-E, moves to the migration path's inflection point 1044-I, and then reverses direction to the compressed state 1044-C. In other words, as DWAP 1281 in FIG. 2.25 moves from the extended state 1014-E to the compressed state 1014-C, migration path 1044-M first moves one direction to inflection point 1044-I, and then reverses direction to compressed point 1044-C. Migration path 1045-M starts at the extended state 1045-E, moves to the migration path's inflection point 1045-I, and then reverses direction to the compressed state 1045-C. In other words, as DWAP 1281 in FIG. 2.25 moves from the extended state 1014-E to the compressed state 1014-C, migration path 1045-M first moves one direction to inflection point 1045-I, and then reverses direction to compressed point 1045-C. Migration path 1120-M starts at the extended state 1120-E, moves to the migration path's inflection point 1120-I, and then reverses direction to the compressed state 1120-C. In other words, as DWAP 1281 in FIG. 2.25 moves from the extended state 1014-E to the compressed state 1014-C, migration path 1120-M first moves one direction to inflection point 1120-I, and then reverses direction to compressed point 1120-C.

In FIG. 2.27, 1045-M is the migration path of PIVC[1002][1005] 1045 from the extended to the compressed state. It also shows suspended body 1001, PIVC[1001][1003] 1040, and PIVC[1001][1004] 1041. Migration path 1045-M starts at the extended state 1045-E, moves to the migration path's inflection point 1045-I, and then reverses direction to the compressed state 1045-C. In other words, as DWAP 1281 in FIG. 2.25 moves from the extended state 1014-E to the compressed state 1014-C, migration path 1045-M first moves one direction to inflection point 1045-I, and then reverses direction to compressed point 1045-C. The center of curvature 1320 of the minimum radius of curvature 1321 of migration curve 1045-M is also shown. Note that the minimum radius is for one particular location of the curve. The radius of curvature is not constant and varies throughout the entire migration path. This is not true with linear motion where the curvature is 0, or with circular motion where the curvature is constant. The depicted PIVC[1002][1005] 1045 migration curvature and minimum radius, as well as the varying radius of curvature is characteristic of the acceleration (anti-squat) and deceleration (anti-rise) responses described in FIG. 1.40 and FIG. 1.41. Note that embodiment 2 exhibits similar anti-squat, anti-rise, and leverage rate properties, although not identical. The higher anti-squat percentage is for pedaling efficiency in the beginning of the travel while the lower anti-squat percentage minimizes the anti-squat force where bump absorption takes precedence. Thus, suspension performance may be improved through the interrelationship between the 15 IVC migration paths.

Embodiment 2 has similar anti-squat, anti-rise, and leverage rate properties to that of embodiment 1 and therefore shares similar benefits regarding suspension performance described above.

Note that anti-squat, anti-rise, and leverage ratio are typically highly dependent variables in a typical 4-bar linkage or other suspension designs. As a result, the behavior of these three variables is limited with these designs. The disclosed 6-bar linkage allows for greater separation of these variables so that each can be adjusted or optimized as discussed above to improve the ride quality.

Turning now to the figures for embodiment 3, in accordance with various embodiments the suspension system can include a 6-bar linkage. Note that in all figures, "-E" denotes the extended state, "-I" denotes the inflection state, and "-C" denotes the compressed state. It is possible that other embodiments do not have a state of inflection.

FIG. 3.1 shows an example of another embodiment in the extended state. Brake caliper 3012-E is operatively connected to swingarm body 3002-E. Brake rotor 3013-E is operatively connected to driven wheel 3010-E. Missing link body labels in these Figs. are shown in later Figs. Swingarm body 3002-E can include a driven wheel axis 3014-E, and suspended body 3001 can include a driving cog axis 3017. In accordance with the embodiment, the swingarm body 3002-E is operatively coupled to a driven wheel 3010-E. The driven wheel 3010-E engages with the ground 3016. Front wheel 3011 is operatively connected to a fork at 3015 which is operatively connected to suspended body 3001. Shock/damper body 3008-E is operatively coupled to suspended body 3001 at 3009 and link body 3006-E.

FIG. 3.2 shows and illustrates the embodiment discussed above with regard to FIG. 3.1 in the compressed state. Brake caliper 3012-C is operatively connected to swingarm body 3002-C. Brake rotor 3013-C is operatively connected to driven wheel 3010-C. Note that not all linkage bodies are labeled or shown for clarity. Those missing are shown in later Figs. wherein the view is ideal. Swingarm body 3002-C can include a driven wheel axis 3014-C, and suspended body 3001 can include a driving cog axis 3017. In accordance with the embodiment, the swingarm body 3002-C is operatively coupled to a driven wheel 3010-C. The driven wheel 3010-C engages with the ground 3016. Front wheel 3011 is operatively connected to a fork at 3015 which is operatively connected to suspended body 3001. Shock/damper body 3008-C is operatively coupled to suspended body 3001 at 3009 and link body 3006-C.

FIG. 3.3 shows a detailed view with swingarm body 3002 removed for clarity. Here the seven PIVCs are shown: PIVC[3001][3003] 3040-E, PIVC[3001][3004] 3041-E, PIVC[3001][3006] 3042, PIVC[3003][3005] 3043-E, PIVC [3004][3005] 3044-E, PIVC[3002][3005] 3045-E, and PIVC[3002][3006] 3046-E. Here upper linkage 3100 and lower linkage 3200 shown. This embodiment is similar to the previous embodiments discussed above, in that it uses a flexure design similar to lower linkage 200, see e.g. FIG. 1.37. However in this case, lower linkage 3200 is composed of link body 3003, link body 3004, link body 3005, and suspended body 3001. The difference in embodiment 3 being suspended body 3001 is integrated into a single structure with link body 3003, link body 3004, and link body 3005. This eliminates all hardware and rotary/revolute bearings/bushings/etc. in the 200 assembly of the above discussed first embodiment. As a result, it is possible to even further reduce the weight of the assembly while retaining similar kinematic behavior and optimizing manufacturability. Therefore, PIVC [1][3] 3040-E and PIVC [1][4] 3041-E are now virtual and flex within beam member about PIVC [1][3] 3040-E/PIVC [3][5] 4043-E and PIVC [1][4] 3041-E/PIVC [4][5] 4044-E accordingly. Link body 3006, PIVC [1][6] 3042-E, and damper/shock body 3008-E are also shown and are pivotally connected to link body 3006 at 3047-E. Link body 3006-E is operatively coupled to suspended body 3001 defining PIVC[3001][3006] 3042 and swingarm body 3002-E defining PIVC[3002][3006] 3046-E. Swingarm body 3002-E is operatively coupled to link body

3005-E defining PIVC[3002][3005] 3045-E. PIVC[3002][3005] 45-E is not common with PIVC[3003][3005] 43-E or PIVC [3004][3005] 44-E.

Considering the reference frames discussed, the front triangle is assumed to be stationary for suspension analysis. However, in embodiment 3, PIVC [1][3] 3040-E and PIVC [1][4] 3041-E are now virtual and flex within beam member about PIVC [1][3] 3040-E/PIVC [3][5] 4043-E and PIVC [1][4] 3041-E/PIVC [4][5] 4044-E accordingly. Therefore only PIVC [1][6] 3042 and the structure of front triangle body 3001 will be stationary, or SIVCs. Therefore, these PIVCs do not have the notation of "-E," "-I," or "-C" discussed previously, or the PIVC is being discussed at a position other than "-E," "-I," or "-C." An example is PIVC[3001][1006] 1042.

FIG. 3.4 shows a detailed view of swingarm body 3002-E with all other components removed for clarity. Here PIVC [3002][3005] 3045-E and PIVC[3002][3006] 3046-E are shown. FIG. 3.5 shows a detailed view of FIG. 3.3 with all other components removed for clarity. Here PIVC[3001][3006] 3042 is shown. In this figure it is clear that suspended body 3001, link body 3003, link body 3004, and link body 3005 are integrated.

FIG. 3.7-3.15 go into further detail of embodiment 3 with the integration of suspended body 3001, link body 3003, link body 3004, and link body 3005. FIG. 3.6 shows a rear solid view of a portion of suspended body 3001, link body 3003, link body 3004, and link body 3005 with flexural pivots with cross-section line K. FIG. 3.7 shows cross-section K of FIG. 3.6. From this view it is clear that suspended body 3001, link body 3003, link body 3004, and link 3005 are integrated into a single body. Also, the "S" structure of link body 3003, link body 3004, and link 3005 is clear, as well as the wider outwardly supports from the central cylindrical structure about PIVC [3002][3005] 3045-E, the thinner lateral structures for virtual PIVC [3003][3005] 3043-E/PIVC [3001][3003] 3040-E, and virtual PIVC [3004][3005] 3044-E/PIVC [3001][3004] 3041-E.

FIG. 3.8 shows a detailed view of FIG. 3.5 without PIVC [1][6] 3042 to more clearly show the integration of suspended body 1, link body 3, link body 4, and link body 5. FIG. 3.9 shows drive side isometric view of FIG. 3.8. FIG. 3.10 shows non-drive side isometric view of FIG. 3.8.

FIG. 3.11 shows a rear solid view of a portion of suspended body 3001, link body 3003, link body 3004, and link body 3005 with flexural pivots with cross-section line L.

FIG. 3.12 shows cross-section L of FIG. 3.11. PIVC [3002][3005] 3045-E is shown as an axis in this non-planar, isometric view. About PIVC [3002][3005] 3045-E is a cylindrical structure at or near the central portion of the body that houses a bearing 3500 on opposing sides and bearing spacer 3520 between said bearings. While bearings are shown in this embodiment, any other suitable rotary joint assembly such as a bushing may be used for relative pivotal motion. This spacer aids in preventing the ball bearings from binding when fastened to swingarm body 2. It is clear from this figure that a rotary joint assembly is not used for PIVC[3001][3003] 3040 and PIVC [3001][3004] 3041.

FIG. 3.13 shows a rear solid view of a portion of suspended body 3001, link body 3003, link body 3004 and link body 3005 with flexural pivots with cross-section line M. FIG. 3.14 shows cross-section M of FIG. 3.13. PIVC [3002][3005] 3045-E is shown as an axis in this non-planar, isometric view. About PIVC [3002][3005] 3045-E is a cylindrical structure at or near the central portion of the body that houses a bearing 3500 on opposing sides and bearing spacer 3520 between said bearings. Note that bearings are shown in this embodiment, but any other rotary joint assembly such as a bushing may be used for relative pivotal motion. This spacer is not required, but aids in preventing the ball bearings from binding when fastened to swingarm body 2.

FIG. 3.15 shows FIG. 3.8 in the extended, inflection, and compressed states. In the extended state, the one beam structure flexes as virtual PIVC [3001][3004] 3041-E/PIVC [3004][3005] 3044-E. Another beam structure flexes as virtual PIVC [3001][3003] 3040-E/PIVC [3003][3005] 3043-E.

From the extended state to the inflection state, the beam structure representing virtual PIVC [3001][3004] 3041-E/PIVC [3004][3005] 3044-E flexes upwardly to [3001][3004] 3041-I/PIVC [3004][3005] 3044-I. The beam structure representing virtual PIVC [3001][3003] 3040-E/PIVC [3003][3005] 3043-E flexes upwardly to PIVC [3001][3003] 3040-I/PIVC [3003][3005] 3043-I. The beam structure that flexes as Virtual PIVC [3][5] 44-E has deformed accordingly to allow for a degree of freedom.

From inflection state to the compressed state, the beam structure representing virtual PIVC [3001][3004] 3041-I/PIVC [3004][3005] 3044-I flexes downwardly to [3001][3004] 3041-C/PIVC [3004][3005] 3044-C. The beam structure representing virtual PIVC [3001][3003] 3040-I/PIVC [3003][3005] 3043-I flexes upwardly to PIVC [3001][3003] 3040C/PIVC [3003][3005] 3043-C. The beam structure that flexes as Virtual PIVC [3][5] 44-E has deformed accordingly to allow for a degree of freedom.

The force to deform the beam structures for virtual PIVC [3004][3005] 3043 and PIVC [3004][3005] 3044 may also be advantageous for suspension performance. The integration of suspended body 3001, link body 3003, link body 3004, and link body 3005 may be designed so that the position of beam structures at virtual PIVC [3003][3005] 3043, PIVC [3001][3003] 3040, PIVC [3004][3005] 3044, and PIVC [3001][3004] 3041 are within any position of 3043-M or 3044-M respectively before the body is pivotally mounted to suspended body 3001 at PIVC [3001][3003] 3040 and PIVC [3001][3004] 3041, or in its free state. As a result, the deformation of beam structures at virtual PIVC [3001][3003] 3040/PIVC [3003][3005] 3043 and PIVC [3001][3004] 3041/PIVC [3004][3005] 3044 may apply a force to PIVC [3002][3005] 3045 in either direction of migration path 3045-M depending on design intent. As an example, the free state of integration of suspended body 3001, link body 3003, link body 3004, and link body 3005 may be designed so that a downward force is applied relative to migration path 3045-M of PIVC [3002][3005] 3045 which would inhibit the motion of swingarm body 3002 as it moves from the state of extension to the state of inflection. This may aid in pedaling efficiency by working in tandem with anti-squat forces and the extension of the swingarm to prevent suspension bobbing. In another example the free state of integration of suspended body 3001, link body 3003, link body 3004, and link body 3005 may be designed at the sag position (described above). As a result, the equilibrium of beam flexure forces tends to position the swingarm at the sag position of travel. This may aid in pedaling efficiency by working in tandem with anti-squat forces and the extension of the swingarm, by working in tandem with anti-squat forces and the extension of the swingarm to prevent suspension bobbing. As a final example the integration of suspended body 3001, link body 3003, link body 3004, and link body 3005 may be designed at the mid-point of migration paths 3043-M and 3044-M. As a result, the amount of beam flexure deflection at virtual PIVC [3001][3003] 3040/

PIVC [3003][3005] 3043 and PIVC [3001][3004] 3041/PIVC [3004][3005] 3044 would be equal minimizing the flexural force on the linkage system, so that it more similarly represents a non-flexural system, but with the weight savings and manufacturability advantages.

In accordance with various embodiments, the integration of suspended body 3001, link body 3003, link body 3004, and link body 3005 limits the flex required due to the relatively short migration paths of 3043-M and 3044-M, and with the ability for the cylindrical structures about virtual PIVC [3001][3003] 3040/PIVC [3003][3005] 3043 and PIVC [3001][3004] 3041/PIVC [3004][3005] 3044. As a result, the internal stresses when the beam structure flexes can be minimized as well as the force on the linkage system as described above. Therefore, the flexure system can closely mimic that of the mechanical linkage version, but with the added weight savings and manufacturability advantages.

FIGS. 3.16-1.20 illustrate an embodiment of combined link body 3001/3003/3004-E in the extended state. FIG. 3.16 shows a side view of a possible embodiment where link body 3003 and link body 3004 are integrated with suspended body 3001. Note that the extended state was chosen arbitrarily, and the free state of the combined link body 3001/3003/3004-E could be at any position from the extended to the compressed state. This embodiment is similar to that in FIG. 3.3, however in this case the link body 3005-E is a separate component from integrated link bodies 3001/3003/3004-E. As in FIG. 3.3, PIVC [1][3] 3040-E and PIVC [1][4] 3041-E are now virtual and flex within beam member about PIVC [1][3] 3040-E/PIVC [3][5] 4043-E and PIVC [1][4] 3041-E/PIVC [4][5] 3044-E accordingly.

FIG. 3.17 is an isometric exploded view which clearly shows link body 3005-E as a separate component to that of 3001/3003/3004-E. PIVC [3002][3005] 3045-E is shown as an axis in this non-planar, isometric view. About PIVC [3002][3005] 3045-E is the central body 3005 that houses bearing 3500 on opposing sides. While bearings are shown in this embodiment, it is understood that any other suitable rotary joint assembly such as a bushing may be used for relative pivotal motion. Inner race extensions 3551 may interface with bearing 3500 and the mounting surface. Spacer 3552 may be used to interface with bearings 3500 in order to support the inner races when the bearing is preloaded axially. From this central cylindrical housing stems opposing protrusions that extend outwardly. These protrusions end as a mounting interface to accept additional components. Combined body 3001/3003/3004 is fixed to central body 3005 at the upper protrusion mounting interface via screws 3554 that are threaded into central body 3005. Washer 3555 is placed between upper flexural component 3001/3003/3004-E and screws 3554 to aid in distributing the force of screws 3554 about upper flexural component 3001/3003/3004-E.

FIG. 3.18 is an isometric view of the complete assembly with link body 3005-E fixed to combined body 3001/3003/3004-E.

FIG. 3.19 is a side view of the complete assembly shown in FIG. 3.18. Between the upper fixed ends of 3001/3003/3004-E is a relatively thin structure that flexes about this beam length, and virtually represents PIVC [3001][3004] 3041-E and PIVC [3004][3005] 3044-E as PIVC [3002][3005] 3045 migrates per path 3045-M. Between the lower fixed ends of 3001/3003/3004-E is a relatively thin structure that flexes about this beam length, and virtually represents PIVC [3001][3003] 3040-E and PIVC [3003][3005] 3043-E as PIVC [3002][3005] 3045 migrates per path 3045-M.

FIG. 3.20 is a cross-section view of the complete assembly shown in FIG. 3.19. Between the upper fixed ends of 3001/3003/3004-E is a relatively thin structure that flexes about this beam length, and virtually represents PIVC [3001][3004] 3041-E and PIVC [3004][3005] 3044-E as PIVC [3002][3005] 3045 migrates per path 3045-M. Between the lower fixed ends of 3001/3003/3004-E is a relatively thin structure that flexes about this beam length, and virtually represents PIVC [3001][3003] 3040-E and PIVC [3003][3005] 3043-E as PIVC [3002][3005] 3045 migrates per path 3045-M. From this view it is clear that suspended body 3001, link body 3003, and link body 3004, are integrated into a single body.

Separating the combined body into separate assembled components has several advantages. First, the parts may be composed of varying materials with varying material properties, each of which may be chosen to optimize the properties such as weight, cost, stiffness, manufacturability, fatigue life, etc. For example, central body 3005 may be made from aluminum which is light weight and easily machinable. This component does not see cyclic flexural loads as with flexural components 553 and 557. Flexural components 3003 and 3004 are integrated into suspended body 3001 and may be made from composite such as carbon fiber which has a high or infinite fatigue life ideal for the cyclic bending loads that will occur with these components. Another advantage of dividing the structure into assembled components is manufacturability. The combined structure of 3001/3003/3004 simplified by omitting 3005. This allows manufacturing of a molded composite part to be greatly simplified.

Note that combined link body 3001/3003/3004-E with flexural pivots assembled to link body 3005-E shown in FIG. 3.18 would undergo the same general motion as described in FIG. 3.15 at the varying points of travel within the suspension range.

Turning now to the figures for embodiment 4, in accordance with various embodiments the suspension system can include a 6-bar linkage.

FIG. 4.1 shows another embodiment in the extended state. In this embodiment, the same linkage layout as embodiment 1, however, two modular components, front triangle body 4098 and gearbox housing 4099 are mounted together to form the rigid body of suspended body 4001 which will become clear in further figures. In this embodiment, suspended body 4001 is suspended by the suspension system at least at the rear of the bike and preferably by a suspension fork at the front, which is not shown herein for simplicity of the figures. In this example, and as used herein generally a suspended body is the frame portion of the vehicle that is configured to directly support the weight of a rider on a suspension system. The suspended body may also be referred to as the front triangle herein, however, this is not meant to be limiting of the shape of the suspended body but merely referential of the portion of the vehicle that is suspended or supports the weight of the rider. Swingarm body 4002-E is a dynamic body (DB), comprising a wheel carrier and a brake carrier. When the swingarm is composed of multiple linkage bodies that are pivotally connected, they are commonly known as the chainstay and seatstay. In the case of the disclosed invention, the chainstay and seatstay make up the single rigid swingarm body 4002-E. Brake features are not shown in this figure for clarity. Note that in other embodiments swingarm body 4002-E may be a wheel carrier only, a brake carrier only, or it can be a non-dynamic body. Brake caliper 4012-E is operatively connected to swingarm body 4002-E. Brake rotor 4013-E is operatively connected to driven wheel 4010-E. Note that not all linkage bodies are labeled or shown for clarity. Those missing are shown in later Figs. wherein the view is ideal. Swingarm body 4002-E can include a driven wheel axis 4014-E, and suspended body 4001 can include a driving cog axis 4017. In accordance with the embodiment, the swingarm body 4002-E is operatively coupled to a driven wheel 4010-E. The driven wheel 4010-E engages with the ground 4016. Front wheel 4011 is operatively connected to a fork at 4015 which is operatively connected to suspended body 4001. Shock/damper body 4008-E is operatively coupled to suspended body 4001 at 4009 and link body 4006-E.

FIG. 4.2 shows a CAD rendering example of embodiment 4 in the compressed state. Embodiment 4 has the same linkage layout as embodiment 1, however, two modular components, front triangle body 4098 and gearbox housing 4099 are mounted together to form the rigid body of suspended body 4001 which will become clear in further figures. In this embodiment, suspended body 4001 is suspended by the suspension system at least at the rear of the bike and preferably by a suspension fork at the front, which is not shown herein for simplicity of the figures. In this example, and as used herein, generally a suspended body is the frame portion of the vehicle that is configured to directly support the weight of a rider on a suspension system. The suspended body may also be referred to as the front triangle herein, however, this is not meant to be limiting of the shape of the suspended body but merely referential of the portion of the vehicle that is suspended or supports the weight of the rider. Swingarm body 4002-C is a dynamic body (DB), comprising a wheel carrier and a brake carrier. When the swingarm is composed of multiple linkage bodies that are pivotally connected, they are commonly known as the chainstay and seatstay. In the case of the disclosed invention, the chainstay and seatstay make up the single rigid swingarm body 4002-C. Brake features are not shown in this figure for clarity. Note that in other embodiments swingarm body 4002-C may be a wheel carrier only, a brake carrier only, or it can be a non-dynamic body. Brake caliper 4012-C is operatively connected to swingarm body 4002-C. Brake rotor 4013-C is operatively connected to driven wheel 4010-C. Note that not all linkage bodies are labeled or shown for clarity. Those missing are shown in later Figs. wherein the view is ideal. Swingarm body 4002-C can include a driven wheel axis 4014-C, and suspended body 4001 can include a driving cog axis 4017. In accordance with the embodiment, the swingarm body 4002-E is operatively coupled to a driven wheel 4010-E. The driven wheel 4010-C engages with the ground 4016. Front wheel 4011 is operatively connected to a fork at 4015 which is operatively connected to suspended body 4001. Shock/damper body 4008-C is operatively coupled to suspended body 4001 at 4009 and link body 4006-C.

FIG. 4.3 shows a detailed view of FIG. 4.1 with swingarm body 4002-E removed for clarity. Here the seven PIVCs are shown: PIVC[4001][4003] 4040, PIVC[4001][4004] 4041, PIVC[4001][4006] 4042, PIVC[4003][4005] 4043-E, PIVC [4004][4005] 4044-E, PIVC[4002][4005] 4045-E, and PIVC[4002][4006] 4046-E. Suspended body 4001, link body 4003-E, link body 4004-E, link body 4005-E, link body 4006-E, extender body 4007-E, and damper/shock body 4008-E are also shown. Extender body 4007-E is pivotally connected to link body 4006-E at 4047-E. Gearbox housing 4099 is mounted to front triangle body 4098 at mounting locations 4800 and 4801. Note that in other embodiments, link body 4003-E and link body 4004-E can be arranged as eccentrics pivoting about PIVC 4040 and PIVC 4041 respectively. This would allow the effective link sizes to be reduced. Also note that link body 4003, link body 4004, and link body 4005 may be combined into a single flexural body as described in other embodiments.

FIG. 4.4 shows a detailed view of FIG. 4.3 focusing on the area around the driving cog axis 4017. FIG. 4.5 shows a detailed view of FIG. 4.2 with swingarm body 4002-C removed for clarity. Here the seven PIVCs are shown: PIVC[4001][4003] 4040, PIVC[4001][4004] 4041, PIVC [4001][4006] 4042; PIVC[4003][4005] 4043-C, PIVC [4004][4005] 4044-C, PIVC[4002][4005] 4045-C, and PIVC[4002][4006] 4046-C. Suspended body 4001, link body 4003-C, link body 4004-C, link body 4005-C, link body 4006-C, extender body 4007-C and damper/shock body 4008-C are also shown. Extender body 4007-E is pivotally connected to link body 4006-C at 4047-C. Gearbox housing 4099 is mounted to front triangle body 4098 at mounting locations 4800 and 4801. Note that in other embodiments, link body 4003-C and link body 4004-C can be arranged as eccentrics pivoting about PIVC 4040 and PIVC 4041 respectively. This would allow the effective link sizes to be reduced. Also note that link body 4003, link body 4004, and link body 4005 may be combined into a single flexural body as described in other embodiments.

FIG. 4.6 shows a detailed view of swingarm body 4002-E with all other components removed for clarity. Here PIVC [4002][4005] 4045-E and PIVC[4002][4006] 4046-E are shown. FIG. 4.7 shows gearbox housing 4099 separated from front triangle structure 4098. Here it can be seen that gearbox housing mounting location 4810 is mounted to front triangle structure mounting location 4800, and gearbox housing mounting location 4811 is mounted to front triangle structure mounting location 4801. PIVC [1][3] 4040 is located on gearbox housing 4099, while PIVC [1][4] 4041 is located on front triangle structure 4098. FIG. 4.8 shows gearbox housing 4099 mounted to front triangle structure 4098 to form rigid suspended body 4001. PIVC [1][3] 4040 is located on gearbox housing 4099, while PIVC [1][4] 4041 is located on front triangle structure 4098.

FIG. 4.9 shows an isometric exploded view of embodiment 4 with swingarm 4002 removed for clarity. Mounting hardware 4820 fastens gearbox housing 4099 to front triangle structure 4098 at through 4800 and 4810. Mounting hardware 4821 fastens gearbox housing 4099 to front triangle structure 4098 at through 4801 and 4811. Driving cog 4051 is mounted to drive side crank-arm 4050. In other embodiments, the driving cog may be separate from the drive side crank and mounted to a motor or gearbox component. Drive side crank-arm 4050 is rigidly mounted to gearbox axle 4703. Non-drive side crank-arm 4052 is rigidly mounted to gearbox axle 4703. PIVC [1][3] 4040 is located on gearbox housing 4099, while PIVC [1][4] 4041 is located on front triangle structure 4098.

FIG. 4.10 shows a collapsed view of FIG. 4.9. Mounting hardware 4820 fastens gearbox housing 4099 to front triangle structure 4098 at through 4800 and 4810. Mounting hardware 4821 fastens gearbox housing 4099 to front triangle structure 4098 at through 4801 and 4811. Driving cog 4051 is rigidly mounted to drive side crank-arm 4050. Drive side crank-arm 4050 is rigidly mounted to gearbox axle 4703. Non-drive side crank-arm 4052 is rigidly mounted to gearbox axle 4703. PIVC [1][3] 4040 is located on gearbox housing 4099, while PIVC [1][4] 4041 is located on front triangle structure 4098. FIG. 4.11 shows FIG. 4.10 with crank arms and driving cog removed for clarity. PIVC [1][3] 4040 is located on gearbox housing 4099, while PIVC [1][4] 4041 is located on front triangle structure 4098.

FIG. 4.12 shows 4-bar linkage assembly 4048-E separated from suspended body 4001 which is composed of gearbox housing 4099 and front triangle structure 4098 noted above. Here it can clearly be seen that PIVC [1][3] 4040 is located on gearbox housing 4099, while PIVC [1][4] 4041 is located on front triangle structure 4098. FIG. 4.13 shows a collapsed view of FIG. 4.12. Here it can clearly be seen that PIVC [1][3] 4040 is located on gearbox housing 4099, while PIVC [1][4] 4041 is located on front triangle structure 4098.

FIG. 4.14 shows an isometric view of 4-bar linkage assembly 4048-E separated from suspended body 4001 which is composed of gearbox housing 4099 and front triangle structure 4098 noted above. FIG. 4.15 shows an isometric shows an isometric assembled view of 4-bar linkage assembly 4048-E assembled in suspended body 4001. Here it can clearly be seen that PIVC [1][3] 4040 is located on gearbox housing 4099, while PIVC [1][4] 4041 is located on front triangle structure 4098. FIG. 4.13 shows a collapsed view of FIG. 4.12. Here it can clearly be seen that PIVC [1][3] 4040 is located on gearbox housing 4099, while PIVC [1][4] 4041 is located on front triangle structure 4098.

FIGS. 4.16 shows a cross section view of suspended body 4001 which is composed of gearbox housing 4099 and front triangle structure 4098 noted above. Also visible is electric motor 4700, which drives pinion gear 4701, which drives main gear 4702 that is connected to crank axle 4703. Note that pinion gear 4701 and main gear 4702 may be bevel, straight, spiral, or any other configuration. The assembly shown is simplified to shown the general design, and there are many features left out for clarity. For example, not shown is an optional clutch mechanism that separates the motor assist from the cranks. Also shown is cable 4704 that connect electric motor 4700 and battery 4705. Downtube cover 4706 is removable and allows for access to the electric motor 4700 or battery 4705.

FIGS. 4.17 shows an isometric exploded view of suspended body 4001 which is composed of gearbox housing 4099 and front triangle structure 4098 noted above. Also visible is electric motor 4700, which drives pinion gear 4701, which drives main gear 4702 that is connected to crank axle 4703. Note that pinion gear 4701 and main gear 4702 may be bevel, straight, spiral or any other configuration. The assembly shown is simplified to shown the general design, and there are many features left out for clarity. For example, not shown is an optional clutch mechanism that separates the motor assist from the cranks. Also shown is cable 4704 that connect electric motor 4700 and battery 4705. Downtube cover 4706 is removable and allows for access to the electric motor 4700 or battery 4705.

In current electric bicycle or pedelec designs, PIVCs are not integrated into motor, battery or gearbox housings. Breaking up suspended body 4001 into modular components with PIVCs located on more than one such as gearbox housing 4099 and front triangle structure 4098 has several advantages. First, it allows for better packaging of suspension linkages. If PIVC [1][3] 4040 was required to be part of front triangle structure 4098 rather than gearbox housing 4099, it would be difficult to fit 4-bar linkage 4048-E shown in FIG. 4.12 with other packaging constraints such as drive-train clearances. It would also be difficult to provide adequate clearance for linkage body 4003 and linkage body 4005. In addition, the front triangle structure would require a cantilevered “C” shape that extended over the gearbox housing to PIVC [1][3] 4040. This type of structure may have inadequate strength, may be difficult to manufacture, and may be heavy. As a result of the modular PIVC design, both the gearbox housing and the front triangle structure can be better optimized for weight, strength, and manufacturability. It also allows for more freedom to place linkage bodies and therefore tune kinematics which allows for increased suspension performance as described above.

Note that this is one possible embodiment and a person of ordinary skill in the art can and will understand other combinations possible in which PIVCs are located on modular bodies that form a rigid suspended body based on the disclosure herein. For example, a PIVC may be integrated into a motor and gearbox that is combined into one unit. These types of motor/gearbox assemblies are commonly used, but currently do not have integrated PIVCs. Another example could be a non-motorized two-wheel vehicle. Here the bottom bracket shell may be a separate modular component front the front triangle structure. In another non-motorized example, the gearbox may be a separate modular component front the front triangle structure but without motor assist. These types of gearbox assemblies are commonly used to replace traditional derailleur shifting systems, but currently do not have integrated PIVCs.

The invention claimed is:

1. A two-wheel vehicle suspension linkage that comprises:

a first linkage structure;

a modular component removably connected together with the first linkage structure forming a rigid body, wherein a housing of the modular component is connected together with the first linkage structure by at least a first fastener, wherein the modular component comprises an electric drive assembly;

a first physical instantaneous velocity center (PIVC) positioned on the first linkage structure; and a second PIVC positioned on the housing of the modular component.

2. The two-wheel vehicle suspension linkage of claim 1 further comprising:

an upper linkage assembly pivotally connected to the first linkage structure;

a lower linkage assembly pivotally connected to the first linkage structure; and a swingarm body-2 pivotally connected to the upper linkage assembly at an upper pivot and pivotally connected to the lower linkage assembly at a lower pivot, wherein the upper or lower linkage assembly constrains at least one of the upper or lower pivots to a first migration travel path with a non-constant radius of curvature.

3. The suspension linkage in claim 2, wherein the upper or lower linkage assembly constrains the other of the upper or lower pivots to a second migration travel path with a constant radius of curvature.

4. The suspension linkage in claim 3, wherein the upper linkage assembly constrains the upper pivot to the second migration travel path and the lower linkage assembly constrains the lower pivot to the first migration travel path.

5. The suspension linkage in claim 3, wherein the lower linkage assembly constrains the lower pivot to the second migration travel path and the upper linkage assembly constrains the upper pivot to the first migration travel path.

6. The suspension linkage in claim 3, wherein the at least one of the upper or lower pivots constrained to the migration travel path with a non-constant radius of curvature reverses directions as the other of the upper or lower pivots constrained to the migration travel path with a constant radius of curvature moves in one direction.

7. The suspension linkage in claim 2, wherein the upper or lower linkage assembly flexes in order to constrain the upper or lower pivot to the migration travel path with a non-constant radius of curvature.

8. The suspension linkage in claim 7, wherein the upper or lower linkage assembly flexes thereby inducing a spring force that promotes or opposes motion along the migration travel path with a non-constant radius of curvature as the swingarm body moves from an extended state to a compressed state.

9. The suspension linkage in claim 8, wherein the spring force that varies between promotion of the motion along the migration travel path and opposition to the motion along the migration travel path.

10. The suspension linkage in claim 8, wherein the spring force is correlated to the motion of the swingarm body, the correlation having two inflection points.

11. The suspension linkage in claim 10, wherein an inflection point is within a sag range.

12. The two-wheel vehicle suspension linkage of claim 2, further comprising a damper unit configured to resist movement between two or more of the first linkage structure, the swingarm body-2, the link body-3, the link body-4, the link body-5, or the link body-6.

13. The two-wheeled suspension linkage of claim 1, further comprising:

- a plurality of linkage bodies including:
  - the first linkage structure,
  - a link body-2,
  - a link body-3,
  - a link body-4,
  - a link body-5, and
  - a link body-6, wherein:
    - the plurality of linkage bodies are operatively coupled with one another,
    - the plurality of linkage bodies defines a plurality of physical instantaneous velocity centers (PIVCs) defining a plurality of PIVC migration paths, and
    - at least three PIVC migration paths reverse as the suspension linkage moves from the extended state at least partially to the compressed state.

14. The suspension linkage of claim 13 wherein:

- the link body-3 includes jointed connections with the first linkage structure defining a PIVC[1][3] at the second PIVC, and link body-5 defining a PIVC[3][5];
- the link body-4 includes jointed connections with the first linkage structure defining a PIVC[1][4], and link body-5 defining a PIVC[4][5];
- the link body-6 includes jointed connections with the suspended body-1 defining a PIVC[1][6], and the link body-2 defining a PIVC[2][6];
- the link body-5 includes a jointed connection with the link body-2 defining a PIVC[2][5]; wherein the PIVC[2][5] is not common with the PIVC[3][5] or the PIVC[4][5].

15. The suspension linkage in claim 14 wherein, a migration path of PIVC[2][5] has a radius of curvature greater than 100 mm at an instance as the suspension linkage moves from the extended state at least partially to the compressed state.

16. The suspension linkage in claim 15 wherein, another migration path of PIVC[2][5] has a radius of curvature greater than 500 mm at an instance as the suspension moves from the extended state at least partially to the compressed state.

17. The suspension linkage in claim 16 wherein, another migration path of PIVC[2][5] has a radius of curvature greater than 1000 mm at an instance as the suspension moves from the extended state at least partially to the compressed state.

18. The suspension linkage in claim 17 wherein, another migration path of PIVC[2][5] has a radius of curvature greater than 10,000 mm at an instance as the suspension moves from the extended state at least partially to the compressed state.

19. The suspension linkage in claim 14 wherein, the swingarm body-2 is a wheel carrier body and a brake carrier body.

20. The suspension linkage in claim 14 wherein, a migration path of PIVC[2][5] reverses as the suspension moves from the extended state at least partially to the compressed state.

21. The suspension linkage in claim 14 wherein, a migration path of PIVC[3][5] reverses as the suspension moves from the extended state at least partially to the compressed state.

22. The suspension linkage in claim 14 wherein, a migration path of PIVC[4][5] reverses as the suspension moves from the extended state at least partially to the compressed state.

23. The suspension linkage in claim 14 wherein, suspended body-1, link body-3, link body-4 and link body-5 are configured in a 4-bar configuration having an s-shaped travel path.

24. The suspension linkage in claim 14 wherein, suspended body-1, link body-3, link body-4 and link body-5 are configured in a 4-bar configuration.

25. The two-wheel vehicle suspension linkage in claim 14, wherein the jointed connections defined at the PIVC[3][5] and the PIVC[4][5] are flexural so that link body-3, link body-4 and link body-5 are combined into a single body.

26. The two-wheel vehicle suspension linkage of claim 13, wherein the migration paths of the PIVC[2][5], the PIVC[3][5] and the PIVC[4][5] reverse as the suspension linkage moves from an at least partially extended state to an at least partially compressed state.

27. The two-wheel vehicle suspension linkage of claim 1 further comprising:

- the first linkage structure;
- a swingarm body-2;
- a link body-3;
- a link body-4;
- a link body-5; and
- a link body-6 operatively coupled with one another such that a subset of four of the linkage members are operatively connected so that two joints are flexural.

28. The two-wheel vehicle suspension linkage of claim 1 further comprising: a second linkage structure being a single body linkage structure that is pivotally connected to the first linkage structure at more than one location with the single body linkage structure flexing to allow for relative motion with the first linkage structure.

29. The two-wheel vehicle suspension linkage of claim 28, further comprising a third linkage structure pivotally connected to the second linkage structure body.

30. The two-wheel vehicle suspension linkage of claim 29, wherein the third linkage structure is a swingarm.

31. The two-wheel vehicle suspension linkage of claim 29, wherein the second linkage structure has more than 2 instantaneous velocity centers (IVCs).

32. The two-wheel vehicle suspension linkage of claim 29, wherein the first linkage is front triangle which is connected to the third linkage structure via the second linkage structure.

33. The two-wheel vehicle suspension linkage in claim 32, wherein the front triangle has at least six IVCs.

34. The two wheeled vehicle suspension linkage in claim 33 comprising: the first linkage structure being a swingarm body and the second linkage structure being a single body flexural linkage, with the second linkage structure pivotally connected to the first linkage structure.

35. The two-wheel vehicle suspension linkage in claim 34, wherein the swingarm body is pivotally connected to a rigid member linkage body.

36. The two-wheel vehicle suspension linkage of claim 28, wherein the second linkage structure is integral with the first linkage structure at least at two locations.

37. The two-wheel vehicle suspension linkage of claim 36, wherein the second linkage structure extends from the integral connection with the first linkage structure on opposing sides of the IVCs of the second linkage.

38. The two-wheel vehicle suspension linkage in claim 1, wherein the first linkage structure comprises a front triangle structure, wherein the modular component is removably connected together with the front triangle structure.

39. The two-wheel vehicle suspension linkage in claim 1, wherein the modular component comprises a gearbox housing.

40. The two-wheel vehicle suspension linkage in claim 1, wherein the modular component comprises a motor housing.

41. The two-wheel vehicle suspension linkage in claim 40, wherein the two-wheel vehicle has motor assist.

42. The two-wheel vehicle suspension linkage in claim 1, wherein the modular component comprises a battery housing.

43. The two-wheel vehicle suspension linkage in claim 1, wherein the modular component comprises a bottom bracket housing.

44. The two-wheel vehicle suspension linkage of claim 1, wherein the first linkage structure and the modular component share three PIVCs therebetween.

45. The two-wheel vehicle suspension linkage of claim 1, wherein the second PIVC positioned on the modular component is in a fixed location.

46. A two-wheel vehicle suspension linkage that comprises:

a front triangle structure;

a modular component removably connected together with the front triangle structure to form a rigid body, wherein the modular component is connected together with the front triangle structure by at least a first mounting location;

a physical instantaneous velocity center (PIVC) positioned on the modular component, wherein an output shaft of the modular component is offset from the PIVC.

47. The two-wheel vehicle suspension linkage of claim 46, wherein the PIVC positioned on the modular component is in a fixed location.

48. The two-wheel vehicle suspension linkage of claim 47, wherein the modular component is a gearbox.

49. The two-wheel vehicle suspension linkage of claim 47, wherein the modular component is a motor and gearbox combined into one unit.

* * * * *